(12) United States Patent
Simpson

(10) Patent No.: US 12,346,987 B2
(45) Date of Patent: Jul. 1, 2025

(54) PRICE TIME PRIORITY QUEUE ROUTING FOR TRANSPORTATION CAPACITY UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 3 days.

(21) Appl. No.: 17/069,597

(22) Filed: Oct. 13, 2020

(65) Prior Publication Data

US 2021/0042872 A1 Feb. 11, 2021

Related U.S. Application Data

(63) Continuation-in-part of application No. 16/589,229, filed on Oct. 1, 2019, now abandoned, which is a
(Continued)

(51) Int. Cl.
*G06Q 10/047* (2023.01)
*G01C 21/34* (2006.01)
(Continued)

(52) U.S. Cl.
CPC ......... *G06Q 50/40* (2024.01); *G01C 21/3423* (2013.01); *G01C 21/3484* (2013.01);
(Continued)

(58) Field of Classification Search
None
See application file for complete search history.

(56) References Cited

U.S. PATENT DOCUMENTS

D209,710 S   12/1967   Bruce
4,476,954 A  10/1984   Johnson et al.
(Continued)

FOREIGN PATENT DOCUMENTS

CN   107341968 A   11/2017
GB     2539556 A   12/2016
(Continued)

OTHER PUBLICATIONS

PCT International Search Report and Written Opinion; PCT/US2020/027543; Jul. 1, 2020.
(Continued)

*Primary Examiner* — Peter D Nolan
*Assistant Examiner* — Matthew Cobb
(74) *Attorney, Agent, or Firm* — Pramudji Law Group PLLC; Ari Pramudji

(57) ABSTRACT

Various implementations directed to price time priority queue routing for transportation capacity units are provided. In one implementation, a method may include receiving origin location data and destination location data. The method may also include generating routes based on the origin location data and the destination location data. The method may further include determining virtual hubs along the routes, where the virtual hubs include a first virtual hub based on the origin location data and a second virtual hub based on the destination location data. The method may additionally include receiving travel cost data for the routes for geolocation exchange units. In addition, the method may include receiving market depth data for a geolocation exchange for the geolocation exchange units based on the routes. The method may also include selecting an optimized route of the routes for the geolocation exchange units based on an objective function.

12 Claims, 53 Drawing Sheets

Related U.S. Application Data continuation-in-part of application No. 16/556,838, filed on Aug. 30, 2019, now Pat. No. 11,555,709, application No. 17/069,597 is a continuation-in-part of application No. 16/397,685, filed on Apr. 29, 2019, now Pat. No. 12,154,183, which is a continuation-in-part of application No. 16/359,841, filed on Mar. 20, 2019, now Pat. No. 12,141,885, which is a continuation-in-part of application No. 16/357,241, filed on Mar. 18, 2019, now Pat. No. 12,165,223, said application No. 16/556,838 is a continuation-in-part of application No. 16/274,490, filed on Feb. 13, 2019, now Pat. No. 11,215,466, which is a continuation-in-part of application No. 16/258,658, filed on Jan. 27, 2019, now Pat. No. 11,035,682, which is a continuation-in-part of application No. 16/257,032, filed on Jan. 24, 2019, now abandoned, which is a continuation-in-part of application No. 16/242,981, filed on Jan. 8, 2019, now abandoned, which is a continuation-in-part of application No. 16/242,967, filed on Jan. 8, 2019, now Pat. No. 12,001,999, which is a continuation-in-part of application No. 16/239,485, filed on Jan. 3, 2019, which is a continuation-in-part of application No. 16/183,647, filed on Nov. 7, 2018, now Pat. No. 11,861,527, said application No. 16/357,241 is a continuation-in-part of application No. 16/183,647, filed on Nov. 7, 2018, now Pat. No. 11,861,527, which is a continuation-in-part of application No. 16/167,525, filed on Oct. 22, 2018, now Pat. No. 11,810,023, which is a continuation-in-part of application No. 15/877,393, filed on Jan. 23, 2018, now Pat. No. 12,124,976, which is a continuation-in-part of application No. 15/266,326, filed on Sep. 15, 2016, now Pat. No. 11,138,827.

(60) Provisional application No. 63/052,159, filed on Jul. 15, 2020, provisional application No. 63/051,373, filed on Jul. 13, 2020, provisional application No. 63/044,997, filed on Jun. 26, 2020, provisional application No. 63/039,918, filed on Jun. 16, 2020, provisional application No. 63/027,344, filed on May 19, 2020, provisional application No. 62/927,081, filed on Oct. 28, 2019, provisional application No. 62/914,427, filed on Oct. 12, 2019.

(51) Int. Cl.
| | |
|---|---|
| *G06Q 10/02* | (2012.01) |
| *G06Q 10/083* | (2023.01) |
| *G06Q 10/0835* | (2023.01) |
| *G06Q 10/10* | (2023.01) |
| *G06Q 30/0201* | (2023.01) |
| *G06Q 30/0204* | (2023.01) |
| *G06Q 30/08* | (2012.01) |
| *G06Q 50/40* | (2024.01) |
| *G06Q 30/0282* | (2023.01) |
| *G06Q 50/26* | (2012.01) |

(52) U.S. Cl.
CPC .......... *G06Q 10/02* (2013.01); *G06Q 10/047* (2013.01); *G06Q 10/083* (2013.01); *G06Q 10/08355* (2013.01); *G06Q 10/10* (2013.01); *G06Q 30/0205* (2013.01); *G06Q 30/0206* (2013.01); *G06Q 30/08* (2013.01); *G06Q 30/0282* (2013.01); *G06Q 50/265* (2013.01)

(56) References Cited

U.S. PATENT DOCUMENTS

| | | |
|---|---|---|
| D318,073 S | 7/1991 | Jang |
| 5,249,259 A | 9/1993 | Harvey |
| 5,412,560 A | 5/1995 | Dennison |
| 5,604,676 A | 2/1997 | Penzias |
| 5,726,885 A | 3/1998 | Klein et al. |
| 5,751,245 A | 5/1998 | Janky et al. |
| 5,948,040 A | 9/1999 | DeLorme |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,400,996 B1 | 6/2002 | Hoffberg |
| D460,952 S | 7/2002 | Kataoka |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,010,472 B1 | 3/2006 | Vasey-Glandon et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 * | 12/2009 | Alvarado ............... G06Q 50/06 705/37 |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcorn et al. |
| D628,171 S | 11/2010 | Hakopian |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Haney |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 1/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |

(56) References Cited

U.S. PATENT DOCUMENTS

| | | |
|---|---|---|
| 9,960,637 B2 | 5/2018 | Sanders et al. |
| 9,978,282 B2 | 5/2018 | Lambert et al. |
| 1,008,279 A1 | 9/2018 | Glaser |
| D832,355 S | 10/2018 | Castro |
| 10,216,367 B1 | 2/2019 | Patel |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,872,381 B1 | 10/2020 | Leise et al. |
| 10,832,337 B1 | 11/2020 | Floyd et al. |
| D903,657 S | 12/2020 | Catania |
| D903,658 S | 12/2020 | Catania |
| D903,659 S | 12/2020 | Catania |
| D910,758 S | 2/2021 | Leong |
| 11,138,827 B2 | 10/2021 | Simpson |
| D938,375 S | 12/2021 | Zhang |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 | 1/2023 | Simpson |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,704,219 B1 | 7/2023 | Lerner et al. |
| 11,722,500 B2 | 8/2023 | Singh |
| 11,734,618 B2 | 8/2023 | Ogden |
| 1,000,137 A1 | 10/2023 | Shuster |
| 1,007,451 A1 | 12/2023 | Im |
| 1,024,065 A1 | 4/2024 | Kim |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017977 A1* | 2/2002 | Wall ............... G06Q 10/08 340/8.1 |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomaian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0254819 A1 | 12/2004 | Halim |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh |
| 2006/0184321 A1 | 8/2006 | Kawakami |
| 2007/0005224 A1 | 1/2007 | Sutardja |
| 2007/0260723 A1 | 11/2007 | Cohen |
| 2008/0033833 A1 | 2/2008 | Senior |
| 2008/0040232 A1 | 2/2008 | Perchthaler |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1 | 2/2010 | Bai et al. |
| 2010/0081548 A1 | 4/2010 | Labedz |
| 2010/0114790 A1* | 5/2010 | Strimling ............ G06Q 10/083 705/330 |
| 2010/0191834 A1 | 7/2010 | Zampiello |
| 2010/0208029 A1 | 8/2010 | Marti |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2010/0318373 A1 | 12/2010 | Harris |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Ajjarapu et al. |
| 2011/0184784 A1 | 7/2011 | Rudow |
| 2011/0191248 A1 | 8/2011 | Bishop |
| 2011/0202418 A1 | 8/2011 | Kempton et al. |
| 2012/0023032 A1 | 1/2012 | Visdomini |
| 2012/0072925 A1 | 3/2012 | Jenkins et al. |
| 2012/0075067 A1 | 3/2012 | Attaluri |
| 2012/0078743 A1* | 3/2012 | Betancourt ............ G06Q 30/08 705/338 |
| 2012/0101629 A1 | 4/2012 | Olsen et al. |
| 2012/0136527 A1 | 5/2012 | McQuade |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0035973 A1 | 2/2013 | Desai et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0032034 A1 | 1/2014 | Raptopoulos |
| 2014/0038781 A1 | 2/2014 | Foley |
| 2014/0052500 A1 | 2/2014 | Vallapuzha et al. |
| 2014/0075528 A1* | 3/2014 | Matsuoka ............ H04L 63/102 726/7 |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0282586 A1 | 9/2014 | Shear et al. |
| 2014/0310019 A1 | 10/2014 | Blander et al. |
| 2014/0310149 A1 | 10/2014 | Singh |
| 2014/0324633 A1* | 10/2014 | Pollak ............... G06Q 10/083 705/26.63 |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |

(56) References Cited

U.S. PATENT DOCUMENTS

| | | |
|---|---|---|
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0018969 A1 | 1/2016 | Sundarraman |
| 2016/0026253 A1 | 1/2016 | Bradski et al. |
| 2016/0034305 A1 | 2/2016 | Shear et al. |
| 2016/0041628 A1 | 2/2016 | Verma |
| 2016/0063436 A1 | 3/2016 | Coles |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0221935 A1 | 8/2016 | Jaworska-Maslanka |
| 2016/0224935 A1* | 8/2016 | Burnett .............. G06Q 10/0834 |
| 2016/0225115 A1 | 8/2016 | Levy et al. |
| 2016/0253662 A1 | 9/2016 | Sriram |
| 2016/0307276 A1 | 9/2016 | Young |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1* | 11/2016 | Dube .............. G06Q 10/08355 |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1* | 10/2017 | Narkulla .............. G06Q 10/083 |
| 2017/0293950 A1 | 10/2017 | Rathod |
| 2017/0318325 A1 | 11/2017 | Ortiz |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0088455 A1 | 3/2018 | Cippant |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0165354 A1 | 6/2018 | Jagota et al. |
| 2018/0173742 A1 | 6/2018 | Liu et al. |
| 2018/0173800 A1 | 6/2018 | Chang et al. |
| 2018/0188715 A1 | 7/2018 | Cella et al. |
| 2018/0209801 A1 | 7/2018 | Stentz |
| 2018/0209803 A1 | 7/2018 | Rakah |
| 2018/0238705 A1 | 8/2018 | O'Herlihy |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0180862 A1 | 6/2019 | Wisser et al. |
| 2019/0186942 A1 | 6/2019 | Rubin |
| 2019/0188450 A1 | 6/2019 | Spivack et al. |
| 2019/0202448 A1 | 7/2019 | Pal et al. |
| 2019/0204110 A1 | 7/2019 | Dubielzyk |
| 2019/0205793 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0259008 A1 | 8/2019 | Lindsey |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0318286 A1 | 10/2019 | Simpson |
| 2019/0324989 A1 | 10/2019 | Borochoff et al. |
| 2019/0325541 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |
| 2021/0004909 A1 | 1/2021 | Farmer et al. |
| 2021/0012278 A1 | 1/2021 | Alon et al. |
| 2021/0041258 A1 | 2/2021 | Simpson |
| 2021/0042835 A1 | 2/2021 | Simpson |
| 2021/0065100 A1 | 3/2021 | Hwang |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1 | 10/2021 | Simpson |
| 2021/0326872 A1 | 10/2021 | Robotham |
| 2021/0379447 A1 | 12/2021 | Lee |
| 2021/0382924 A1 | 12/2021 | Aaltonen et al. |
| 2022/0020073 A1 | 1/2022 | Farmer |
| 2022/0068081 A1 | 3/2022 | Pariseau |

(56) References Cited

U.S. PATENT DOCUMENTS

| | | | |
|---|---|---|---|
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | |
|---|---|---|
| JP | 2003177034 A | 12/2001 |
| KR | 20170078094 A1 | 12/2015 |
| WO | 2001041084 A2 | 6/2001 |
| WO | 2015059691 A1 | 4/2015 |
| WO | 2015161307 A1 | 4/2015 |
| WO | 2018024844 A1 | 2/2018 |
| WO | 2019/134005 A1 | 7/2019 |
| WO | 2019183468 A1 | 9/2019 |
| WO | 2021/163675 A1 | 8/2021 |

OTHER PUBLICATIONS

PCT International Search Report and Written Opinion; PCT/US2020/023223; Jun. 19, 2020.
PCT International Search Report and Written Opinion; PCT/US2020/023729; Jun. 18, 2020.
PCT International Search Report and Written Opinion; PCT/US2020/021546; Jun. 8, 2020.
PCT International Search Report and Written Opinion; PCT/US2020/018012; Apr. 21, 2020.
PCT International Search Report and Written Opinion; PCT/US2020/012208; Mar. 24, 2020.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020).
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?.
Peters, et al.; Student Support Services for Online Learning Re-Imagined and Re-Invigorated: Then, Now and What's To Come; Contact North | Contact Nord; Sep. 2017.
Soccer ball-shaped drone might be the safest flying robot yet https://mashable.com/2015/12/21/soccer-ball-drone/ ; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205; filed Jan. 1, 19970.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool For YOur Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.

Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php,dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust in the Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13 , Mar. 27, 2019.
PCT International Search Report and Written Opinion; PCT/US2021/065855; Mar. 29, 2022.
PCT International Search Report and Written Opinion; PCT/US2022/012717; Mar. 30, 2022.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
PCT International Search Report and Written Opinion; PCT/US2022/027077; Nov. 1, 2022.
Wei, et al. "impact of aircraft size and seat availability on airlines demand and market share in duopoly markets" Published by Elsevier, 2005, pp. 315-327.
PCT International Search Report and Written Opinion; PCT/US2022/052969; Mar. 21, 2023.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; Mar. 8, 2023.
EP23168879.7 European Search Report, Jul. 5, 2023, pp. 1-13.
Papa, U., & Del Core, G., "Design of Sonar Sensor Model for Safe Landing of an UAV," IEEE Metrology for Aerospace, 2015, pp. 346-350.
EP23153137.7 European Search Report, May 24, 2023, pp. 1-10.
EP20787830.7 European Search Report, May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; 2023may08; p. 1.

(56) References Cited

OTHER PUBLICATIONS

Freebeat, Smart Exercise Bike; retrieved from internet: https://www.amazon.com/Resistance-Cushioned-Detection-Altorithm-Instructors/dp/B0BZKKZ6B3/7th=1, 2023mar03; p. 1.

Bortolini, et al.; "Fresh food sustainable distribution: cost, delivery time and carbon footprint three-objective optimization," 2016, pp. 1-12.

Fulldomepro, VR Aquatic Simulator with a Dome, Pub. Sep. 3, 2018, https://www.youtube.com/watch?v=k_53G5DksjQ, pp. 1-2.

Randomoneh, Dome Screens & Displays, Pub. Oct. 12, 2012, https:// hardforum.com/threads/dome-screens-displays, p. 1.

Borgobello, Bridget, TOOB Personal Dome Screen Revamped, Pub. Jan. 12, 2012, https:// newatlas.com/toob-earth-personal-dome-screen/21082, p. 1.

Asghari, et al; "Price-aware Real-time Ride-sharing at Scale—An Auction-based Approach", Oct. 31, 2016, SIGSPACIAL'16: Proceedings of the 24th ACM SIGSPATIAL International Conference on Advances in Geographic Information Systems, Article No. 3, pp. 1-10.

EP22740218.7 European Search Report, Nov. 12, 2024, pp. 1-29.

Aratani, Lori, "This app wants to reward you for smart commuting choices," The Washington Post, Aug. 18, 2018, pp. 1-3.

Yu, Haicong et al.; "A Multi-Modal Route Planning Approach with an Improved Genetic Algorithm", The International Archives of the Photogrammetry, Remote Sensing and Spaital Information Sciences, vol. 38, Part I, 2010.

"Node Influence Metric", Wikipedia, Nov. 6, 2020, pp. 1-5.

EP21916571 European Search Report, May 29, 2024, pp. 1-9.

Karbassi, et al.; "Vehicle Route Prediction and Time of Arrival Estimation Techniques for Improved Transportation System Management" Published by IEEE; 2003, pp. 511-516.

EP23153137.7 Exam Report (Communication pursuant to Article 94(3) EPC), Mar. 5, 2025, pp. 1-11.

Chang, et al., "Estimating Real-Time Traffic Carbon Dioxide Emissions Based on Intelligent Transportation System Technologies," IEEE Mar. 1, 2023, vol. 14, pp. 1-11.

Zhao, et al., Deshpande, P. M., Naughton, J. F., & Shukla, A (1998, Jun.). Simultaneous optimization and evaluation of multiple dimensional queries. In Proceedings of the 1998 ACM SIGMOD international conference on Mangement of data (pp. 271-282).

* cited by examiner

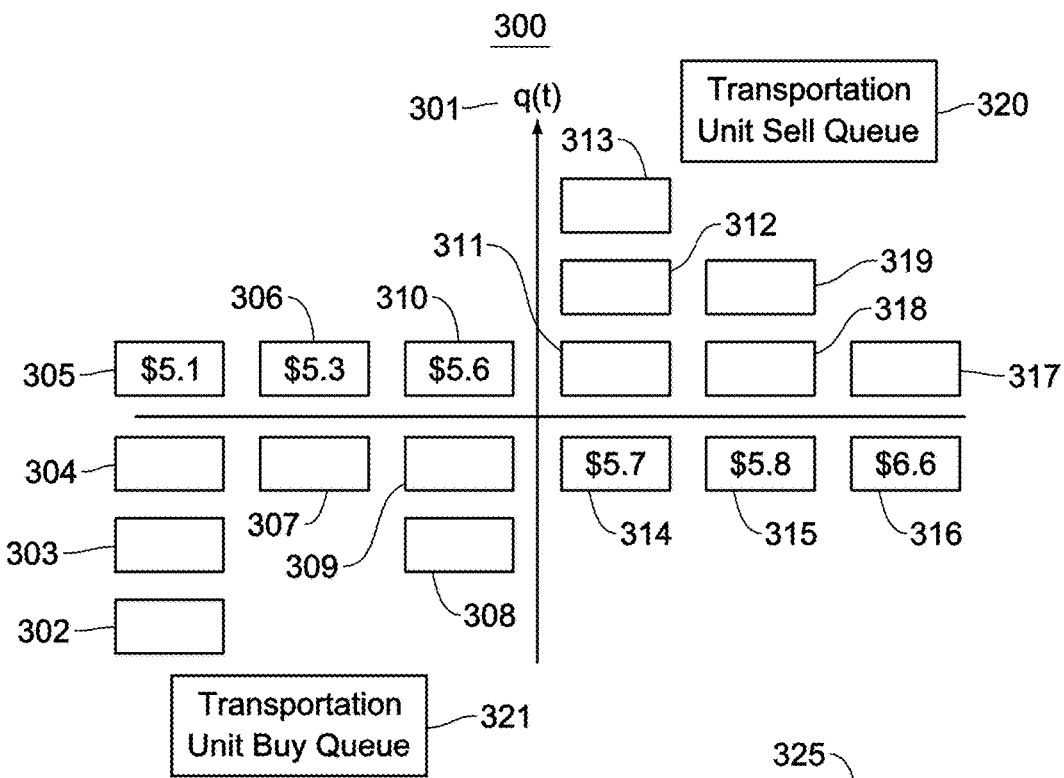

Transportation unit specification limit order book ("LOB") is represented by vector $q(t)$ such that the i-th coordinate for $i>0$, $q_i(t)$, is the number of sell limit orders that are waiting in the LOB at time t at price $i\delta$ ($\delta$ is the price unit tick size) The number of buy limit orders at $i\delta$ are represented with a negative sign $q_i(t)$ $s(t) = s(q(t)) = \min(\min\{0 < i\delta : q_i(t) > 0\})$
if $q_i(t) \leq 0$ for all $i > 0$, then $s(q(t)) = \infty$ $b(t) = b(q(t)) = \max(\max\{i\delta > 0 : q_i(t) < 0\})$
if $q_i(t) \geq 0$ for all $i > 0$, then $b(q(t)) = -\infty$ If $s(t) = b(t)$, then match transportation unit specification and move to confirmation process If $s(t) > b(t)$, maintain queue position If $s(t)$ or $b(t)$ is cancelled, remove from queue If $s(t)$ or $b(t)$ is new, insert $s(t)$ or $b(t)$ with priority of price, then time into price time priority queue of LOB

MODEL MAKE — 4015
- ACURA ✓ — 4020
- BMW ☐
- DAIMLER ☐
- FORD ☐
- GM, HONDA, ETC. ☐

4051

MODEL TYPE — 4025
- MDX ✓ — 4030
- BDX ☐
- NSX ☐
- TLX ☐
- ILX ☐

MODEL YEAR — 4035
- 2019 ✓ — 4040
- 2020 ☐

MODEL FUEL TYPE — 4045
- ELECTRIC ☐
- GASOLINE ✓ — 4050
- DIESEL ☐
- SOLAR ☐

Let $y_i, i \in M$, be a binary variable taking the value 1 if supplier $i$ is selected, and 0 otherwise. Let $x_{ij}, (i,j) \in A$, be a binary variable taking value 1 if arc $(i,j)$ is traversed, and 0 otherwise. Let $Z_{ik}, k \in K, i \in M_k$, be a variable representing the number of units of product $k$ purchased in supplier $i$. Moreover, for any subset $V'$ of nodes, let us define $\delta + (V') := \{(i,j) \in A : i \in V', j \notin V'\}$ and $\delta - (V') := \{(i,j) \in A : i \notin V', j \in V'\}$. Then price time priority queue routing:

$$\min \sum_{(i,j) \in A}^{n} c_{ij} x_{ij} \sum_{k \in K} \sum_{i \in M_k} P_{ik} Z_{ik} :$$ 4803

$$\text{subject to } \sum_{i \in M_k} Z_{ik} = d_k \qquad k \in K$$ 4804

$$Z_{ik} \leq q_{ik} y_i \qquad k \in K, i \in M_k$$ 4805

$$\sum_{(i,j) \in \delta+(\{h\})} x_{ij} = \sum_{(i,j) \in \delta-(\{h\})} x_{ij} = y_h \qquad h \in M$$ 4806

$$\sum_{(i,j) \in \delta-(M')} x_{ij} \geq y_h = \qquad M' \subseteq M, h \in M'$$ 4807

$$x_{ij} \in \{0,1\} \qquad (i,j) \in A$$ 4808

$$y_i \in \{0,1\} \qquad i \in M$$ 4809

$$z_{iik} \geq 0 \qquad k \in K, i \in M_k$$ 4810

FIG. 48

A first trivial preprocessing can be applied to 4800

$$M^* \stackrel{\text{def}}{=} \{0\} \cup \left\{ i \in M : \exists\, k \in K \text{ such that } \sum_{j \in M_k/\{i\}} q_{ik} < d_k \right\}$$

as the node set that must be necessarily part of any feasible solution and $K^* := \left\{ k \in K : \sum_{i \in M_k} q_{ik} = d_k \right\}$ as the product set for which suppliers selection and purchasing plan decisions can be predetermined Thus constraints 4809 may be replaced by $y_i = 1$ when $i \in M^*$, and contraints 4804 by $z_{ik} = q_{ik}$ when $k \in K^*, i \in M_k$

FIG. 49

Introducing a non − negative variable $u_i$ for each supplier $i \in M$ representing the total number of suppliers already visited when leaving supplier i. The we may substitute inequality 4807 with $$u_i - u_j + |M|x_{ij} \leq |M| - 1 \quad i,j \in M, i \neq j$$

that prevent the creation of subtours by controlling the order of visit of the suppliers.

Another embodiment is to define a non − negative flow variable $f_{ij}$ for each arc $(i,j) \in A$ representing the quanity of a commodity on the vehicle when it leaves supplier i and arrives in j. Then the single commodity flow formulation may be obtained by substituting inequalities 4806 and 4807 with the following:

$$\sum_{j \in M} f_{0j} = \sum_{k \in K} d_k$$

$$\sum_{j(i,j) \in \delta+(\{h\})} f_{ij} - \sum_{(i,j) \in \delta-(\{h\})} f_{ij} = -\sum_{k \in K} z_{hk} \quad h \in M$$

$$f_{ij} \leq x_{ij} \sum_{k \in K} d_k \quad (i,j) \in A$$

FIG. 50

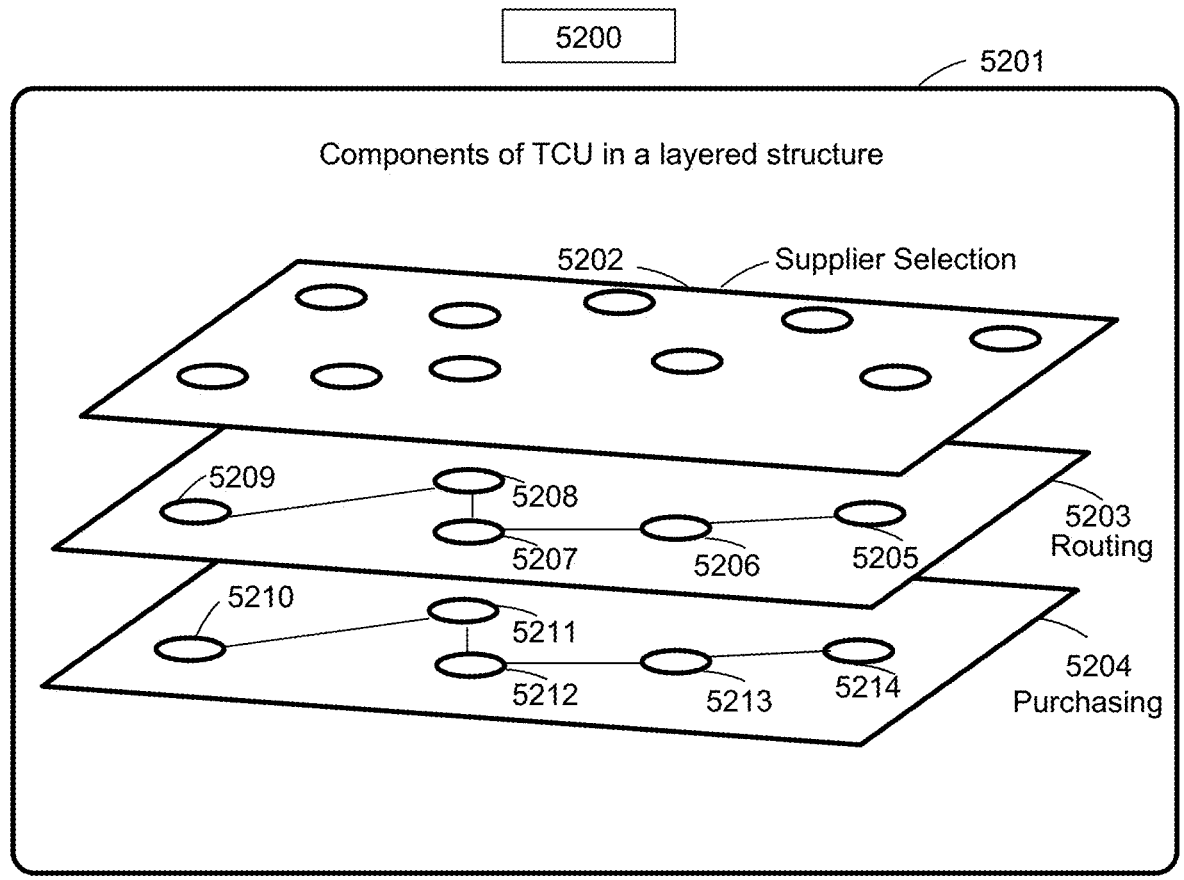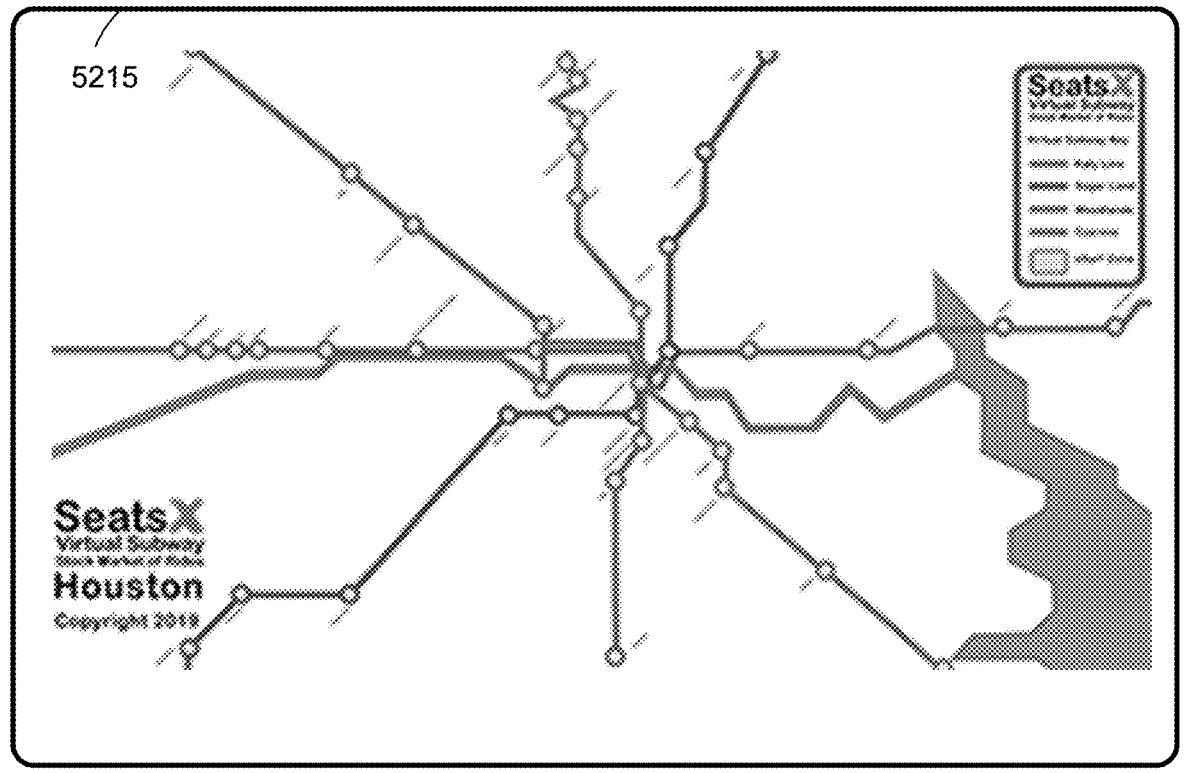
FIG. 52

PRICE TIME PRIORITY QUEUE ROUTING FOR TRANSPORTATION CAPACITY UNITS

CROSS-REFERENCE TO RELATED APPLICATIONS

This application claims the benefit of: U.S. provisional patent application Ser. No. 62/914,427, filed Oct. 12, 2019 and titled "ASYMETRIC VIRTUAL SUBWAY TRAVEL DISTANCE PRICE TIME PRIORITY QUEUE ROUTING FOR TRANSPORTATION CAPACITY UNITS;" U.S. provisional patent application Ser. No. 62/927,081, filed Oct. 28, 2019 and titled "TOLL AND CONGESTION COMMUNITY OBJECTS WITH PRICE—TIME PRIORITY QUEUES FOR TRANSFORMED TOLL AND CONGESTION CAPACITY UNITS;" U.S. provisional patent application Ser. No. 63/027,344, filed May 19, 2020 and titled "TIME INTERVAL GEOLOCATION COMMUNITY OBJECTS WITH PRICE TIME PRIORITY QUEUES FOR TRANSFORMED TIME INTERVAL GEOLOCATION UNITS;" U.S. provisional patent application Ser. No. 63/039,918, filed Jun. 16, 2020 and titled "VIRTUAL REALITY, AUGMENTED REALITY, MIXED REALITY DATA EXCHANGE SOCIAL NETWORK WITH MULTI-DIMENSIONAL MAP TILE PORTING;" U.S. provisional patent application Ser. No. 63/044,997, filed Jun. 26, 2020 and titled "MULTI-DIMENSIONAL CLASSIFICATION OBJECT MATRICES TO ESTIMATE MULTI-DIMENSIONAL REPRESENTATIONS WITH MULTI-FUNCTION DEVICE;" U.S. provisional patent application Ser. No. 63/052,159, filed Jul. 15, 2020 and titled "MULTI-DIMENSION INFORMATION SERVICE HELMET METHOD AND SYSTEM;" and U.S. provisional patent application Ser. No. 63/051,373, filed Jul. 13, 2020 and titled "VIRTUAL POWER PLANT OPTIMIZATION METHOD AND SYSTEM;" each of which is herein incorporated by reference.

This application is a continuation-in-part of U.S. patent application Ser. No. 16/589,229, entitled "TRANSPORTATION AND FREIGHT CAPACITY UNITS," filed Oct. 1, 2019; which is a continuation-in-part of U.S. patent application Ser. No. 16/556,838, entitled "FINANCIAL SWAP INDEX METHOD AND SYSTEM ON TRANSPORTATION CAPACITY UNITS AND TRADING DERIVATIVE PRODUCTS BASED THEREON," filed Aug. 30, 2019; which is a continuation-in-part of U.S. patent application Ser. No. 16/274,490, entitled "ROUTE COMMUNITY OBJECTS WITH PRICE-TIME PRIORITY QUEUES FOR TRANSFORMED TRANSPORTATION UNITS," filed Feb. 13, 2019; which is a continuation-in-part of U.S. patent application Ser. No. 16/258,658, entitled "NAVIGATION ROUTES AS COMMUNITY OBJECT VIRTUAL HUB SEQUENCES TO WHICH USERS MAY SUBSCRIBE," filed Jan. 27, 2019; which is a continuation-in-part of U.S. patent application Ser. No. 16/257,032, entitled "SECURITIZATION OF TRANSPORTATION UNITS," filed Jan. 24, 2019; which is a continuation-in-part of U.S. patent application Ser. No. 16/242,981, entitled "STRATEGY GAME LAYER OVER PRICE BASED NAVIGATION," filed Jan. 8, 2019; which is a continuation-in-part of U.S. patent application Ser. No. 16/242,967, entitled "PRICE BASED NAVIGATION," filed Jan. 8, 2019; which is a continuation-in-part of U.S. patent application Ser. No. 16/239,485, entitled "MARKET LAYER PRICE QUEUE ROUTING FOR MULTI-LAYERED NODAL NETWORK TOPOLOGY FOR A MULTI-MODAL SECURE FORWARD MARKET AUCTION IN TRANSPORTATION CAPACITY AND SPACE," filed Jan. 3, 2019; which is a continuation-in-part of U.S. patent application Ser. No. 16/183,647, entitled "FINANCIAL SWAP PAYMENT STRUCTURE METHOD AND SYSTEM ON TRANSPORTATION CAPACITY UNIT ASSETS," filed Nov. 7, 2018; which is a continuation-in-part of U.S. patent application Ser. No. 16/167,525, entitled "MULTI-LAYERED NODAL NETWORK TOPOLOGY FOR A MULTI-MODAL SECURE FORWARD MARKET AUCTION IN TRANSPORTATION CAPACITY AND SPACE," filed Oct. 22, 2018; which is a continuation-in-part of U.S. patent application Ser. No. 15/877,393, entitled "ELECTRONIC FORWARD MARKET EXCHANGE FOR TRANSPORTATION SEATS AND CAPACITY IN TRANSPORTATION SPACES AND VEHICLES," filed Jan. 23, 2018; which is a continuation-in-part of U.S. patent application Ser. No. 15/266,326, entitled "IMPLEMENTATIONS OF A COMPUTERIZED BUSINESS TRANSACTION EXCHANGE FOR VARIOUS USERS," filed Sep. 15, 2016; each of which is herein incorporated by reference.

This application is also a continuation-in-part of U.S. patent application Ser. No. 16/397,685, entitled "TUTORING COMMUNITY OBJECTS WITH PRICE TIME PRIORITY QUEUES FOR TRANSFORMED TUTORING UNITS," filed Apr. 29, 2019; which is a continuation-in-part of U.S. patent application Ser. No. 16/359,841, entitled "PARKING COMMUNITY OBJECTS WITH PRICE-TIME PRIORITY QUEUES FOR TRANSFORMED PARKING UNITS," filed Mar. 20, 2019; which is a continuation-in-part of U.S. patent application Ser. No. 16/357,241, entitled "RENEWABLE ENERGY COMMUNITY OBJECTS WITH PRICE TIME PRIORITY QUEUES FOR TRANSFORMED RENEWABLE ENERGY UNITS," filed Mar. 18, 2019; which is a continuation-in-part of U.S. patent application Ser. No. 16/183,647, entitled "FINANCIAL SWAP PAYMENT STRUCTURE METHOD AND SYSTEM ON TRANSPORTATION CAPACITY UNIT ASSETS," filed Nov. 7, 2018; which is a continuation-in-part of U.S. patent application Ser. No. 16/167,525, entitled "MULTI-LAYERED NODAL NETWORK TOPOLOGY FOR A MULTI-MODAL SECURE FORWARD MARKET AUCTION IN TRANSPORTATION CAPACITY AND SPACE," filed Oct. 22, 2018; which is a continuation-in-part of U.S. patent application Ser. No. 15/877,393, entitled "ELECTRONIC FORWARD MARKET EXCHANGE FOR TRANSPORTATION SEATS AND CAPACITY IN TRANSPORTATION SPACES AND VEHICLES," filed Jan. 23, 2018; which is a continuation-in-part of U.S. patent application Ser. No. 15/266,326, entitled "IMPLEMENTATIONS OF A COMPUTERIZED BUSINESS TRANSACTION EXCHANGE FOR VARIOUS USERS," filed Sep. 15, 2016; each of which is herein incorporated by reference.

BACKGROUND OF THE INVENTION

The following descriptions and examples are not admitted as prior art by virtue of their inclusion within this section.

In some scenarios, carpool, vanpool, bus transit, boat, ship, freight, train, airline, subway, taxi, drone, helicopter, transportation network company, scooter units, bike units, and shared transport unit route sequence models may not utilize dynamic virtual topology market queues or price time priority queues. Such queues may not be used because transportation systems may typically considered to be closed, non-transparent, non-substitutable, and/or non-transferable, no cost of cover calculations exist, and the construct for dynamic routing based on transportation or freight unit marketplaces may not be understood. Further, in such scenarios, legal or physical transformations may not exist for transportation or freight capacity units to trade as commodities, which may prevent the formation of routing sequences that are based upon market dynamic, transparent market price-based inputs in edge weights or edge values. In these scenarios, methods and systems may lack the legal and physical calculation mechanics for transportation and freight capacity units, which may limit dimension routing analysis and equation usefulness.

Deficiencies in market structure and legal and physical commuter, livery, and freight transportation may not allow for the transferability of an underlying ticket, ride or freight, which may inhibit flexibility to exchange such an asset and may lead to the development of monopolistic systems. Further, in some scenarios, transportation options may allow for transferability, but they may lack structures which account for force majeure contingencies, remedies for transportation capacity unit delivery failures, events of default, remedies, calculation formulas for termination payments, or independent valuation transformations. In such scenarios, the ability to trade the value of ride or freight capacity may be limited.

SUMMARY

Described herein are implementations of various technologies relating to a price time priority queue routing for transportation capacity units. In one implementation, a method may include receiving origin location data and destination location data from a first user, where the origin location data corresponds to a geographic origin and the destination location data corresponds to a geographic destination. The method may also include generating a plurality of routes based on the origin location data and the destination location data. The method may further include determining a plurality of virtual hubs along the plurality of routes, where the plurality of virtual hubs includes a first virtual hub based on the origin location data and a second virtual hub based on the destination location data. The method may additionally include receiving travel cost data for the plurality of routes for one or more geolocation exchange units, where the one or more geolocation exchange units corresponds to a predetermined space traveling from the first virtual hub to the second virtual hub, and where the travel cost data includes data relating to travel time, travel expenses, or combinations thereof. In addition, the method may include receiving market depth data for a geolocation exchange for the one or more geolocation exchange units based on the plurality of routes, where the market depth data includes one or more bid prices and one or more offer prices for the one or more geolocation exchange units. The method may also include selecting an optimized route of the plurality of routes for the one or more geolocation exchange units based on an objective function, where the objective function uses the travel cost data, the market depth data, or combinations thereof.

In another implementation, a computing system may include one or more processors, and the computing system may also include one or more memory having program instructions executable by the one or more processors to receive origin location data and destination location data from a first user, where the origin location data corresponds to a geographic origin and the destination location data corresponds to a geographic destination. The one or more memory may also have program instructions executable by the one or more processors to generate a plurality of routes based on the origin location data and the destination location data. The one or more memory may further have program instructions executable by the one or more processors to determine a plurality of virtual hubs along the plurality of routes, where the plurality of virtual hubs includes a first virtual hub based on the origin location data and a second virtual hub based on the destination location data. The one or more memory may additionally have program instructions executable by the one or more processors to receive travel cost data for the plurality of routes for one or more geolocation exchange units, where the one or more geolocation exchange units corresponds to a predetermined space traveling from the first virtual hub to the second virtual hub, and where the travel cost data includes data relating to travel time, travel expenses, or combinations thereof. In addition, the one or more memory may have program instructions executable by the one or more processors to receive market depth data for a geolocation exchange for the one or more geolocation exchange units based on the plurality of routes, where the market depth data includes one or more bid prices and one or more offer prices for the one or more geolocation exchange units. The one or more memory may also have program instructions executable by the one or more processors to select an optimized route of the plurality of routes for the one or more geolocation exchange units based on an objective function, where the objective function uses the travel cost data, the market depth data, or combinations thereof.

In yet another implementation, a non-transitory computer-readable medium may have stored thereon a plurality of computer-executable instructions which, when executed by a computer, cause the computer to receive origin location data and destination location data from a first user, where the origin location data corresponds to a geographic origin and the destination location data corresponds to a geographic destination. The plurality of computer-executable instructions which, when executed by a computer, may also cause the computer to generate a plurality of routes based on the origin location data and the destination location data. The plurality of computer-executable instructions which, when executed by a computer, may further cause the computer to determine a plurality of virtual hubs along the plurality of routes, where the plurality of virtual hubs includes a first virtual hub based on the origin location data and a second virtual hub based on the destination location data. The plurality of computer-executable instructions which, when executed by a computer, may additionally cause the computer to receive travel cost data for the plurality of routes for one or more geolocation exchange units, where the one or more geolocation exchange units corresponds to a predetermined space traveling from the first virtual hub to the second virtual hub, and where the travel cost data includes data relating to travel time, travel expenses, or combinations thereof. In addition, the plurality of computer-executable instructions which, when executed by a computer, may cause the computer to receive market depth data for a geolocation exchange for the one or more geolocation exchange units based on the plurality of routes, where the market depth data includes one or more bid prices and one or more offer prices for the one or more geolocation exchange units. The plurality of computer-executable instructions which, when executed by a computer, may also cause the computer to select an optimized route of the plurality of routes for the one or more geolocation exchange units based on an objective function, wherein the objective function uses the travel cost data, the market depth data, or combinations thereof.

The above referenced summary section is provided to introduce a selection of concepts in a simplified form that are further described below in the detailed description section. The summary is not intended to identify key {XE "Narrowing designation: key"} features or essential {XE "Narrowing designation: essential"} features of the claimed subject matter, nor is it intended to be used to limit the scope of the claimed subject matter. Furthermore, the claimed subject matter is not limited to implementations that solve any or all {XE "Narrowing designation: all"} disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3 illustrates a user price-time priority queue system in accordance with implementations of various techniques described herein.

FIGS. 40 and 41 illustrate a configuration module in accordance with implementations of various techniques described herein.

FIGS. 48-52 illustrate a system in accordance with implementations of various techniques described herein.

DETAILED DESCRIPTION

Figure 1:
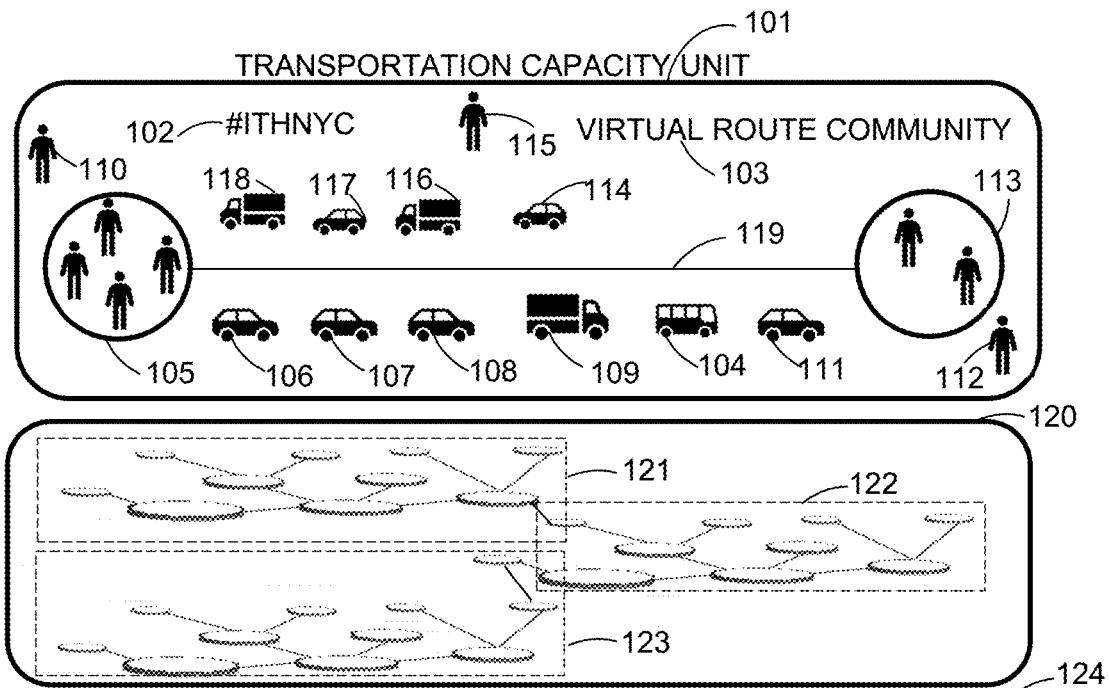
FIG. 1 illustrates a system using virtual hubs in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits, and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact transportation and freight units as a physical or financial forward commodity, security, swap, option, future or forward. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A computing device, as described herein, may include any computing implementation known to those skilled in the art, including mobile computing devices. In some implementations, a fixed stationary computing device, a virtual reality headset, a mixed reality headset, an augmented reality headset, or an audio interfaced computer device may be used instead. In another implementation, the computing device may be used in conjunction with a projection computing device. The computing device may be used with or include any device which communicates and integrates the use of: a network, community route processor, my route processor, sequence route processor, global positioning system (GPS) network, routing algorithms based on dynamic market inputs, servers, forward commodity forward market auction database, grouping software instructions for hubs, securitization transformations and specifications, game servers, indexing algorithms for transportation and freight unit securities, forwards, futures, options, swaps and contracts on various navigation routes, navigation servers, routing sequence algorithms, virtual hub topology methods and systems, transparent open access user interface pricing systems with price time priority queues, blockchain audit and safety methods, facial recognition, fingerprint recognition or photo recognition of users for security and identity check, and/or algorithms for no arbitrage conditions and constraints. A computing device, as described herein, may utilize a user interface (e.g., a graphical user interface) formatted on mobile or stationary computing devices over various mediums. Such devices may be connected through a network for the purpose of grouping users into virtual hub sequences of community objects as a gateway to participating, transacting, and/or trading transportation or freight capacity units between combinations of virtual hubs as a forward commodity in an auction.

Various implementations directed to price time priority queue routing for transportation capacity units will now be described in the following paragraphs with reference to FIGS. 1-52.

FIG. 1 illustrates a system using virtual hubs in accordance with implementations of various techniques described herein. In one implementation as illustrated in FIG. 1, a user 110 may be assigned or may join a virtual route community 101, 103 of a transportation or freight capacity unit, where the community 101, 103 is a sequence of one or more virtual hubs. The virtual hub sequence may be assigned a metadata tag 102, such as #ITHNYC, which may be a shortened name for a longer, full name sequence, such as Ithaca, NY to New York City, NY The virtual route community 101, 103 may include an origin virtual hub 105, which may be a specific address and/or geolocation data. As shown in FIG. 1, the origin virtual hub 105 may be in the city of Ithaca, NY A geolocation exchange unit may encompass the transportation or freight capacity unit described herein, and those skilled in the art will understand that one or more of the implementations described herein may be applied to the geolocation exchange unit.

As shown in FIG. 1, a route 119 may be disposed between the Ithaca, NY virtual hub 105 and the New York City, NY virtual hub 113, where the route 119 may be a sequence of one or two or more virtual hubs in multi-mode dimension space. As also shown in FIG. 1, one or more trucks 118, cars 117, additional trucks 116, and/or additional cars 114 may be headed in a certain direction along the route 119. Additional vehicles 106, 107, 108, 109, 104, 111 may be headed in the other direction along the route 119 between the two virtual hub points 105, 113. One or more additional users 112 may also join the virtual hub route sequence community 103. In another implementation, the user 110 may be assigned or may join a virtual route community 121, 122, 123, where the virtual route community may be a sequence of one or more virtual hubs in multiple modes or dimensions.

In one implementation, transportation capacity and/or freight capacity units 101 may be transformed towards forward, future, option, international swap, and derivative agreement configurations using one or more formulas. In some implementations, the formulas may be used to calculate replacement value contracts associated with the transportation and freight capacity units 101. In such implementations, the transportation and freight capacity units 101 may be configured as firm or non-firm legal contracts, where the contracts may be utilized with the one or more formulas. In particular, the one or more formulas may be used to determine liquidated damages, replacement contract values, termination replacement price, termination replacement transactions, termination payments, interest rates, interest discount rates, option premiums, force majeure, early termination dates, and/or default dates.

In a further implementation, a virtual hub sequence, such as route 119 between the Ithaca, NY virtual hub 105 and the New York City, NY virtual hub 113, may be transformed into one or more community objects, where the community objects may be assigned a plurality of attributes. The community objects having attributes may be similar to the use of class and class objects having methods in object-oriented programming (e.g., Java). Similar to the use of data transformations in computing languages, the data transformation of a virtual hub sequence into a community object may facilitate communication in an organized manner using modular logic. In some implementations, virtual hub sequences, such as route 119 between virtual hub 105 and virtual hub 113, may be combined with other virtual hub sequences to extend the series sequence.

The attributes of communities and associated legal and calculation transformations may allow for superior communication, accountability and transactions to occur using a community transportation and freight unit object (i.e., unit 101). In some implementations, the data transformation of a virtual hub sequence community object may allow for a plurality of network members 110, 112 to be assigned to virtual route communities 103 based on a plurality of attributes, prior GPS location histories, navigation search queries, and/or other attributes. Virtual hub sequences which have been transformed into community objects may provide greater communication and organizational ability for a market in order to transact transportation units and to provide a gateway for transportation unit transactions, as described in U.S. patent application Ser. No. 15/266,326, "Implementations of a Computerized Business Transaction Exchange for Various Users," filed Sep. 15, 2016 and U.S. Patent Application Publication, Ser. No. 15/877,393, "Electronic Forward Market Exchange for Transportation Seats and Capacity in Transportation Spaces and Vehicles," filed Jan. 23, 2018, the entireties of which are incorporated by reference herein.

In one implementation, a transportation or freight capacity unit routing and procurement problem may be defined where a depot is considered to be a single node in a transportation or freight capacity unit topology 120, a set of K transportation capacity units may be available to purchase, and a set M of geographically dispersed suppliers/markets 121, 122, 123 may be available from which to choose. A discrete demand $d_k$ may be specified for each $k \in K$, such that, in turn, transportation capacity units can be purchased from a subset $M_k \subseteq M$ of suppliers at a price $p_{ik} > 0$, $i \in M_k$. Moreover, a product availability $q_{ik} > 0$ may also be defined for each product $k \in K$ and each supplier $i \in M_k$. In some implementations, to guarantee the existence of a feasible purchasing plan with respect to the product demand, the condition $\Sigma_{i \in M_k} q_{ik} \geq d_k$, $\forall k \in K$ has to hold. In a further implementation, a route sequence may be defined on a complete directed graph $G=(V, A)$ where $V:=M \cup \{0\}$ is the node set and $A:=\{(i, j): i, j \in V, i \neq j\}$ is the arc edge set, where i and j may each refer a city or node. A traveling cost $c_{ij}$ may be associated with each arc $(i, j) \in A$. In some implementations, each arc may represent a route between two nodes or cities. An arc set may include a collection of arcs (i.e., routes between two nodes or cities). As such, an arc set may represent a multi-stop route.

The above equations may be used to determine a tour G starting and ending at the depot, visiting a subset of suppliers, and deciding how much to purchase for each product from each supplier in order to satisfy the demand at a minimum traveling and purchasing costs. A goal of the routing algorithm may be to satisfy product demands and node visits. In particular, the convenience to visit a supplier of transportation or freight capacity unit may depend on the trade-off between the additional traveling cost of visiting the node and the possible savings obtained in purchasing other transportation and freight capacity units at lower prices. The transportation and freight capacity unit algorithm may have a bi-objective nature, where the minimization of both traveling and purchasing costs may be linearly combined in a single objective function. The bi-objective function nature may make the problem of selecting the optimal suppliers of transportation and freight capacity units more complex. In particular, the traveling cost optimization pushes the purchaser to select only suppliers that are strictly necessary to satisfy product demand, whereas the purchasing cost minimization pushes to select a more convenient and potentially larger set of suppliers.

In some implementations, a first classification may be derived using the routing nature on a directed graph, where the cost $c_{ij}$ may be potentially different from $c_{ji}$, thereby granting the potential for asymmetry, as opposed to the symmetric case where $c_{ij} = c_{ji}$. The asymmetric case may be referred to as a directed graph, whereas the symmetric case may be referred to as an undirected graph. Another classification may concern the availability of products at the suppliers. In particular, if the available quantity of a transportation capacity unit product $k \in K$ in a supplier $i \in M_k$ is defined as a finite value $q_{ik}$, which may potentially be smaller than product demand $d_k$, then the routing algorithm case may be restricted. In a further implementation, the unrestricted case may be where the supply of transportation and freight capacity units is unlimited, such that $q_{ik} \geq d_k$, $k \in K$, $i \in M_k$. The unrestricted case may be a special case, as having an unlimited supply of transportation capacity units may be equivalent to considering $d_k = 1$ and $q_{ik} = 1$, $\forall k \in K$, $\forall i \in M^k$.

In another implementation, the transportation and freight capacity unit routing problem may be considered to be NP-hard in the strong sense as a generalization of the uncapacitated facility location problem. In some implementations, the proof therein with the following reductions to the generalized case where each supplier offers a product that cannot be purchased elsewhere, wherein each transportation or capacity unit is distinct; and each node corresponds to a supplier and each customer to a transportation or freight capacity unit, $M_k = M$ for all $k \in K$, $p_{ik}$ is the cost of serving customer $k$ from node $i$, and $$c_{ij} := \frac{b_i + b_j}{2},$$

$\forall (i, j) \in A$ with $b_i$ the cost of opening node $i$.

In particular, each destination node may be arrived at from only one origin node, such that the path must be unique. Subsequent paths to a new node must also adhere to this principle. Accordingly, the overall path sequence between all nodes must be exactly one route sequence. There may be only one line path connecting all the nodes, as opposed to multiple paths between the nodes. As such, the portfolio route distance and cost of moving that object has been minimized, and the cost of movement of the transportation exchange unit (as further explained below) has been minimized.

In some implementations, some special cases of the transportation and freight capacity unit routing may be solved trivially. One such special case may be the trivial traveling case. For the trivial traveling case, if traveling costs are null, then an optimal unrestricted supply solution can be found by purchasing each product or transportation or freight capacity unit from the cheapest supplier, since any tour connecting these suppliers is optimal. In some implementations of the trivial traveling case, for the restricted case, the suppliers may be sorted in non-decreasing order or price for each product k. Then, the optimal solution may be found by purchasing for each k, from its cheapest suppliers, the minimum between the available quantity and the residual demand. Another special case may be the one supplier case. For the one supplier case, if a supplier sells all the products of transportation or freight capacity units at the lowest price, then only this supplier will be part of the optimal tour. In some implementations of the one supplier case, the restricted transportation and freight capacity unit routing problem remains true if, for each product, the quantity available in that supplier is sufficient to satisfy demand. In particular, the supply must be at least equal to demand, or the path route may not otherwise exist.

In some implementations, the problem of feasibility may be checked polinomially just by inspecting of the input data. In particular, the problem may be checked using all of the variables. In a further implementation, if a product is not available at any supplier, then no solution may exist for the unrestricted transportation or freight capacity unit routing problem. Similarly, for the restricted transportation or freight capacity unit routing problem, the infeasibility may occur if there exists a product k such that $\Sigma_{i \in M_k} q_{ik} < d_k$. Transportation or freight capacity units may represent space on a telecommunications spectrum, a wireless spectrum, fiber optic light wave broadband networks, or any broadband network where associated market transportation and freight capacity unit market structure transformations have occurred. In particular, the market structure queues or price time priority queues for transformed transportation and freight capacity units with special configurations mentioned above may be incorporated via industrial and generic communication networks. Such infrastructures may include one or more local area networks collecting traffic of user nodes at the switching centers and of a backbone network that routes high volume traffic among switching centers. Because of reliability and self-healing properties, an optimized network structure may use a ring architecture for the backbone and a star architecture for the local area networks. In some implementations, the transportation or freights capacity unit routing problem may be to determine a tour on the ring backbone on a subset of the network virtual nodes and connect the remaining nodes to the others in the tour, minimizing the overall connection cost. In such implementations, the problem may be referred to as the ring-star problem, where the graph nodes may correspond to both the suppliers and the set of transportation or freight capacity units.

In a further implementation, box 124 illustrates a Miller Tucker-Zemlin formulation, the node stops (i.e., virtual hubs) may be labeled with index values 1 through n (see box 125). As also shown in box 125, the path variable $x_{ij}$ may equal 1 as the path goes from node i to node j and may equal 0 otherwise. In some implementations, for i=1, . . . , n, $u_i$ may represent a dummy variable, and $c_{ij}$ may represent the distance between node i and node j. Further, with the aforementioned assumptions, the transportation and freight capacity unit routing problem may be written as the combination of formulations disclosed in boxes 126, 127, 128, 129, 131, 130, and 132. In some embodiments, the first set of inequalities disclosed in boxes 126, 127, and 128 may require that each node is arrived at from exactly one other node, and the second set of inequalities disclosed in boxes 129, 131, 130, 132 may require that from each node there is a departure to exactly one other node. The Miller Tucker-Zemlin formulation shown in box 124 may represent a general case upon which more specific, modified cases over new dimensions may be built.

The constraints disclosed in boxes 130, 131 may enforce that there is only one single tour covering all nodes and not two or more disjointed tours that only collectively cover all nodes. To prove this, it may be shown that: (1) every feasible solution may contain only one closed sequence of nodes, and (2) that for every tour covering all nodes, that there may be values for the dummy variables $u_i$ that satisfy the constraints. To prove that every feasible solution may contain only one closed sequence of nodes, it may be demonstrated that every subtour in a feasible solution passes through node 1 (noting that the equalities may ensure there can only be one such tour). For if we sum all the inequalities corresponding to $x_{ij}=1$ for any subtour of k steps not passing through node 1, we may obtain: n k≤(n−1) k, which may represent a contradiction. Thus, for every single tour covering all nodes, there may be values for the dummy variables $u_i$ that satisfy the constraints. Without loss of generality, the tour may be defined as originating (and ending) at node 1. In some implementations, it may be determined that $u_i$=t if node i is visited in step t(i, t=1, 2, . . . , n). Accordingly, it may be determined that $u_i-u_j \leq n-1$, since $u_i$ can be no greater than n and $u_j$ can be no less than 1. Hence, the constraints may be satisfied whenever $x_{ij}=0$. In some implementations, for $x_{ij}=1$, we may derive the following: $u_i-u_j+nx_{ij}=(t)-(t+1)+n=n-1$, which may satisfy the constraint.

Figure 2:
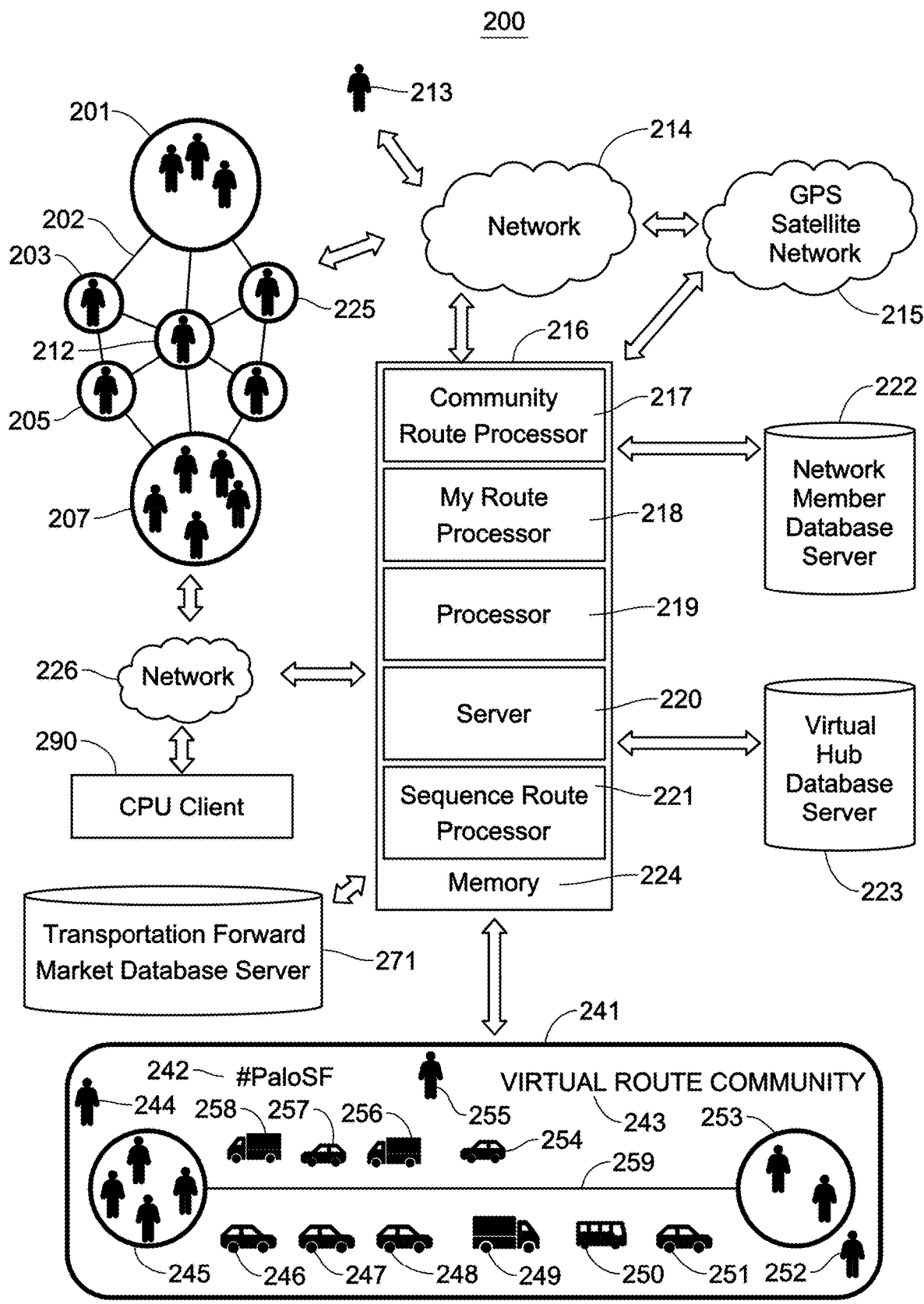
FIG. 2 illustrates a network configuration in accordance with implementations of various techniques described herein.

FIG. 2 illustrates a network configuration 200 in accordance with implementations of various techniques described herein. As shown, the configuration 200 may include a network of virtual transportation hubs 201, 203, 205, 207, 212, 225, where each network may represent a virtual transportation network of a neighborhood, village, city, county, state, country, continent, or inter-virtual hub networks across geographies. Methods and/or data transformations, as described herein, may be used to transform navigation routes 202, which are a virtual hub sequence, between a series of virtual transportation hubs 201 and 203, 203 and 212, or multi-leg or multi-modal combinations such as 201 to 203 and 203 to 212. The network configuration 200 may be implemented using one or more computing systems composed of one or more computing devices.

In some implementations, one or more users 213 of the network 214 may input hundreds, thousands, or millions or more of virtual hubs, thereby forming a network topology for transportation virtual hub sequences 241. The transportation data transformation to a series of virtual transportation hubs 245, 253 may allow for network structures 201, 203, 212, 205, 207, 225, 212 to be developed. Further, the structures may be organized in a hub and spoke model or ring and star model, where these models are known to those skilled in the art. Further, using virtual transportation hub topologies 241 over road structures 259 may allow for the benefits of public transportation networks to be combined with private vehicle networks.

In some implementations, once the virtual transportation hub networks 201, 203, 212, 205, 207, 225, 212 have been input into the network 214, the community route processor 217 may transform subsections of the topology of the transportation networks 201, 203, 212, 205, 207, 225, 212 into a virtual hub sequence 241. The virtual hub sequence 241 may represent two addresses 245, 253 route 259 such as Palo Alto, California 245 to San Francisco, California 253. In particular, each virtual hub address 245, 252 may correspond with a physical address. Virtual route communities 243 may be one to one, one to two, one to many, and/or any superset or subset combination thereof.

The My Route Processor 218 may further process virtual hub combination and virtual transportation hub sequences into a specific network member's account on the network member database server 222. The sequence route processor 221 may be used to connect a plurality of virtual hub sequences 201, 203 205, 207 in a logical order to complete a path combination 201 to 207 for navigation or community object construction. In some implementations, community objects may be derived from simple direct path routes 202 between two virtual hubs 201 and 203, may be derived from multi-virtual hub constructions between two virtual hub sequences 201 to 207 by waypoints of 201 to 203 to 212 to 207, or any combination or superset or subset thereof.

In a further implementation, the virtual route community 243 may allow attributes to be assigned to the community objects. In particular, users may be assigned to a plurality or community virtual hub sequence objects 241. In some implementations, a network member 213 may be assigned to a virtual route community 241 because the user's route history on the GPS satellite network 215 suggests the route has overlap with virtual hub route sequences that the user has used or queried on various search methods on the system. In another implementation, the user 213 may use a CPU client 210 with the network 226 of navigation route communities 243, where the CPU client 210 may include a visual interface, an audio interface, and/or any other type of computing interface known to those skilled in the art. In some embodiments virtual route communities 241 may be transformed data structures that form objects to which community users 213 may subscribe, friend, join, or follow to receive information regarding transportation unit transactions, as described in U.S. Patent Application Publication, Ser. No. 15/877,393, "Electronic Forward Market Exchange for Transportation Seats and Capacity in Transportation Spaces and Vehicles," filed Jan. 23, 2018, the entirety of which is incorporated by reference herein.

FIG. 3 illustrates a user price-time priority queue system 300 in accordance with implementations of various techniques described herein. In particular, the user price-time priority queue system 300 may be used for transacting or matching transformed transportation and freight unit data, participating, transacting and/or trading transportation and freight capacity units, representing the transformed transportation unit value as a homogeneous asset specification, or representing freight as a physical forward commodity security, swap, option, forward, and/or future between combinations of virtual hubs over various transportation modes. In some implementations, one or more user transformed transportation units and/or one or more transformed transportation units may be associated with route community objects and routing sequences in the system 300.

The system 300 may include one or more of the following instructions, transformations, and/or elements, as shown in FIG. 3. As is known to those skilled in the art, different values than those shown in FIG. 3 may be used. In particular, the system 300 may include: transformed transportation unit price-time priority sell queue 320; transformed transportation unit price-time priority buy queue 321; transformed transportation unit price priority bucket 305 in the transportation unit buy queue of $5.10; transformed transportation unit price priority bucket 306 in the transportation unit buy queue of $5.30; transformed transportation unit price priority bucket 310 in the transportation unit buy queue of $5.60; transformed transportation unit price priority bucket 314 in the transportation unit sell queue of $5.70; and transformed transportation unit price priority bucket 315 in the transportation unit sell queue of $5.80; and transformed transportation unit price priority bucket 316 in the transportation unit sell queue of $6.60.

The system 300 may also include one or more of the following: transformed transportation unit price-time priority buy price 304 in the first time position of the price priority bucket 305 of $5.10; transformed transportation unit price-time priority buy price 303 in the second time position of the price priority bucket 305 of $5.10; transformed transportation unit price-time priority buy price 302 in the third time position of the price priority bucket 305 of $5.10; transformed transportation unit price-time priority buy price 307 in the first time position of the price priority bucket 306 of $5.30; transformed transportation unit price-time priority buy price 309 in the first time position of the price priority bucket 310 of $5.60; transformed transportation unit price-time priority buy price 308 in the second time position of the price priority bucket 310 of $5.60; transformed transportation unit price-time priority sell price 311 in the first time position of the price priority bucket 314 of $5.70; transformed transportation unit price-time priority sell price 312 in the second time position of the price priority bucket 314 of $5.70; transformed transportation unit price-time priority sell price 313 in the third time position of the price priority bucket 314 of $5.70; transformed transportation unit price-time priority sell price 318 in the first time position of the price priority bucket 315 of $5.80; transformed transportation unit price-time priority sell price 319 in the second time position of the price priority bucket 315 of $5.80; and transformed transportation unit price-time priority sell price 317 in the first time position of the price priority bucket 316 of $6.60.

The system 300 may also include a transformed transportation unit price time priority limit order book ("LOB") 325, which may be represented by the vector q(t) 301. In particular, the i-th coordinate for i>0, $q_i$ (t), may represent the number of sell limit orders of transformed transportation units that are waiting in the LOB at time t a price iδ (where δ may represent the price unit tick size of the transformed transportation unit). In addition, the number of buy limit orders for transformed transportation units at iδ may be represented with a negative sign $q_i$ (t).

Further, the system 300 may also include: a benchmark price 326 of all sell limit orders at time t, which may be computed as s(t)=s(q(t))=min (min {0<iδ:$q_i$ (t)>0}) if $q_i$ (t) is less than or equal to 0 for all i>0, then s (q (t))=infinity; benchmark price 327 of all buy limit orders at time t, which may be computed as b(t)=b (q(t))=max (max{iδ>0:$q_i$ (t)<0}), if $q_i$ (t) is greater than or equal to 0 for all i>0, then b(q(t))=negative infinity; order match 328 in the transformed transportation unit limit order book where s(t)=b(t), which may move the method and system to the matched transformed transportation unit limit order confirmation and delivery process; a limit order book status of no order match 329, where s(t)>b(t); if limit order book i-th $q_i$ (t) element 330 of LOB is cancelled, remove from queue; and if i-th qi (t) element is a new transformed transportation unit order 331 in LOB, then insert into respective limit order buy queue 321 or limit order sell queue 320 with priority of price, and then time into the price time priority queues.

In some implementations, the price-time priority queue for transformed transportation units may be assigned to a commute community object 241, where the object 241 may be a waypoint sequence of transformed transportation units. In a further implementation, the price-time priority queue may be assigned to two waypoints as a commute community object 241, or the price-time prior queue may be assigned to a commute community waypoint object sequence of many waypoints 203 to 205 to 207 to 212. The waypoints may have been added together to form one continuous commute community object 241 and respective price-time priority queue for transformed transportation units through processing instructions from the Community Route Processor 217 and Sequence Route Processor 221, where the processors may be configured to communicate via the networks 226, 214, and 215. In another implementation, the limit order book 301 vector may be assigned to a specific date and time for the commute community waypoint object which is a forward market price for transformed transportation unit(s) 271 and commute community waypoint object(s) 241. In particular, the value of a route or the value of the path may be assigned between two nodes using the organizing method of the price time priority queue. The benefit of this method is the assignment of a market mechanism to efficiently allocate and organize buyers and seller across the optimization sequence of both a single route between two nodes and also the portfolio path of an entire arc set. The objects may also have legal transformations to securitize or unitize the object, such that it may be traded on exchange with cost of cover, replacement value, liquidated damages, and default remedy calculations which are required to securitize an object.

In a further implementation, a specific transformed transportation unit price-time priority queue limit buy order 304, with a specific price stamp bucket 305 of $5.10, may be cancelled. If the order 304 is cancelled, then the price-time priority limit order book buy queue price at position 303 moves to the higher price-time priority queue position of 304, and price-time priority price of position 302 moves to position 303. Similarly, in a further implementation, the price-time priority limit order sell price 319 of price-time priority bucket price 315 of $5.80 may be cancelled. If price-time priority of the transformed transportation unit is cancelled, then order 317 moves to a higher position in the overall transformed transportation queue 320, even though the limit order book price 317 may remain in the price bucket of position 316 at $6.60.

In another implementation, price-time priority insertion may occur where a new order may be inserted into either the transformed transportation unit buy queue 320 or transformed transportation unit sell queue 321. For example, a new price-time limit order for a transformed transportation unit may be inserted as a sell order at a price of $5.70 at position 313, which would then assume order 312 was also at a price of $5.70 and that order 312 was placed with a time that was before order 313 was placed. In the aforementioned example of the price-time order insertion of 313, price-time orders of 319, 318 and 317 may have moved lower in their relative position, even though they remain in distinctly different price buckets of 315 and 316, respectively. With regard to the price-time priority queue for transformed transportation units, price is first priority, followed by time stamp.

In some implementations, the lowest selling price s(t) 326 may equal the highest buying price b(t) 327. In such an implementation, the highest transformed transportation unit buy queue price bucket 310 may be equal to the lowest transformed transportation unit sell queue 320 selling bucket price 314. In the example of the limit order book 301, the highest transformed unit buy price 310 of $5.60 may be lower than the lowest transportation unit sell queue 320 lowest selling bucket 314 of $3.70. As such, no match may occur because s(t)>b(t) (see box 329). In some implementations, one or more order insertions 331 or order cancellations 330 may occur for transformed transportation units from the transportation forward market database server 271 associated with community objects, where the objects may be a series of waypoints 241.

In another implementation, the LOB 325 for transformed transportation units may contain many different types of instruction structures and specifications, such as limit orders, market orders, market if touched orders, snap market orders, snap mid orders, snap to primary orders, peg to benchmark orders, or adaptive custom orders. Adaptive custom orders may be custom, customer-designed instructions, as known to those skilled in the art. In some implementations, the LOB 325 for transformed transportation units may also contain instructions for order times, such as good for the day, good till cancelled, immediate or cancel, good till date, day till cancelled, or a plurality of additional custom instructions for the timing of the order of the transformed transportation unit in the LOB 325. In a further implementation, a plurality of additional instructions and specifications may also be unique to each transformed transportation unit in the LOB 325, such as automobile mode, air mode, autonomous vehicle mode, bike mode, boat mode, bus mode, drone mode, limo mode, motorcycle mode, moped mode, shuttle mode, spaceship mode, subway mode, taxi mode, train mode, and fastest optimized mode. Fastest optimized mode may combine many modes or a single mode for a waypoint commute community object 241 or waypoint community sequence (e.g., 201 to 203 to 205 to 212 to 207) of many commute communities 241.

In another implementation, the LOB 325 may be assigned to transformed transportation unit packages that have associated commute community objects 241. In such an implementation, the LOB 325 for transformed transportation units may be assigned to cargo, such as a trailer of a rig, a container of a boat, a container on a truck, or any type of cargo that takes up the space of a transformed transportation unit. In a further implementation, the LOB 325 may be assigned to a virtual transformed transportation unit, which may represent space along a packet moving medium, such as a telecommunications pipeline, satellite telecommunications, and/or wireless telecommunications that move packets of data, where the packets correspond to transformed transportation units.

In another implementation, the LOB 325 may have other configurations and ordering algorithms in the open architecture auction method and system as unitized and as described in U.S. patent application Ser. No. 15/266,326, "Implementations of a Computerized Business Transaction Exchange for Various Users," filed Sep. 15, 2016, the entirety of which is incorporated by reference herein.

Figure 4:
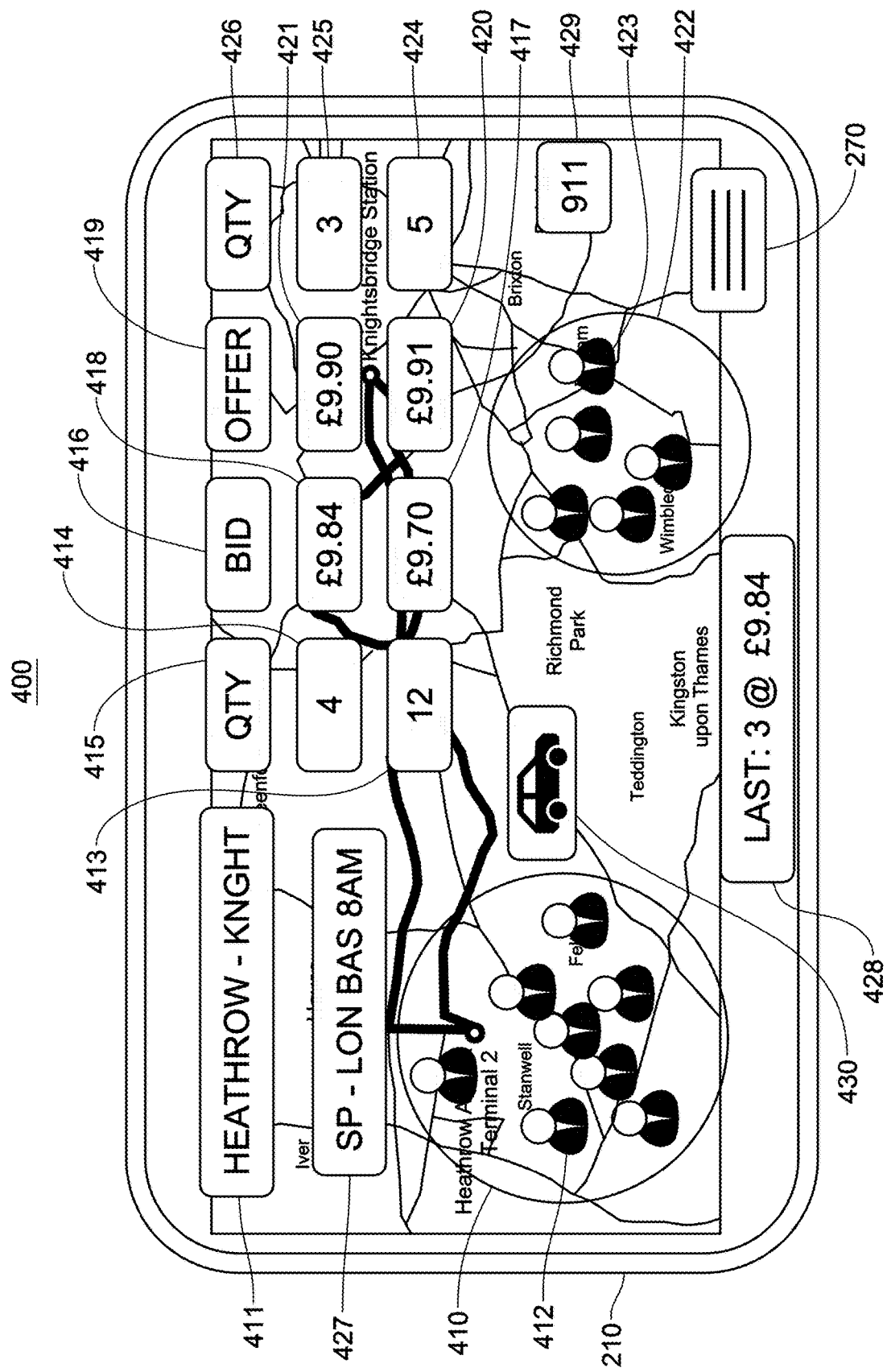
FIGS. 4-14 illustrate a user interface of a computing device in accordance with implementations of various techniques described herein.

FIG. 4 illustrates a user interface 210 of a computing device in accordance with implementations of various techniques described herein. In particular, the user interface 210 may be used for participating, transacting, and/or trading transportation as a physical forward data-transformed transportation unit commodity or security between combinations of virtual hubs over various transportation modes. While the implementations disclosed herein may be discussed using a mobile computing device, any other form of computing device known to those skilled in the art may be used, as well. Further, the user interface 210 may also hereinafter be referred to as a graphical user interface (GUI) 210. In addition, the term button as used herein may refer to either physical or displayed virtual buttons on the mobile computing device. Further, while the implementations disclosed herein may be discussed in terms of the user 110, the implementations may be used by other types of users, as well.

The user interface 210 may display and/or include one or more of the following elements: a virtual hub combination 411; a virtual hub origin/from location 410 with users 412 within the virtual hub location 410; and a specification summary of the market, level of service, and time of delivery commencement 427. For example, as shown in FIG. 4, the user interface 210 may display an international virtual market hub combination market, such as within London.

The user interface may also display and/or include one or more of the following elements: a mode of transportation capacity type 430; a transaction summary of the last trade auction quantity and price 428 in the local currency or another currency set by the user 110; a virtual hub destination/to location 422 and user who is being delivered on the transportation or freight capacity unit 423; a bid/buy quantity title header 415 for an exemplary virtual transportation hub market; a bid/buy price title header 416 for an exemplary virtual transportation hub market; an offer/sell price title header 419 for an exemplary virtual transportation hub market; and an offer/sell quantity title header 426 for an exemplary virtual transportation hub market.

The user interface may also display and/or include one or more of the following elements: a bid/buy quantity 414 for the best bid quantity from a plurality of users 110 for a transportation capacity virtual hub combination that has undergone a plurality of data transformations according to one or more implementations described herein; a bid/buy quantity 413 for the second-best bid quantity from the plurality of users 110 for a transportation or freight capacity virtual hub combination that has undergone a plurality of data transformations according to one or more implementations described herein; a bid/buy price 418 for the best bid price from the plurality of users 110 for a transportation capacity virtual hub combination that has undergone a plurality of data transformations according to one or more implementations described herein; and a bid/buy price 417 for the second-best bid price from the plurality of users 110 for a transportation or freight capacity virtual hub combination that has undergone a plurality of data transformations according to one or more implementations described herein.

In addition, the user interface may display and/or include one or more of the following elements: an offer/sell price 421 for the best offer price from the plurality of users 110 for a transportation or freight capacity virtual hub combination that has undergone a plurality of data transformations according to one or more implementations described herein; an offer/sell price 420 for the second-best offer price from the plurality of users 110 for a transportation or freight capacity virtual hub combination that has undergone a plurality of data transformations according to one or more implementations described herein; an offer/sell quantity 425 for the best offer quantity from the plurality of users 110 for a transportation or freight capacity virtual hub combination that has undergone a plurality of data transformations according to one or more implementations described herein; an offer/sell quantity 424 for the second-best offer quantity from the plurality of users 110 for a transportation or freight capacity virtual hub combination that has undergone a plurality of data transformations according to one or more implementations described herein; a safety dispatch "911" button 429 to enact video and audio recording of the user's 110 environment and dispatch of that information to authorities; and a hamburger menu button 270 to move back to menu options and settings away from the participation, transaction, trading displayed in the user interface 210.

In some implementations, a user 110 may enter a transaction quantity and price for a transformed transportation or freight capacity unit securities in order to participate, transact and/or trade via the GUI 210, where the GUI 210 may detect the user's 110 contact with a displayed bid/buy price 418 or offer/sell price 421. The GUI 210 may detect the user's 110 contact with any of the GUI 210 buttons mentioned above. The GUI 210 may also detect user contact with any of the GUI's 210 display and/or buttons 418, 417, 420, 421 or may communicate with the user 110 via a voice interface.

Upon user contact with the display and/or buttons on the GUI 210, instructions may be instantiated which allow the user 110 to change the specifications of the virtual hub combination 411. A plurality of prices and markets may be presented based on a plurality of contract specifications. In some implementations, the best bid/buy price 418 may be moving up in price or down in price depending on the market conditions at any given time. The last auction trade or last transacted price for a given specification may be listed to inform the user 110 as to how the market is moving, which may allow the user 110 to submit a competitive offer/selling price 421 or bid/buying price 414. In some implementations, users 110 may adjust settings of the GUI 210 to show more bid/buying prices 417 or more offer/selling prices 420. The matrix of market quantities and prices 413, 414, 415, 416, 417, 418, 419, 420, 421, 424, 425, 426 displayed in the GUI 210 may be referred to as market depth. In a further implementation, the number of users 110 may be displayed as user icons 412 or 423 for the people logged who desire to transact, trade or participate in a given virtual hub 410 to virtual hub 422 combination auction. Users 110 may select the transportation mode 430, such that the GUI 210 displays a market for one form of transformed transportation capacity as a commodity or security. In a further implementation, the GUI 210 may show multiple forms of transformed transportation capacity between two virtual transportation capacity hubs 410, 411, 422.

In some implementations, the user 110 may select the 911 display and/or button 429, which may activate voice and video recording functions on the mobile computing device and transmit the data with a confirmation from the user 110 to the authorities to provide enhanced security while participating, transacting or trading forward transformed transportation or freight as a commodity or security. The user may toggle between the GUI 210 market view screen in FIG. 4 and other menu 270 options and settings by the user 110 selecting the hamburger button 270, with the mobile computing device detecting the user 110 input or contact on the GUI 210. In some implementations, the mobile computing device may instantiate instructions in its memory, and the device may transmit transportation or freight capacity data through the network 214 or wireless GPS network 215 to call upon instruction routines and instruction sub-routines on the transportation forward market database server 271, virtual hub database server 223, network member database server 222, no arbitrage condition database server and/or instructions in the memory of the cloud and local CPUs 290. These elements may interface together to make a system configured to deliver transportation or freight capacity units to users 110 from and to a plurality of virtual hubs 410, 422 with a plurality of specifications 427 at specific market prices.

Figure 5:
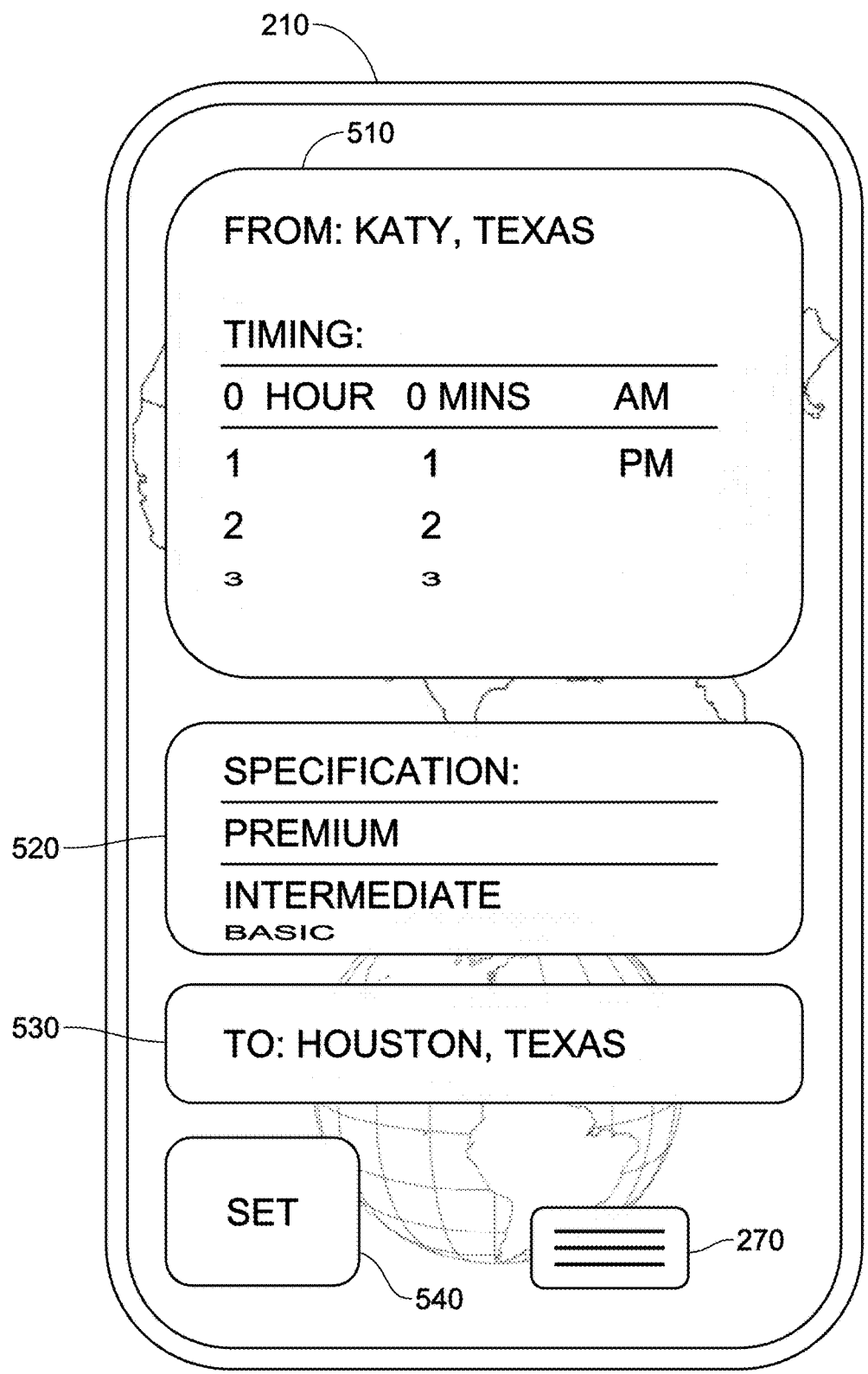

FIG. 5 illustrates the user interface 210 of a computing device in accordance with implementations of various techniques described herein. In particular, the user interface 210 may be used for listing timing specifications 510 on a portable multifunction device (e.g., a mobile computing device). Further, while the implementations disclosed herein may be discussed in terms of the user 110, the implementations may be used by other types of users, as well.

The user interface 210 may display and/or include one or more of the following elements: origin/from virtual hub timing (a data transformation) 510; specification of quality of transportation capacity (a data transformation) or type such as physical or financial 520; destination/To virtual hub (a data transformation) 530; setting button 540 to transmit the timings 510 and quality and type specification grade 520 (a data transformation); and hamburger button 270 to instruct the GUI 210 to take the user 110 to the menu screen.

In some implementations, the user 110 may select a plurality of timing options in the timing selection specification 510. The timing specification constraint may be the time at which the transformed transportation or freight capacity unit security departs from the origin/from virtual hub 410. As in any commodity market, if a user 110 is late and they have purchased the transportation capacity unit, the user must still pay for the transportation or freight capacity unit regardless if the user 110 is present at the time of departure or not. The user may the option, if they know they will be late, to sell back the transportation or freight capacity unit to the market at the then current price. Accordingly, for the purpose of example, but not limiting by example, if a user 110 bought a transformed transportation capacity unit security for £9.90 421 and the user 110 realizes they would be late for the 8 AM departure specification 427, then the user 110 may either pay for the transportation unit, even though the user 110 was present and did not take delivery of the transportation unit security, or the user 110 may preemptively sell back the transportation capacity unit security to the market at the then current bid price 418. The user 110 would then have offset their obligation in a timely manner and another user 110 on the network 214, 226 may then purchase the available transportation or freight capacity unit security. By eliminating the initial obligation and by creating an offset obligation, additional data transformation concepts such as cost of cover, liquidated damages or force majeure may be avoided. In some implementations, virtual transportation or freight hub combination units may or may not have the available liquidity if the user 110 were to wait too long before delivery of the transportation capacity unit to make an adjustment. Therefore, the user 110 may need to take delivery even if they are not present.

In some implementations, the user 110 may select a grade specification 520, a specification for financial swaps and options, or a specification for physical swaps and options of transportation and freight capacity units. For example, a plurality of specification grades may exist, such as "premium," which may be defined by certain classes of transportation capacity units and/or certain quality levels. Similarly, for example, a plurality of specification grades may exist such as "intermediate" or "basic," which may be defined by certain classes of transportation or freight capacity unit securities and/or certain quality levels.

In some implementations, the user 110 may select the destination/to virtual hub 530 to change the virtual hub combination. In another implementation, the user 110 may contact the "set" button 540 to transmit the transformed transportation capacity unit security specification data by using the GUI 210. In such an implementation, the mobile computing device may instantiate instructions in its memory, and the mobile computing device may then transmit transportation capacity data through the network 214 or wireless GPS network 215 to call upon instruction routines and instruction sub-routines on the transportation forward market database server 271, virtual hub database server 223, network member database server 222, map routing servers, no arbitrage condition database server and/or instructions in the memory of the cloud and local CPUs 290. The elements may interface together to make a system configured to deliver transformed transportation capacity unit securities to users 110 from and to a plurality of virtual hubs 410, 422 with a plurality of specifications at specific market prices.

Figure 6:
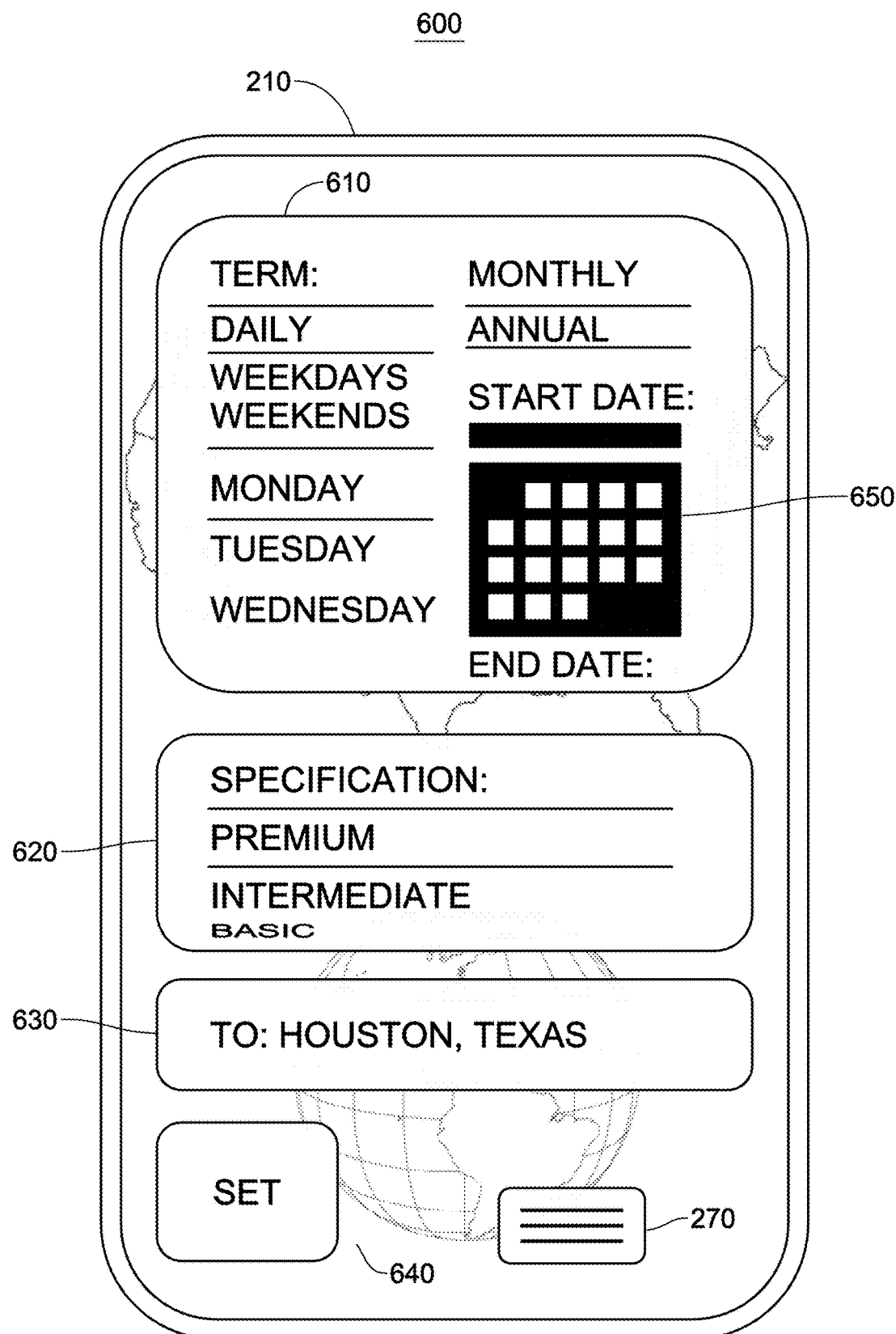

FIG. 6 illustrates the user interface 210 of a computing device in accordance with implementations of various techniques described herein. In particular, the user interface 210 may be used for selecting the term transformation specification 610 on a portable multifunction device (e.g., a mobile computing device). Further, while the implementations disclosed herein may be discussed in terms of the user 110, the implementations may be used by other types of users, as well.

The user interface 210 may display and/or include one or more of the following elements: term specification options 610 (a data transformation); specification 620 of quality or type such as financial or physical of transportation or freight capacity (a data transformation); destination/to virtual hub 630 (a data transformation); setting button 640 to transmit the term 610 and quality specification grade 620 (a data transformation); calendar button 650 to select specification start dates and end dates for a plurality of virtual transportation or freight hub combinations (a data transformation); and hamburger button 270 to instruct the GUI 210 to take the user 110 to the menu screen.

The term specification options 610 may be used to participate, transact and/or trade in a specific virtual hub combination for a specific time period specification. Users 110 may set the term to daily, weekly, monthly, annual, weekdays, weekends, specific days, or any combination of term selections. For example, the user 110 may select "weekdays" from among the term specification options 610 during a specific calendar time period of a given year, which may be selected using the calendar button 650. In particular, specific time start dates and end dates may be set by the user with the calendar button 650. For example, a user 110 may select "Mondays" within a specification date window (a data transformation). In another example, the user 110 may select "weekends" during a specification calendar window of dates (a data transformation).

The user 110 may contact the "set" button 640 to transmit the transformed transportation or freight capacity unit specification data by using the GUI 210. The mobile computing device may instantiate instructions in its memory, and the device may then transmit transportation capacity data through the network 214 or wireless GPS network 215 to call upon instruction routines and instruction sub-routines on the transportation forward market database server 271, virtual hub database server 223, network member database server 222, map routing servers, no arbitrage condition database server and/or instructions in the memory of the cloud and local CPUs 290. These elements may interface together to make a system configured to deliver transportation capacity units to users 110 from and to a plurality of virtual hubs 410, 422 with a plurality of specifications at specific market prices.

Figure 7:
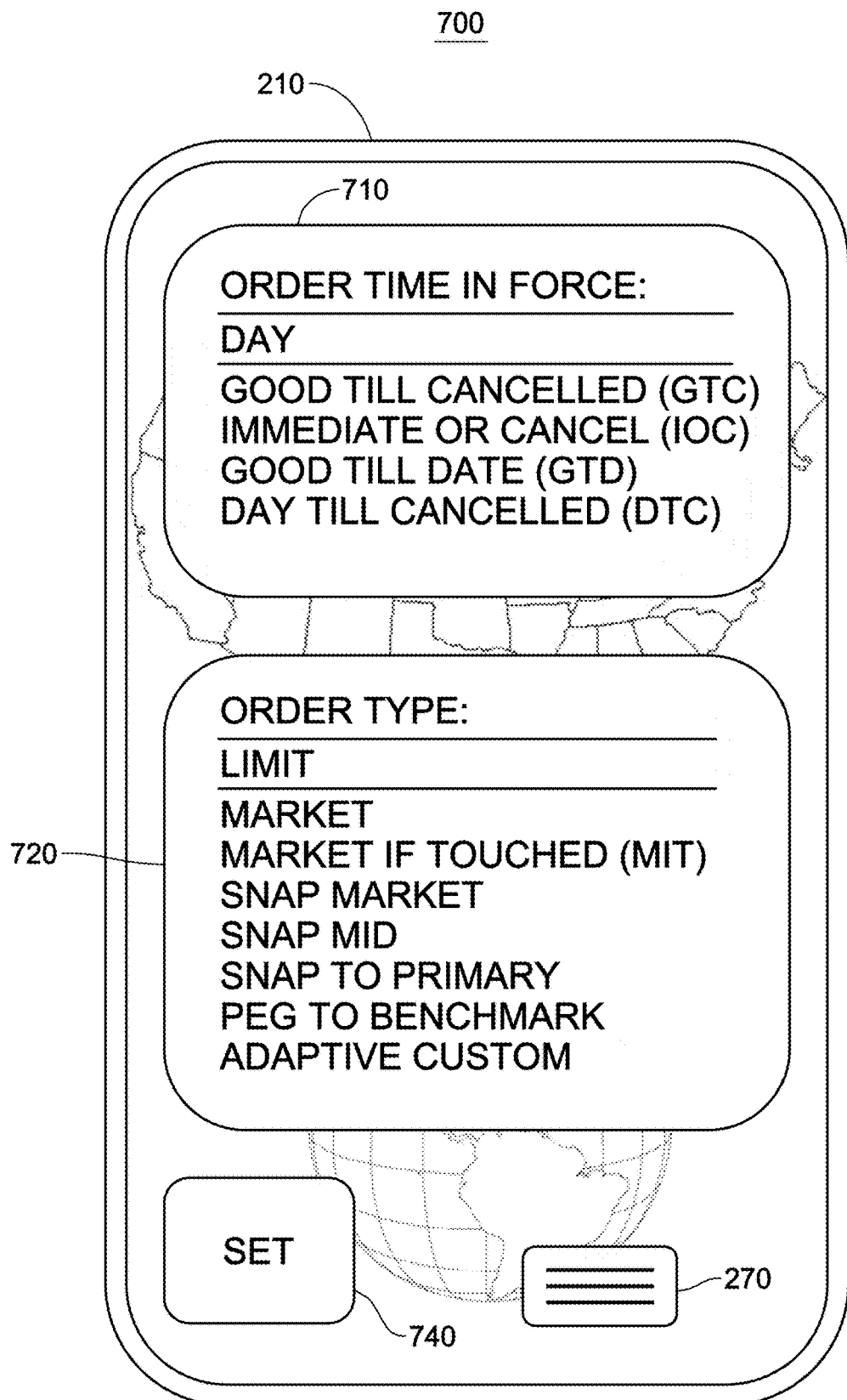

FIG. 7 illustrates the user interface 210 of a computing device in accordance with implementations of various techniques described herein. In particular, the user interface 210 may be used for selecting order time in force order types 710 (a data transformation) and order types 720 (a data transformation) on a portable multifunction device (e.g., a mobile computing device). Further, while the implementations disclosed herein may be discussed in terms of the user 110, the implementations may be used by other types of users, as well.

The user interface 210 may display and/or include one or more of the following elements: order time in force specification options 710 (a data transformation); order type specification options 720 (a data transformation); setting button 740 to transmit the order time in force specification 710 and Order type specification option 720 (a data transformation); and/or hamburger button 270 to instruct the GUI 210 to take the user 110 to the menu screen.

In some implementations, the user interface 210 may be used by the user 110 to select a plurality of order time in force specifications 710. The order time in force selections 710 may include one or more of the following: day (DAY) order; good till cancelled order (GTC); immediate or cancel order (IOC); good till date order (GTD); and/or day till cancelled order (DTC). Order time in force specifications 710 may be used to designate how long a user 110 order may be valid. In a further implementation, the GUI 210 may display the definitions of a plurality of order time in force specification 710 characteristics so that the user 110 may select the appropriate order time in force specification for a transportation or freight capacity unit.

In some implementations, the user interface 210 may be used to select the order type specifications 720. The order type selections 720 may include one or more of the following: Limit, Market, Market if Touched (MIT); Snap to Market; Snap to Mid; Snap to Primary; Peg to Benchmark; and/or Adaptive Custom. In a further implementation, the GUI 210 may display the definitions of a plurality of order type specification 720 characteristics so that the user 110 may select the appropriate order type specification 720 for a transportation or freight capacity unit.

In some implementations, the user 110 may contact the "set" button 740 to transmit the transportation or freight capacity unit specification data by using the GUI 210. In such an implementation, the mobile computing device may instantiate instructions in its memory, and the mobile computing device 111 may then transmit transportation or freight capacity data through the network 214 or wireless GPS network 215 to call upon instruction routines and instruction sub-routines on the transportation forward market database server 271, virtual hub database server 223, network member database server 222, map routing server, no arbitrage condition database server and/or instructions in the memory of the cloud and local CPUs 290. These elements may interface together to make a system configured to deliver transformed transportation capacity unit securities to user(s) 110 from and to a plurality of virtual hubs 410, 422 with a plurality of specifications at specific market prices.

Figure 8:
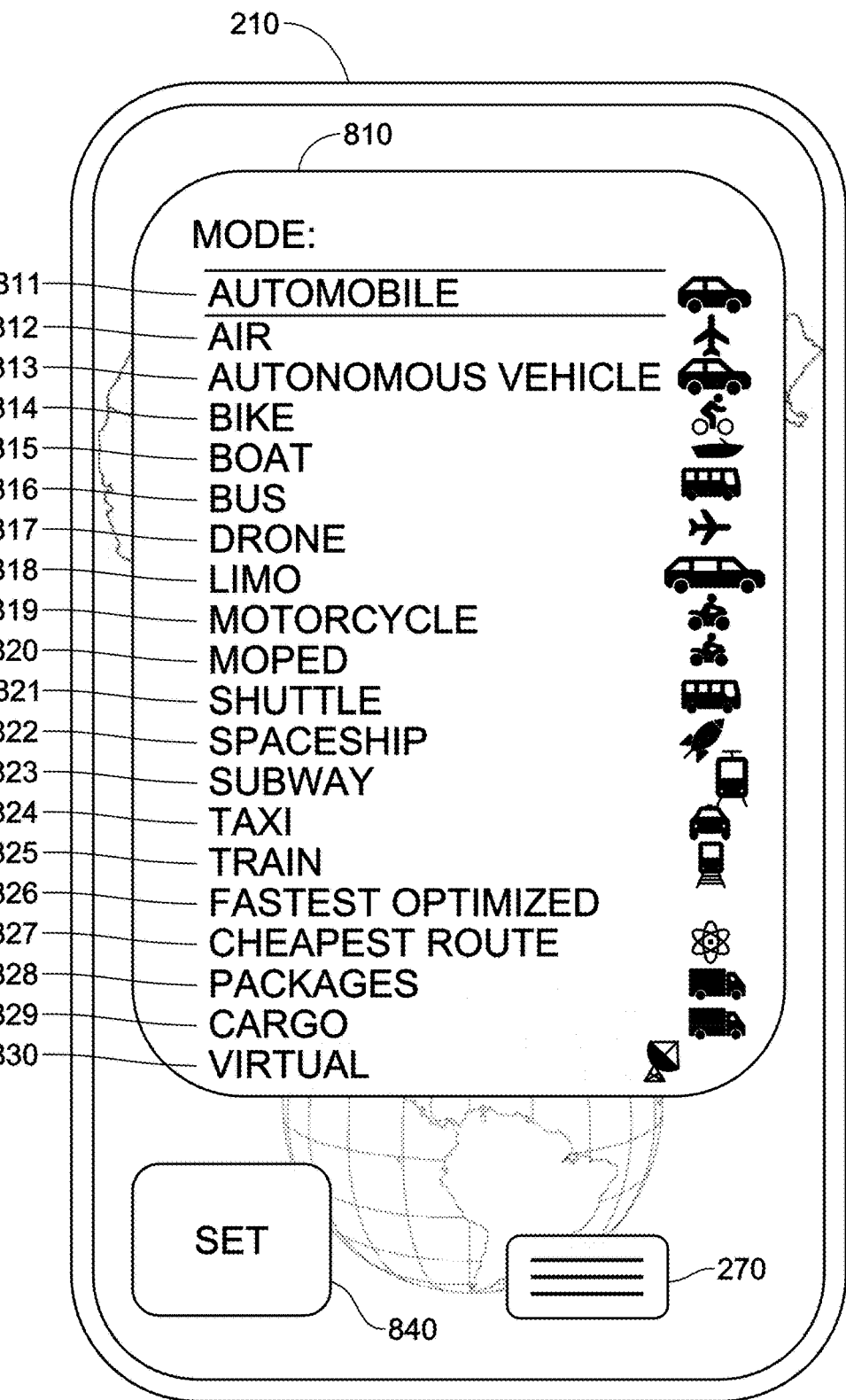

FIG. 8 illustrates the user interface 210 of a computing device in accordance with implementations of various techniques described herein. In particular, the user interface 210 may be used for selecting virtual hub transportation capacity unit modes 810 (a data transformation) on a portable multifunction device (e.g., a mobile computing device). Further, while the implementations disclosed herein may be discussed in terms of the user 110, the implementations may be used by other types of users, as well.

The user interface 210 may display and/or include one or more of the following elements: virtual hub transportation capacity unit modes 810 (a data transformation); setting button 840 to transmit the virtual hub transportation capacity unit modes 810; and/or the hamburger button 270 to instruct the GUI 210 to take the user 110 to the menu screen.

In some implementations, the user interface 210 may be used by the user 110 to select a plurality of virtual hub transformed transportation capacity unit modes 810. The virtual hub transportation capacity unit mode selections 810 may include one or more of the following: automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; and/or virtual 830. In one such implementation, a selection of a particular virtual hub transportation capacity unit mode may correspond to a selection by a user 110 for a virtual transportation or freight capacity unit seat in an automobile or an airplane. In another such implementation, the user 110 of a particular virtual hub transportation capacity unit mode may correspond to a bid on cargo 829 or package capacity 828 in any mode or multi-modal of transformed transportation or freight capacity between a combination of virtual transportation hub locations. The user 110 may use one or more modes of transportation between a combination of virtual transportation hub capacity points.

In some implementations, the user 110 may contact the "set" button 840 to transmit the transformed transportation or freight capacity unit specification mode data by using the GUI 210. In such implementations, the mobile computing device may instantiate instructions in its memory, and the mobile computing device 111 may then transmit transportation capacity data through the network 214 or wireless GPS network 215 to call upon instruction routines and instruction sub-routines on the transportation forward market database server 271, virtual hub database server 223, network member database server 222, no arbitrage condition database server and/or instructions in the memory of the cloud and local CPUs 290. The elements may interface together to make a system configured to deliver transformed transportation or freight capacity unit securities, forwards, futures, swaps, options or other derivatives to users 110 from and to a plurality of virtual hubs 410, 422 with a plurality of specifications at specific market prices.

Figure 9:
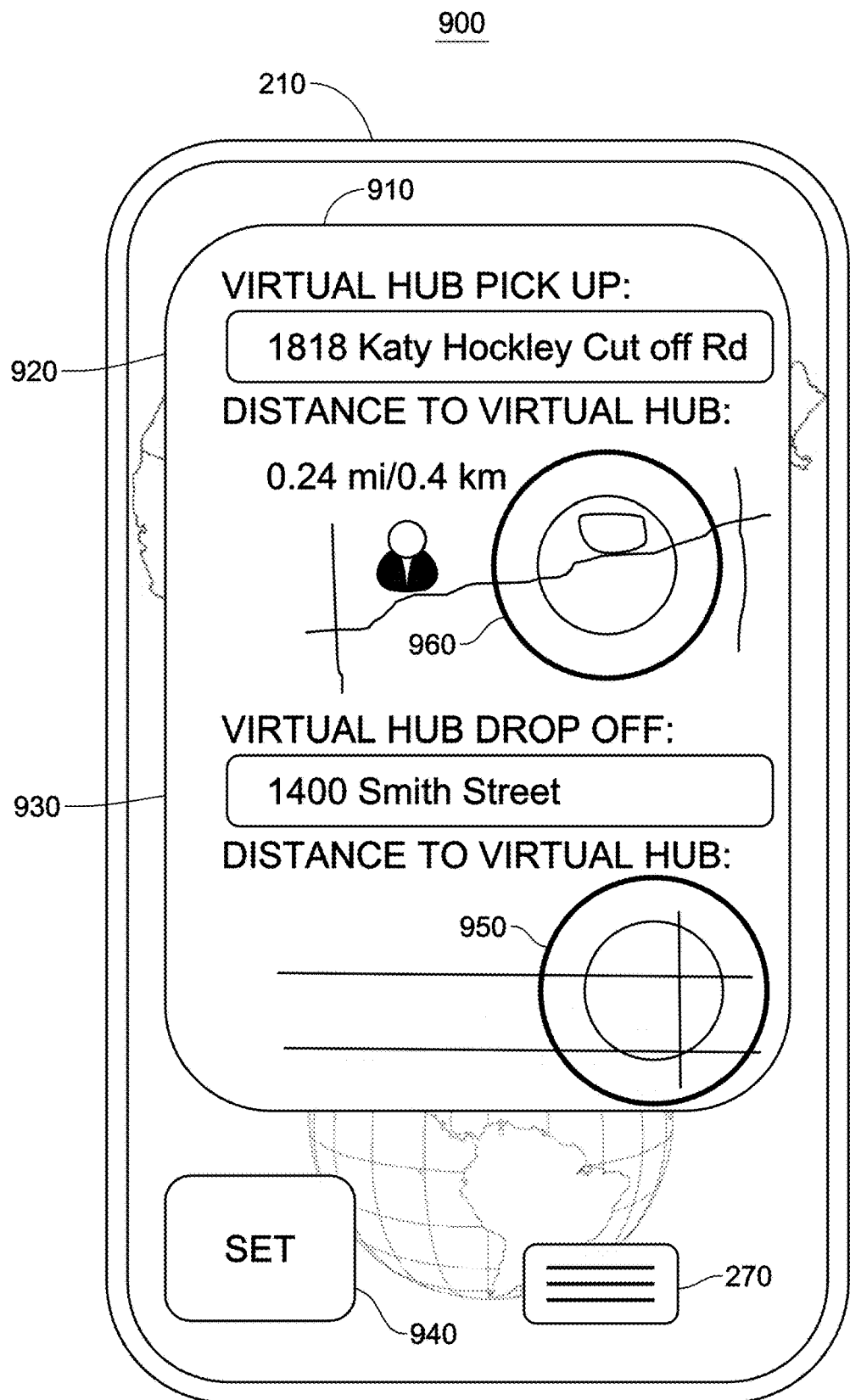

FIG. 9 illustrates the user interface 210 of a computing device in accordance with implementations of various techniques described herein. In particular, the user interface 210 may be used for identifying the distance the user 110 is from the virtual hub from a map and distance perspective on a portable multifunction device (e.g., a mobile computing device). Further, while the implementations disclosed herein may be discussed in terms of the user 110, the implementations may be used by other types of users, as well.

The user interface 210 may display and/or include one or more of the following: virtual hub transportation capacity unit pick up display 910; virtual hub transportation capacity unit pick up address 920; virtual hub transportation capacity unit drop off address 930; virtual hub transportation capacity pick-up target zone 960; virtual hub transportation capacity drop-off target zone 950; setting button 940 to transmit the virtual hub transportation capacity unit addresses 920, 930; and/or hamburger button 270 to instruct the GUI 210 to take the user 110 to the menu screen.

In some implementations, the user interface 210 may be used by the user 110 to select a plurality of virtual hub transportation capacity unit address specifications 910. The virtual hub transportation or freight capacity unit address selections 910 may include one or more of the following: virtual hub pick up address 920; and/or virtual hub drop off address 930. The virtual hub transportation capacity unit addresses 920 and 930 may be changed before delivery of a virtual transportation capacity unit. The user interface map and address tool 910 may display the user's 110 distance from the address of the virtual transportation or freight hub, and may be used as a map to assist the user 110 in finding the location of the virtual transportation hub. The user interface 210 may also display the virtual hub pick up zone 960 on a map in context to the user's 110 location. In addition, the user interface 210 displays the virtual hub drop off zone 950 on a map in context to the user's 110 location.

In some implementations, the user 110 may contact the "set" button 940 to transmit the transportation capacity unit specification address data by using the GUI 210. In such an implementation, the mobile computing device may instantiate instructions in its memory, and the mobile computing device 111 may then transmit transportation or freight capacity data through the network 214 or wireless GPS network 215 to call upon instruction routines and instruction sub-routines on the transportation forward market database server 271, virtual hub database server 223, network member database server 222, map routing server, no arbitrage condition database server and/or instructions in the memory of the cloud and local CPUs 290. These elements may interface together to make a system configured to deliver transportation or freight capacity units to users 110 from and to a plurality of virtual hubs 410, 422 with a plurality of specifications at specific market prices.

Figure 10:
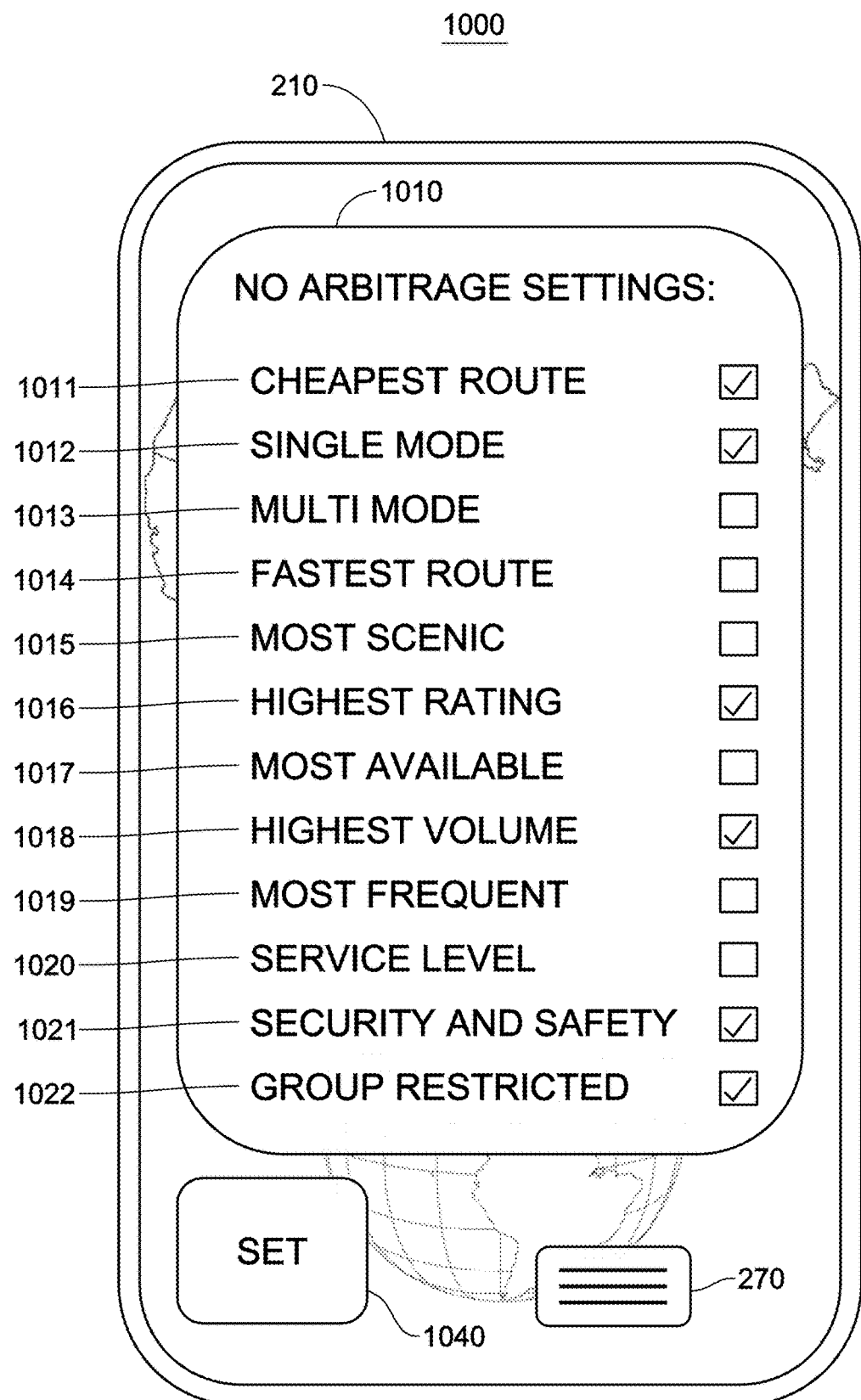

FIG. 10 illustrates the user interface 210 of a computing device in accordance with implementations of various techniques described herein. In particular, the user interface 210 may be used for identifying the constraints and no arbitrage settings 1010 that the user 110 selects on a portable multifunction device (e.g., a mobile computing device) (multiple data transformations). Further, while the implementations disclosed herein may be discussed in terms of the user 110, the implementations may be used by other types of users, as well.

The user interface 210 may display and/or include one or more of the following elements: constraint and no arbitrage settings 1010 (a data transformation); setting button 1040 to transmit the virtual hub transportation capacity constraints and no arbitrage settings 1010; and/or hamburger button 270 to instruct the GUI 210 to take the user 110 to the menu screen.

In some implementations, the user interface 210 may be used by the user 110 to select a plurality of virtual hub transportation capacity constraint and no arbitrage settings 1010. The virtual hub transportation capacity unit constraint and no arbitrage selections 1010 may include one or more of the following: cheapest route 1011 (a data transformation); single mode 1012 (a data transformation); multi-mode 1013 (a data transformation); fastest route 1014 (a data transformation); most scenic 1015 (a data transformation); highest rating 1016 (a data transformation); most available 1017 (a data transformation); highest volume 1018 (a data transformation); most frequent 1019 (a data transformation); service level 1020 (a data transformation); and/or security and safety 1021 (a data transformation).

Selecting the cheapest route setting 1011 may initiate a standard cost minimization linear program (such as in the cloud and/or local CPUs 290), where the program may be used to assist the user 110 in completing the transportation capacity unit between two virtual hubs with the lowest cost. Selecting the single mode setting 1012 may set a constraint that the user 110 wishes to complete the transportation capacity unit between two virtual hubs with only one mode of transportation. Selecting the multi-mode setting 1013 may set a constraint that the user 110 wishes to complete the transportation capacity unit between two virtual hubs with more than one mode of transportation. Selecting the fastest route setting 1014 may initiate the use of a standard linear programming equation (such as by the cloud and/or local CPUs 290), where the equation may be used to minimize travel time for the user 110 in completing the transportation capacity unit between two virtual hubs with the shortest time. In addition, the settings 1010 may set instructions for the price-based navigation routing index and GUI presentation on the interface 210.

Selecting the most scenic setting 1015 may initiate the use of an algorithm (such as by the cloud and/or local CPUs 290) to determine the highest ratings for a scenery, where the algorithm may be used to assist the user 110 in completing the transformed transportation capacity unit between two virtual hubs with the highest scenery rating. Selecting the highest rating setting 1016 may initiate the use of a rating algorithm (such as by the cloud and/or local CPUs 290), where the algorithm may be used to assist the user 110 in completing the transportation capacity unit between two virtual hubs with the highest rating. Selecting the most available setting 1017 may initiate the use of an algorithm (such as by the cloud and/or local CPUs 290) to search for the route with the most open transportation capacity units, where the algorithm may be used to assist the user 110 in completing the transportation capacity unit between two virtual hubs with the most available open seats or open transportation capacity units. Selecting the highest volume setting 1018 may initiate the use of an algorithm (such as by the cloud and/or local CPUs 290), where the algorithm may be used to select the route with the highest volume of participants to assist the user 110 in completing the transformed transportation capacity unit between two virtual hubs with the largest number of users 110. Selecting the most frequent setting 1019 may initiate the use of a most frequent route analysis (such as by the cloud and/or local CPUs 290) from a timing constraint perspective, where the analysis may be used to assist the user 110 in completing the transportation capacity unit between two virtual hubs with the most frequent departures.

Selecting the service level setting 1020 may be used (such as by the cloud and/or local CPUs 290) to align the constraint and to select the service level in order to assist the user 110 in completing the transportation capacity unit between two virtual hubs with the correct level of service. Selecting the security and safety setting 1021 ma initiate safety and security algorithms (such as by the cloud and/or local CPUs 290) on the user 110 based on block chain performance of drivers and riders, where the algorithms may be used to assist the user 110 in completing the transportation capacity unit between two virtual hubs with the highest level of safety and security. Selecting the group restricted setting 1022 may initiate grouping limitation algorithms (such as by the cloud and/or local CPUs 290) on the user's 110 market auction based on limiting the pool of drivers and riders or freight providers and shippers, where the algorithms may be used to assist the user 110 in completing the transportation or freight capacity unit between two virtual hubs with a limit on the pool of available users. In some implementations, a plurality of settings 1010 which transform the data may be sequenced for presenting as a transformed market or as a transformed market as a layer on a navigation system with indexed routes based on price. A user's 110 pool for group restricted settings 1022 (a data transformation) may limit the user pool displayed by email, security, sex, rating, or a plurality of other restrictions.

The user 110 may contact the "set" button 1040 to transmit the transportation or freight capacity unit security specification constraint and arbitrage data by using the GUI 210. The mobile computing device may instantiate instructions in its memory, and the mobile computing device may then transmit transportation capacity security and safety data through the network 214 or wireless GPS network 215 to call upon instruction routines and instruction sub-routines on the transportation forward market database server 271, virtual hub database server 223, network member database server 222, map routing server, no arbitrage condition database server and/or instructions in the memory of the cloud and local CPUs 290. These elements may interface together to make a system configured to deliver transportation or freight capacity units to users 110 from and to a plurality of virtual hubs 410, 422 with a plurality of specifications at specific market prices in an auction format.

Figure 11:
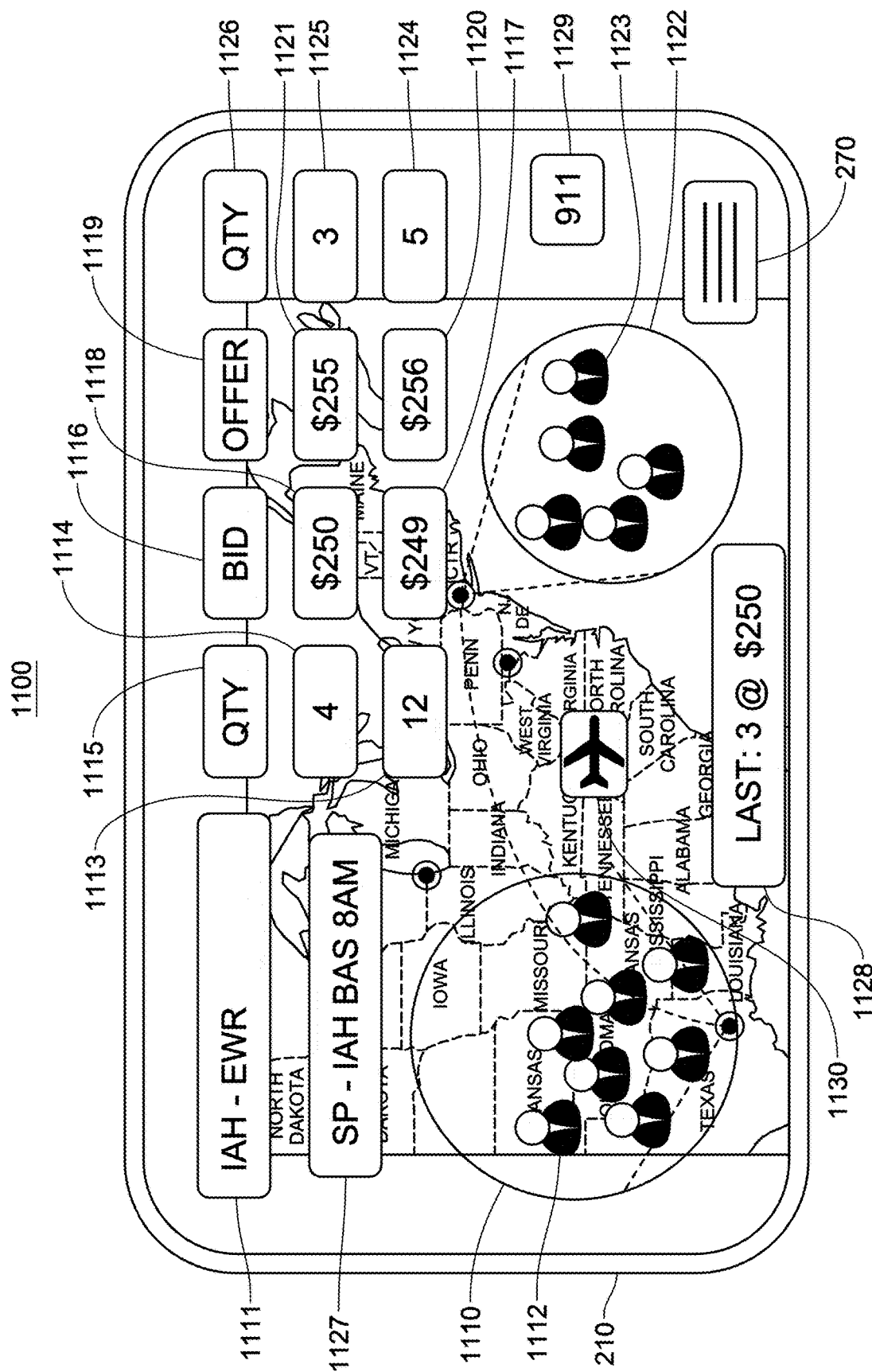

FIG. 11 illustrates the user interface 210 of a computing device in accordance with implementations of various techniques described herein. In particular, the user interface 210 may be used for participating, transacting and/or trading transformed transportation or freight as a physical forward commodity or security between combinations of virtual hubs over various transportation modes. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub combination 1111; a virtual hub origin/from location 1110 with users 1112 within the virtual hub location 1110; a specification summary of the market, level of service and time of delivery commencement 1127; a mode of air transportation or freight capacity type 1130; a transaction summary of the last trades quantity and price 1128; a virtual hub destination/to location 1122 and user who is being delivered on the transportation capacity unit 1123; a bid/buy quantity title header 1115 for a virtual transportation hub market; a bid/buy price title header 1116 for a virtual transportation or freight hub market; an offer/sell price title header 1119 for a virtual transportation or freight hub market; and/or an offer/sell quantity title header 1126 for a virtual transportation or freight hub market.

The user interface may also display and/or include one or more of the following elements: a bid/buy quantity 1114 for the best bid quantity from a plurality of users 110 for a transportation or freight capacity virtual hub combination that has undergone a plurality of data transformations using implementations described herein; a bid/buy quantity 1113 for the second-best bid quantity from a plurality of users 110 for a transportation or freight capacity virtual hub combination that has undergone a plurality of data transformations using implementations described herein; a bid/buy price 1118 for the best bid price from a plurality of users 110 for a transportation or freight capacity virtual hub combination that has undergone a plurality of data transformations using implementations described herein; and/or a bid/buy price 1117 for the second-best bid price from a plurality of users 110 for a transportation or freight capacity virtual hub combination that has undergone a plurality of data transformations using implementations described herein.

In addition, the user interface may display and/or include one or more of the following elements: an offer/sell price 1121 for the best offer price from a plurality of users 110 for a transportation or freight capacity virtual hub combination that has undergone a plurality of data transformations using implementations described herein; an offer/sell price 1120 for the second-best offer price from a plurality of users 110 for a transportation or freight capacity virtual hub combination that has undergone a plurality of data transformations using implementations described herein; an offer/sell quantity 1125 for the best offer quantity from a plurality of users 110 for a transportation or freight capacity virtual hub combination that has undergone a plurality of data transformations using implementations described herein; an offer/sell quantity 1124 for the second-best offer quantity from a plurality of users 110 for a transportation or freight capacity virtual hub combination that has undergone a plurality of data transformations using implementations described herein; a safety dispatch "911" button 1129 to enact video and audio recording of the user 110 environment and dispatch of that information to authorities; and/or a hamburger menu button 270 to move back to menu options and settings away from the participation, transaction, trading auction GUI 210.

In some implementations, the user 110 may enter a transaction quantity and price for a transformed transportation or freight capacity unit securities in order to participate, transact and/or trade via the GUI 210, where the GUI 210 may detect the user's 110 contact or audio interface with the bid/buy price 1118 or the offer/sell price 1121. The GUI 210 may detect the user's 110 contact with any of the buttons of the GUI 210 mentioned above. Upon user contact or audio interface with the buttons on the GUI 210, instructions may be instantiated in the memory of the device, which may allow the user 110 to change the specifications of the respective virtual hub combination 1111.

A plurality of prices and markets may be presented based on a plurality of contract specifications. In some implementations, the best bid/buy price 1118 may be moving up in price or down in price depending on the market conditions at any given time. The last trade or last transacted price for a given specification may be listed to inform the user 110 as to how the market is moving, which may allow the user 110 to submit a competitive offer/selling price 1121 or bid/buying price 1118. In some implementations, the user 110 may adjust settings of the GUI 210 to show more bid/buying prices 1117 or more offer/selling prices 1120. The matrix of market quantities and prices 1113, 1114, 1115, 1116, 1117, 1118, 1119, 1120, 1121, 1124, 1125, 1126 displayed in the GUI 210 may be referred to as market depth. In a further implementation, the number of users 110 may be displayed as user icons 1112 or 1123 for the people logged in who desire to transact, trade or participate in a given virtual hub 1110 to virtual hub 1122 combination.

Users 110 may select the transportation mode 1130, such that GUI 210 displays a market for one form of transportation capacity as a commodity. In a further implementation, the GUI 210 may show multiple forms of transportation capacity between two virtual transportation capacity hubs 1110, 1111, 1122.

In some implementations, the user 110 may select the 911 button 1129, which may activate voice and video recording functions on the mobile computing device and transmit the data with a confirmation from the user 110 to the authorities to provide enhanced security while participating, transacting or trading transformed forward transportation as a commodity or security. The user may toggle between the GUI 210 market view screen in FIG. 11 and other menu 270 options and settings by the user 110 selecting the hamburger button 270, with the mobile computing device detecting the user 110 input/contact or audio instruction. In some implementations, the mobile computing device may instantiate instructions in its memory, and the device may then transmit the transportation or freight capacity data through the network 214 or wireless GPS network 215 to call upon instruction routines and instruction sub-routines on the transportation forward market database server 271, virtual hub database server 223, network member database server 222, map routing server, no arbitrage condition database server and/or instructions in the memory of the cloud and local CPUs 290. These elements may interface together to make a system configured to deliver transportation capacity units to users 110 from and to a plurality of virtual hubs 1110, 1122 with a plurality of specifications at specific market prices.

Figure 12:
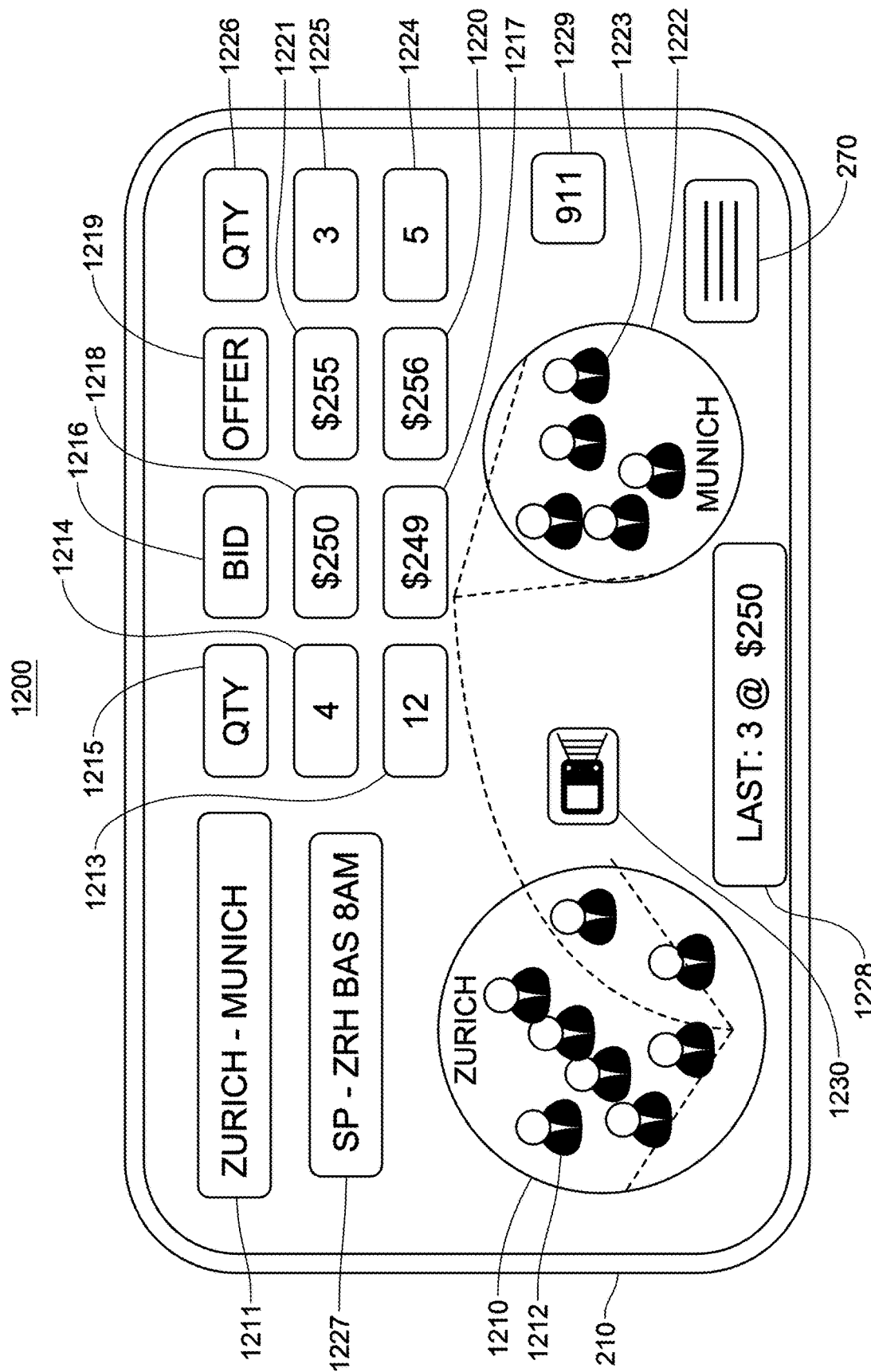

FIG. 12 illustrates a user interface 210 of a computing device in accordance with implementations of various techniques described herein. In particular, the user interface 210 may be used for participating, transacting, and/or trading transformed transportation as a physical forward commodity or security between combinations of virtual hubs over various transportation modes. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub combination 1211; a virtual hub origin/from location 1210 with users 1212 within the virtual hub location 1210; a specification summary of the market, level of service and time of delivery commencement 1227; a mode of train transportation capacity type 1230; a transaction summary of the last trades quantity and price 1228; a virtual hub destination/to location 1222 and user who is being delivered on the transportation or freight capacity unit 1223; a bid/buy quantity title header 1215 for a virtual transportation or freight hub market; a bid/buy price title header 1216 for a virtual transportation or freight hub market; an offer/sell price title header 1219 for a virtual transportation or freight hub market; and/or an offer/sell quantity title header 1226 for an exemplary virtual transportation for freight hub market.

The user interface may also display and/or include one or more of the following elements: a bid/buy quantity 1214 for the best bid quantity from a plurality of users 110 for a transportation or freight capacity virtual hub combination that has undergone a plurality of data transformations using implementations described herein; a bid/buy quantity 1213 for the second-best bid quantity from a plurality of users 110 for a transportation or freight capacity virtual hub combination that has undergone a plurality of data transformations using implementations described herein; a bid/buy price 1218 for the best bid price from a plurality of users 110 for a transportation or freight capacity virtual hub combination that has undergone a plurality of data transformations using implementations described herein; and/or an bid/buy price 1217 for the second-best bid price from a plurality of users 110 for a transportation or freight capacity virtual hub combination that has undergone a plurality of data transformations using implementations described herein.

In addition, the user interface may display and/or include one or more of the following elements: an offer/sell price 1221 for the best offer price from a plurality of users 110 for a transportation or freight capacity virtual hub combination that has undergone a plurality of data transformations using implementations described herein; an offer/sell price 1220 for the second-best offer price from a plurality of users 110 for a transportation or freight capacity virtual hub combination that has undergone a plurality of data transformations using implementations described herein; an offer/sell quantity 1225 for the best offer quantity from a plurality of users 110 for a transportation or freight capacity virtual hub combination that has undergone a plurality of data transformations using implementations described herein; an offer/sell quantity 1224 for the second-best offer quantity from a plurality of users 110 for a transportation or freight capacity virtual hub combination that has undergone a plurality of data transformations using implementations described herein; a safety dispatch "911" button 1229 to enact video and audio recording of the user 110 environment and dispatch of that information to authorities; and/or a hamburger menu button 270 to move back to menu options and settings away from the participation, transaction, trading GUI 210.

In some implementations, the user 110 may enter a transaction quantity and price for a transportation or freight capacity units in order to participate, transact and/or trade via the GUI 210, where the GUI 210 may detect the user's 110 contact with a bid/buy price 1218 or offer/sell price 1221. The GUI 210 may detect the user's 110 contact with any of the GUI 210 buttons mentioned above. Upon user contact with the buttons or audio interface on the GUI 210, instructions are instantiated in the memory of the device which allow the user 110 to change the specifications of the respective virtual hub combination 1211.

A plurality of transformed prices and transformed markets may be presented based on a plurality of transformed contract specifications. In some implementations, the best bid/buy price 1118 may be moving up in price or down in price depending on the market conditions at any given time. The last trade or last transacted price for a given specification may be listed to inform the user 110 as to how the market is moving, which may allow the user 110 to submit a competitive offer/selling price 1221 or bid/buying price 1214. In some implementations, the user 110 may adjust settings of the GUI 210 to show more bid/buying prices 1217 or more offer/selling prices 1120. The matrix of market quantities and prices 1213, 1214, 1215, 1216, 1217, 1218, 1219, 1220, 1221, 1224, 1225, 1226 displayed in the GUI 210 may be referred to as market depth.

In a further implementation, the number of users 110 may be displayed as user icons 1212 or 1223 for the people logged in who desire to transact, trade or participate in a given virtual hub 1210 to virtual hub 1222 combination. Users 110 may select the transportation mode 1230, such that the GUI 210 displays a market for one form or mode of transportation capacity as a commodity or security. In a further implementation, the GUI 210 may show multiple forms (multi-modal) of transportation capacity between virtual transportation capacity hubs 1210, 1211, 1222.

In some implementations, the user 110 may select the 911 button 1229, which may activate voice and video recording functions on the mobile computing device and transmit the data with a confirmation from the user 110 to the authorities to provide enhanced security while participating, transacting or trading transformed forward transportation or freight units as a commodity or security. The user may toggle between the GUI 210 market view screen in FIG. 12 and other menu 270 options and settings by the user 110 selecting the hamburger button 270, with the mobile computing device detecting the user 110 input/contact or audio instructions. In some implementations, the mobile computing device may instantiate instructions in its memory, and the device may then transmit transportation or freight capacity data through the network 214 or wireless GPS network 215 to call upon instruction routines and instruction sub-routines on the transportation forward market database server 271, virtual hub database server 223, network member database server 222, map routing servers, no arbitrage condition database server and/or instructions in the memory of the cloud and local CPUs 290. These elements may interface together to make a system configured to deliver transportation or freight capacity units to users 110 from and to a plurality of virtual hubs 1210, 1222 with a plurality of specifications at specific market prices.

Figure 13:
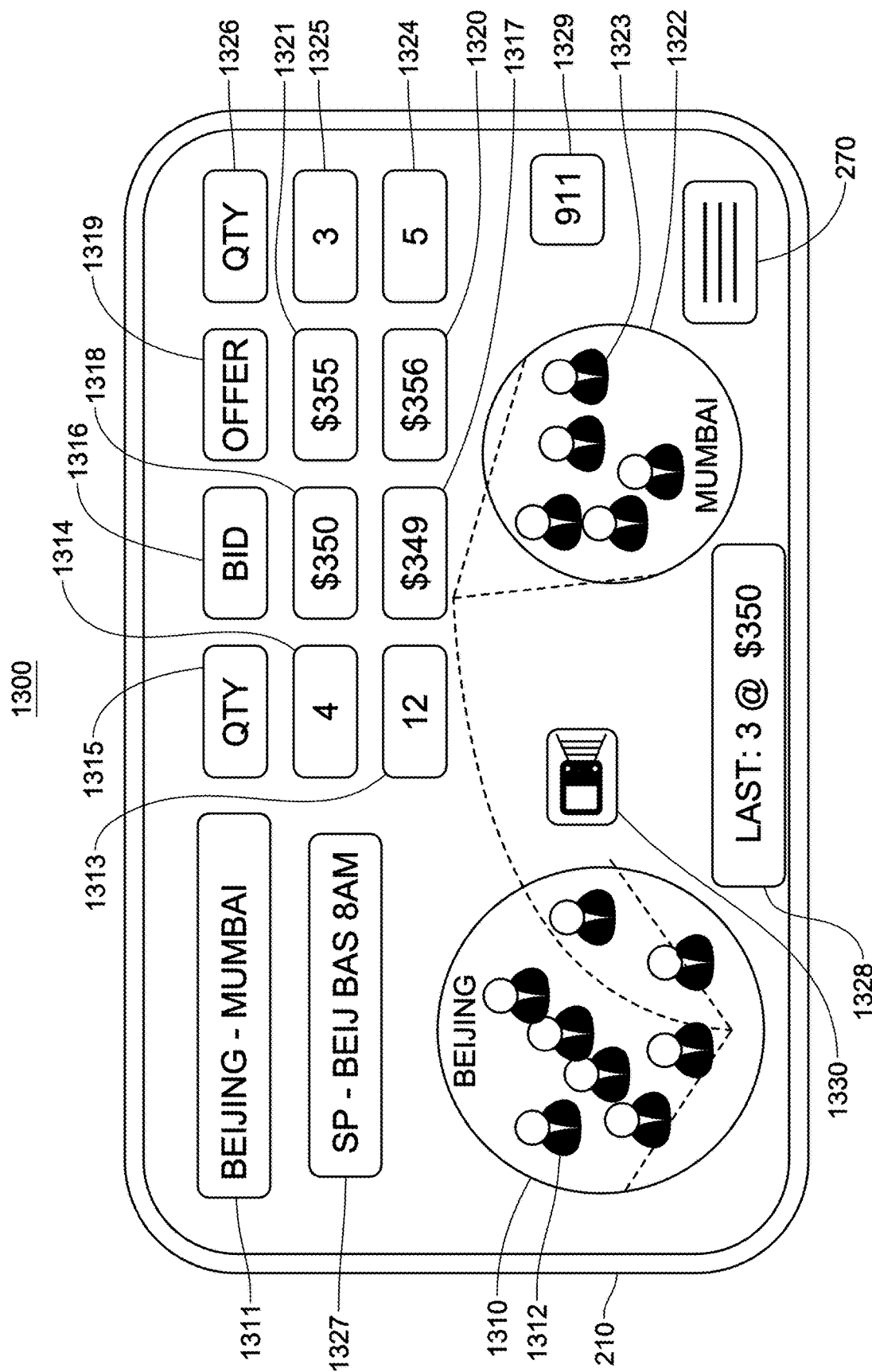

FIG. 13 illustrates the user interface 210 of a computing device in accordance with implementations of various techniques described herein. In particular, the user interface 210 may be used for participating, transacting, and/or trading transformed transportation as a physical forward commodities or securities between combinations of virtual hubs over various transportation modes. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub combination 1311; a virtual hub origin/from location 1310 with users 1312 within the virtual hub location 1310; a specification summary 1327 of the market, level of service and time of delivery commencement; a mode of train transportation capacity type 1330; a transaction summary 1328 of the last trades quantity and price; a virtual hub destination/to location 1322 and user who is being delivered on the transportation or freight capacity unit 1323; a bid/buy quantity title header 1315 for a virtual transportation or freight hub market; a bid/buy price title header 1316 for a virtual transportation or freight hub market; an offer/sell price title header 1319 for a virtual transportation or freight hub market; and/or an offer/sell quantity title header 1326 for a virtual transportation or freight hub market.

The user interface 210 may also display and/or include one or more of the following elements: a bid/buy quantity 1314 for the best bid quantity from a plurality of users 110 for a transportation or freight capacity virtual hub combination that has undergone a plurality of data transformations using implementations described herein; a bid/buy quantity 1313 for the second-best bid quantity from a plurality of users 110 for a transportation or freight capacity virtual hub combination that has undergone a plurality of data transformations using implementations described herein; a bid/buy price 1318 for the best bid price from a plurality of users 110 for a transportation or freight capacity virtual hub combination that has undergone a plurality of data transformations using implementations described herein; and/or a bid/buy price 1317 for the second-best bid price from a plurality of users 110 for a transportation or freight capacity virtual hub combination that has undergone a plurality of data transformations using implementations described herein.

In addition, the user interface may display and/or include one or more of the following elements: an offer/sell price 1321 for the best offer price from a plurality of users 110 for a transportation or freight capacity virtual hub combination that has undergone a plurality of data transformations using implementations described herein; an offer/sell price 1320 for the second-best offer price from a plurality of users 110 for a transportation or freight capacity virtual hub combination that has undergone a plurality of data transformations using implementations described herein; an offer/sell quantity 1325 for the best offer quantity from a plurality of users 110 for a transportation or freight capacity virtual hub combination that has undergone a plurality of data transformations using implementations described herein; an offer/sell quantity 1324 for the second-best offer quantity from a plurality of users 110 for a transportation or freight capacity virtual hub combination that has undergone a plurality of data transformations using implementations described herein; a safety dispatch "911" button 1329 to enact video and audio recording of the user's 110 environment and dispatch of that information to authorities; and/or a hamburger menu button 270 to move back to menu options and settings away from the participation, transaction, trading GUI 210.

In some implementations, the user 110 may enter a transaction quantity and price for a transportation or freight capacity units in order to participate, transact and/or trade via the GUI 210, where the mobile computing device (e.g., via the GUI 210) may detect the user's 110 contact or audio instructions with the bid/buy price 1318 or the offer/sell price 1321. The mobile computing device may detect the user's 110 contact with any of the GUI 210 buttons mentioned above. Upon user contact or audio interface with the buttons or audio instructions on the GUI 210, instructions may be instantiated in the memory of the device, which may allow the user 110 to change the specifications of the respective virtual hub combination 1311.

A plurality of prices and markets may be presented based on a plurality of transformed contract specifications. In some implementations, the best bid/buy price 1318 may be moving up in price or down in price depending on the market conditions at any given time. The last trade or last transacted price for a given transformed specification may be listed to inform the user 110 as to how the market is moving, which may allow the user 110 to submit a competitive offer/selling price 1321 or bid/buying price 1318. In some implementations, the user 110 may adjust settings of the GUI 210 to show more bid/buying prices 1317 or more offer/selling prices 1320. The matrix of market quantities and prices 1313, 1314, 1315, 1316, 1317, 1318, 1319, 1320, 1321, 1324, 1325, 1326 displayed in the GUI 210 may be referred to as market depth.

In a further implementation, the number of users 110 may be displayed as user icons 1312 or 1323 for the people logged in who desire to transact, trade or participate in a given virtual hub 1310 to virtual hub 1322 transformed combination. Users 110 may select the transportation mode 1330, such that the GUI 210 displays a market for one form of transportation capacity as a commodity. In a further implementation, to the GUI 210 may show multiple forms of transformed transportation or freight capacity or securities between two virtual transportation capacity hubs 1310, 1311, 1322.

In another implementation, transformed transportation units or transformed transportation unit securities may be substitutable between modes if specifications meet the grade category of the transformed transportation unit specification or transformed transportation unit security. For example, a user 110 may have bought a transformed transportation unit with a specification and the delivery mechanism was a bus. However, the bus user 110 may buy back their transformed transportation unit or transformed transportation unit security, allowing the original purchaser to be matched with a car of another user 110 who will deliver the transformed transportation unit or transformed transportation unit security. The modes of transportation discussed above, including a bus, train, airplane, car, and/or a plurality of other modes, may be substitutable if the transformed transportation unit or transformed transportation unit security meets the delivery transformed specification grade.

In some implementations, the user 110 may select the 911 button 1329, which may activate voice and video recording functions on the mobile computing device and transmit the data with a confirmation from the user 110 to the authorities to provide enhanced security while participating, transacting or trading forward transportation or freight as a commodity. The user may toggle between the GUI 210 market view screen in FIG. 13 and other menu 270 options and settings by the user 110 selecting the hamburger button 270, with the mobile computing device detecting the user 110 input or contact. In some implementations, the mobile computing device may instantiate instructions in its memory, and the device may then transmit the transportation or freight capacity data through the network 214 or wireless GPS network 215 to call upon instruction routines and instruction subroutines on the transportation forward market database server 271, virtual hub database server 223, network member database server 222, map routing servers, no arbitrage condition database server and/or instructions in the memory of the cloud and local CPUs 290. The elements may interface together to make a system configured to deliver transportation or freight capacity units to users 110 from and to a plurality of virtual hubs 1310, 1322 with a plurality of specifications at specific market prices.

Figure 14:
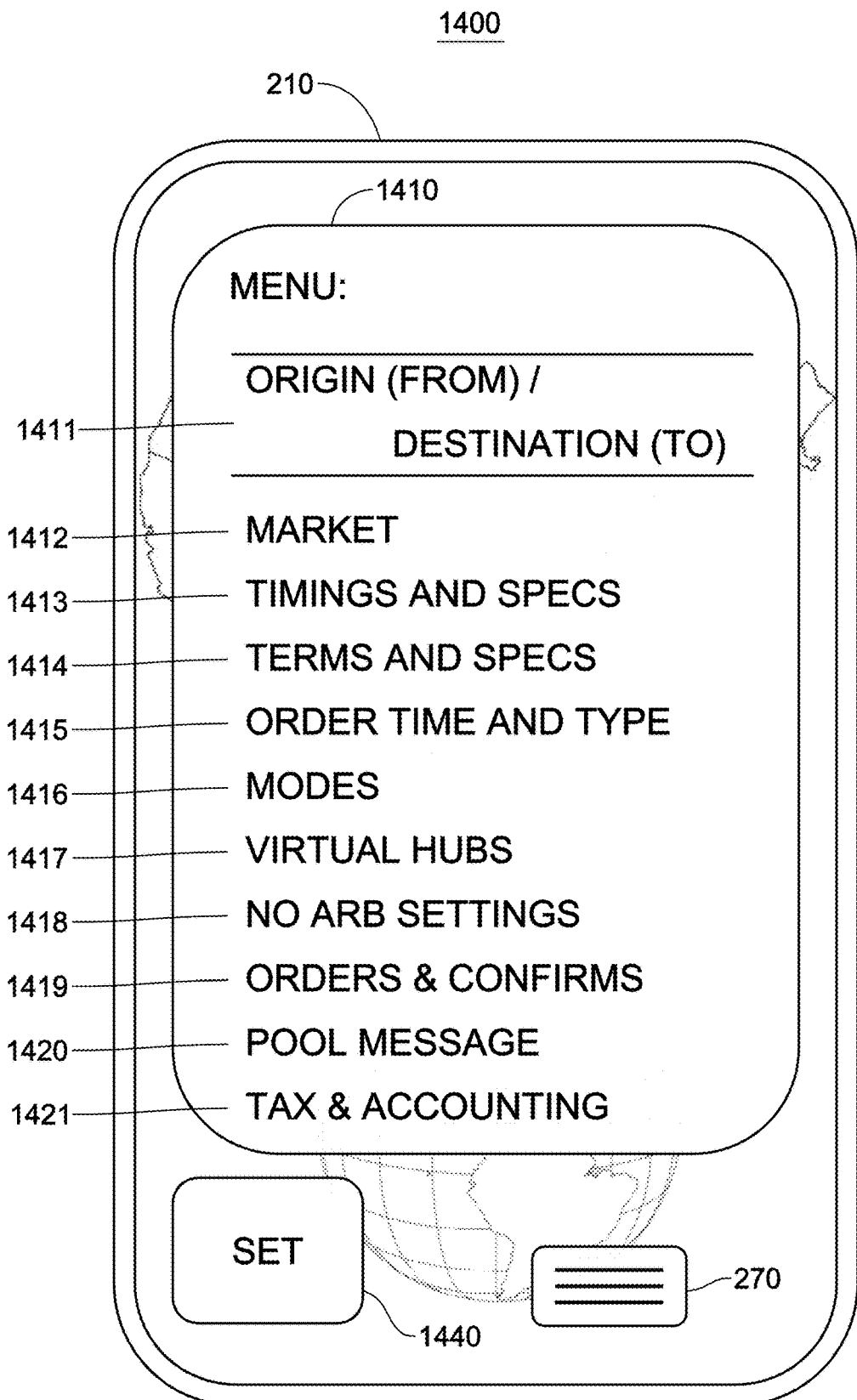

FIG. 14 illustrates a user interface 210 of a computing device in accordance with implementations of various techniques described herein. In particular, the user interface 210 may be used for selecting menu options 1410 on a portable multifunction device (e.g., a mobile computing device). Further, while the implementations disclosed herein may be discussed in terms of the user 110, the implementations may be used by other types of users, as well.

The user interface 210 may display and/or include one or more of the following elements: menu options 1410; origin (from)/destination (to) menu option 1411; market menu option 1412; timings and Specs menu option 1413; term and specs menu option 1414; order time and type menu option 1415; modes menu option 1416; virtual hubs menu option 1417; no arb settings menu option 1418; orders and confirms menu option 1419; pool message menu option 1420; tax and accounting menu option 1421; setting button 1440 to transmit the menu option; and/or hamburger button 270 to instruct the GUI 210 to take the user 110 to the menu screen.

In some implementations, the user interface 210 may be used by the user 110 to select a plurality of menu options 1410. The user 110 may select the origin (from)/destination (to) menu option 1411, which may lead to the GUI 210 displaying an address input rendering (e.g., address input rendering 910 and/or FIG. 2). The user 110 may select the "market" menu option 1412, which may lead to the GUI 210 displaying a market participation, transaction and/or trading rendering (e.g., as shown in FIG. 4, 11, 12, or 13). The user may toggle between the GUI 210 market view screen in FIG. 14 and other menu options and settings by the user 110 selecting the hamburger button 270, where the mobile computing device may detect the user's 110 input or contact with the GUI 210. The user 110 may select the timings and spec" menu option 1413, which may lead to the GUI 210 displaying a timings and specs rendering (e.g., as shown in FIG. 5). The user 110 may select the term and specs menu option 1414, which may lead to the GUI 210 displaying a term and specs rendering (e.g., as shown in FIG. 6). The user 110 may select the order time and type menu option 1415, which may lead to the GUI 210 displaying an order time and type rendering (e.g., as shown in FIG. 7).

The user 110 may select the modes menu option 1416, which may lead to the GUI 210 displaying a mode rendering (e.g., as shown in Figure). The user 110 may select the virtual hubs menu option 1417, which may lead to the GUI 210 displaying a virtual hubs rendering (e.g., as shown in FIG. 9). The user 110 may select the no arb settings menu option 1418, which may lead to the GUI 210 displaying a no arbitrage constraint rendering (e.g., as shown in FIG. 10). The user 110 may select the orders and confirms menu option 1419, which may lead to the GUI 210 displaying the market orders and transaction confirmations for the user 110. The user 110 may select the pool message menu option 1420, which may lead to the GUI 210 displaying a message to either the actual transportation capacity unit, the opposite seller user, or buyer user, depending on if the user 110 was an opposite buyer or seller of the transportation capacity unit. The user 110 may select the tax and accounting menu option 1421, which may lead to the GUI 210 displaying tax and accounting information for the user 110.

Selecting a particular menu option 1410 may lead to the mobile computing device instantiating instructions in its memory, and the mobile computing device may then transmit transportation capacity data through the network 214 or wireless GPS network 215 to call upon instruction routines and instruction sub-routines on the transportation forward market database server 271, virtual hub database server 223, network member database server 222, map routing server, no arbitrage condition database server and/or instructions in the memory of the cloud and local CPUs 290. The elements may interface together to make a system configured to deliver transportation or freight capacity units or securities to users 110 from and to a plurality of virtual hubs 410, 422 with a plurality of specifications at specific market prices.

Figure 15:
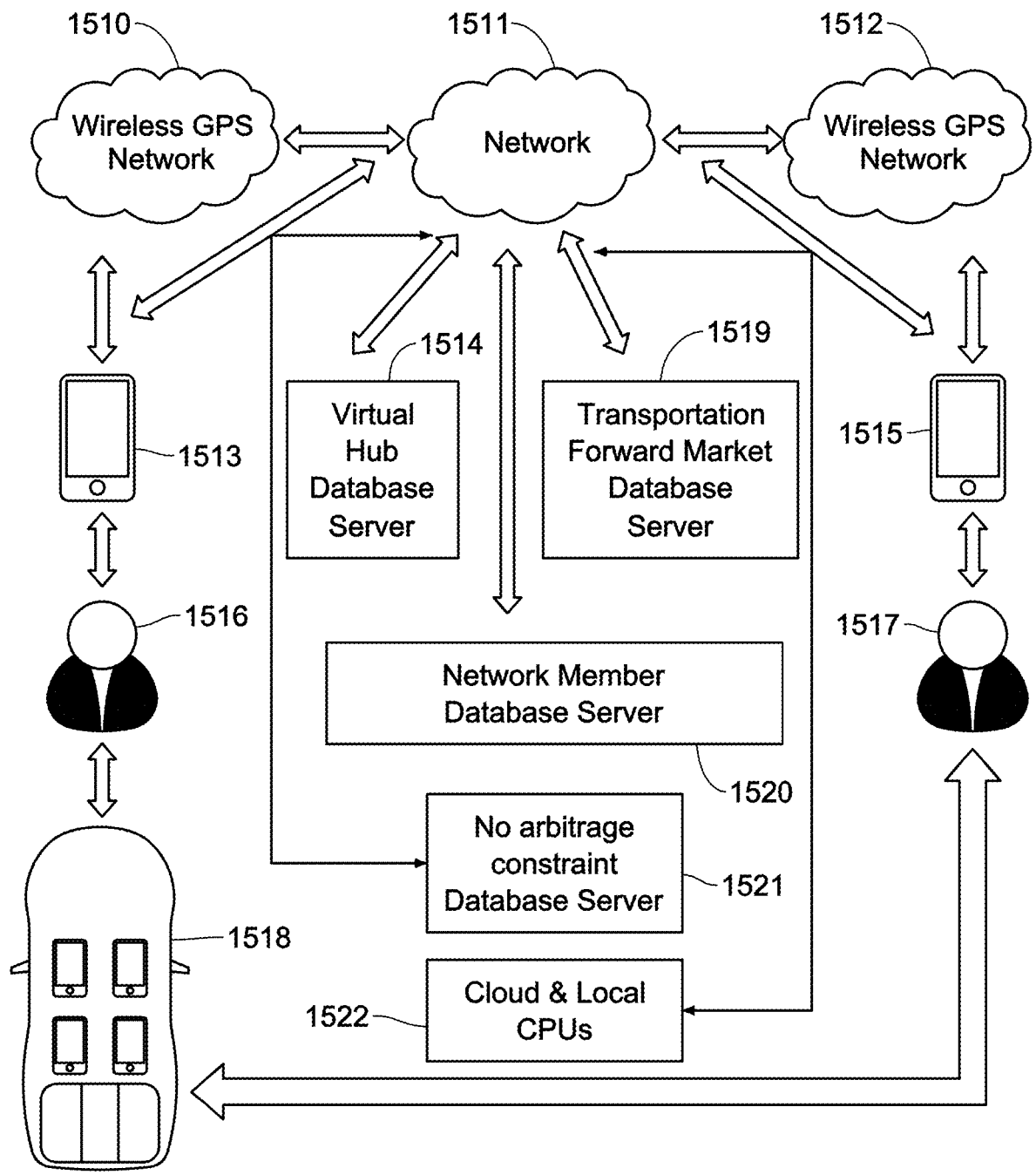
FIG. 15 illustrates a network configuration in accordance with implementations of various techniques described herein.

FIG. 15 illustrates a network configuration 1500 in accordance with implementations of various techniques described herein. In one implementation, the network configuration 1500 may be used for participating, transacting and/or trading transformed transportation or freight capacity units or securities. Further, while the implementations disclosed herein may be discussed in terms of the user 110, the implementations may be used by other types of users, as well.

In some implementations, the network configuration 1500 may include one or more of the following elements: wireless global positioning system (GPS) network 1510; networks 1511; additional GPS network 1512; user member portable multifunction device 1513; virtual hub database server 1514; transportation forward market database server 1519; additional user member portable multifunction device 1515; network member database server 1520; network member user 1516; additional network member user 1517; no arbitrage constraint database server 1521; cloud and local CPUs 1522; and/or transportation or freight capacity unit mode 1518.

In some implementations, the software and/or instructions stored in memory of the cloud & local CPUs 1522 and portable multifunction devices 1513, 1515 (e.g., mobile computing devices) may include additional instructions to instantiate specification requirements, participation, transactions, and/or trading on the transportation or freight capacity unit network 1511. The instructions may include standard database web services with the database as service provider (i.e., calling from the outside in), which may allow the client GUI 210 or 1513 to call the virtual hub database server 1514, the transportation forward market database server 1519, the network member database server 1520, the no arbitrage constraint database server 1521, and/or the cloud & local CPUs 1522 via the wireless GPS network 1510 or network 1511. In some implementations, the virtual hub database server 1514, the transportation forward market database server 1519, the network member database server 1520, the no arbitrage constraint database server 1521, and/or the cloud & local CPUs 1522 may each instruct the network 1511 to instantiate the database servers 1514, 1519, 1520, 1521, 1522 as service consumers (i.e., calling from the inside out), which may allow a SQL query or application module in the database session to consume an external web service. In some implementations, users 1516 and/or 1517 may use portable multifunction devices 1513 and/or 1515 to access the transportation or freight capacity unit market GUI 210, thereby allowing the users 1516 and/or 1517 to participate, transact and/or trade transportation or freight capacity units.

In some implementations, the virtual hub database server 1514 may store map tile data in addition to user location data, where such data may be used to display or render, via the GUI 210, locations of virtual hubs and user 1516 proximity to those virtual hubs. In some implementations, the transportation forward market database server 1519 may store bid and offer data for respective quantities of users, as well as transaction data and a plurality of market data for each virtual hub combination. In some implementations, the network member database server 1520 may store user profile, user transaction, user trade, user settings, user specifications, user rating, user criminal history, background check data, facial recognition data, fingerprint recognition data, photo scan recognition data, ride history data, user track record, user bank data, user credit card data, user history data, user tax data, and/or a plurality of other data. In some implementations, the no arbitrage constraint database server 1521 may store data and algorithms to identify user 110 constraints and may run algorithm calculations for users 110 on specific constraints to check for compliance with the constraints. In some implementations, network servers and CPUs 1514, 1519, 1520, 1521, 1522, 1513, 1515 may interface through the network 1511 and/or wireless GPS networks 1510, 1512, such that transportation or freight capacity units may be participated in, transacted and/or traded efficiently in the context of a market for transportation capacity units or securities. Included aforementioned data elements may be a subset or superset of data used for any specific calculation or transformation to participate, transact, or trade transportation or freight capacity units or securities.

Figure 16:
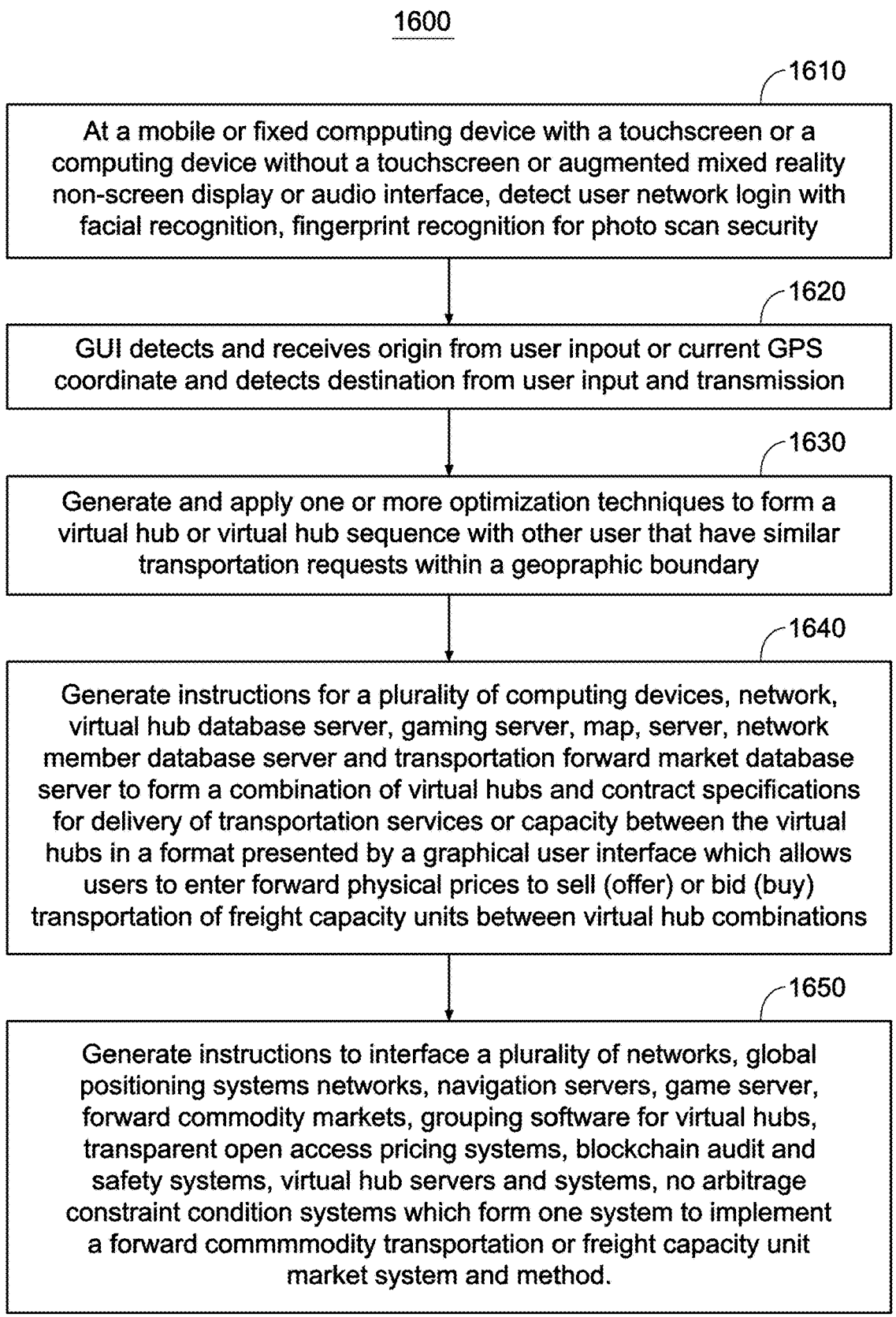
FIG. 16 illustrates a flow diagram of a method in accordance with implementations of various techniques described herein.

FIG. 16 illustrates a flow diagram of a method 1600 in accordance with implementations of various techniques described herein, where the method 1600 may be used for participating in, transacting, and/or trading transformed transportation capacity units or securities between virtual hub combinations. In one implementation, method 1600 may be at least partially performed by a computing system, such as the computing system implementations discussed herein. In particular, the computing system may include one or more of the following: a computing device, a mobile or portable multifunction device, a fixed computing device, a computing device with a touchscreen, a computing device without a touchscreen, an augmented, audio interface computing device, a computing device with a mixed reality non-screen display, and/or any other computing system or device known to those skilled in the art. It should be understood that while method 1600 indicates a particular order of execution of operations, in some implementations, certain portions of the operations might be executed in a different order. Further, in some implementations, additional operations or steps may be added to the method 1600. Likewise, some operations or steps may be omitted.

At block 1610, the computing system may receive and/or detect a user login. In one implementation, the user login may be communicated to a transportation capacity unit network (as described above) for detection and/or any other determination. At block 1620, the computing system may determine an origin location based on user input or current GPS coordinate information, and may determine a destination address based on user input. In one implementation, data relating to the origin location and/or the destination address may be transmitted using the transportation capacity unit network.

At block 1630, the computing system may, in conjunction with CPUs and/or databases of the network, generate and apply one or more optimization techniques to form a virtual hub with other users that have similar transportation requests within a geographic boundary. At block 1640, the computing system may, in conjunction with CPUs and or databases of the network, generate instructions for a plurality of computing devices, network, virtual hub database server, network member database server and transportation forward market database server 271. These instructions may be used form a combination of virtual hubs and transformed contract specifications for delivery of transportation services, transportation, and/or freight capacity between the virtual hubs. This combination may be presented via a graphical user interface to allow users to enter forward physical prices to sell (offer) or bid (buy) transportation capacity units or securities between virtual hub combinations in an open market auction format.

At block 1650, the computing system may, in conjunction with CPUs and or databases of the network, generate instructions to interface a plurality of networks, global positioning systems networks, servers, forward commodity market auctions, map routing servers, grouping instruction software for virtual hubs, navigation servers, transparent open access pricing systems, game servers, blockchain audit and safety systems, virtual hub servers and systems, no arbitrage constraint condition systems. These elements may form a system configured to implement a forward commodity transportation or freight capacity unit forward market system.

Figure 17:
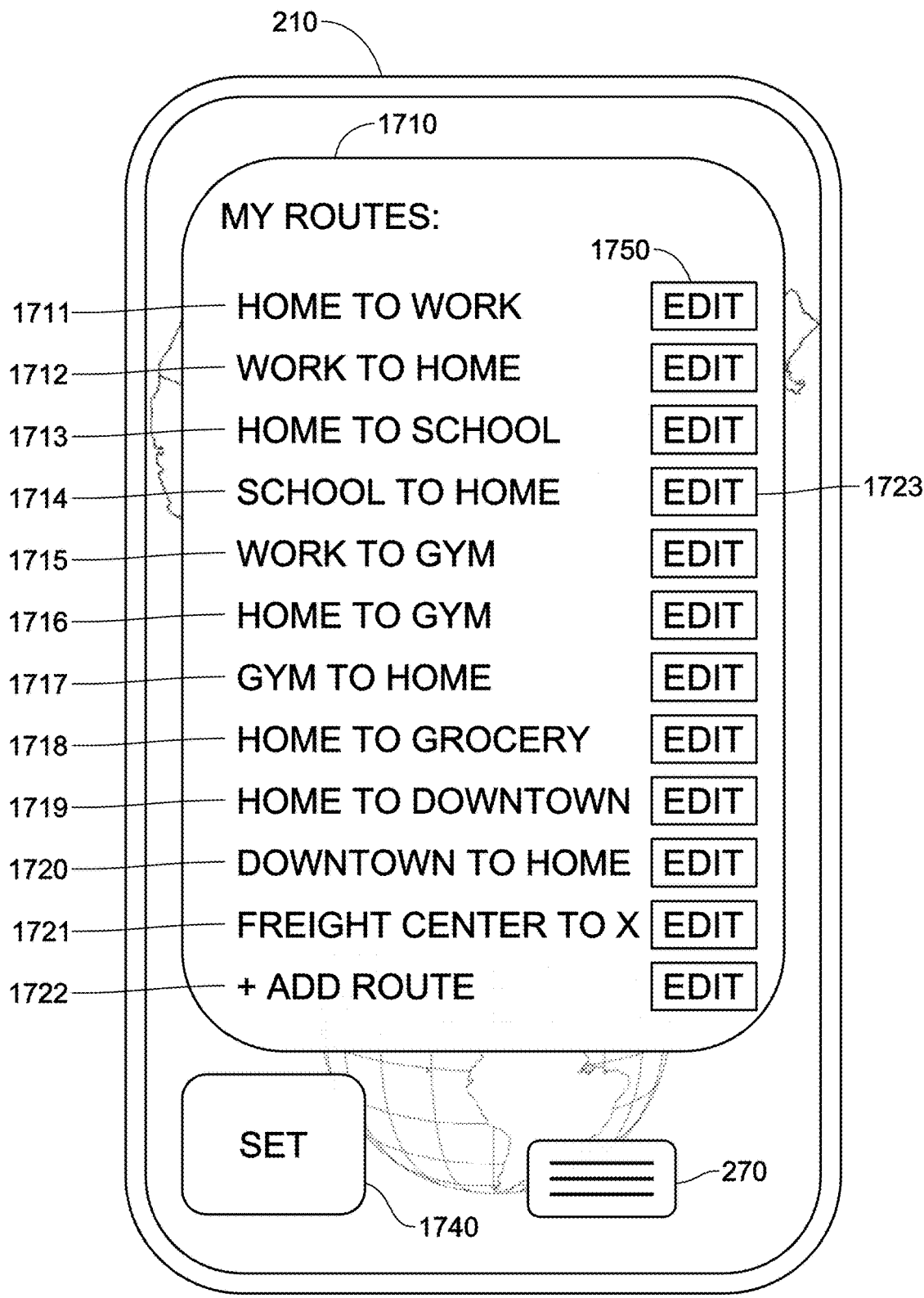
FIG. 17 illustrates a user interface of a computing device in accordance with implementations of various techniques described herein.

FIG. 17 illustrates a user interface 210 of a computing device in accordance with implementations of various techniques described herein. In particular, the of the user interface 210 may display one or more options relating to a user's most frequent transportation or freight unit routes 1710, which may be used for participating, transacting and/or trading transportation or freight capacity units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements relating to the most frequent my routes: Home to Work 1711 (may have subsets of transformed data); Work to Home 1712 (may have subsets of transformed data); Home to School 1713 (may have subsets of transformed data); School to Home 1714 (may have subsets of transformed data); Work to Gym 1715 (may have subsets of transformed data); Home to Gym 1716 (may have subsets of transformed data); Gym to Home 1717 (may have subsets of transformed data); Home to Grocery 1718 (may have subsets of transformed data); Home to Downtown 1719 (may have subsets of transformed data); Downtown to Home 1720 (may have subsets of transformed data); Freight Center to X 1721 (may have subsets of transformed data), where X is a delivery route or multi virtual hub combination; +Add Route 1722 (may have subsets of transformed data); Edit 1723 or 1750 (may have subsets of transformed data); set button 1740 to transmit the My Routes data; and/or hamburger button 270 to instruct the GUI 210 to take the user 110 to the menu screen.

In some implementations, the GUI 210 may be used to select, store and/or edit a user's 110 frequent or preferred routes ("MY ROUTES") 1710 for more efficient access to transportation capacity unit markets over various modes and specifications of transportation capacity. In such implementations, the user 110 may select, store and/or edit address and specification data for Home to Work 1711, Work to Home 1712, Home to School 1713, School to Home 1714, Work to Gym 1715, Home to Gym 1716, Gym to Home 1717, Home to Grocery 1718, Home to Downtown 1719, Downtown to Home 1720, Freight Center to X 1721, and/or +Add Route 1722. The My Routes module 1710 may include any route a user 110 may request on any transportation or freight capacity unit mode and/or specification.

In some embodiments the user may toggle between the a market view screen (e.g., as shown in FIG. 4) and other menu options and settings (e.g., options 1410 of FIG. 14) by the user 110 selecting the hamburger button 270, with the mobile computing device detecting the user 110 input or contact. In some implementations, the user 110 may be notified via SMS text, in application, email, and/or a plurality of other known communication methods as to when market activity occurs on a given route or virtual hub combination. In other words, the "My Routes" 1710 feature may not only allow for one touch access to a saved route but may also perform notification features between users. Lastly, in some implementations, the Edit button 1723, 1750 may allow a user 110 to modify a plurality of notification settings, such as email, SMS text, in application, voice, messaging, and/or other notification methods.

Figure 18:
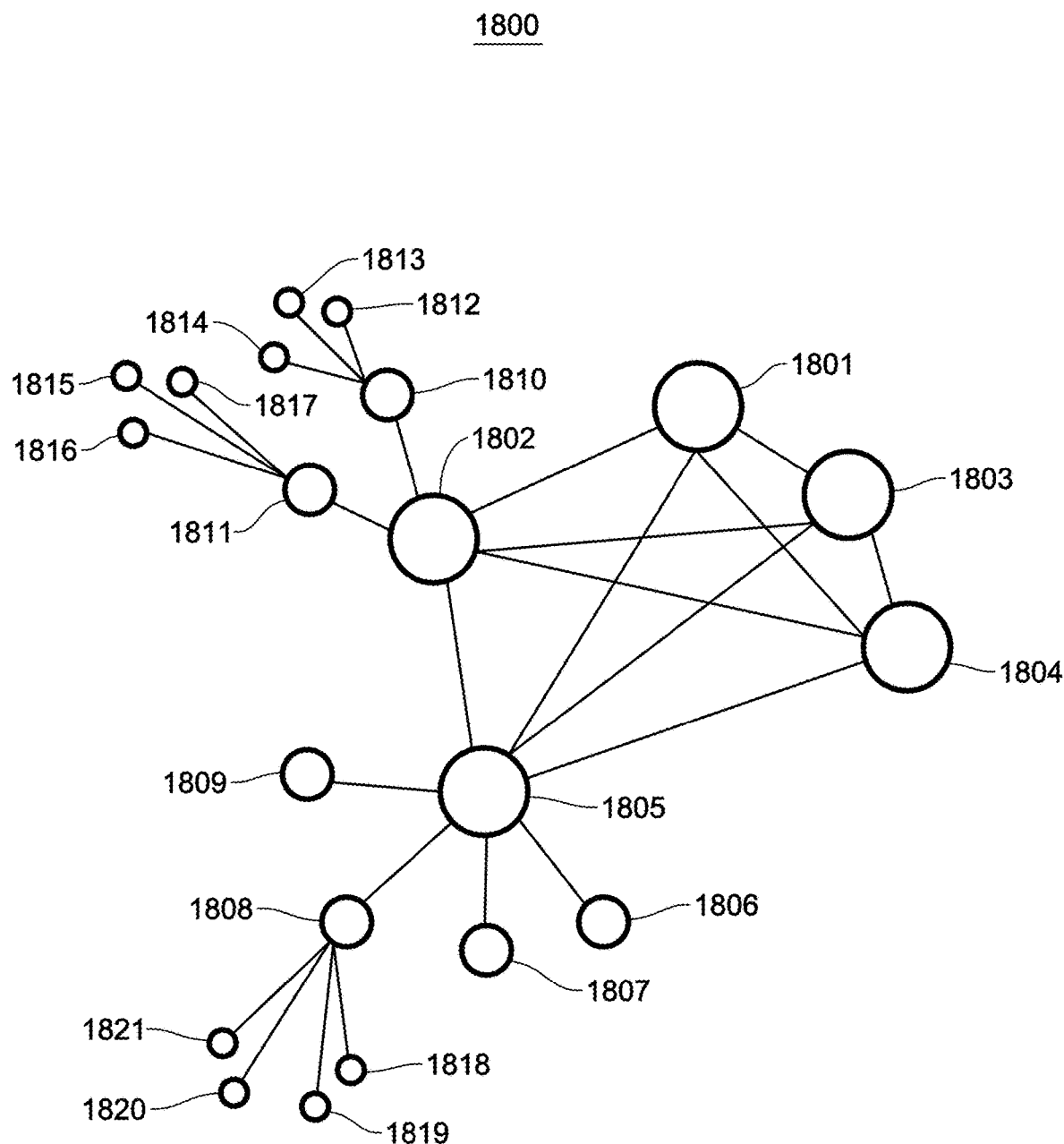
FIG. 18 illustrates a network topology configuration in accordance with implementations of various techniques described herein.

FIG. 18 illustrates a network topology configuration 1800 in accordance with implementations of various techniques described herein. In one implementation, the network configuration 1800 may be used for participating, transacting and/or trading transformed transportation or freight capacity units or securities. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the network configuration 1800 may include one or more of the following elements: large virtual hub nodes 1801, 1802, 1803, 1804, 1805; medium virtual hub nodes 1810, 1811, 1809, 1808, 1807, 1806; and/or small virtual hub nodes 1812, 1813, 1814, 1815, 1816, 1817, 1818, 1819, 1820, 1821. In particular, the overall network node topology configuration 1800 may include large virtual hub nodes 1801, 1802, 1803, 1804, 1805, medium virtual hub nodes 1810, 1811, 1809, 1808, 1807, 1806, small virtual hub nodes 1812, 1813, 1814, 1815, 1816, 1817, 1818, 1819, 1820, 1821, or a subset or superset thereof.

In some implementations, a user may input a starting point of 1815 and an ending point of 1818, which may represent specific geographic virtual hub locations in a city, multiple cities, a country, or multiple countries. Forward transportation market auctions may occur directly between two exemplary points, such as 1815 and 1818, or the method and system may combine a series of smaller auctions to create a larger auction between two endpoints on the system. In one implementation, a series of smaller auctions may be combined between 1815 and 1811, 1811 and 1802, 1802 and 1805, 1805 and 1808, and 1808 and 1818, which would be added together to make a combined virtual hub auction. A combined series of smaller auctions may be constrained by instructions used to form auctions, where such instructions may be based on cheapest transportation or freight route, single mode transport or freight auctions, multi-mode transport or freight, fastest transport or freight constraints, most scenic auctions, highest rating auctions, most available or liquid auctions, highest volume auctions, most frequent auctions, service level auctions, security and safety level auctions, and/or group restricted auctions by sex, email, organization, gender, or other considerations.

In some implementations, the constraints may allow for many types of auctions for transformed transportation and freight capacity units or securities in a forward transportation and freight market. In such implementations, the user 110 may specify instructions that set forward market auction constraints based on one or a plurality of constraints. The constrained auctions may have fungible units which allow many participants to transact in the auctions. The forward market of transportation units between virtual hubs 1801 and 1804, or other combinations along map routes, may include the attributes of a fungible forward contract. Such a contract may allow for one transportation unit to be substitutable for another transportation unit, because the unit may have been transformed and defined as a commodity contract. For example, assume user A bought a transportation unit from user B between virtual hub 1801 and virtual hub 1804, but then user A was not able to perform the obligation to purchase the transportation unit between virtual hub 1801 and virtual hub 1804 from user B. User A could then resell the transportation unit contract between virtual hub 1801 and virtual hub 1804 to a third party user C on the forward transportation unit auction market between virtual hub 1804 and virtual hub 1801 to retrieve the financial payment made for their original purchase from user B. User C would then replace user A and be matched with user B for the transportation unit transformation between virtual hub 1804 and virtual hub 1801. In some implementations, constrained optimization may be used to form one auction between two points or a series of multiple auctions that form one larger auction.

In some implementations, the forward transportation and freight unit auctions subject to various constraints may be presented as a linear programming cost minimization problem for cases where the user 110 selects the cheapest route 1011 constraint. For example, the series of auctions that utilize the lowest cost path between the start point 1815 and the ending point 1818 may be combined. Further, in such an example, the linear programming cost minimization function may select the path of 1815 to 1811 to 1802 to 1804 to 1805 to 1808 to 1818 if that combination is the lowest cost auction path.

In another implementation, the user 110 may select instructions for the auction to minimize both cost and shortest route. In such an implementation, the linear programming function may minimize the cost, subject to the constraint that time is shortest along the path. The resulting auction may combine a different and unique series of auctions between the starting point of 1815 and ending point 1818. Accordingly, the path may be optimized to minimize cost subject to the shortest path, which may yield a path of 1815 to 1811 to 1802 to 1805 to 1808 to 1818. The plurality of combinations and permutations of linear programming sequences of auctions for transportation or freight units between two points may be infinite.

In some implementations, the forward transformed transportation and freight unit or transformed transportation security unit auctions may be held side by side between two competing routes. For example, a user may input instructions for the method and system to route between virtual hub 1801 and virtual hub 1805. One route may be directly between virtual hub 1801 and virtual hub 1805. Another route may be between virtual hub 1801 and virtual hub 1805 by way of virtual hub 1802. The time between the routes may vary due to traffic, construction, road conditions, accidents, or a plurality of other exogenous factors. However, the data transformation of the implementations disclosed herein may allow for two auctions to form side by side. Side by side auctions may be displayed on a market based user interface (e.g., as shown in FIG. 13) or as a software layer of instructions over a navigation system. The first transportation unit auction may be directly between virtual hub 1805 and virtual hub 1801 as one auction. A second auction may be formed by combining two smaller auctions between virtual hub 1805 and virtual hub 1802 with the auction between virtual hub 1802 and virtual hub 1801, which could be expressed independently or as a combined auction. The plurality of route auctions for the transportation unit (e.g., the first auction directly between 1801 virtual hub and 1805 virtual hub and the second auction between 1801 virtual hub and 1805 virtual hub by way of 1802 virtual hub) may provide transparent price auction information to the user regarding the value of various proposed routes, which may have different price values.

Figure 19:
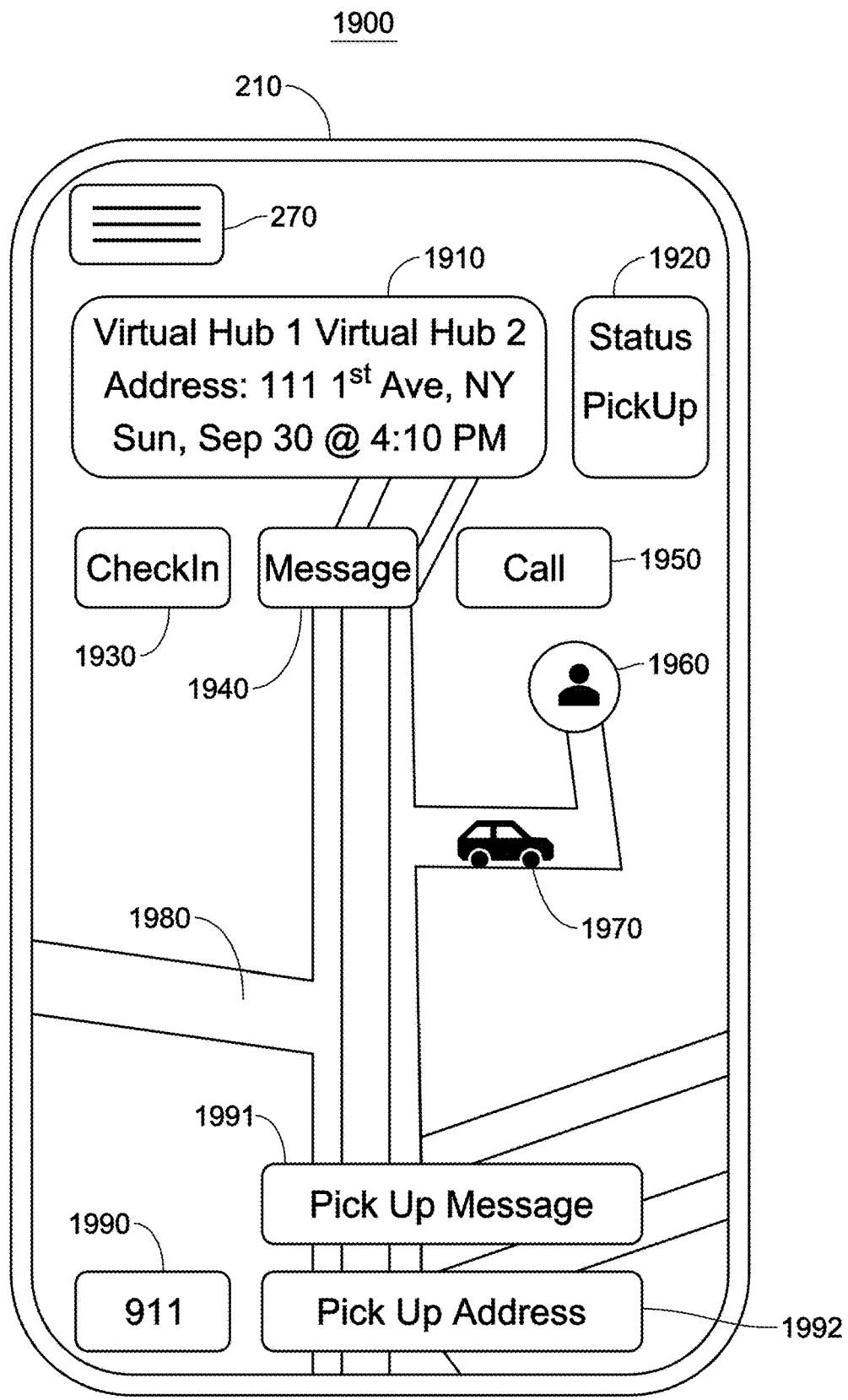
FIGS. 19-27 illustrate the user interface of a computing device in accordance with implementations of various techniques described herein.

FIG. 19 illustrates the user interface 210 of a computing device in accordance with implementations of various techniques described herein. In particular, the user interface 210 may be used to display a delivery and pick up status configuration 1900 for participating, transacting and/or trading transformed transportation or freight capacity units or securities. In particular, the GUI 210 may be used to display implementations which utilize a multi-layered network node topology for forward market of transportation and freight units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the delivery and pick up status configuration 1900 may include one or more of the following elements: hamburger menu button 270 to move between different application configurations; information 1910 relating to a virtual hub 1 pickup address and virtual hub 2 destination address having a contract specification with regards to quality, day, date, and time; trip status 1920 indicating the status of "PickUp" for the transportation or freight unit; check-in passenger or freight button 1930 for the transportation unit; message button 1940 for messaging texts and instructions between users to facilitate pick up and delivery of transportation or freight capacity units; call button 1950 for placing a call between users, where number masking may be used for privacy and security; GPS map location indicator 1960 of a rider or of a cargo location; GPS map location indicator 1970 of a driver or of a cargo carrier; GPS map 1980 corresponding to the delivery and pick up of the transportation or freight unit; texting message window 1991 used for communication between users; pick up address data window 1992 during the ongoing pick up process; and/or security button 1990 used to report security issues to 911 and system database.

In some implementations, the GUI 210 may transmit delivery instructions to the users 110 (e.g., the rider and driver), where the instructions may include a rendering or map of their respective GPS locations, which may be shown via indicators 1960 and 1970. The GUI 210 may display the trip status 1920, where the trip status may include pick up, start, leaving, on-going, in-progress, arriving, arrived, or a plurality of other trip status conditions. Further, the GUI 210 may include check-in passenger or freight button 1930, which may be used to confirm a passenger or freight transformed transportation unit has been moved into the transformed transportation unit object. The transformed transportation unit object may be a car, airplane, autonomous vehicle, bike, boat, ship, bus, drone, limo, motorcycle, moped, shuttle, spaceship, subway, taxi, train, cargo, a combination of transformed modes, and/or other modes of transportation.

In addition, the users 110 may transmit a message using the message button 1940, which may be used to transmit audio, visual or text messages between users 110. The users 110 may also call each other using the call button 1950, which may be used to communicate pick up or delivery instructions. Additionally, a user may message another user using the texting message window 1991, which may be used to facilitate visual, audio or text communication between users and while logging a message history.

In some implementations, the users 110 may toggle to other modes of the application using the menu hamburger button 270. The relative positions of a transportation or freight unit seller (i.e., indicator 1970) and a transportation or freight unit buyer (i.e., indicator 1960) may be displayed on the GPS map 1980 to help users 110 understand each other's relative position and location on the map 1980. In some implementations, the GPS location of the transportation and freight unit seller (i.e., indicator 1970) and transportation or freight unit buyer (i.e., indicator 1960) may be tracked in real time with location updates on the map 1980.

Figure 20:
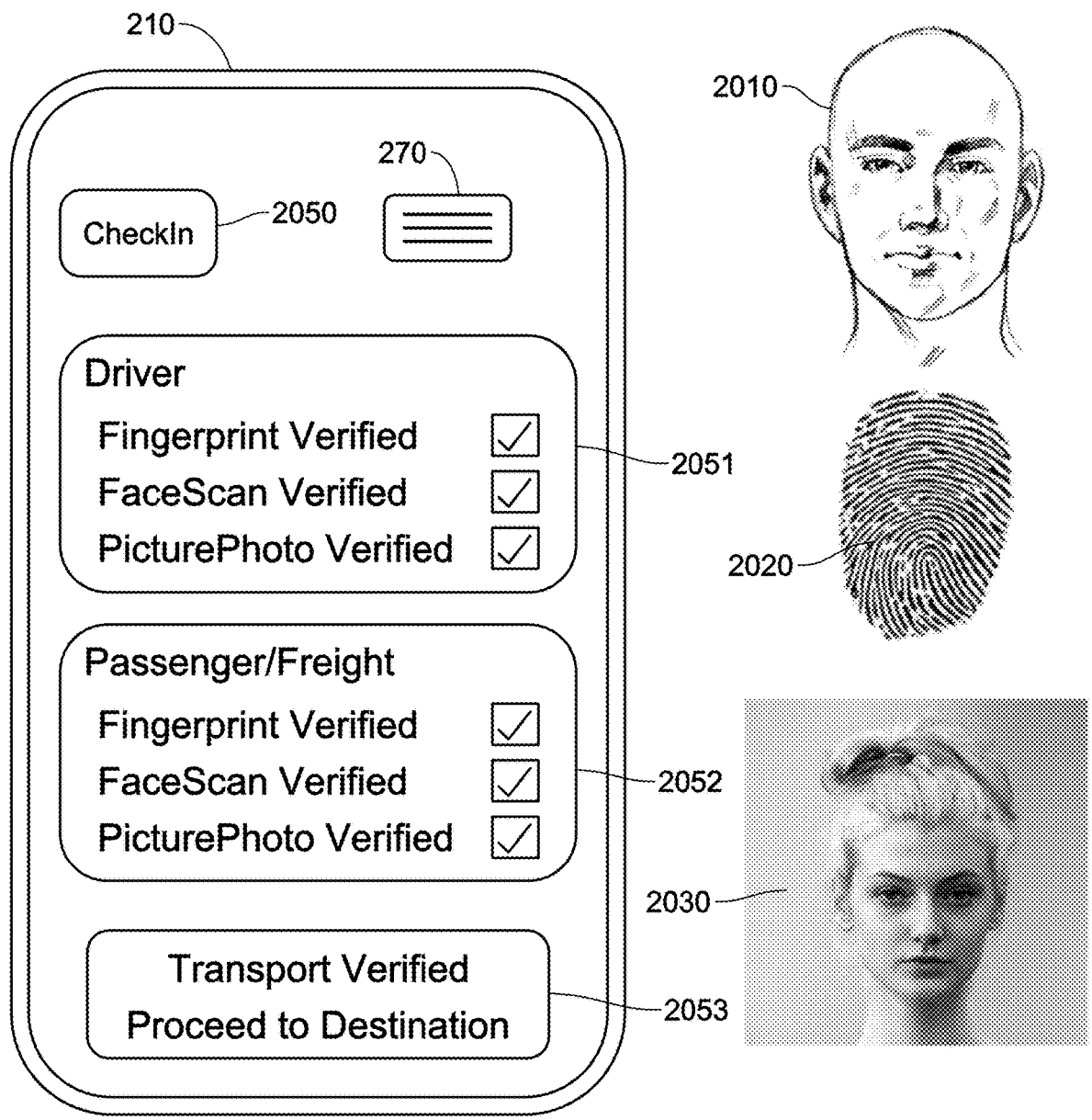

FIG. 20 illustrates the user interface 210 of a computing device in accordance with implementations of various techniques described herein. In particular, the of the user interface 210 may display a CheckIn configuration 2000, which may be used for participating, transacting and/or trading transportation or freight capacity units. In particular, the GUI 210 may be used to display a multi-layered network node topology for forward market of transportation and freight units with security CheckIn features. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the user interface 210 may display and/or include one or more of the following elements: a CheckIn button 2050 for a buyer or seller of a transportation or freight unit; a hamburger menu button 270 to move between different application configurations; a driver or seller of transportation or freight unit scan check window 2051, which may indicate the use of a fingerprint, face scan, and/or picture photo scan to verify the identity of a user; a passenger or freight and transportation unit buyer unit scan check window 2052, which may indicate the use of a fingerprint, face scan, and/or picture photo scan to verify the identity of a user; a transport verification confirmation window 2053 to confirm identities of users in the system at the application system level; facial data 2010 for a buyer and/or seller of transportation or freight unit for whom facial recognition confirmation is used; fingerprint data 2020 for a buyer and/or seller of a transportation or freight unit for whom fingerprint recognition confirmation is used; photo data 2030 for a buyer and/or seller of a transportation or freight unit for whom photo recognition confirmation is used;

In some implementations, the computing device may be used to transmit data and confirm the identity of users against identity records in the network member database server 222. The computing device may also be used to confirm security checks for criminal records or other activity that would suspend a user from the platform environment. In a further implementation, the driver verification window 2051 may indicate a failure regarding an identity verification due to a user not being the registered user on the network member database server 222. In other implementations, the passenger or freight verification window 2052 may indicate a failure regarding an identity verification due to a user not being the registered user on the network member database server 222. In another implementation, the transport verification window 2053 may instruct the user to proceed to a destination if the one or more verifications are successful. The transport verification window 2053 may also instruct the user not to proceed to the destination if the one or more verification are not successful.

Figure 21:
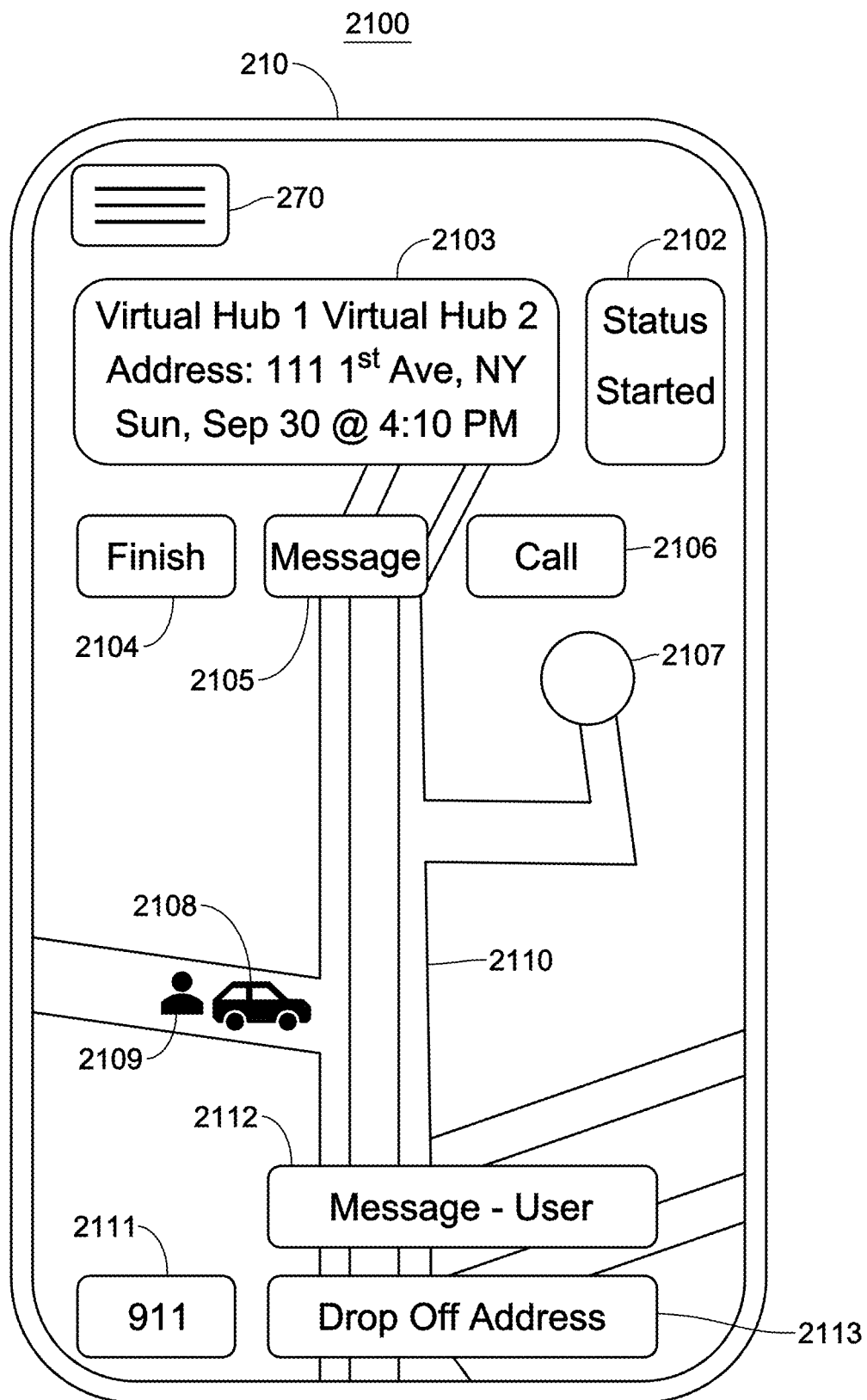

FIG. 21 illustrates the user interface 210 of a computing device in accordance with implementations of various techniques described herein. In particular, the user interface 210 may be used to display a delivery and pick up status configuration 2100 once a transportation or freight unit delivery has started when participating, transacting and/or trading transportation or freight capacity units, as described above. In particular, the GUI 210 may be used to display implementations which utilize a multi-layered network node topology for forward market of transportation and freight units. Further, while the implementations disclosed herein may be discussed in terms of the user 110, the implementations may be used by other types of users, as well.

In some implementations, the delivery and pick up status configuration 2100 may include one or more of the following elements, or a subset or superset thereof:

a hamburger menu button 270 to move between different application configurations; information 2103 relating to a virtual hub 1 pickup address and virtual hub 2 destination address having a transformed contract specification with regards to quality, day, date, and time of delivery of a transportation or freight unit; trip status 2102 indicating the status of "Started" for the transportation or freight unit or security; a finish trip passenger or freight button 2104 for the transportation unit for use once a transportation or freight unit has been delivered; message button 2105 for messaging texts and instructions between users to facilitate the pick up and delivery of transportation or freight capacity units; call button 2106 for placing a call between system users, where number masking may be used for privacy and security; GPS map location indicator 2109 of a rider or a cargo location; GPS map location indicator 2108 of a driver or a cargo carrier location; GPS map 2110 corresponding to the delivery and pick up of the transportation or freight unit; texting message window 2112 for communication between users; starting point 2107 of a virtual hub for forward transportation or freight units; security button 2111 to report security issues to 911 and/or a system database; and/or drop off address window 2113 for the delivery of passenger or freight for transportation or freight unit.

In some implementations, the GUI 210 may transmit delivery instructions to the users 110 (e.g., the rider and driver), where the instructions may include a rendering or map of their respective GPS locations, which may be shown via indicators 1960 and 1970. The GUI 210 may display the trip status 2102, where the trip status may include pick up, started, leaving, on-going, in-progress, arriving, arrived, or a plurality of other trip status conditions.

Further, the GUI 210 may include a finish trip passenger or freight button 2104, which may be used to confirm a passenger or freight transportation unit has been delivered or completed by the transportation unit object. The transportation unit object may be a car, airplane, autonomous vehicle, bike, boat, ship, bus, drone, limo, motorcycle, moped, shuttle, spaceship, subway, taxi, train, cargo, and/or other modes of transportation.

In addition, the users 110 may transmit a message using the message button 2105, which may be used to transmit audio, visual or text messages between users 110. The users 110 may also call each other using the call button 2106, which may be used to communicate pick up or delivery instructions or other communications. Additionally, a user may message another user using the texting message window 2112, which may be used to facilitate visual, audio or text communication between users while logging a message history.

In some implementations, the users 110 may toggle to other modes of the application using the menu hamburger button 270. The relative positions of a transformed transportation or freight unit or security seller (i.e., indicator 2108) and a transformed transportation or freight unit or security buyer (i.e., indicator 2109) may be displayed on the GPS map 2110 to help users 110 understand each other's relative position and location on the map 2110. In some implementations, the GPS location of the transportation and freight unit seller (i.e., indicator 2108) and transportation or freight unit buyer (i.e., indicator 2109) may be tracked in real time with location updates on the map 2110.

Figure 22:
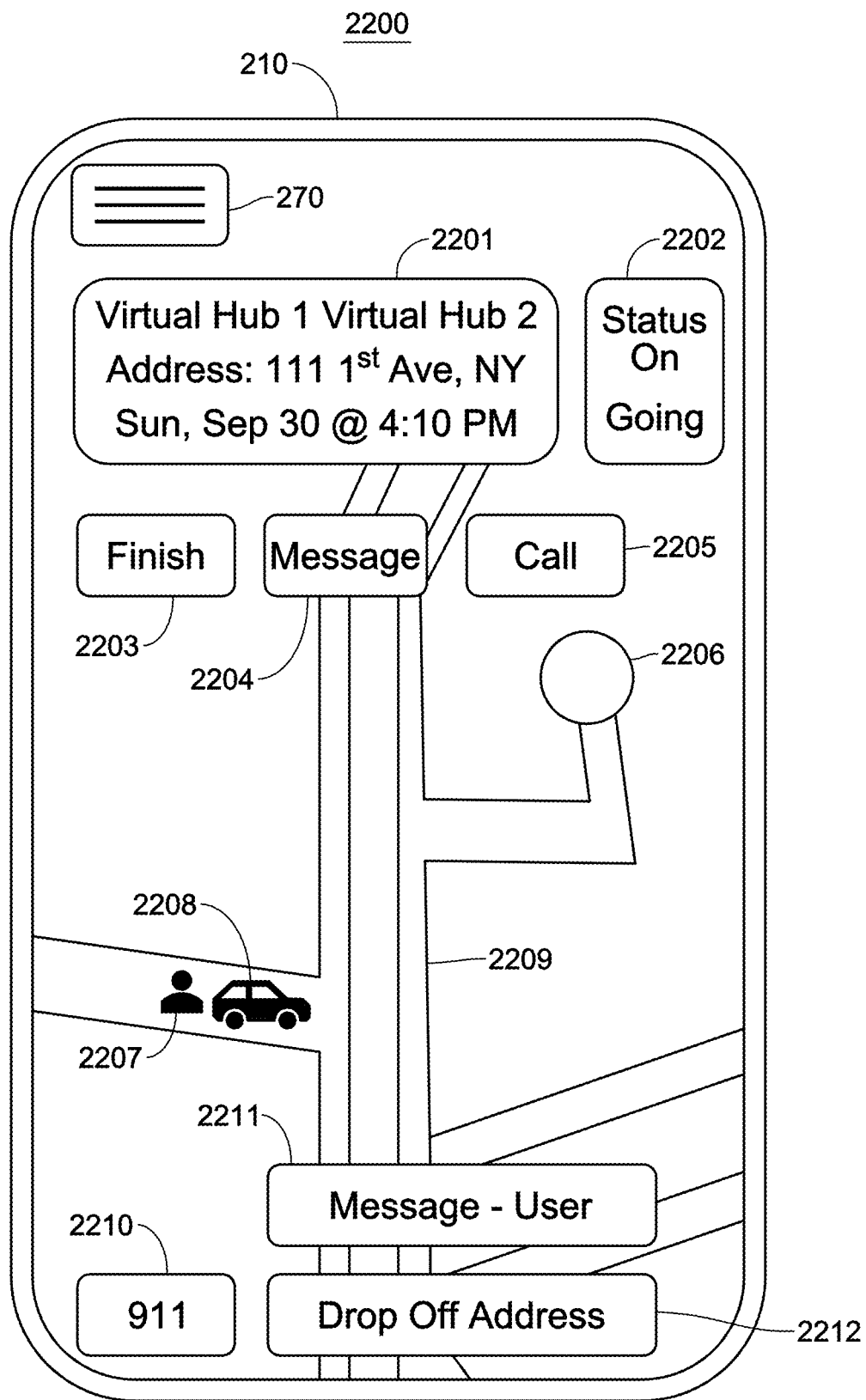

FIG. 22 illustrates the user interface 210 of a computing device in accordance with implementations of various techniques described herein. In particular, the user interface 210 may be used to display a delivery and pick up status configuration 2200 for a transportation or freight unit delivery that is ongoing when participating, transacting and/or trading transformed transportation or freight capacity units or securities. In particular, the GUI 210 may be used to display implementations which utilize a multi-layered network node topology for forward market of transportation and freight units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the delivery and pick up status configuration 2200 may include one or more of the following elements: hamburger menu button 270 to move between different application configurations; information 2201 relating to virtual hub 1 pickup address and virtual hub 2 destination address having a contract specification with regards to quality, day, date, and time of delivery of a transportation or freight unit; trip status 2202 indicating that the status of "Ongoing" for the transportation or freight unit; finish trip passenger or freight button 2203 for the transportation unit for use once a transportation or freight unit has been delivered; message button 2204 for messaging texts and instructions between users to facilitate the pick-up and delivery of transportation or freight capacity units; call button 2205 for placing a call between system users, number masking may be used for privacy and security; GPS map location indicator 2207 of a rider or cargo location; GPS map location indicator 2208 of a driver or cargo carrier location; GPS map 2209 corresponding to the delivery and pick up of the of transportation or freight unit; texting message window 2211 for communication between users; starting point 2206 of a virtual hub for forward transportation or freight units; security button 2210 to report and record security issues to 911 and/or a system database; and/or drop off address window 2212 for the delivery of passenger or freight for transportation or freight unit.

In some implementations, the GUI 210 may transmit delivery instructions to the users 110 (e.g., the rider and driver), where the instructions may include a rendering or map of their respective GPS locations, which may be shown via indicators 2207 and 2208. The GUI 210 may display the trip status 2202, where the trip status 2202 may include pick up, started, leaving, on-going, in-progress, arriving, arrived, or a plurality of other trip status conditions.

Further, the GUI 210 may include a finish trip passenger or freight button 2203, which may be used to confirm a passenger or freight transportation unit or security has been delivered or completed by the transportation unit The transportation unit object may be a car, airplane, autonomous vehicle, bike, boat, ship, bus, drone, limo, motorcycle, moped, shuttle, spaceship, subway, taxi, train, cargo, and/or other types of transportation modes.

In addition, the users 110 may transmit a message using the message button 2204, which may be used to transmit audio, visual or text messages between users 110. The users 110 may also call each other using the call button 2205, which may be used to communicate pick up or delivery instructions or other necessary communication. Additionally, a user may message another user to facilitate visual, audio or text communication between users while logging a message history.

In some implementations, the users 110 may toggle to other modes of the application using the menu hamburger button 270. The relative positions of a transportation or freight unit seller (i.e., indicator 2208) and a transportation or freight unit buyer (i.e., indicator 2207) may be displayed on the GPS map 2209 to help users 110 understand each other's relative position and location on the map 2209. In some implementations, the GPS location of the transportation and freight unit seller (i.e., indicator 2208) and transportation or freight unit buyer (i.e., indicator 2207) may be tracked in real time with location updates on the map 2209. The GUI 210 may also display the drop off address 2212 of the transportation or freight unit. In some implementations, a user 110 may use a security button 2210 to submit a recording to the system servers and to authorities who are connected to the system if anything has occurred that may compromise the security of any user or transportation unit.

Figure 23:
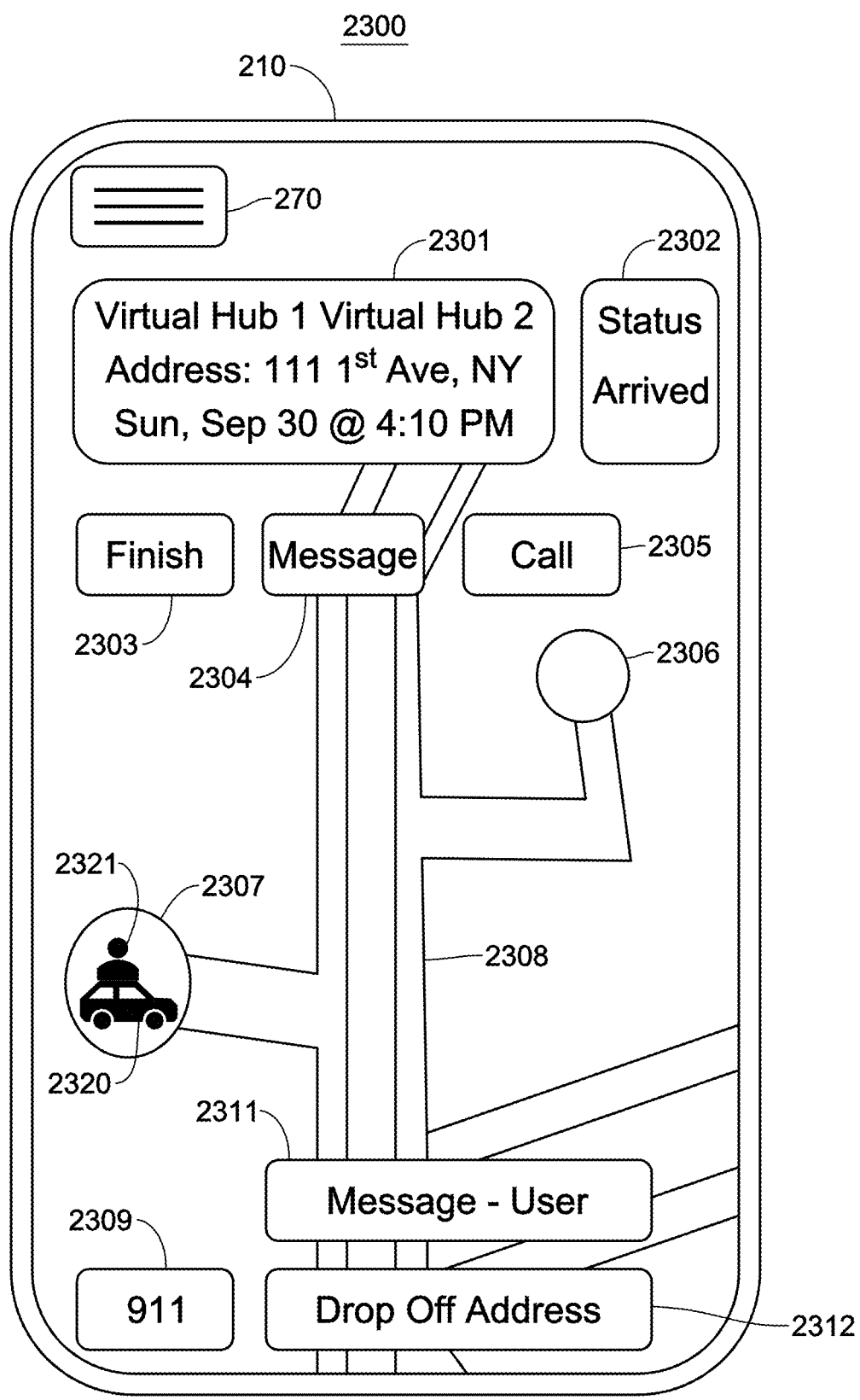

FIG. 23 illustrates the user interface 210 of a computing device in accordance with implementations of various techniques described herein. In particular, the user interface 210 may be used to display a delivery and pick up status configuration 2300 once a transportation or freight unit delivery has arrived when participating, transacting and/or trading transportation or freight capacity units. In particular, the GUI 210 may be used to display implementations which utilize a multi-layered network node topology for forward market of transportation and freight units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the delivery and pick up status configuration 2300 may include one or more of the following elements: hamburger menu button 270 to move between different application configurations; information 2301 relating to a virtual hub 1 pickup address and virtual hub 2 destination address having a contract specification with regards to quality, day, date, and time of delivery of a transportation or freight unit; trip status 2302 indicating the status of "Arrived" for the transportation or freight unit; finish trip passenger or freight button 2303 for the transportation unit for use once a transportation or freight unit has been delivered; message button 2304 for messaging texts and instructions between users to facilitate the pick up and delivery of transportation or freight capacity units; call button 2305 for placing a call between system users, where number masking may be used for privacy and security; GPS map location indicator 2321 of a rider or cargo location; GPS map location indicator 2320 of a driver or cargo carrier location; GPS map 2308 corresponding to the delivery and pick up of the transportation or freight unit; texting message window 2311 for communication between users; starting point 2306 of a virtual hub for forward transformed transportation or freight units or securities; ending point 2307 of a virtual hub for forward transformed transportation units or freight units or securities; security button 2309 to report and record security issues to 911 and/or a system database; and/or drop off address window 2312 for the delivery of passenger or freight for transportation or freight unit.

In some implementations, the GUI 210 may transmit delivery instructions to the users 110 (e.g., the rider and driver), where the instructions may include a rendering or map of their respective GPS locations, which may be shown via indicators 2320 and 2321. The GUI 210 may display the trip status 2302, where the trip status may include pick up, started, leaving, on-going, in-progress, arriving, arrived, or a plurality of other trip status conditions.

Further, the GUI 210 may include a finish trip passenger or freight button 2303, which may be used to confirm a passenger or freight transportation unit has been delivered or completed by the transportation unit object. The transportation unit object may be a car, airplane, autonomous vehicle, bike, boat, ship, bus, drone, limo, motorcycle, moped, shuttle, spaceship, subway, taxi, train, cargo, and/or other types of transportation modes.

In addition, the users 110 may transmit a message using the message button 2304, which may be used to transmit audio, visual or text messages between users 110. The users 110 may also call each other using the call button 2305, which may be used to communicate pickup or delivery instructions or other communications. Additionally, a user may message another user using the texting message window 2112, which may be used to facilitate visual, audio or text communication between users while logging a message history.

In some implementations, the users 110 may toggle to other modes of the application using the menu hamburger button 270. The relative positions of a transportation or freight unit seller (i.e., indicator 2320) and a transportation or freight unit buyer (i.e., indicator 2321) may be displayed on the GPS map 2110 2308 to help users 110 understand each other's relative position and location on the map 2308. In some implementations, the GPS location of the transportation and freight unit seller (i.e., indicator 2320) and transformed transportation or freight unit or security buyer (i.e., indicator 2321) may be tracked in real time with location updates on the map 2308. The GUI 210 may also display the drop off address 2312 of the transformed transportation or freight unit or security. In some implementations, a user 110 may use a security button 2309 to submit a recording to the system servers and to authorities who are connected to the system if anything has occurred that may compromise the security of any user or transportation unit.

Figure 24:
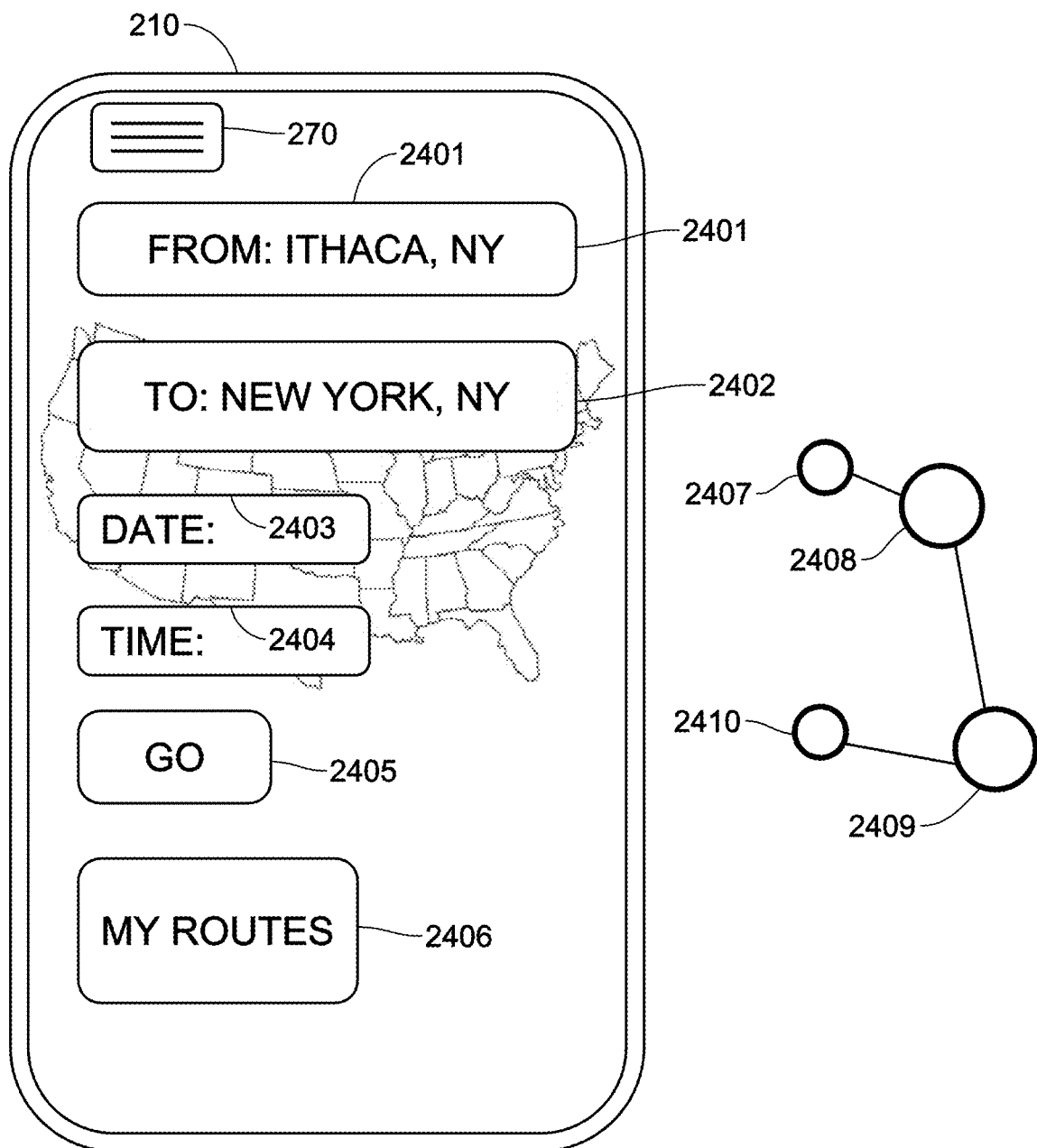

FIG. 24 illustrates the user interface 210 of a computing device in accordance with implementations of various techniques described herein. In particular, the user interface 210 may be used to display a delivery and pick up configuration 2400 for a transportation or freight unit multi-layered network node topology for use with participating, transacting and/or trading transportation or freight capacity units. In particular, the GUI 210 may be used to display implementations which utilize a multi-layered network node topology for forward market of transportation and freight units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the delivery and pick up configuration 2400 may include one or more of the following elements: hamburger menu button 270 to move between different application configurations; "From" node starting point 2401 of a multi-layered network node topology for forward market of transportation and freight units; "To" or destination node ending point 2402 of a multi-layered network node topology for forward market of transportation and freight units; Date module 2403 of an auction corresponding to a multi-layered network node topology for forward market of transformed transportation and freight units or securities; Time module 2404 for pickup and delivery of an auction corresponding to a multi-layered network node topology for forward market of transportation and freight units; Go button 2405, which may be used to form an auction corresponding to a multi-layered network node topology for forward market of transformed transportation and freight units or securities; My Routes button 2406, which may be used to obtain common "From" node 2401 or "To" node 2402 points in an auction corresponding to a multi-layered network node topology for forward market of transformed transportation and freight units for a user on the system; and/or multi-hub networks (i.e., node points) 2407, 2408, 2409, 2410, which may form a single node auction, a dual node auction, and/or any possible node combination or a multi-node auction series corresponding to a multi-layered network node topology for forward market of transportation and freight units for a user on the system.

In some implementations, the GUI 210 may transmit a From node 2401 and To node 2402 with instructions to the users 110 with a specific date 2403 and time 2404 corresponding to a multi-layered network node topology for forward market of transformed transportation and freight units. The instructions may include for a user on the system to perform an auction by pressing the Go button 2405. The system may use a plurality of constraints, such as, but not limited to, cheapest route, single mode of transportation, multi-method mode of transportation, fastest route, most scenic route, highest rated route, highest rated driver, most available route, highest volume route, most frequent route, service level route, security and safety of route, group restricted email, and/or group criteria. The system may also use any two or more of the node points 2407, 2408, 2409, 2410, including any combination of the points 2407, 2408, 2409, 2410. In some implementations, the system may use no constraints, one constraint, or a plurality of constraints to allow the user 110 to participate, transact, or trade in a multi-layered network node topology for forward market of transportation and freight units in an auction.

In some implementations, the auction for forward market transformed transportation or freight units or securities may be comprised of an auction between only two points or between a plurality of points subject to a plurality of constraints. For example, the from point, starting point, or starting virtual hub may be the node point 2407. However, the system may select an auction between node points 2408 and 2409, rather than starting at point 2407, because one or more constraints were selected to frame the auction for forward market transportation or freight units. In some implementations, an auction may be comprised of multiple modes of transportation, such as a car ride transportation or freight unit auction between points 2407 and 2408, followed by an airplane transportation or freight unit auction between points 2408 and 2409, which may be followed by a ship auction between points 2410 and 2409 for transportation or freight units. The various plurality of auctions may be displayed as one auction or a series of auctions. The auctions for a multi-layered network node topology for a forward market of transportation and freight units may consist of any subset or superset of the aforementioned possibilities, including any constraints discussed with respect to FIG. 10 or any plurality of modes discussed with respect to FIG. 8.

Figure 25:
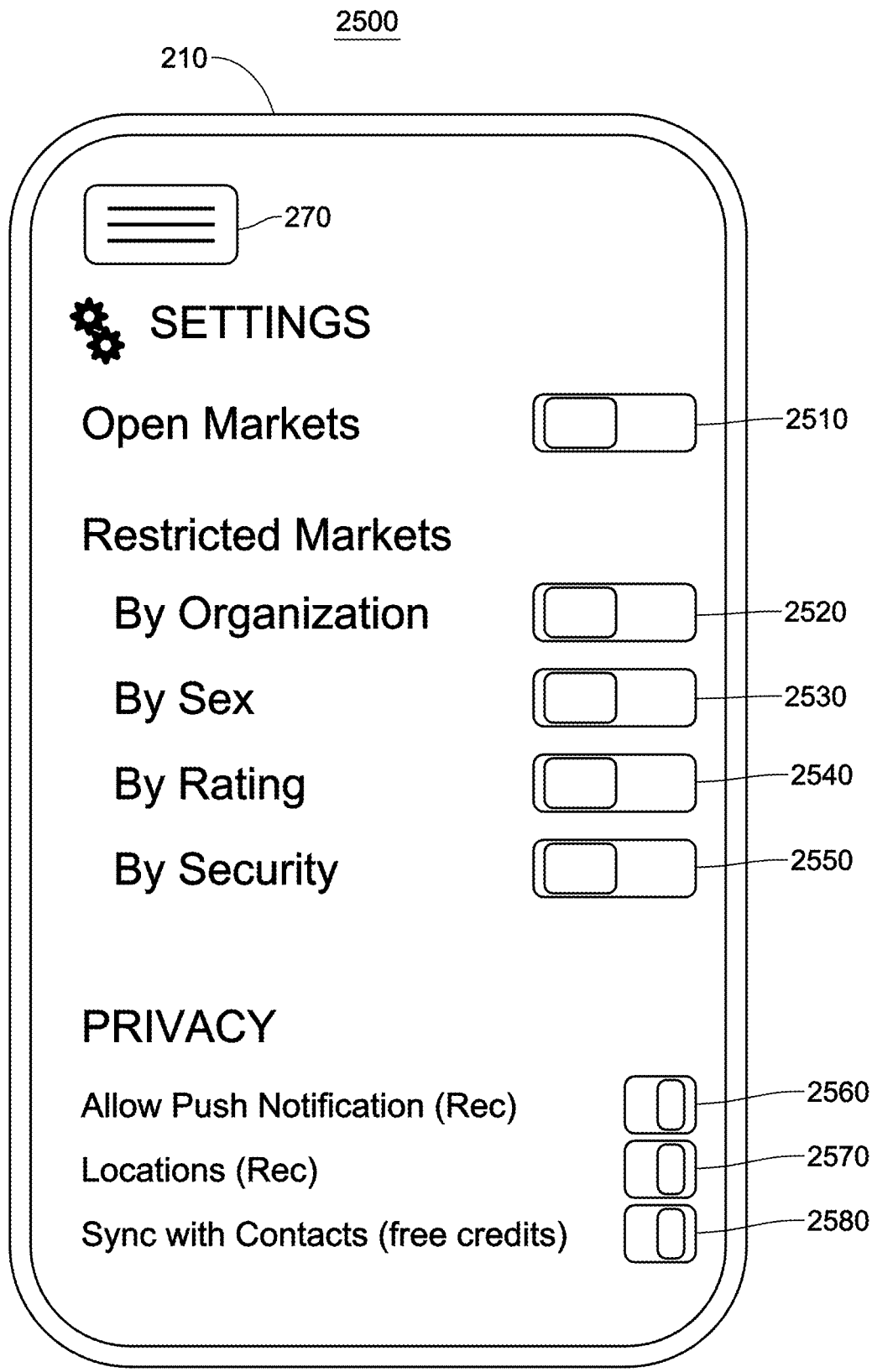

FIG. 25 illustrates the user interface 210 of a computing device in accordance with implementations of various techniques described herein. In particular, the user interface 210 may be used to display a setting configuration 2500 for a transportation or freight unit multi-layered network node topology, which may be used for participating, transacting and/or trading transportation or freight capacity units. In particular, the GUI 210 may be used to display a multi layered network node topology for forward market of transportation and freight units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the setting configuration 2500 may include one or more of the following setting elements: hamburger menu button 270 to move between different application configurations; open markets setting toggle 2510, which may allow a user to see all market participants of a given auction of transformed transportation and freight units or securities; restricted markets setting, which may be restricted by organization 2520, by sex 2530, by rating 2540, by security 2550, or by any other restriction the user 110 defines and where the restriction may limit the auction participants for the user; and/or privacy settings, which may include push notification restrictions 2560, location information restrictions 2570, sync with contacts restrictions 2580, and/or other privacy settings.

In some implementations, a user 110 may select the open markets toggle 2510, which may be used to show every participant in a given auction for a multi-layered network node topology for a forward market of transportation and freight units. The users 110 may also select to restrict the market view of the GUI 210, such as by organization 2520 (may be based on email), by sex 2530, by rating 2540 of driver or user, by security 2550, and/or by any other restriction. Users 110 may also change privacy settings, which may change push notification restrictions 2560, location settings restrictions 2570, sync with contacts settings restrictions 2580, and/or any other settings. The toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market auction for a multi-layered network node topology for a forward market of transportation and freight units. In particular, the overall input sets may be restricted by sex, organization, rating, security, privacy, location, and/or other attributes. As such, optimizations may occur over limited subsets for the transportation and freight units.

Figure 26:
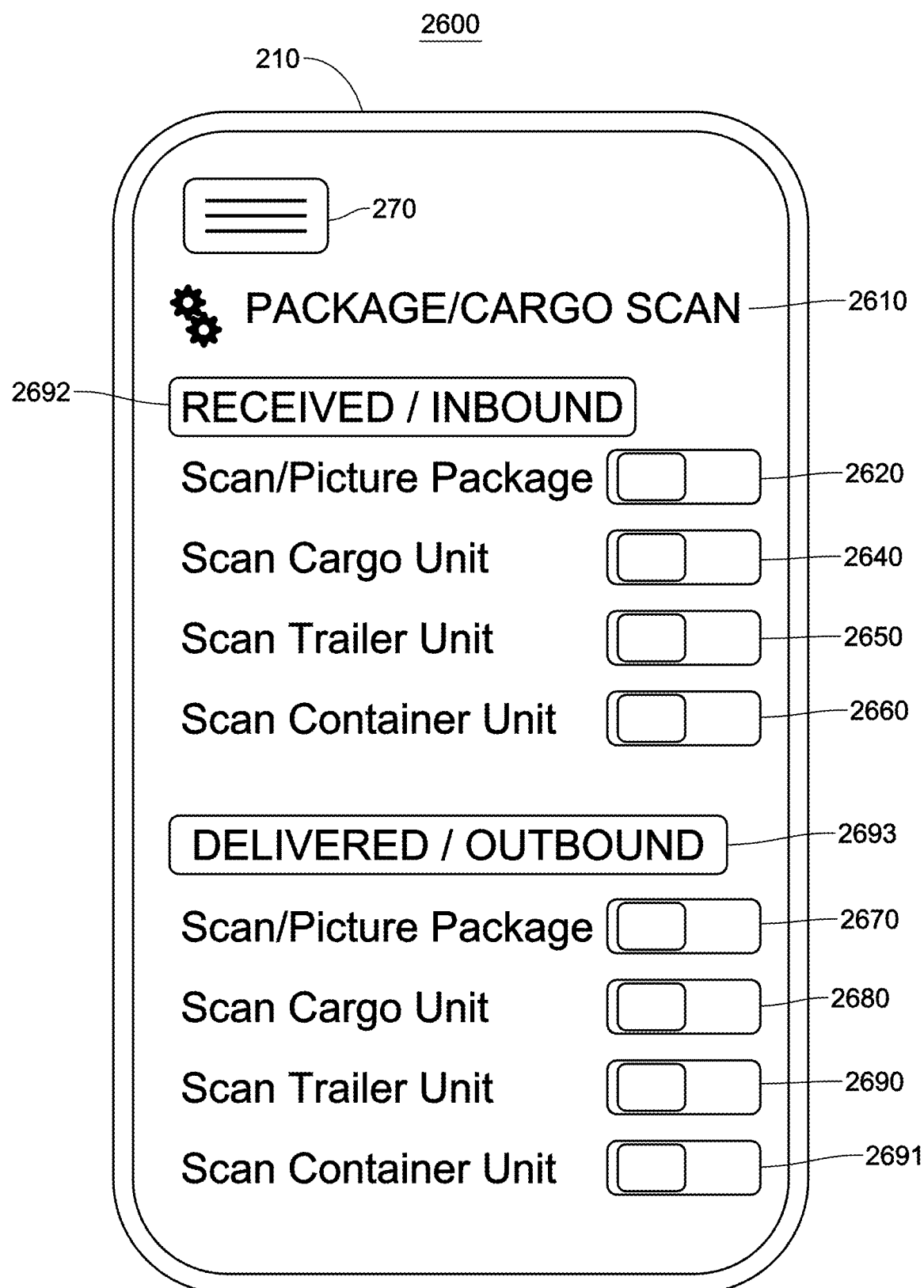

FIG. 26 illustrates the user interface 210 of a computing device in accordance with implementations of various techniques described herein. In particular, the user interface 210 may be used to display a package or cargo scan configuration 2600 for a transformed transportation or freight unit multi-layered network node topology for use with participating, transacting and/or trading transportation or freight capacity units. In particular, the GUI 210 may be used to display implementations which utilize a multi-layered network node topology for forward market of transportation and freight units. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In some implementations, the package or cargo scan configuration 2600 may include one or more of the following elements: hamburger menu button 270 to move between different application configurations; package/cargo scan module 2610, which may be used to document the status and position of transformed forward market freight or transportation units or security; package/cargo inbound or received module 2692, which may be used to scan a picture, universal product code barcode, QR code, or other transformed transportation or freight unit identifier or security; package/cargo inbound scan toggle switch 2620, which may be used to scan a picture, universal product code barcode, QR code, or other transformed transportation or freight unit identifier or security; cargo unit inbound scan toggle switch 2640, which may be used to scan a picture, universal product code barcode, QR code, or other transformed transportation or freight unit identifier or security; trailer unit inbound scan toggle switch 2650, which may be used to scan a picture, universal product code barcode, QR code, or other transformed transportation or freight unit identifier or security; and/or container unit inbound scan toggle switch 2660, which may be used to scan a picture, universal product code barcode, QR code, or other transformed transportation or freight unit identifier or security The package or cargo scan configuration 2600 may also include one or more of the following elements: package/cargo outbound or delivered module 2693, which may be used to scan a picture, universal product code barcode, QR code, or other transformed transportation or freight unit or security identifier or security; package/cargo outbound or delivered scan toggle 2670, which may be used to scan a picture, universal product code barcode, QR code, or other transformed transportation or freight unit identifier or security; cargo outbound or delivered scan toggle 2680, which may be used to scan a picture, universal product code barcode, QR code, or other transformed transportation or freight unit identifier; trailer outbound or delivered scan toggle 2690, which may be used to scan a picture, universal product code barcode, QR code, or other transformed transportation or freight unit identifier; and/or container unit outbound or delivered scan toggle 2691, which may be used to scan a picture, universal product code barcode, QR code, or other transformed transportation or freight unit identifier.

In some implementations, a user 110 may select the package/cargo scan module 2610 to scan or take a picture of a package or cargo identification code, such as a QR code, Uniform Product code, and/or other identifying package or cargo characteristic. The user 110 may select the package/cargo inbound scan toggle switch 2620, which may capture the identification characteristic, such as QR Codes, Uniform Product Codes, Serial Numbers, and/or other cargo identification characteristics of a package/cargo transportation or freight unit. Cargo may be a larger unit or structure than a package, where the cargo may be, for example, a crate or large movable unit with the identification characteristics mentioned above. For such larger units, the user 110 may use the cargo unit inbound scan toggle switch 2640 to capture the cargo identification characteristic for inbound receipt of the transportation or freight unit. The trailer unit inbound scan toggle switch 2650 option may be used by the user 110 to instruct the system configuration that a large trailer unit, such as an eighteen wheel trailer unit or smaller trailer, may be scanned to identify the transportation or freight unit in order to confirm receipt. The container unit inbound scan toggle switch 2660 may be utilized to track the receipt or location of a shipping container.

In some implementations, the user 110 may select the package/cargo outbound or delivered module 2693 to scan or take a picture of a package or cargo identification code, such as a QR code, Uniform Product code, and/or other identifying package or cargo characteristics to confirm delivery to a delivery address of the transportation or freight unit. The user 110 may select the package/cargo outbound or delivered scan toggle 2670, which may be used to capture the identification characteristic of a package or cargo transportation or freight unit once the unit is delivered to the delivery address. For such larger units, such as cargo, the user 110 may use the cargo outbound or delivered scan toggle 2680 to capture the cargo identification characteristic for outbound receipt of the transformed transportation or freight unit or security. The trailer outbound or delivered scan toggle 2690 may be used by the user 110 to instruct the system that a large trailer unit, such as an eighteen wheel trailer unit or smaller trailer, may be scanned to identify the transportation or freight unit and confirm delivery. The container unit outbound or delivered scan toggle 2691 may be utilized to track the delivery or location of a shipping container which has been delivered. Transformed transportation or freight units or securities may be a subset or superset of the aforementioned in the formation of an open forward market auction for a multi layered network node topology for a forward market of transformed transportation and freight units or securities. In particular, the overall input sets may be restricted by cargo type, package type, data type, virtual type, and/or other attributes. As such, optimizations may occur over limited subsets for the transportation and freight units.

Figure 27:
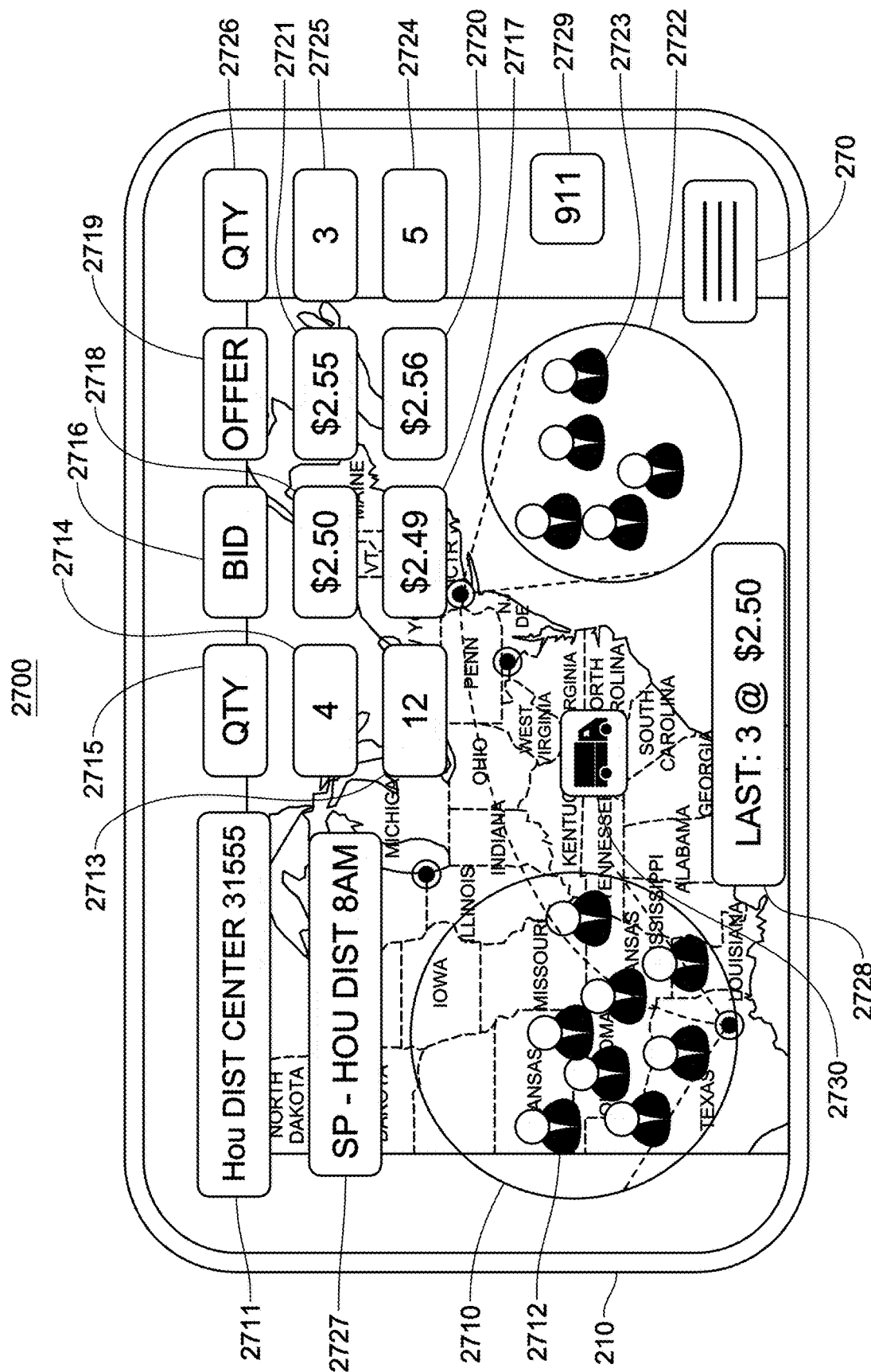

FIG. 27 illustrates the user interface 210 of a computing device in accordance with implementations of various techniques described herein. In particular, the user interface 210 may be used to display a package or cargo market configuration 2700 for a transformed transportation or freight unit or security multi layered network node topology, which may be used for participating, transacting and/or trading transformed transportation or freight capacity units or securities. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

The user interface 210 may display and/or include one or more of the following elements: a virtual hub combination 2711 from a shipping center location (a data transformation); a virtual hub origin/from location 2710 with users or freight originators 2712 within the virtual hub location 2710 (a data transformation); a specification summary 2727 of the market, level of service and time of delivery commencement (a data transformation); a mode of ground transportation or freight capacity type 2730 (a data transformation); a transaction summary 2728 of the last trades quantity and price; a virtual hub destination/to location 2722 and user who is being delivered on the transportation or freight capacity unit 2723 (a data transformation); a bid/buy quantity title header 2715 for a virtual transportation or freight unit hub market (a data transformation); a bid/buy price title header 2716 for a virtual transportation or freight hub market (a data transformation); an offer/sell price title header 2719 for a virtual transportation or freight hub market (a data transformation); and/or an offer/sell quantity title header 2726 for a virtual transportation or freight hub market (a data transformation).

The user interface 210 may also display and/or include one or more of the following elements: a bid/buy quantity 2714 for the best bid quantity from a plurality of users 110 for a transportation or freight capacity virtual hub combination 2711 (a data transformation); a bid/buy quantity 2713 for the second-best bid quantity from a plurality of users 110 for a transportation or freight capacity virtual hub combination 2711 (a data transformation); a bid/buy price 2718 for the best bid price from a plurality of users 110 for a transportation or freight capacity virtual hub combination 2711 (a data transformation); a bid/buy price 2717 for the second-best bid price from a plurality of users 110 for a transportation or freight capacity virtual hub combination 2711 (a data transformation); In addition, the user interface 210 may display and/or include one or more of the following elements: an offer/sell price 2721 for the best offer price from a plurality of users 110 for a transportation or freight capacity virtual hub combination 2711 (a data transformation); an offer/sell price 2720 for the second-best offer price from a plurality of users 110 for a transportation or freight capacity virtual hub combination 2711 (a data transformation); an offer/sell quantity 2725 for the best offer quantity from a plurality of users 110 for a transportation or freight capacity virtual hub combination 2711 (a data transformation); an offer/sell quantity 2724 for the second-best offer quantity from a plurality of users 110 for a transportation or freight capacity virtual hub combination 2711 (a data transformation); a safety dispatch "911" button 2729 to enact video and audio recording of the user's 110 environment and dispatch of that information to authorities and system servers; and/or a hamburger menu button 270 to move back to menu options and settings away from the participation, transaction, trading auction GUI 210.

In some implementations, the user 110 may enter a transaction quantity and price for a transportation or freight capacity units in order to participate, transact and/or trade via the GUI 210, where the mobile computing device (e.g., via the GUI 210) may detect the user's 110 contact or audio interface with the bid/buy price 2718 or offer/sell price 2721. The mobile computing device may detect user's 110 contact with any of the GUI 210 buttons mentioned above. Upon user contact or audio interface with buttons on the GUI 210, instructions may be instantiated in the memory of the device, which may allow the user 110 to change the specifications of the respective virtual hub combination 2711.

A plurality of prices and markets may be presented based on a plurality of transformed contract specifications. In some implementations, the best bid/buy price 2718 may be moving up in price or down in price depending on the market conditions at any given time. The last trade or last transacted price for a given specification may be listed to inform the user 110 as to how the market is moving, which may allow the user 110 to submit a competitive offer/selling price 2721 or bid/buying price 2718. In some implementations, the user 110 may adjust settings of the GUI 210 to show more bid/buying prices 2717 or more offer/selling prices 2720. The matrix of market quantities and prices 2713, 2714, 2715, 2716, 2717, 2718, 2719, 2720, 2721, 2724, 2725, 2726 displayed in the GUI 210 may be referred to as market depth.

In a further implementation, the number of users 110 may be displayed as user icons 2712 or 2723 for the people logged in who desire to transact, trade or participate in a given virtual hub 2710 to virtual hub 2722 combination for transportation or freight units. Users 110 may select the transportation mode 2730, such that the GUI 210 displays a market for one form of transformed transportation or freight capacity as a commodity. In a further implementation, the GUI 210 may show multiple forms of transportation or freight capacity between virtual transportation capacity hubs 2710, 2711, 2722.

In some implementations, a user 110 may select the 911 button 2729, which may activate voice and video recording functions on the mobile computing device and transmit the data with a confirmation from the user 110 to the authorities and system servers to provide enhanced security while participating, transacting or trading forward transformed transportation or freight as a commodity or security. The user may toggle between the GUI 210 market view screen in FIG. 27 and other menu 270 options and settings by the user 110 selecting the hamburger button 270, with the mobile computing device detecting the user 110 input/contact or audio instruction. In some implementations, the mobile computing device may instantiate instructions in its memory, and the device may then transmit transformed transportation or freight capacity data through the network 214 or wireless GPS network 215 to call upon instruction routines and instruction sub-routines on the transportation forward market database server 271, virtual hub database server 223, network member database server 222, map routing servers, no arbitrage condition database server and/or instructions in the memory of the cloud and local CPUs 290. These elements may interface together to make a system configured to deliver transportation capacity units to users 110 from and to a plurality of virtual hubs 2710, 2722 with a plurality of specifications at specific market prices.

Figure 28:
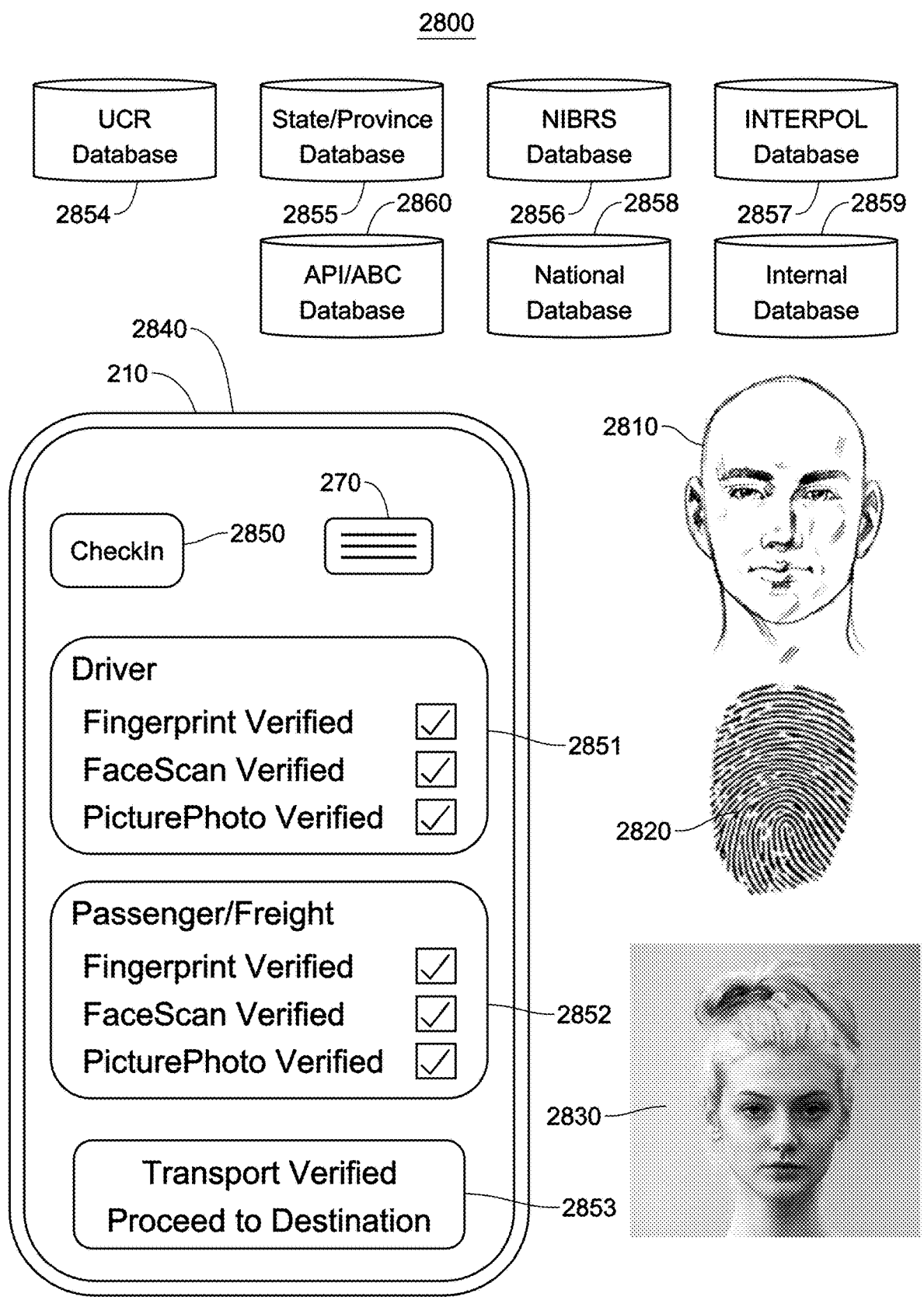
FIG. 28 illustrates a check in and security database configuration for a transportation or freight unit multi-layered network node topology for use with participating, transacting and/or trading transformed transportation or freight capacity units or securities in accordance with implementations of various techniques described herein.

FIG. 28 illustrates a check in and security database configuration 2800 for a transportation or freight unit multi-layered network node topology for use with participating, transacting and/or trading transformed transportation or freight capacity units or securities in accordance with implementations of various techniques described herein. The configuration 2800 may be implemented using the mobile computing device mentioned above, where the device may include the GUI 210. In particular, the GUI 210 may be used to display implementations which utilize a multi-layered network node topology for forward market of transportation and freight units. The transportation or freight unit security may be the same as those discussed above. While the implementations disclosed herein may be discussed using a mobile computing device, any other form of computing device known to those skilled in the art may be used, as well. Further, while the implementations disclosed herein may be discussed in terms of the user 110, the implementations may be used by other types of users, as well.

In particular, the check in and security database configuration 2800 may include one or more of the following elements: a uniform crime reporting ("UCR") database 2854 from international agencies who report crime; an international, state, and/or provincial crime reporting database 2855 from international governments who report crime; an international National Incident-Based Reporting System ("NIBRS") crime reporting database 2856 from international governments who report crime; an International Criminal Police Organisation (INTERPOL) crime reporting database 2857 from international governments who report crime which connects National Central Bureaus ("NCBs"); an international application program interface and ABC ("API/ABC") crime reporting database 2860 from international governments who report crime; a national crime reporting database 2858 from international governments who report crime; and/or an internal system crime reporting database 2859 from crimes which occurred on system.

The check in and security database configuration 2800 may also include one or more of the following elements: a facial scan to identify a user against a plurality of crime databases based on a facial image 2810; a fingerprint scan to identify a user against a plurality of crime databases based on a fingerprint image 2820; a photo scan to identify a user against a plurality of crime databases based on a photo image 2830; a voice scan to identify a user against a plurality of crime databases based on vocal data; hamburger menu button 270 to move between different application configurations displayed by the GUI 210; a driver, freight transport, or freight/transport seller interface 2851 to confirm an identity against a plurality of crime databases using one or more verification methods; a passenger or freight user interface 2852 to confirm an identity against a plurality of crime databases using one or more verification methods; and/or a handshake verification user interface 2853 to confirm both buyer and seller of transportation or freight units were correctly verified against crime databases.

In some implementations, one or more crime databases may be used to confirm whether a user 110 has a criminal history. Such crime databases may include the UCR Database 2854, the international, state, and/or provincial crime reporting database 2855, the international NIBRS database 2856, the INTERPOL database 2857, the API/ABC database 2860, the national crime reporting database 2858, the internal system crime reporting database 2859, and/or any other crime database known to those skilled in the art. Such security checks may be automated and may be utilized for various modes of transportation, such as those discussed above, which may improve the overall safety of these transportation modes.

In some implementations, a user may be rejected from using a verified transport if the user fails a safety check based on one or more of the crime databases. In contrast, a user that has been confirmed has having no crime history or users that do not have activity reported in the crime databases mentioned above may be provided a transport verified status 2853 in the system.

Figure 29:
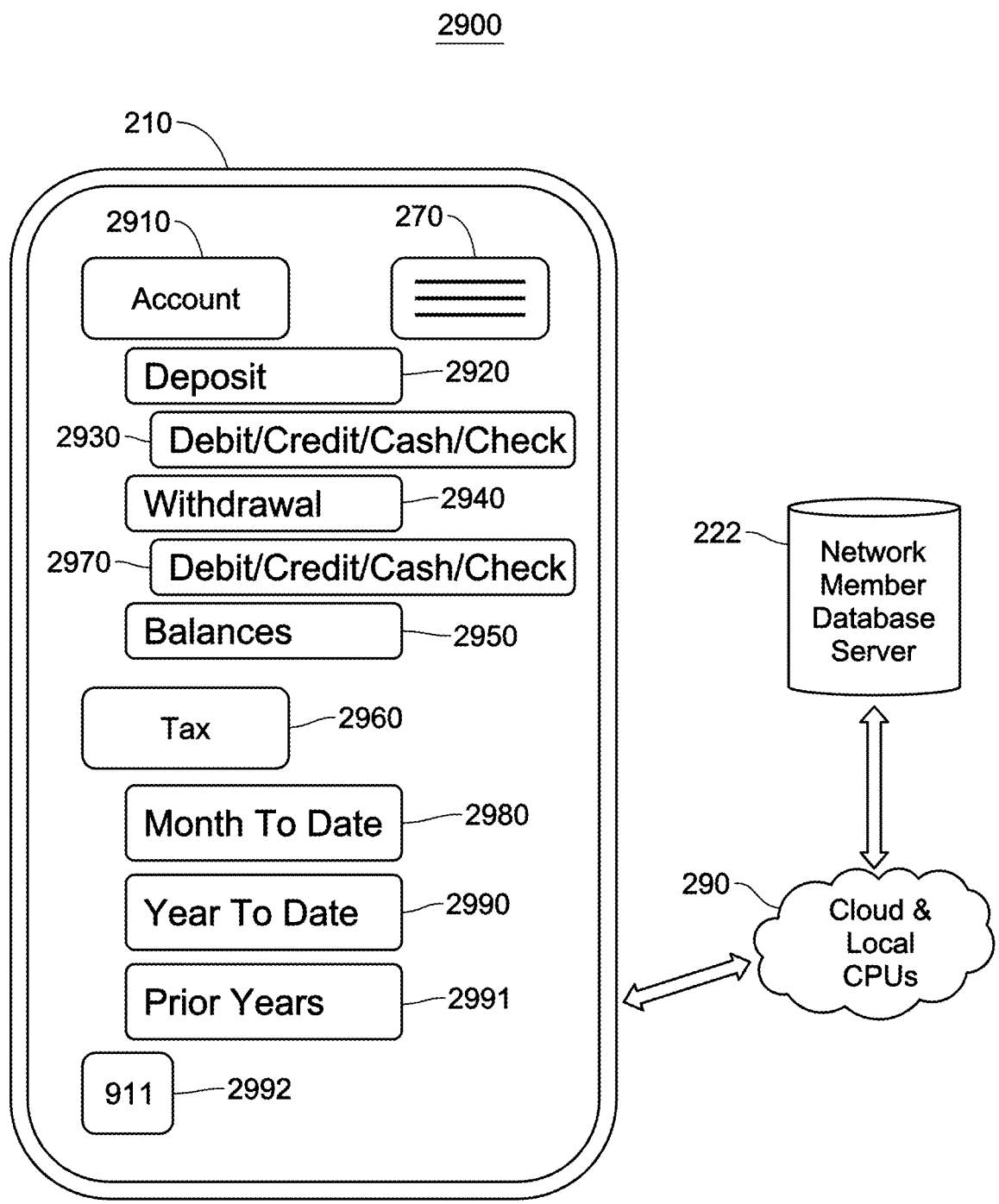
FIG. 29 illustrates a user accounting configuration for a transformed transportation or freight unit or security multi-layered network node topology for use with participating, transacting and/or trading transformed transportation or freight capacity unit auctions in accordance with implementations of various techniques described herein.

FIG. 29 illustrates a user accounting configuration 2900 for a transformed transportation or freight unit or security multi-layered network node topology for use with participating, transacting and/or trading transformed transportation or freight capacity unit auctions in accordance with implementations of various techniques described herein. The configuration 2900 may be implemented using the computing device (e.g., mobile computing device) mentioned above, where the device may include the GUI 210. In particular, the GUI 210 may be used to display implementations which utilize a multi-layered network node topology for forward market of transportation and freight units. The transportation or freight unit security may be the same as those discussed above. Further, the computing device may be voice-enabled device, a screen-enabled device, a non-screen enabled device, or any computing device known to those skilled in the art. Further, while the implementations disclosed herein may be discussed in terms of the user 110, the implementations may be used by other types of users, as well.

In particular, the user accounting configuration 2900 may include one or more of the following elements, at least some of which may be implemented using the GUI 210: a hamburger menu button 270 to move between different application configurations of the mobile computing device; an account button 2910 to edit or confirm user account data; a deposit button 2920 to add transaction funds, transaction currency, or transaction balances to the user account; a deposit method button 2930 to add transaction funds, transaction currency, or transaction balances to the user account through debit, credit, cash, check, virtual currency, digital currency, or any other payment method known to those skilled in the art; a withdrawal button 2940 to send transaction funds, transaction currency, or transaction balances to the user account in a different institution; a withdrawal method button 2970 to send transaction funds, transaction currency, or transaction balances to the user account at a different institution through debit, credit, cash, check, virtual currency, digital currency, or any other payment method known to those skilled in the art; a balances button 2950 to confirm user account balances; a tax button 2960 to track user account activity for taxation reporting; a month to date tax reporting button 2980; a year to date tax reporting button 2990; a prior year tax reporting button 2991; a 911 security button 2992; a network member database server 222; and/or a cloud and local CPU network configuration 290 to send and receive network member account data.

The account button 2910 may be used to edit or confirm the user account data, such that, in response to the user operating (e.g., contacting) the account button 2910, the mobile computing device may provide the user account data to the user via display or vocal output. As noted above, the deposit button 2920 may be used to add transaction funds, transaction currency, or transaction balances to the user account, such that, in response to the user operating (e.g., contacting) the deposit button 2920, the mobile computing device may provide user deposit data to the user via display or vocal output. Further, as noted above, the deposit method button 2930 may be used to add transaction funds, transaction currency, or transaction balances to the user account through debit, credit, cash, check, virtual currency, digital currency, or any other payment method known to those skilled in the art. In particular, the deposit method button 2930 may be used to select the method by which the user adds transaction funds, transaction currency, or transaction balances to the user account. In response to the user operating (e.g., contacting) the deposit method button 2930, the mobile computing device may provide user deposit method data to the user via display or vocal output.

As noted above, the withdrawal button 2940 may be used to send transaction funds, transaction currency, or transaction balances to the user account in a different institution, such that, in response to the user operating (e.g., contacting) the withdrawal button 2940, the mobile computing device may provide user withdrawal data to the user via display or vocal output. Further, as noted above, the withdrawal method button 2970 may be used to send transaction funds, transaction currency, or transaction balances to the user account at a different institution through debit, credit, cash, check, virtual currency, digital currency, or any other payment method known to those skilled in the art. In particular, the withdrawal method button 2970 may be used to select the method by which the user sends transaction funds, transaction currency, or transaction balances to the user account. In response to the user operating (e.g., contacting) the withdrawal method button 2970, the mobile computing device may provide user withdrawal method data to the user via display or vocal output.

As noted above, the balances button 2950 may be used to confirm user account balances, such that, in response to the user operating (e.g., contacting) the balances button 2950, the mobile computing device may provide user balances data to the user via display or vocal output. The tax button 2960 may be used to track user account activity for taxation reporting, such that, in response to the user operating (e.g., contacting) the tax button 2960, the mobile computing device may provide user tax data to the user via display or vocal output. Operating (e.g., contacting) the month to date tax reporting button 2980, the year to date tax reporting button 2990, and the prior year tax reporting button 2991 may lead to the mobile computing device providing related data to the user via display or vocal output. In some implementations, accounting and tax information may be stored in the network member database server 222 and transmitted via the cloud and local CPUs 290 to the mobile computing device.

Figure 30:
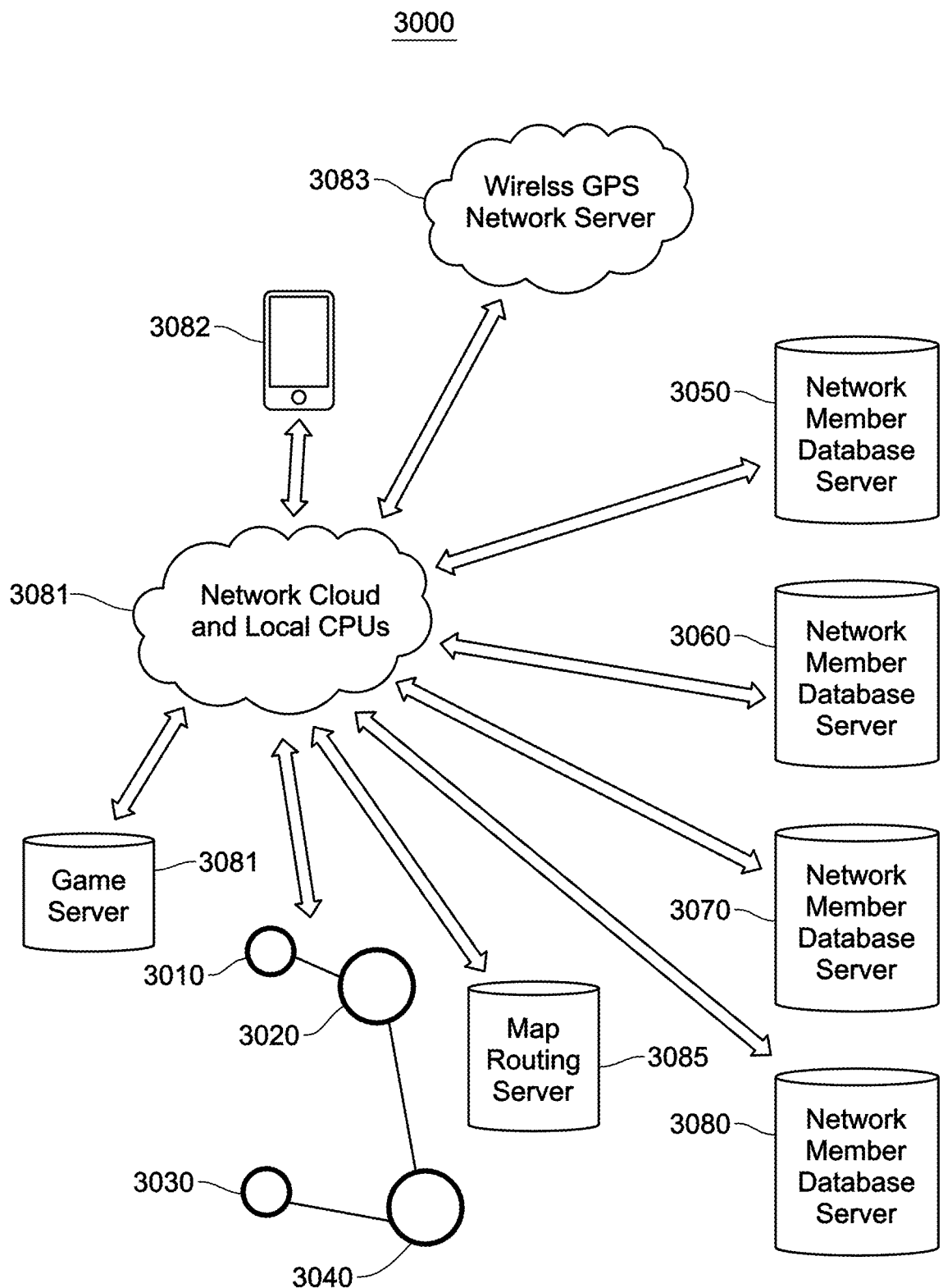
FIG. 30 illustrates a network configuration for a transportation or freight unit multi-layered network node topology.

FIG. 30 illustrates a network configuration 3000 for a transportation or freight unit multi-layered network node topology. In particular, the network configuration 3000 may be used for participating, transacting and/or trading transportation or freight capacity unit auctions.

In some implementations, the network configuration 3000 may include one or more of the following elements: a wireless GPS network and server 3083; a wireless (e.g., mobile) computing device 3082 that may provide an audio, video, screen, and/or non-screen interface; a network member database server 3050; a transportation forward market database server 3060; a no arbitrage condition database server 3070; a virtual hub database server 3080; a network, network cloud, and local CPUs 3081; and/or a network multi-layered network virtual hub node topology (e.g., virtual hub nodes) 3010, 3020, 3030, 3040 for forward market transportation of freight unit auctions.

In some implementations, the network topology 3010 may utilize the computing device 3082 to interface with system and method instructions over the network, network cloud, and local CPUs 3081. The instructions may be used on CPUs to order a constrained or unconstrained virtual hub network topology auction over two or more virtual hub nodes 3010, 3020, 3030, 3040, where the auction may apply to one or more modes of transportation or freight. Further, the instructions and data may be derived using the virtual hub database server 3080, the no arbitrage condition database server 3070, the transportation forward market database server 3060, the network member database server 3050, and/or the wireless GPS network and server 3083. Network data may be provided via the wireless computing device, where the device may be voice-enabled device, a screen-enabled device, a non-screen enabled device, or any computing device known to those skilled in the art.

Figure 31:
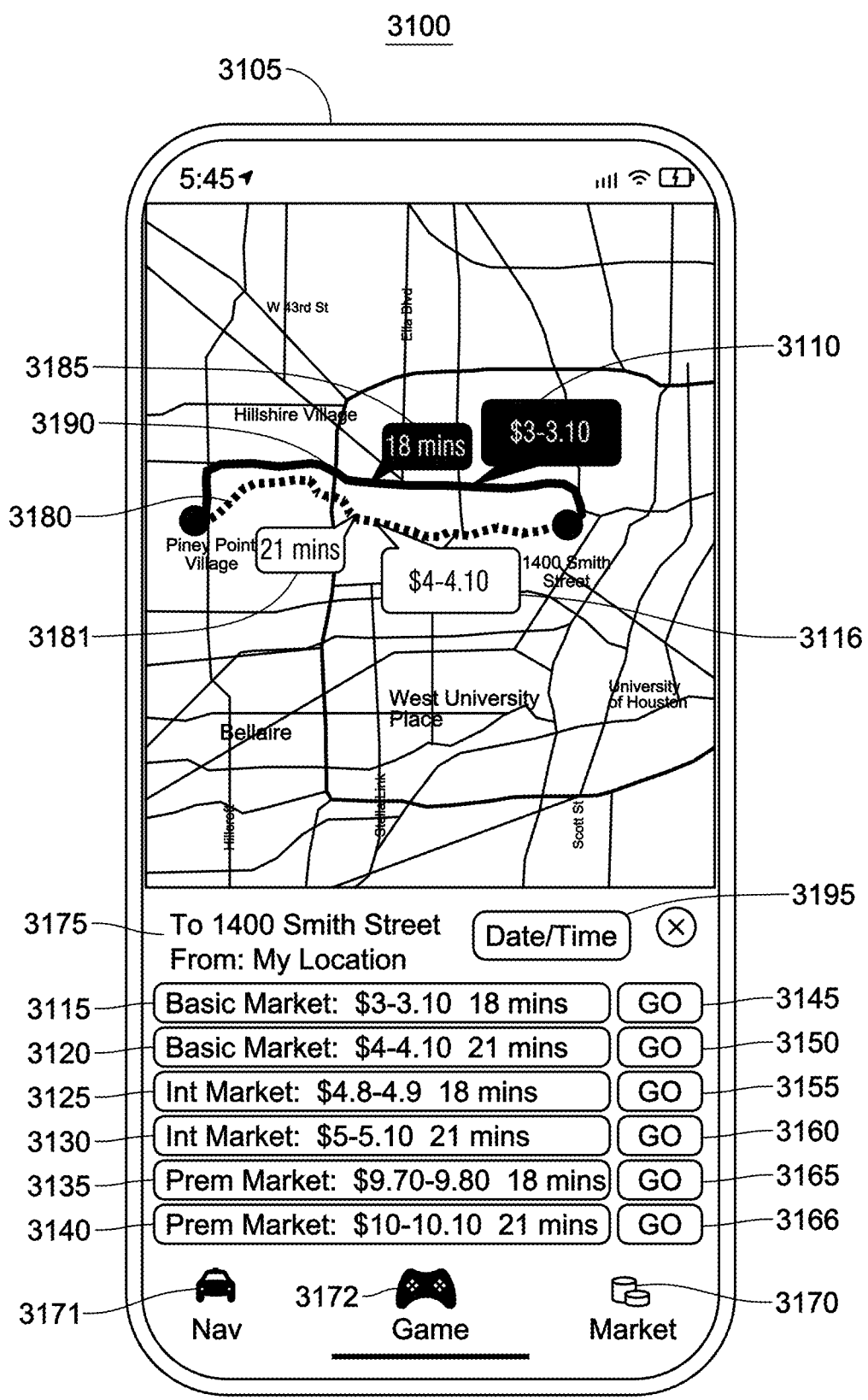
FIGS. 31-35 illustrate a market configuration in accordance with implementations of various techniques described herein.

FIG. 31 illustrates a market configuration 3100 in accordance with implementations of various techniques described herein, where the market configuration 3100 may integrate the implementations disclosed herein as a layer on a map software platform. The map software platform may include third-party map software platforms or any other map software platforms known to those skilled in the art. Further, the configuration 3100 may be used for participating, transacting, and/or trading in transformed transportation or freight capacity unit auctions. The transportation or freight unit security may be the same as those discussed above.

The configuration 3100 may be implemented using the computing device (e.g., mobile computing device) mentioned above, where the device may include a user interface 3105. The user interface 3105 may be a GUI or any other user interface known to those skilled in the art. Further, the computing device may be voice-enabled device, a screen-enabled device, a non-screen enabled device, or any computing device known to those skilled in the art. In particular, the interface 3105 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The market configuration 3100 may display and/or include one or more of the following elements, at least some of which may be implemented via the interface 3105:

a route request 3175, where the request 3175 is input by a user; a route node structure 3190 that satisfies the user route request 3175, where the route node structure may also be referred to as a route; an alternative route node structure 3180 that satisfies the user route request 3175, along with an associated time 3181, and where the route node structure may be referred to as a route; a time estimate 3185 for the route 3190; a live auction price value 3110 for the route 3190; an alternative live auction price value 3116 for the route 3180; a navigation mode button 3171; a game mode button 3172; a date and time modification button 3195 for the route request 3175; a transformed forward transportation unit auction value and modification feed 3115 and selection GO button 3145 to transact for a basic transportation unit or security feature and characteristic for the route 3190; and/or an alternative transformed forward transportation unit auction value and modification feed 3120 and selection GO button 3150 to transact for a basic transportation unit or security feature and characteristic for the alternative route 3180.

The market configuration 3100 may also display and/or include one or more of the following elements, some of which may be implemented via the interface 3105: a transformed forward transportation unit auction value and modification feed 3125 and selection GO button 3155 to transact for an intermediate transportation unit or security feature and characteristic for the route 3190; an alternative transformed forward transportation unit auction value and modification feed 3130 and selection GO button 3160 to transact for an intermediate transportation unit or security feature and characteristic for the alternative route 3180; a transformed forward transportation unit auction value and modification feed 3135 and selection GO button 3165 to transact for a premium transportation unit or security feature and characteristic for the route 3190; an alternative transformed forward transportation unit auction value and modification feed 3140 and selection GO button 3166 to transact for a premium transportation unit or security feature and characteristic for the alternative route 3180; and/or a market display button 3170, which may be configured to display the forward transformed transportation unit market auction as an overlay onto a map routing platform for the user request 3175.

In some implementations, the interface 3105 may display one or more map routing interfaces, such as those provided via third-party map software platforms. In particular, the interface 3105 may integrate the implementations disclosed herein and display the transformed forward transportation unit or security market auction. The interface 3105 may display the auction price along one or more routes based on one or more virtual hub topologies over a user-defined route request 3175. In a further implementation, the mobile computing device may present the forward transformed transportation unit auction price 3110 for the route 3190 via the interface 3105 or any visual, audio, other communication method known to those skilled in the art.

In another implementation, the mobile computing device may communicate (e.g., via the interface 3105) to a user the forward transformed transportation unit or security auction price 3116 of the alternative route 3180. The user may view the prices 3116 and 3110 and then select either route 3190 or 3180. The prices 3110 and 3116 may be generated from a plurality of users between two virtual hubs corresponding to the user-defined route request 3175. The forward market transportation unit auction may be provided (e.g., via the interface 3105) on an on-demand basis, representing the current time and day. In another implementation, the forward market transportation unit auction may be provided on a forward basis, such as by using the date and time modification button 3195 to display the market pricing for future time intervals for the routes 3190 and 3180 corresponding to the user-defined route request 3175. The user-defined route request 3175 may also be referred to as a user-requested virtual hub combination.

In one implementation, virtual hubs may represent the end points corresponding to the route request 3175. In another implementation, virtual hubs may represent points along a route corresponding to the route request 3175, but not including the endpoints. In yet another implementation, virtual hubs may represent points at locations that are not along the route corresponding to the user-defined route request 3175. Virtual hub combinations may transform transportation capacity units into a forward market, which may allow users to transact in the physical market by either: a) delivering transformed transportation units as a driver of a vehicle or capacity holder, or b) by receiving the units as a passenger or receiving a package (i.e., if the unit is a package rather than a person). In particular, a transportation unit or security may represent space which may be filled by a person or a package. Further, the market display button 3170 may overlay the forward transformed transportation unit market auction as a layer on a GPS map routing software platform/display. In one such implementation, the overlay of the market auction may be displayed as an alternative to time based routing or mileage based routing.

The forward transportation unit market may include specifications, such as basic (as shown in feeds 3115 and 3120), intermediate (as shown in feeds 3125 and 3130), and premium (as shown in feeds 3135 and 3140). These specifications may also have one or more other characteristics or levels that form the basis of a fungible transformed contract or substitutable contract between users. The contract may be exchangeable with the same terms and conditions if one user is unable to fulfill his or her contract obligations for the transformed transportation unit. The navigation mode button 3171 may be used to display turn-by-turn directions along the price-based navigation route 3190. The game mode button 3172 may be used to display a game-based overlay on the price-based navigation route 3190. The market display button 3170 may be used to display a market-based overlay on the priced-based navigation route 3190.

As noted above, the configuration 3100 may display one or more prices for routes corresponding to the route request 3175. For example, interface 3105 may display the transportation unit auction prices 3110 and 3116. As shown in FIG. 31, two route prices (e.g., $3 and $3.10) are shown for the live auction price value 3110. The live auction price value 3110 may represent one or more price queues, such as those discussed in implementations described herein. The first price of $3 may represent the price at which a user is willing to buy or pay for a transportation unit along the route 3190. The second price of $3.10 may represent the price at which a user is willing to sell a transportation unit along the route 3190. The auction may be configured to match, such as through software instructions, the highest bidding price of $3 with the lowest selling price in the price queue when the prices match. For example, if a user wanted to sell a transportation unit at the current forward market auction queue 3110 for route 3190, the user would enter a price of $3, which is the current highest bidding price in the queue 3110. In another example, another user may desire to buy a transportation unit for the forward transformed transportation unit auction route 3190. To match, the user would enter a price of $3.10, which is the lowest selling price of a seller on the forward market transportation unit auction queue 3110.

Figure 32:
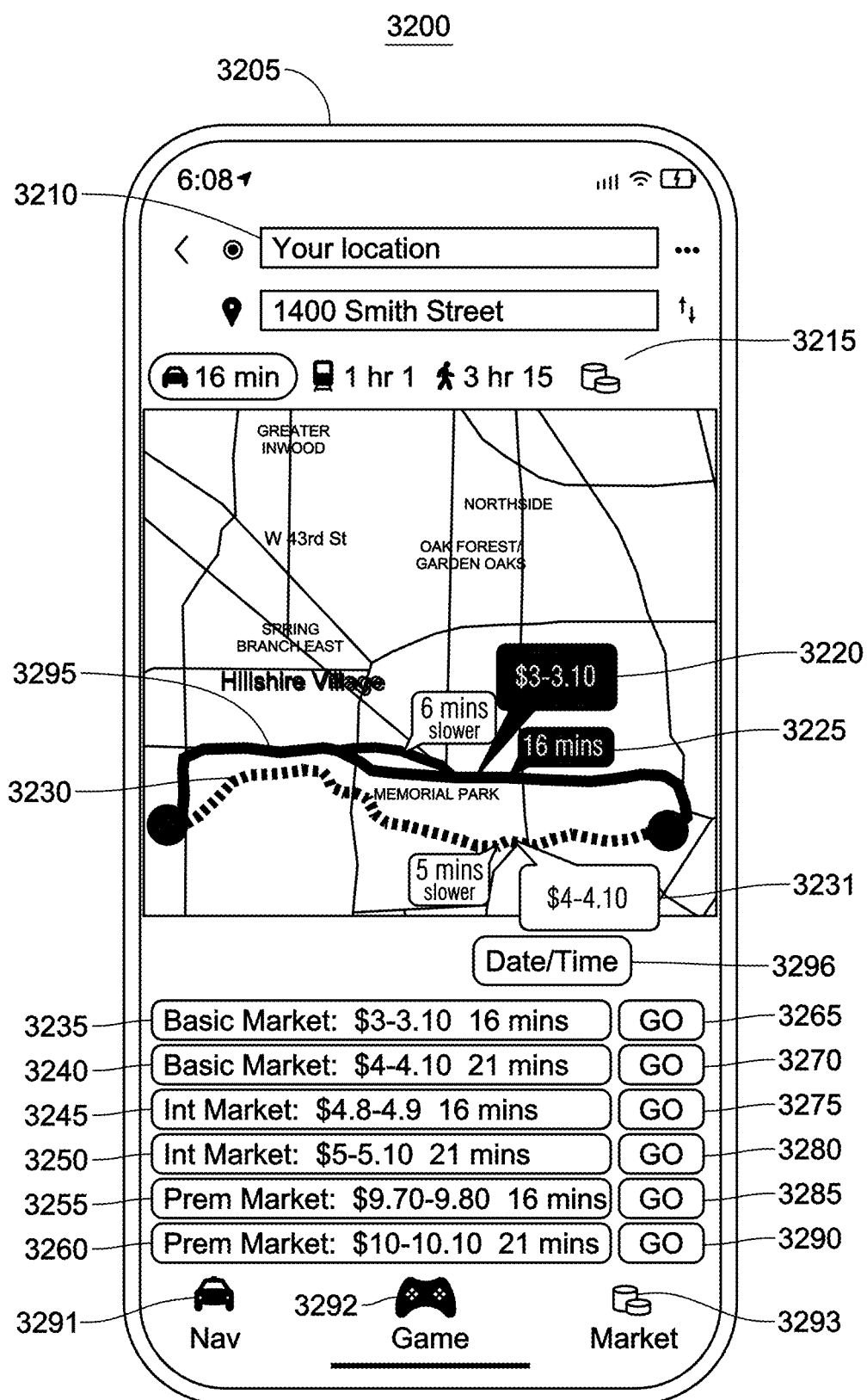

FIG. 32 illustrates a market configuration 3200 in accordance with implementations of various techniques described herein, where the market configuration 3200 may integrate the implementations herein as a layer on another map software platform. The map software platform may include third-party map software platforms or any other map software platforms known to those skilled in the art. Further, the configuration 3200 may be use for participating, transacting, and/or trading in transformed transportation or freight capacity unit auctions. The transportation or freight unit security may be the same as those discussed above.

The configuration 3200 may be implemented using the computing device (e.g., mobile computing device) mentioned above, where the device may include a user interface 3205. The user interface 3205 may be a GUI or any other user interface known to those skilled in the art. Further, the computing device may be voice-enabled device, a screen-enabled device, a non-screen enabled device, or any computing device known to those skilled in the art. In particular, the interface 3205 may be used to display implementations which utilize a multi-layered network node topology for forward market of transportation and freight units. Further, the transformed transportation capacity unit market auction, as described in implementations disclosed herein, may be fully functional as a layer in map routing software or as a standalone application.

The market configuration 3200 may display and/or include one or more of the following elements, at least some of which may be implemented via the interface 3205:

a route request 3210, where the request 3210 is input by user; a route node structure that satisfies the user route request 3210, where the route node structure may also be referred to as a route; an alternative route node structure 3230 that satisfies the user route request 3210 with an associated time, where the route node structure may be referred to as a route; a time estimate 3225 for the route 3295; a navigation mode button 3291; a game mode button 3292; a market mode button 3293; a live auction price value 3220 for the route 3295; an alternative live auction price value 3231 for the route 3230; a date and time modification button 3296 for the route request 3210; a transformed forward transportation unit or security auction value and modification feed 3235 and selection GO button 3265 to transact for a basic transportation unit feature and characteristic for the route 3295; and/or an alternative transformed forward transportation unit or security auction value and modification feed 3240 and selection GO button 3270 to transact for a basic transportation unit feature and characteristic for the alternative route 3230.

The market configuration 3200 may also display and/or include one or more of the following elements, some of which may be implemented via the interface 3105: a transformed forward transportation unit or security auction value and modification feed 3245 and selection GO button 3275 to transact for an intermediate transportation unit feature and characteristic for the route 3295; an alternative transformed forward transportation unit or security auction value and modification feed 3250 and selection GO button 3280 to transact for an intermediate transportation unit feature and characteristic for the alternative route 3230; a transformed forward transportation unit or security auction value and modification feed 3255 and selection GO button 3285 to transact for a premium transportation unit feature and characteristic for the route 3295; an alternative transformed forward transportation unit or security auction value and modification feed 3260 and selection GO button 3290 to transact for a premium transformed transportation unit feature and characteristic for the alternative route 3230; and/or a market display feature 3215, which may be configured to display the forward transformed transportation unit market auction as an overlay onto a map routing platform for the user request 3210.

In some implementations, the interface 3205 may display one or more map routing interfaces, such as those provided via third-party map software platforms. In particular, the interface 3205 may integrate the implementations disclosed herein and display the transformed forward transportation unit or security market auction price. The interface 3205 may display the auction along one or more routes based on one or more virtual hub topologies over a user-defined route request 3210. In a further implementation, the mobile computing device may present the forward transformed transportation unit or security auction price 3220 for the route 3295 via the interface 3205 or any visual, audio, other communication method known to those skilled in the art.

In another implementation, the mobile computing device may communicate (e.g., via the interface 3205) to a user the forward transformed transportation unit auction price 3231 of the alternative route 3230. The user may view the prices 3231 and 3220 and then select either route 3295 or 3230. The prices 3231 and 3220 may be generated from a plurality of users between two virtual hubs corresponding to the user-defined route request 3210 and instructions to generate a price queue for buyers and sellers of transportation units long given routes. In some implementations, the user may alter the date using the date and time modification button 3296, such that the transformed transportation unit or security may be updated with user-submitted prices for forward looking time periods. The forward market transformed transportation unit or security auction may be provided (e.g., via the interface 3205) on an on-demand basis, representing the current time and day. In another implementation, the forward market transportation unit auction may be provided on a forward basis, such as by using the date and time modification button 3296 to display the market pricing for future time intervals for the routes 3295 and 3230 corresponding to the user-defined route request 3210. The user-defined route request 3210 may also be referred to as a user-requested virtual hub combination In one implementation, virtual hubs may represent the end points corresponding to the route request 3210. In another implementation, virtual hubs may represent points along a route corresponding to the route request 3210, but not including the endpoints. In yet another implementation, virtual hubs may represent points at locations that are not along the route corresponding to the user-defined route request 3210. Virtual hub combinations may transform transportation capacity units or securities into a forward market, which may allow users to transact in the physical market by either: a) delivering transformed transportation units as a driver of a vehicle or capacity holder, or b) by receiving the units as a passenger or receiving a package (i.e., if the unit is a package rather than a person). In particular, a transformed transportation unit may represent space which may be filled by a person or a package. Further, the market display feature 3215 may overlay the forward transformed transportation unit market auction as a layer on a GPS map routing software platform/display. In one such implementation, the overlay of the market auction may be displayed as an alternative to time based routing.

The forward transportation unit market may include specifications, such as basic (as shown in feeds 3235 and 3240), intermediate (as shown in feeds 3245 and 3250), and premium (as shown in feeds 3255 and 3260). These specifications may also have one or more other characteristics or levels that form the basis of a fungible contract or substitutable contract between users. The contract may be exchangeable with the same terms and conditions if one user is unable to fulfill his or her contract obligations for the transformed transportation unit. The navigation mode button 3291 may be used to display turn-by-turn directions along the price-based navigation route 3295. The game mode button 3292 may be used to display a game-based overlay on the price-based navigation route 3295. The market mode button 3293 may be used to display a market-based overlay on the priced-based navigation route 3295.

As noted above, the configuration 3200 may display one or more prices for routes corresponding to the route request 3210. For example, interface 3205 may display the transformed transportation unit or security auction prices 3220 and 3231. As shown in FIG. 32, two route prices (e.g., $3 and $3.10) are shown for the live auction price value 3110. The live auction price value 3110 may represent one or more price queues, such as those discussed in implementations described herein. The first price of $3 may represent the price at which a user is willing to buy or pay for a transportation unit along the route 3295. The second price of $3.10 may represent the price at which a user is willing to sell a transportation unit along the route 3295. The auction may be configured to match, such as through software instructions, the highest bidding price of $3 with the lowest selling price in the price queue when the prices match. For example, if a user wanted to sell a transportation unit at the current forward market auction queue 3220 for route 3295, the user would enter a price of $3, which is the current highest bidding price in the queue 3220. In another example, another user may desire to buy a transformed transportation unit for the forward transformed transportation unit or security auction route 3295. To match, the user would enter a price of $3.10, which is the lowest selling price of a seller on the forward market transformed transportation unit auction queue 3220.

Figure 33:
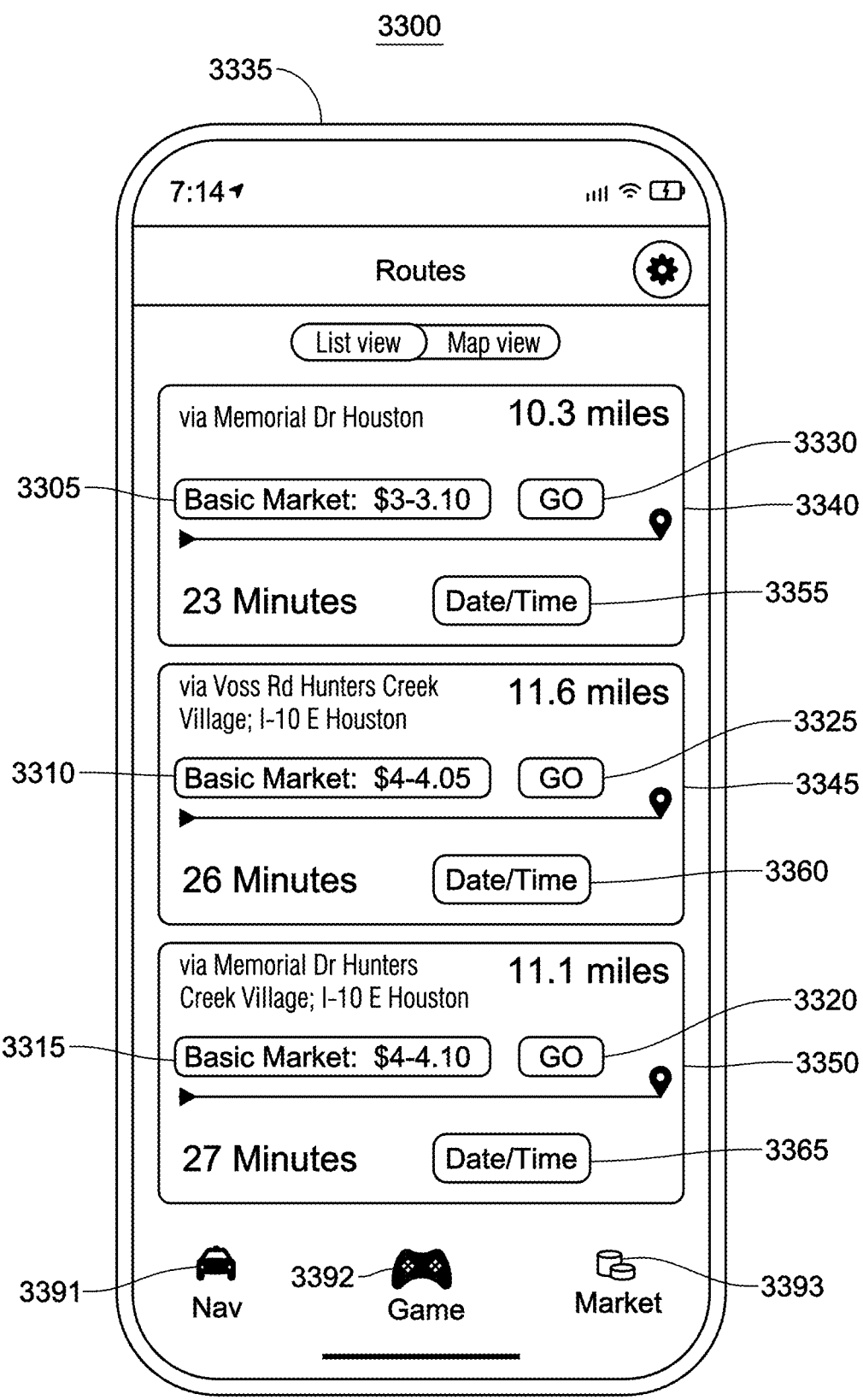

FIG. 33 illustrates a market configuration 3300 in accordance with implementations of various techniques described herein, where the market configuration 3300 may integrate the implementations disclosed herein as a layer on a map software platform. The map software platform may include third-party map software platforms or any other map software platforms known to those skilled in the art. Further, the configuration 3300 may be used for participating, transacting, and/or trading in transformed transportation or freight capacity unit auctions. The transportation or freight unit security may be the same as those discussed above.

The configuration 3300 may be implemented using the computing device (e.g., mobile computing device) mentioned above, where the device may include a user interface 3335. The user interface 3335 may be a GUI or any other user interface known to those skilled in the art. Further, the computing device may be voice-enabled device, a screen-enabled device, a non-screen enabled device, or any computing device known to those skilled in the art. In particular, the interface 3335 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The market configuration 3300 may display and/or include one or more of the following elements, at least some of which may be implemented via the interface 3335: a route node structure 3340 that satisfies user route request with an associated time and price, where the route node structure may also be referred to as a route; an alternative route node structure 3345 that satisfies the user route request with an associated time and price, where the route node structure may also be referred to as a route; another alternative route node structure 3350 that satisfies the user route request with an associated time and price, where the route node structure may also be referred to as a route; a live auction price value 3305 for the price-based route 3340; a navigation mode button 3391; a game mode button 3392; a market mode button 3393; a go 3330 button to transact or modify the price based routing; a go 3325 button to transact or modify the price based routing; a go 3320 button to transact or modify the price based routing; an alternative live auction price value 3310 for the route 3345; an alternative live auction price value 3315 for the route 3350; a date and time modification button 3355 for the route 3340; a date and time modification button 3360 for the route 3345; and/or a date and time modification button 3365 for the route 3350.

In some implementations, the interface 3335 may display one or more map routing interfaces, such as those provided via third-party map software platforms. In particular, the interface 3335 may integrate the implementations disclosed herein and display the transformed forward transportation unit market auction. The interface 3335 may display the auction price along one or more routes based on one or more virtual hub topologies over a user-defined route request. In a further implementation, the mobile computing device may present the forward transformed transportation unit or security auction price 3305 on for the route 3340 via the interface 3335 or any visual, audio, other communication method known to those skilled in the art.

In another implementation, the mobile computing device may communicate (e.g., via the interface 3335) to a user the forward transformed transportation unit auction price 3310 of the alternative route 3345. The user may view the prices 3305, 3310, and 3315 and then select one of route 3340, 3345, or 3350 The prices 3305, 3310, and 3315 may be generated from a plurality of users between two virtual hubs corresponding to the user-defined route request and generated using a price queue for buyers and sellers of transportation units along the routes 3340, 3345, or 3350. The forward market transformed transportation unit or security auction may be provided (e.g., via the interface 3335) on an on-demand basis, representing the current time and day. provided (e.g., via the interface 3335) on an on-demand basis, representing the current time and day. In another implementation, the forward market transportation unit auction may be provided on a forward basis, such as by using the date and time modification buttons 3355, 3360, 3365 to display the market pricing for future time intervals for the routes 3340, 3345, and 3350 corresponding to the user-defined route request. The user-defined route request may also be referred to as a user-requested virtual hub combination. In a further implementation, the user may using the date and time modification buttons 3355 to alter the date, such that the transformed transportation unit or security may be updated with user-submitted prices 3305 for forward looking time periods.

In one implementation, virtual hubs may represent the end points corresponding to the route defined by the user. In another implementation, virtual hubs may represent points along a route corresponding to the user-defined route request, but not including the endpoints. In yet another implementation, virtual hubs may represent points at locations that are not along the route corresponding to the user-defined route request. Virtual hub combinations may transform transportation capacity units into a forward market, which may allow users to transact in the physical market by either: a) delivering transportation units as a driver of a vehicle or capacity holder, or b) by receiving the units as a passenger or receiving a package (i.e., if the unit is a package rather than a person). In particular, a transportation unit may represent space which may be filled by a person or a package. Further, the forward transportation unit market auction overlay may be a layer on a GPS map routing software platform/display. In one such implementation, the overlay of the market auction may be displayed \ as an alternative to time based routing.

The forward transportation unit market may include specifications, such as basic (as shown with respect to values 3305, 3310, and 3315). These specifications may also have one or more other transformed characteristics or levels that form the basis of a fungible contract or substitutable contract specifications between users. The contract may be exchangeable with the same terms and conditions if one user is unable to fulfill his or her contract obligations for the transformed transportation unit or security. The navigation mode button 3391 may be used to display turn-by-turn directions along a price-based navigation route. The game mode button 3392 may be used to display a game-based overlay on a price-based navigation route. The market mode button 3393 may be used to display a market-based overlay on a priced based navigation route.

As noted above, the configuration 3300 may display one or more prices for routes corresponding to the route request. For example, interface 3335 may display the transportation unit auction prices 3305, 3310, and 3315. As shown in FIG. 33, two or more prices may correspond to each route. For example, two route prices (e.g., $3 and $3.10) are shown for the live auction price value 3305. The live auction price value 3305 may represent one or more price queues, such as those discussed in implementations described herein. The first price of $3 may represent the price at which a user is willing to buy or pay for a transportation unit along the route 3340. The second price of $3.10 may represent the price at which a user is willing to sell a transportation unit along the route 3340. The auction may be configured to match, such as through software instructions, the highest bidding price of $3 with the lowest selling price in the price queue when the prices match. For example, if a user wanted to sell a transportation unit at the current forward market auction queue 3305 for the route 3340, then the user would enter a price of $3, which is the current highest bidding price in the queue 3305. In another example, another user may desire to buy a transportation unit for the forward transportation unit auction for the route 3340. To match, the user would enter a price of $3.10, which is the lowest selling price of a seller on the forward market transportation unit auction queue 3305.

Figure 34:
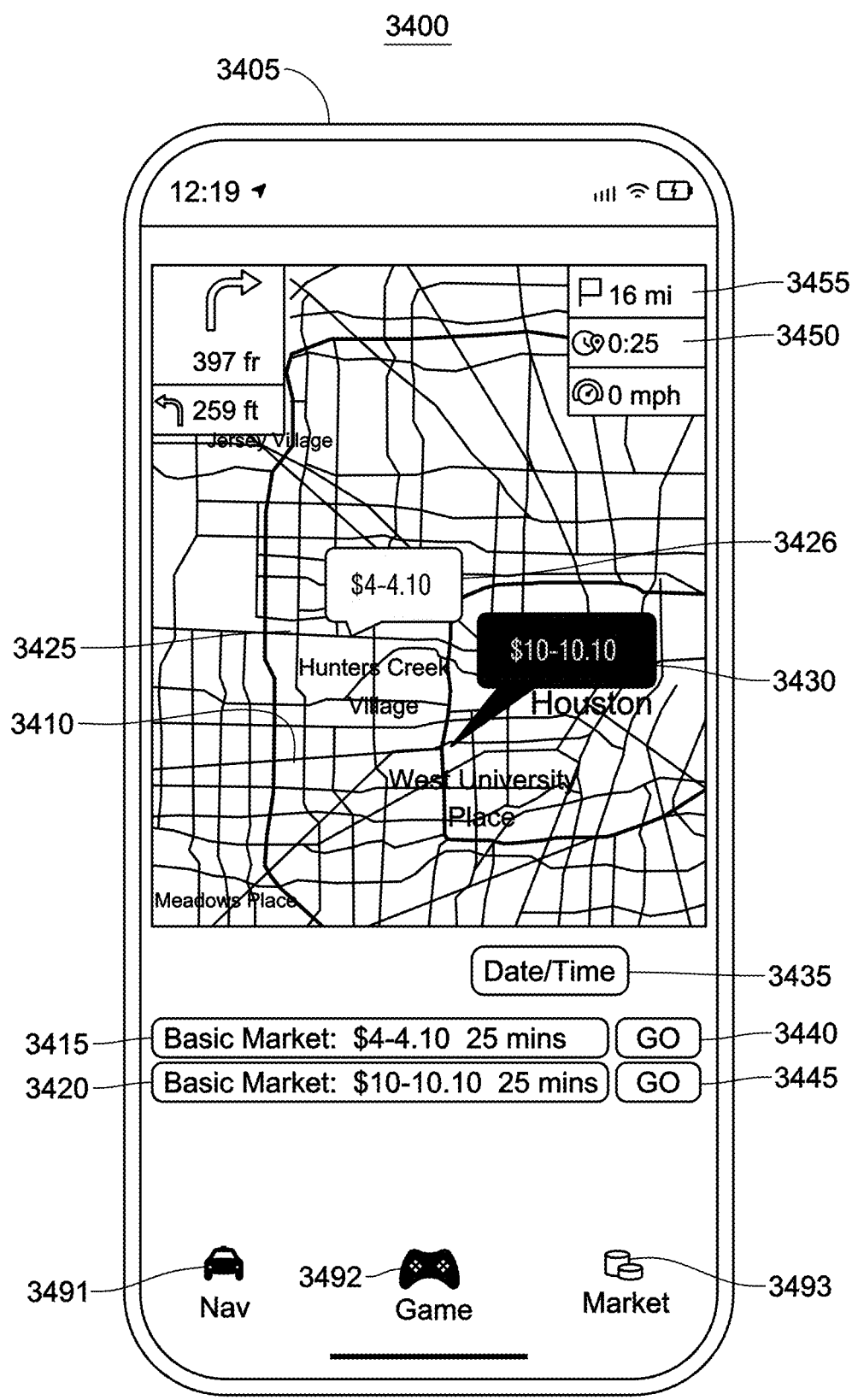

FIG. 34 illustrates a market configuration 3400 in accordance with implementations of various techniques described herein, where the market configuration 3400 may integrate the implementations disclosed herein as a layer on a map software platform. The map software platform may include third-party map software platforms or any other map software platforms known to those skilled in the art. Further, the configuration 3400 may be used for participating, transacting, and/or trading in transformed transportation or freight capacity unit auctions. The transportation or freight unit security may be the same as those discussed above.

The configuration 3400 may be implemented using the computing device (e.g., mobile computing device) mentioned above, where the device may include a user interface 3405. The user interface 3405 may be a GUI or any other user interface known to those skilled in the art. Further, the computing device may be voice-enabled device, a screen-enabled device, a non-screen enabled device, or any computing device known to those skilled in the art. In particular, the interface 3405 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The market configuration 3400 may display and/or include one or more of the following elements, at least some of which may be implemented via the interface 3405: a route 3410; a live auction price value 3430 for the route 3410; an alternative live auction price value 3426 for a route 3425; a navigation mode button 3491; a game mode button 3492; a market mode button 3493; a date and time modification button 3435 for the route 3410; a mileage estimate 3455 for the route 3410; a route estimate 3450 for the route 3410; a transformed forward transportation unit auction value and modification feed 3415 and selection GO button 3440 to transact for a basic transportation unit or security feature and characteristic for the route 3425; and/or a transformed forward transportation unit or security auction value and modification feed 3420 and selection GO button 3445 to transact for a premium transportation unit feature and characteristic for the route 3410.

In some implementations, the navigation mode button 3491 may be used to display turn-by-turn directions along the price-based navigation route 3410. The game mode button 3492 may be used to display a game-based overlay on the price-based navigation route 3410. The market mode button 3493 may be used to display a market-based overlay on the priced-based navigation route 3410.

Figure 35:
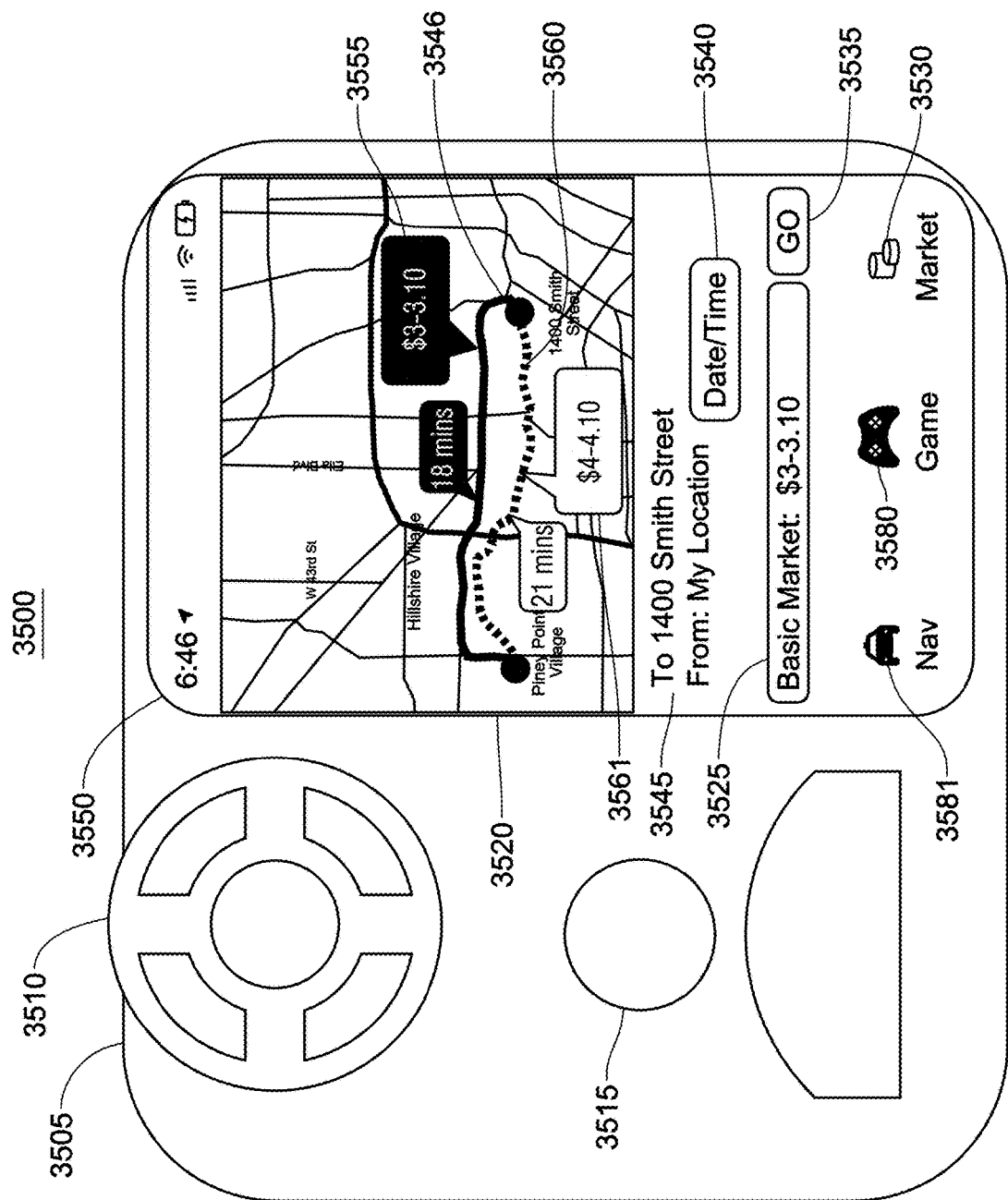

FIG. 35 illustrates a market configuration 3500 in accordance with implementations of various techniques described herein, where the market configuration 3500 may integrate the implementations disclosed herein as a layer on a map software platform in the setting of a vehicle GPS navigation system. The map software platform may include third-party map software platforms or any other map software platforms known to those skilled in the art. Further, the configuration 3500 may be used for participating, transacting, and/or trading in transformed transportation or freight capacity unit auctions. The transportation or freight unit security may be the same as those discussed above.

The configuration 3500 may be implemented using a computing device (e.g., mobile computing device) mentioned above, where the device may include a user interface 3550. The user interface 3550 may be a GUI or any other user interface known to those skilled in the art. Further, the computing device may be voice-enabled device, a screen-enabled device, a non-screen enabled device, or any computing device known to those skilled in the art. In particular, the interface 3550 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The market configuration 3500 may display and/or include one or more of the following elements, at least some of which may be implemented via the interface 3550: a vehicle transportation unit carrier unit 3505; a vehicle transportation unit steering wheel 3510; a navigation mode button 3581; a game mode button 3580; a market mode button 3530; a user 3515 of transportation unit, such as a seller or a driver; address information 3545 for a route 3546, where the route 3546 satisfies a user request; a date and time modification button 3540 for the route 3546; a transformed forward transportation unit auction value and modification feed 3525 and selection GO button 3535 to transact for a basic transportation unit feature and characteristic for the route 3546 that satisfies the user route request; a live auction price value 3555 for the route 3546; a live auction price value 3561 for an alternative route 3560 satisfying the user request; and/or a market layer routing overlay 3530.

In some implementations, the configuration 3500 may be implemented using a vehicle unit GPS navigation system. In particular, the interface 3550 may be used to display and/or may be integrated with the vehicle unit GPS navigation system. The user 3515 may input driving address information 3545 having an origin location and a destination location. In some implementations, the user 3515 may communicate with the interface 3550 through a touchscreen 3520, an audio interface, or another interface. The user 3515 may use the date and time modification button 3540 to change the displayed pricing for the route 3546 from an on-demand (i.e., current time) to a forward time or date (i.e., future time). The market auction based pricing for the route 3546 may vary by date and time due to a plurality of market factors. The user 3515 may edit the displayed market-based auction price for the transportation units by modifying the transformed forward transportation unit auction value and modification feed 3525. Further, the user 3515 may transact for the transportation unit at a particular auction price by selecting the GO button 3535. The navigation mode button 3581 may be used to display turn-by-turn directions along the price-based navigation route 3546. The game mode button 3580 may be used to display a game-based overlay on the price based navigation route 3546. The market mode button 3530 may be used to display a market-based overlay on the priced-based navigation route 3546.

The configuration 3500 may display one or more prices for routes corresponding to a user route request. For example, interface 3550 may display the transportation unit auction prices 3555 and 3561. As shown in FIG. 35, two route prices (e.g., $3 and $3.10) are shown for the live auction price value 3555. The live auction price value 3555 may represent one or more price queues, such as those discussed in implementations described herein. The first price of $3 may represent the price at which a user is willing to buy or pay for a transportation unit along the route 3546. The second price of $3.10 may represent the price at which a user is willing to sell a transportation unit along the route 3546. The auction may be configured to match, such as through software instructions, the highest bidding price of $3 with the lowest selling price in the price queue when the prices match. For example, if a user 3515 wanted to sell a transportation unit at the current forward market auction queue 3555 for route 3546, then the user 3515 would enter a price of $3, which is the current highest bidding price in the queue 3555. In another example, another user may desire to buy a transportation unit for the forward transformed transportation unit or security auction route 3546. To match, the user would enter a price of $3.10, which is the lowest selling price of a seller on the forward market transformed transportation unit or security auction queue 3555.

In some implementations, alternative routes, such as route 3560, having prices in alternative transportation unit auctions may have different prices based on supply and demand conditions. In some embodiments the market layer routing overlay button 3530 may be used to provide an alternative to time-based routing or mileage-based routing which are fundamentally different premises. In a further implementation, the overall software system and associated instructions may ask the user 3515, such as through the interface 3550 or any other interface (e.g., audio), if he or she would like to monetize their routes upon starting any navigation sequence for transformed transportation units or securities.

Figure 36:
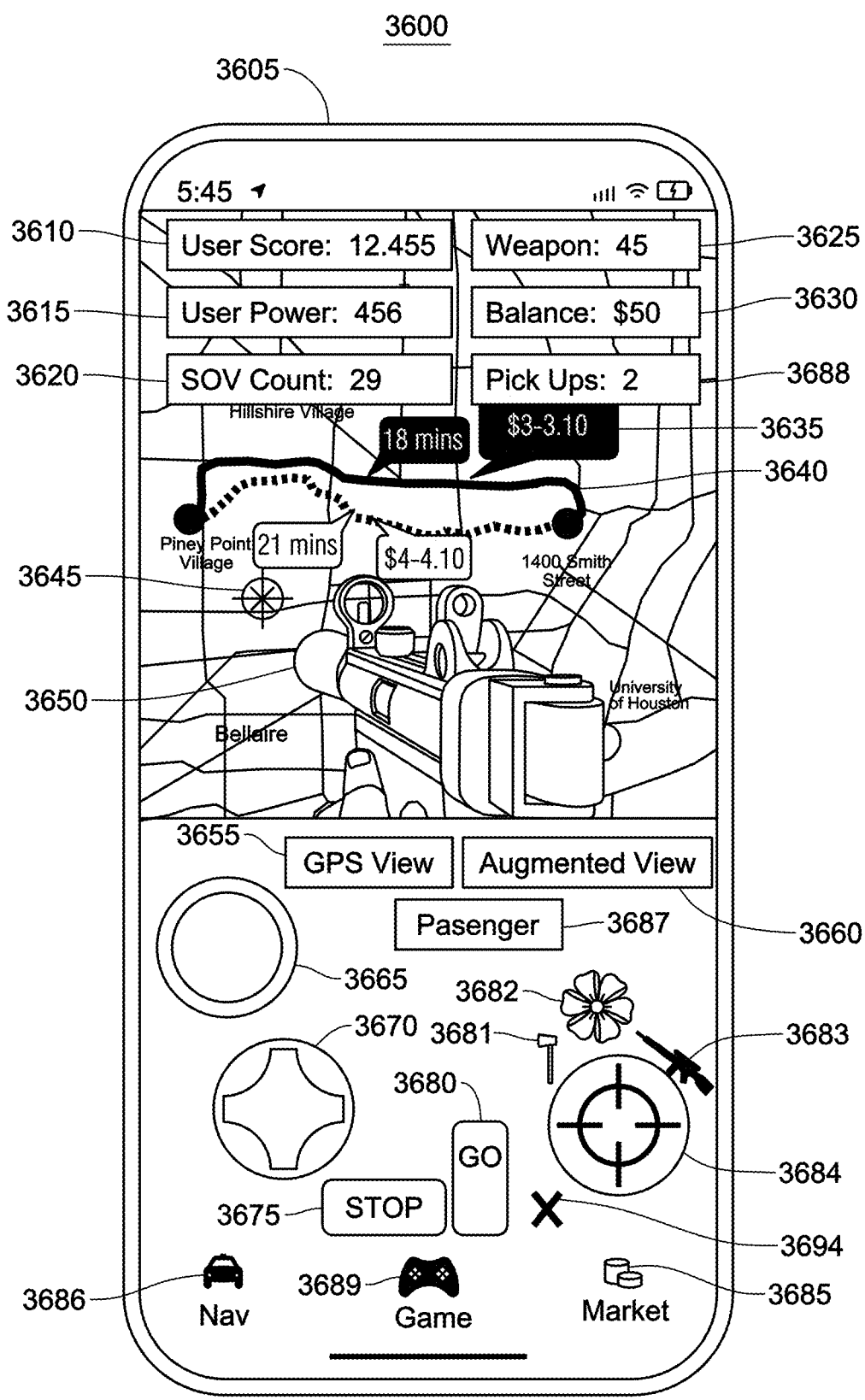
FIGS. 36-39 illustrate a gaming configuration in accordance with implementations of various techniques described herein.

FIG. 36 illustrates a gaming configuration 3600 in accordance with implementations of various techniques described herein, where the gaming configuration 3600 may integrate the implementations disclosed herein as a game layer on a map software platform. The map software platform may include an internal map software platform, a third-party map software platform, or any other map software platforms known to those skilled in the art. Further, the configuration 3600 may be used for participating, transacting, and/or trading in transformed transportation or freight capacity unit auctions. The transportation or freight unit security may be the same as those discussed above.

The configuration 3600 may be implemented using the computing device (e.g., mobile computing device) mentioned above, where the device may include a user interface 3605. The user interface 3605 may be a GUI or any other user interface known to those skilled in the art. Further, the computing device may be voice-enabled device, a screen-enabled device, a non-screen enabled device, or any computing device known to those skilled in the art. In particular, the interface 3605 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The gaming configuration 3600 may display and/or include one or more of the following elements, at least some of which may be implemented via the interface 3605:

a game overlay user score indicator 3610; a game overlay user power indicator 3615; a game overlay single occupancy vehicle (SOV) count indicator 3620; a game overlay weapon strength indicator 3625; a game overlay account balance indicator 3630; a game overlay passenger pick ups indicator 3688; a game overlay SOV target 3645; a game overlay SOV weapon 3650; a game overlay GPS standard map view button 3655; a game overlay augmented or mixed reality view button 3660; a game overlay passenger mode button 3687; a game overlay fire button 3665; a game overlay multi-purpose direction button 3670; a game overlay go button 3680; a game overlay stop button 3675; a navigation overlay button 3686; a game overlay button 3689; a market overlay button 3685; market overlay weapon selection buttons 3683, 3682, 3681, 3694; and/or a market overlay aim finder toggle 3684.

In some implementations, a user may use the game overlay button 3689 to generate a game layer over the displayed mapping, where the game layer may also be displayed using the interface 3605. The game layer may be used by the user to engage with a gaming environment that interacts with the transformed transportation or freight capacity unit auction described above. The gaming environment and game layer be implemented using instructions and a computing system, as known to those skilled in the art. In one implementation, the gaming environment may be used to award scores and/or points for destroying a single occupancy vehicle targeted using the SOV count indicator 3620, to compute and distribute positive or negative transportation unit game auction strategy points (e.g., the points displayed using the score indicator 3610, the power indicator 3615, and/or the account balance indicator 3630) based on one or more of the following: price 3635, route mileage, number of single occupancy vehicles destroyed or passed, number of passengers (as shown in passenger pick ups indicator 3688), route time estimates, transportation unit route 3640, transportation unit specifications, transportation unit model type, transportation unit make type, transportation unit age, matched transportation unit specification, matched transportation unit fuel type, matched transportation unit emission specification, cumulative user transportation unit specifications, transportation unit rating, transportation unit safety, transportation unit time, transportation unit delay, transportation unit driver rating, transportation unit rider rating, transportation unit timeliness relative to contract specification, and/or other specifications.

In some implementations, the game overlay button 3689 may be used to generate the game layer via the interface 3605. The game layer may display a plurality of weapon or scoring configurations, such as a rifle 3683, an axe 3681, a flower gift 3682, and a X logo 3694. The weapon or scoring configurations may be used to take away points or gain points from other users on the system. In a further implementation, the scoring may be independent of other players on the system but dependent on the user's actions in the game overlay. In particular, a selected weapon (e.g., the SOV weapon 3650) may be used to destroy single occupancy vehicles within the gaming environment. The user may use the go button 3680 to accelerate and avoid an attack or fire. In addition, the user may use the stop button 3675 to slow down or stop in order to avoid enemy fire or attack. In some implementations, the stop button 3675 may interface with an autonomous driving system of a vehicle to pick up passengers along a price-based navigation route to increase the score of the player (as shown in score indicator 3610) and increase the balances awarded to the player (as shown in balance indicator 3630) by earning money on the system. A user may be identified by the X logo or by a person logo, where the user may be a bidder on the price-based navigation route 3640 who can increase scores and balances. In some implementations, a user may scan navigation view (such as through the button 3655) or augmented reality view (such as through the button 3660) to look for SOV targets 3645 or X logos for users who are bidding on the price-based navigation route 3640.

In some implementations, the strategy of the price-based navigation gaming environment is to pick up as many passengers or bidders as possible along the price-based navigation route 3640, destroy as many single occupancy vehicles along the price-based navigation route 3640, and to give flowers 3682 and rewards to transportation unit providers who have more than one person in the vehicle along the price-based navigation route 3640. Users may work independently or collectively in tribes to maximize user score in strategy.

Figure 37:
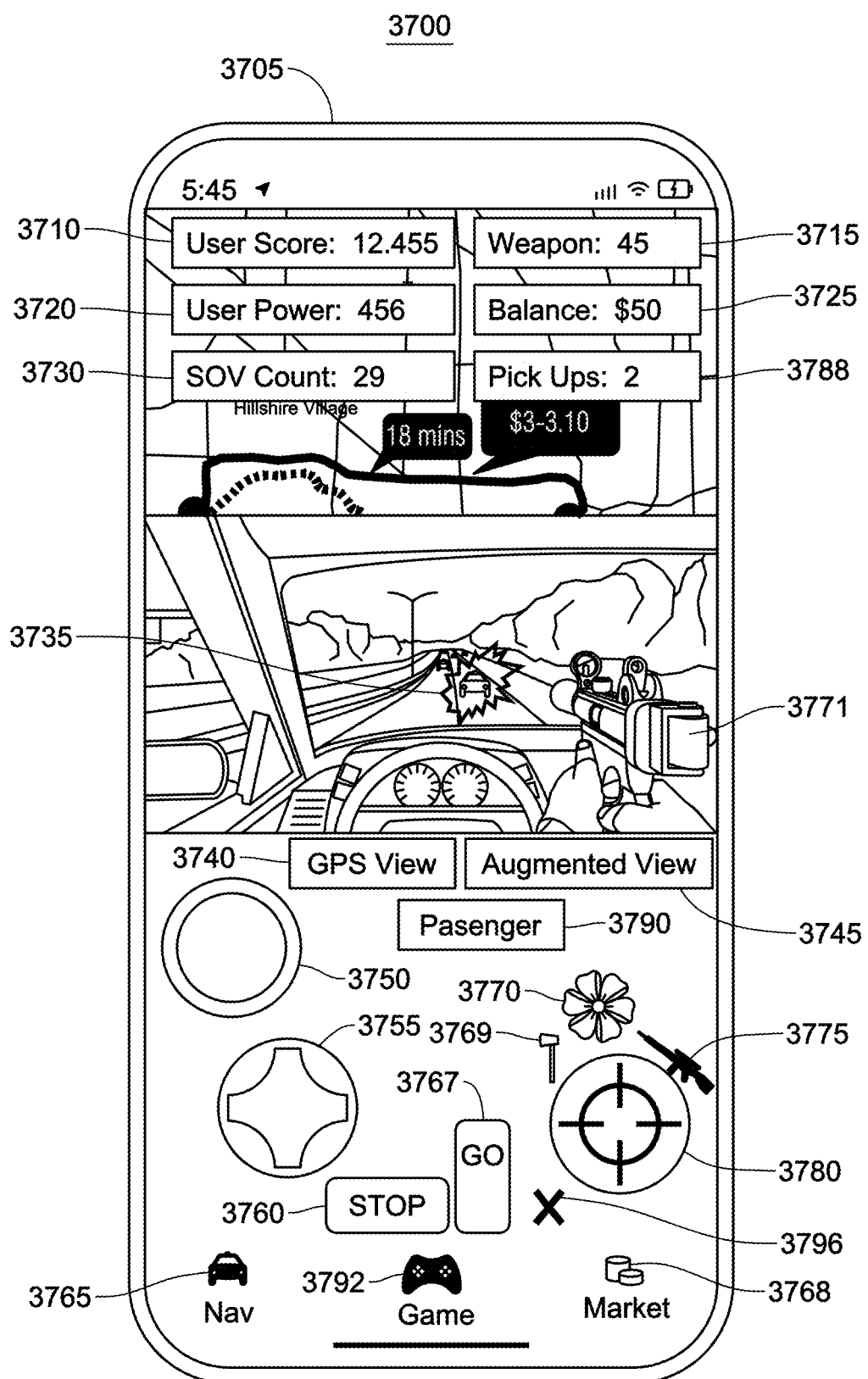

FIG. 37 illustrates a gaming configuration 3700 in accordance with implementations of various techniques described herein, where the gaming configuration 3700 may integrate the implementations disclosed herein on a map software platform. The map software platform may include an internal map software platform, a third-party map software platform, a navigation software platform, and/or any other map software platforms known to those skilled in the art. Further, the configuration 3700 may be used for participating, transacting, and/or trading in transformed transportation or freight capacity unit auctions. The transportation or freight unit security may be the same as those discussed above.

The configuration 3700 may be implemented using the computing device (e.g., mobile computing device) mentioned above, where the device may include a user interface 3705. The user interface 3705 may be a GUI or any other user interface known to those skilled in the art. Further, the computing device may be voice-enabled device, a screen-enabled device, a non-screen enabled device, or any computing device known to those skilled in the art. In particular, the interface 3705 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

In gaming configuration 3700 may display and/or include one or more of the following elements, at least some of which may be implemented via the interface 3705: a game overlay user score indicator 3710; a game overlay user power indicator 3720; a game overlay SOV count indicator 3730; a game overlay weapon strength indicator 3715; a game overlay account balance indicator 3725; a game overlay passenger pick ups indicator 3788; a game overlay SOV target 3735; a game overlay SOV weapon 3771; a game overlay GPS standard map view button 3740; a game overlay augmented or mixed reality view button 3745; a game overlay passenger mode button 3790; a game overlay fire button 3750; a game overlay multi-purpose direction button 3755; a game overlay go button 3767; a game overlay stop button 3760; a navigation overlay button 3765; a game overlay button 3792; a market overlay button 3768; market overlay weapon selection buttons 3775, 3770, 3769, 3796; and/or a market overlay aim finder toggle 3780.

In some implementations, a user may use the game overlay button 3792 to generate a game layer over the displayed mapping, where the game layer may also be displayed using the interface 3705. The game layer may be used by the user to engage with a gaming environment that interacts with the transformed transportation or freight capacity unit auction described above. The gaming environment and game layer be implemented using instructions and a computing system, as known to those skilled in the art. In one implementation, when interacting with the gaming environment and game layer, the interface 3705 may alert the user to a SOV target 3735. The user may interact with the gaming environment to use weapons 3775 or 3769 to destroy the SOV target 3735, which may increase user score displayed in the user score indicator 3710.

In another implementation, the user may identify a vehicle as having more than one passenger and may then choose to award or gift flowers (e.g., via the button 3770) to the vehicle or the transportation user of the vehicle in the gaming environment. The user may also choose to use a weapon (e.g., via the button 3775 or 3769) against a SOV target 3735 within the gaming environment, at which point the vehicle may explode in the gaming environment and the passenger would be left without a vehicle. In a further implementation, the results of the gift or weapon usage may be viewed in an augmented reality view (e.g., via button 3745) or a GPS view (e.g., via button 3740). The user may also choose, within the gaming environment, to award flowers (e.g., via button 3770) to a vehicle with more than one passenger, which may increase the user's score (displayed in the user score indicator 3710) and the add to score of the user that has more than one passenger in their vehicle.

Figure 38:
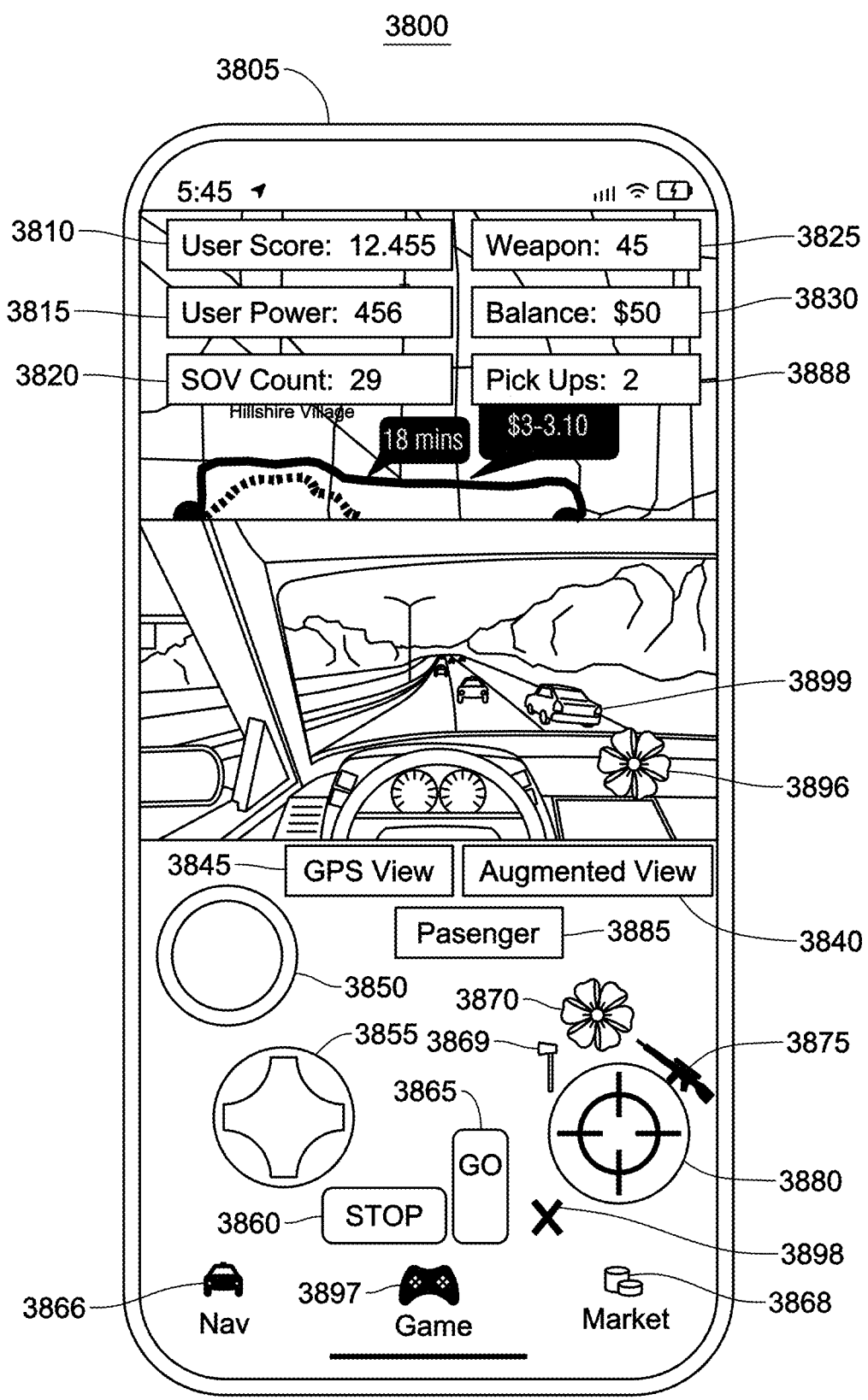

FIG. 38 illustrates a gaming configuration 3800 in accordance with implementations of various techniques described herein, where the gaming configuration 3800 may integrate the implementations disclosed herein on a map software platform. The map software platform may include an internal map software platform, a third-party map software platform, a navigation software platform, and/or any other map software platforms known to those skilled in the art. Further, the configuration 3800 may be used for participating, transacting, and/or trading in transformed transportation or freight capacity unit auctions. The transportation or freight unit security may be the same as those discussed above.

The configuration 3800 may be implemented using the computing device (e.g., mobile computing device) mentioned above, where the device may include a user interface 3805. The user interface 3805 may be a GUI or any other user interface known to those skilled in the art. Further, the computing device may be voice-enabled device, a screen-enabled device, a non-screen enabled device, or any computing device known to those skilled in the art. In particular, the interface 3805 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The gaming configuration 3800 may display and/or include one or more of the following elements, at least some of which may be implemented via the interface 3805: a game overlay user score indicator 3810; a game overlay user power indicator 3815; a game overlay SOV count indicator 3820; a game overlay weapon strength indicator 3825; a game overlay account balance indicator 3830; a game overlay passenger pick ups indicator 3888; a game overlay flower gift 3896; a game overlay GPS standard map view button 3845; a game overlay augmented or mixed reality view button 3840; a game overlay passenger mode button 3885; a game overlay fire button 3850; a game overlay multi-purpose direction button 3855; a game overlay go button 3865; a game overlay stop button 3860; a navigation overlay button 3866; a game overlay button 3897; a market overlay button 3868; market overlay weapon selection buttons 3869, 3870, 3875, 3898; and/or a market overlay aim finder toggle 3880.

In some implementations, a user may use the game overlay button 3897 to generate a game layer over the displayed mapping, where the game layer may also be displayed using the interface 3805. The game layer may be used by the user to engage with a gaming environment that interacts with the transformed transportation or freight capacity unit auction described above. The gaming environment and game layer be implemented using instructions and a computing system, as known to those skilled in the art. In one implementation, when interacting with the gaming environment and game layer, the interface 3805 may alert the user to a vehicle 3899 with more than one passenger, which may prompt the user to gift a flower to the other user within the gaming environment.

Figure 39:
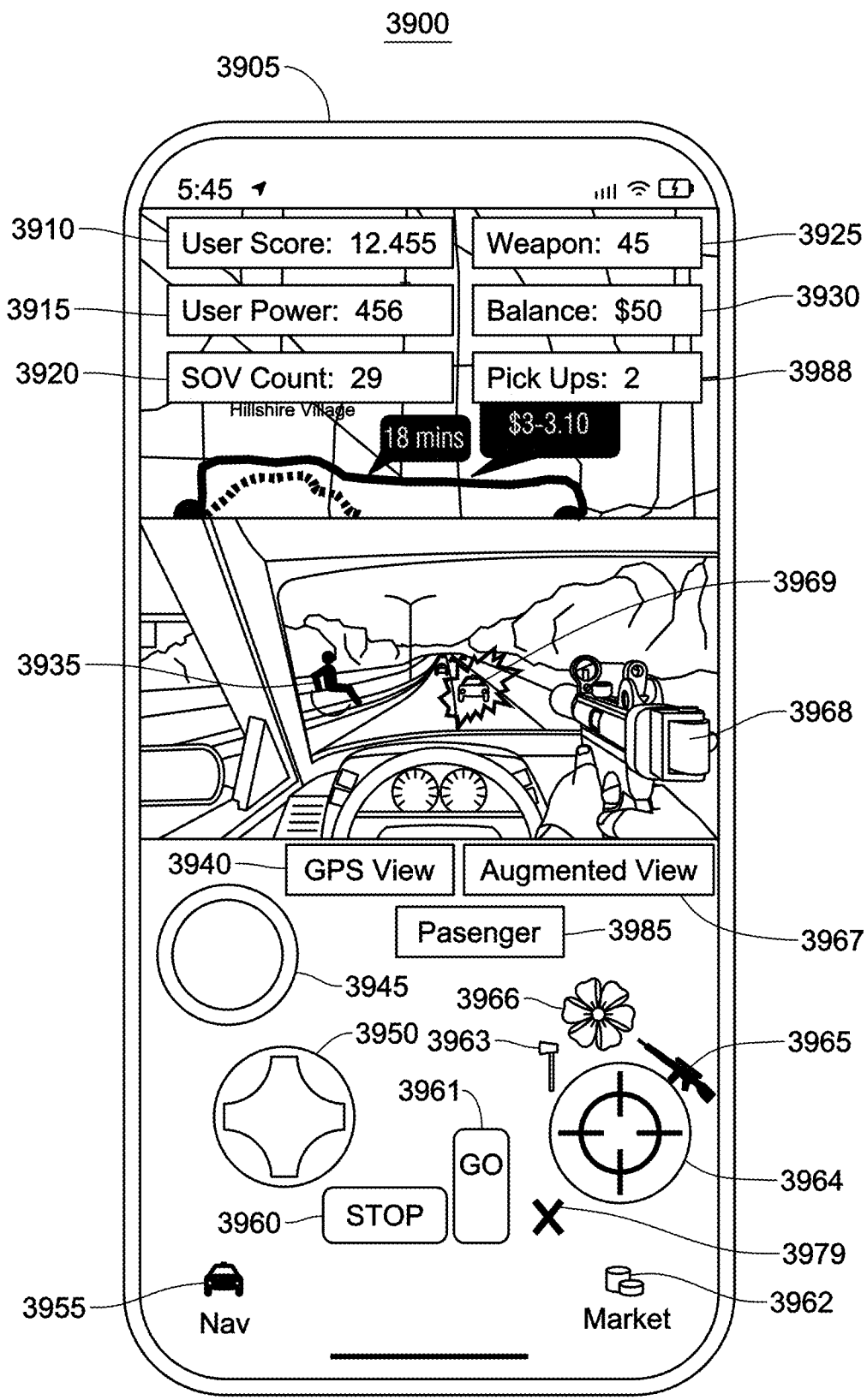

FIG. 39 illustrates a gaming configuration 3900 in accordance with implementations of various techniques described herein, where the gaming configuration 3900 may integrate the implementations disclosed herein on a map software platform. The map software platform may include an internal map software platform, a third-party map software platform, a navigation software platform, and/or any other map software platforms known to those skilled in the art. Further, the configuration 3900 may be used for participating, transacting, and/or trading in transformed transportation or freight capacity unit auctions. The transportation or freight unit security may be the same as those discussed above.

The configuration 3900 may be implemented using the computing device (e.g., mobile computing device) mentioned above, where the device may include a user interface 3905. The user interface 3905 may be a GUI or any other user interface known to those skilled in the art. Further, the computing device may be voice-enabled device, a screen-enabled device, a non-screen enabled device, or any computing device known to those skilled in the art. In particular, the interface 3905 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

In gaming configuration 3900 may display and/or include one or more of the following elements, at least some of which may be implemented via the interface 3905: a game overlay user score indicator 3910; a game overlay user power indicator 3915; a game overlay SOV count indicator 3920; a game overlay weapon strength indicator 3925; a game overlay account balance indicator 3930; a game overlay passenger pick ups indicator 3988; a game overlay weapon 3968; a game overlay GPS standard map view button 3940; a game overlay augmented or mixed reality view button 3967; a game overlay passenger mode button 3985; a game overlay fire button 3945; a game overlay multi-purpose direction button 3950; a game overlay go button 3961; a game overlay stop button 3960; a navigation overlay button 3955; a market overlay button 3962; market overlay weapon selection buttons 3963, 3966, 3965, 3979; a market overlay aim finder toggle 3964;

and/or a user 3935 in an augmented reality view who has had his or her SOV destroyed.

In some implementations, a user may use the game overlay go button 3961 to generate a game layer over the displayed mapping, where the game layer may also be displayed using the interface 3905. The game layer may be used by the user to engage with a gaming environment that interacts with the transformed transportation or freight capacity unit auction described above. The gaming environment and game layer be implemented using instructions and a computing system, as known to those skilled in the art. In one implementation, when interacting with the gaming environment and game layer, the interface 3905 may show the user 3935 who has had his or her SOV destroyed within the gaming environment, which may increase the score of the current user (i.e., the score shown in user score indicator 3910). In addition, the user may target and destroy additional SOVs along the price-based navigation route with the gaming environment.

FIG. 40 illustrates a configuration module 4000 in accordance with implementations of various techniques described herein, where the configuration module 4000 may be used to record one or more vehicle specifications for a user participating, transacting and/or trading in transformed transportation or freight capacity unit auctions. The transportation or freight unit security may be the same as those discussed above.

The configuration module 4000 may be implemented using the computing device (e.g., mobile computing device) mentioned above, where the device may include a user interface 4010. The user interface 4010 may be a GUI or any other user interface known to those skilled in the art. Further, the computing device may be voice-enabled device, a screen-enabled device, a non-screen enabled device, or any computing device known to those skilled in the art. In particular, the interface 4010 may be used to display implementations which utilize a multi-layered network node topology for forward market of transportation and freight units for price-based navigation.

The configuration module 4000 may display and/or include one or more of the following elements, at least some of which may be implemented via the interface 4010: a transportation unit model make heading 4015; a transportation unit model type heading 4025; a transportation unit model year heading 4035; a system menu toggle button 4051; a transportation unit model fuel type heading 4045; a transportation unit model make selection box 4020; a transportation unit model type selection box 4030; a transportation unit model year selection box 4040; and/or a transportation unit model fuel type selection box 4050.

In some embodiments, the configuration module 4000 may allow the user to record vehicle specifications for the user's vehicle, which may allow the user to participate, transact and/or trade in transformed transportation or freight capacity unit auctions, as described above. The vehicle specifications may include model make, model type, model year, model fuel type, and/or any other specification known to those skilled in the art. Further, those skilled in the art will understand that the vehicle specifications are not limited to those shown in FIG. 40.

In one implementation, the user may select a model make for the vehicle under the model make heading 4015, such as, for example, by selecting the model make selection box 4020 to indicate that the vehicle is an Acura. Similarly, the user may select a model type for the vehicle under the model type heading 4025 by selecting the model type selection box 4030, may select a model year for the vehicle under the model year heading 4035 by selecting the model year selection box 4040, and may select a model fuel type for the vehicle under the model fuel type heading 4045 by selecting the model fuel type selection box 4050.

In addition, the implementations described herein may be used to perform a data transformation with respect to a transportation unit or security, such that one or more of the selected vehicle specifications (e.g., model make, model type, model year, model fuel type, and/or the like) may be linked to create specification pools. With respect to the transformed transportation or freight capacity unit auctions described herein, the combinations of similar selected vehicle specifications may be fungible or substitutable when participating, transacting and/or trading in transformed transportation or freight capacity unit auctions. In other implementations, specifications relating to transformed transportation units or securities for travel by bus, subway, train, air, private automobile, and/or other transportation modes may similarly be substitutable. In particular, broad specifications of the transformed transportation or security pool may be substitutable, provided that the broad transformed specifications are met for delivery within the transformed transportation unit or security pool.

Figure 41:
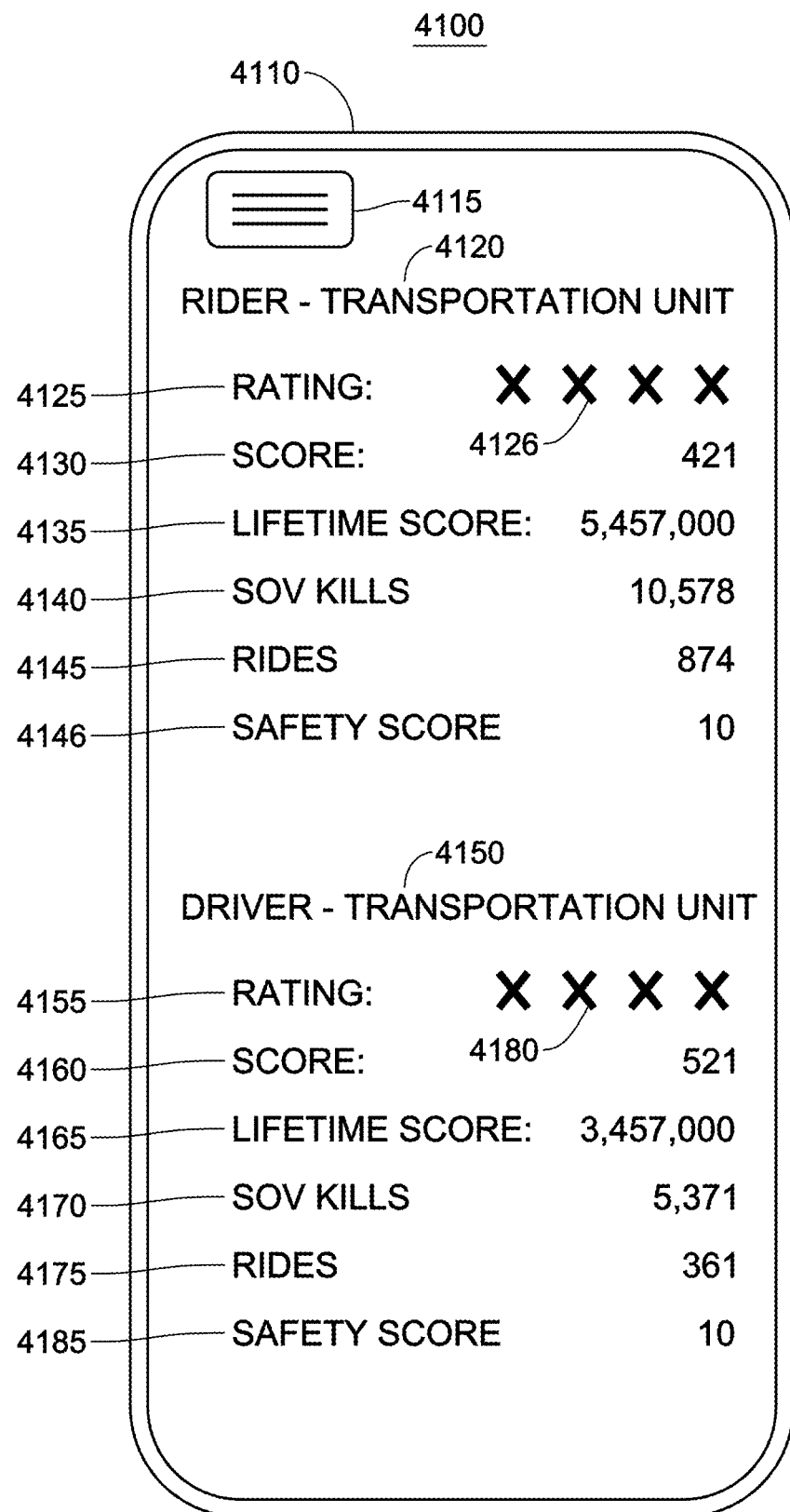

FIG. 41 illustrates a configuration module 4100 in accordance with implementations of various techniques described herein, where the configuration module 4100 may be used to record rider or driver transportation unit specification ratings for a user participating, transacting and/or trading in transformed transportation or freight capacity unit auctions. The transportation or freight unit security may be the same as those discussed above.

The configuration module 4100 may be implemented using the computing device (e.g., mobile computing device) mentioned above, where the device may include a user interface 4110. The user interface 4110 may be a GUI or any other user interface known to those skilled in the art. Further, the computing device may be voice-enabled device, a screen-enabled device, a non-screen enabled device, or any computing device known to those skilled in the art. In particular, the interface 4110 may be used to display implementations which utilize a multi-layered network node topology for forward market of transportation and freight units for price-based navigation.

The configuration module 4100 may display and/or include one or more of the following elements, at least some of which may be implemented via the interface 4110: a menu toggle button 4115; a rider transportation unit rating category heading 4120; a rider transportation unit rating label 4125; a rider transportation unit rating X logo amount 4126; a rider transportation unit rating score 4130 for a navigation route; a rider transportation unit rating lifetime score 4135; a rider transportation unit SOV kills count 4140; a rider transportation unit ride count 4145; a rider transportation unit ride safety score 4146; a driver transportation unit rating category heading 4150; a driver transportation unit rating label 4155; a driver transportation unit rating X logo amount 4180; a driver transportation unit rating score 4160 for a navigation route; a driver transportation unit rating lifetime score 4165; a driver transportation unit SOV kills 4170; a driver transportation unit rides count 4175; and/or a driver transportation unit ride safety score 4185.

In some implementations one or more elements of the configuration module 4100 may be used to account for user actions in the gaming configurations and market configurations mentioned above for use in participating, transacting and/or trading in transformed transportation or freight capacity unit auctions.

Figure 42:
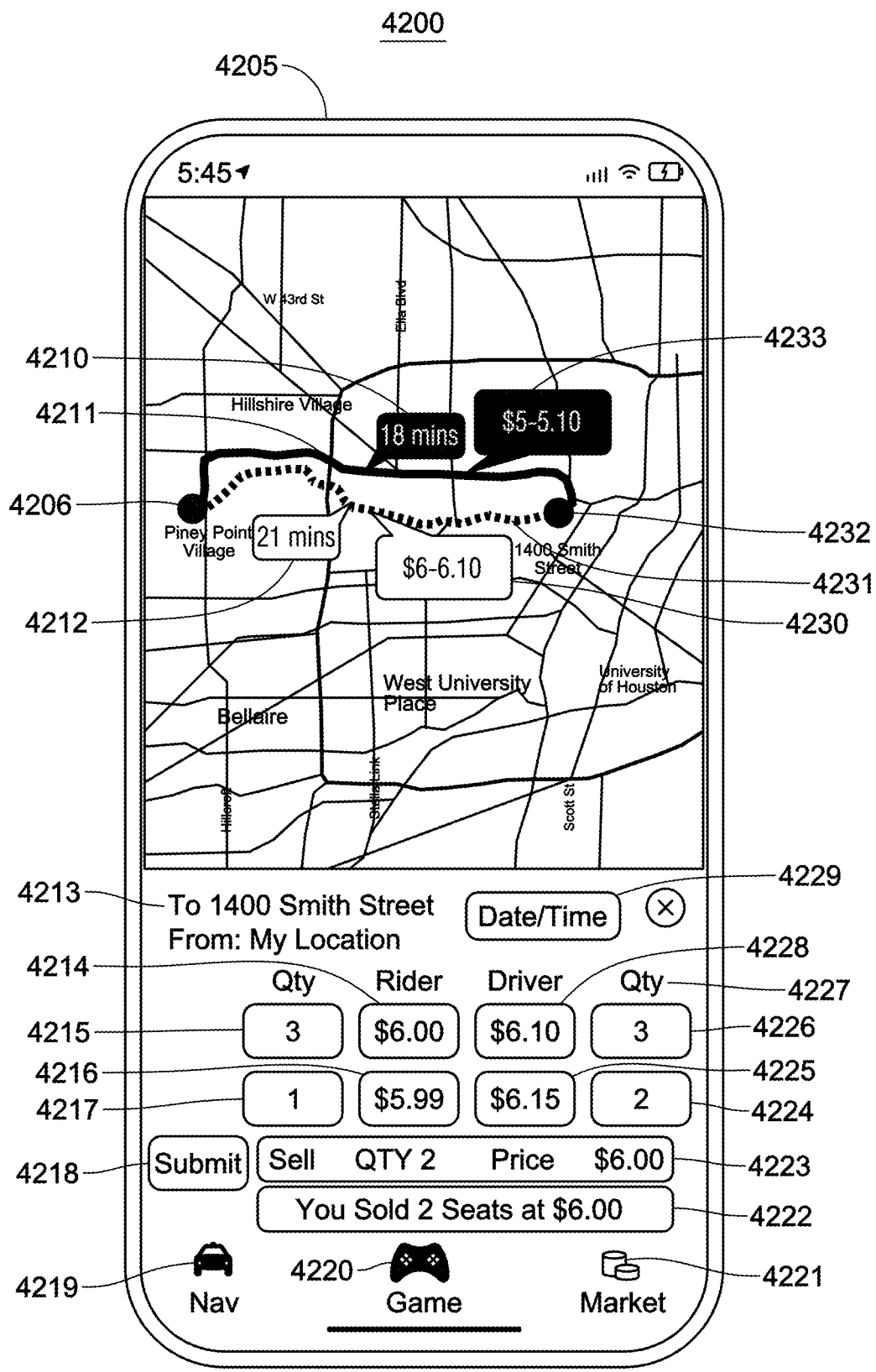
FIG. 42 illustrates a market configuration module in accordance with implementations of various techniques described herein.

FIG. 42 illustrates a market configuration module 4200 in accordance with implementations of various techniques described herein, where the configuration module 4200 may be used to display and/or implement the rider or driver transformed transportation unit or security specifications and the market framework for the transformation for a specified plurality of routes. Further, the configuration module 4200 may be used for participating, transacting, and/or trading in transformed transportation or freight capacity unit auctions. The transportation or freight unit security may be the same as those discussed above.

The configuration module 4200 may be implemented using the computing device (e.g., mobile computing device) mentioned above, where the device may include a user interface 4205. The user interface 4205 may be a GUI or any other user interface known to those skilled in the art. Further, the computing device may be voice-enabled device, a screen-enabled device, a non-screen enabled device, or any computing device known to those skilled in the art. In particular, the interface 4205 may be used to display implementations which utilize a multi-layered network node topology for forward market of transportation and freight units. Further, the transformed transportation capacity unit market auction, as described in implementations disclosed herein, may be fully functional as a layer in map routing software or as a stand-alone application.

The market configuration module 4200 may display and/or include one or more of the following elements, at least some of which may be implemented via the interface 4205: a primary price-based navigation route 4211 of a transformed transportation unit or security; a secondary price-based navigation route 4231 of a transformed transportation unit or security; an estimated time 4210 of the primary route 4211; one or more market prices 4233 of a buyer and seller of the primary route 4211; an estimated time 4212 of the secondary routes 4231; one or more market prices 4230 of a buyer and seller of the secondary route 4231; a starting point virtual hub 4206 of the routes 4211, 4231; an ending point virtual hub 4232 of the routes 4211, 4231; location information 4213 for an ending point and a starting point address of the virtual hubs for the routes 4211, 4231; and/or a date and time specification button 4229 for the routes 4211, 4231.

The market configuration module 4200 may also display and/or include one or more of the following elements, at least some of which may be implemented via the interface 4205: a number or quantity 4215 of offers to buy/bids by riders for transformed transportation units or securities corresponding to the secondary route 4231, where the offers to buy/bids are displayed first in a rider queue that is indexed by highest price; a price 4214 for offers to buy/bids by riders for transformed transportation units or securities corresponding to the secondary route 4231, where the offers to buy/bids are displayed first in the rider queue that is indexed by highest price; a price 4216 for offers to buy/bids by riders for transformed transportation units or securities corresponding to the secondary route 4231, where the offers to buy/bids are displayed second in the rider queue that is indexed by highest price; and/or a number or quantity 4217 of offers to buy/bids by riders for transformed transportation units or securities corresponding to the secondary route 4231, where the offers to buy/bids are displayed second in a rider queue that is indexed by highest price.

The market configuration module 4200 may further display and/or include one or more of the following elements, at least some of which may be implemented via the interface 4205: a number or quantity 4226 of offers to sell by drivers for transformed transportation units or securities corresponding to the secondary route 4231, where the offers to sell are displayed first in a driver queue that is indexed by lowest price; a price 4228 for offers to sell by drivers for transformed transportation units or securities corresponding to the secondary route 4231, where the offers to sell are displayed first in the driver queue that is indexed by lowest price; a number or quantity 4224 of offers to sell by drivers for transformed transportation units or securities corresponding to the secondary route 4231, where the offers to sell are displayed second in the driver queue that is indexed by lowest price; and/or a price 4225 for offers to sell by drivers for transformed transportation units or securities corresponding to the secondary route 4231, where the offers to sell are displayed second in the driver queue that is indexed by lowest price.

The market configuration module 4200 may additionally display and/or include one or more of the following elements, at least some of which may be implemented via the interface 4205: an order entry submit button 4218 configured to submit a user order; information 4223 for an order by a driver to sell a specified quantity of transformed transportation units or securities; an order confirmation 4222 for an order by the driver, where the confirmation indicates the driver sold two units of transformed transportation units or securities; a market view button 4222, where the market view button 4222 may be used to display a price-based navigation layer with indexed prices for one or more routes between two virtual hubs; a game view layer button 4220 for the transformed transportation units or securities; and/or a navigation view layer button 4219 for the transformed transportation units or securities.

As noted above with respect to FIG. 40, a user of one or more configurations (e.g., configuration module 4000) described herein may be used to record vehicle specifications for the user's vehicle. For example, as described above with respect to FIG. 40, the user may select a model make for the vehicle under the model make heading 4015, such as, for example, by selecting the model make selection box 4020 to indicate that the vehicle is an Acura. Returning to FIG. 42, in some implementations, the user's vehicle may be assigned to one or more specification pools, where each specification pool may represent an aggregate of participants or units with a similar selected vehicle specification. In other implementations, the user may be assigned to one or more specification pools, where each specification pool may represent an aggregate of participants with a similar selected specification.

The market configuration module 4200 may then be used to display one or more user-selected navigation routes (e.g., routes 4211, 4231) between the starting point virtual hub 4206 and the ending point virtual hub 4232. The market configuration module 4200 may also display one or more prices associated with the one or more user-selected navigation routes. For example, the market configuration module 4200 may display the one or more market prices 4230 for the secondary route 4231, where the one or more market prices 4230 may correspond to a buy price from the highest bidder or rider for the route 4231.

Further details pertaining to the one or more market prices 4230 may be displayed in the market configuration module 4200, such as in a rider queue display in the module 4200. In particular, as shown in FIG. 42, the price 4214 may correspond to the highest bid price by a rider for the route 4231, where the price 4214 may have an associated quantity 4215 of transformed transportation units or securities. Similarly, as shown in FIG. 42, the price 4228 may correspond to the lowest offer or sale price by a driver for the route 4231, where the price 4228 may have an associated quantity 4226 of transformed transportation units or securities. In some implementations, the quantity 4215 of offers to buy/bids by riders for transformed transportation units or securities corresponding to the secondary route 4231 may represent one or more units. As shown in FIG. 42, the quantity 4215 may include three units, which may represent 1-3 riders who desire to purchase the transformed transportation units or securities for the route 4231. As also shown in FIG. 42, the indexed price 4214 may be queued to the top based on a highest price index and time stamp for a given specification of a transformed transportation unit or security.

In some implementations, the offers to buy/bids by riders and offers to sell by drivers may be for transformed transportation units or securities having one or more specific specification, attributes, and/or the like. In such implementations, these transformed transportation units or securities may represent a pool of transformed transportation units or securities for a user-selected route having one or more similar specifications, attributes, and/or the like. These one or more specifications, attributes, and/or the like may include one or more of the following: vehicle mode make, vehicle mode model type, vehicle model year, cheapest route, single mode, multi modal, fastest route, most scenic, highest rating, most available, highest volume, most frequent, service level, security and safety, group restricted, modes, automobile, air, autonomous vehicle, bike, boat, bus, drone, limo, motorcycle, moped, shuttle, spaceship, subway, taxi, train, fastest optimized, cheapest route, packages, cargo, virtual, order types, term specification, timing specification, virtual hub end point and start point, and/or a plurality of other specifications, attributes, and/or the like.

In some implementations, the market configuration module 4200 may be used to match a rider with a driver for a transformed transportation unit or security in instances where the rider's offer is the highest price 4214 in the rider queue, the driver's offer is the lowest price 4228 in the driver queue, and the price 4214 is equal to the price 4228. In a further implementation, if no such match of prices occur between the driver and rider queues for a given specification of a transformed transportation unit or security, then the prices/offers may remain in the queues until a match or a new order entry re-indexes the order of all the deals. For example, the rider queue may be re-indexed if a newly-offered price is higher than the current highest bid price 4214. In another example, the rider queue may be re-indexed after an order has been placed, with the rider queue being indexed and ranked such that a highest rider price is placed at the top of the queue and the remaining rider prices are displayed in descending order based on price and then based on time of order entry with all other things being equal. The driver price queue may be similarly indexed and ranked such that a lowest driver offer/price 4228 is placed at the top of the queue and the remaining driver prices are displayed in ascending order based on price and then based on time of order entry with all other things being equal (e.g., for a given pool specification of transformed transportation units or securities).

In some implementations, the plurality of routes (e.g., 4231 and 4211_ may be displayed as price-based navigation options that are indexed by market pricing. The user may select one or more routes (e.g., one, two, three, etc.) to be displayed as options between their virtual hubs in order to perform calculations that may maximize the number of transportation units or securities they sell for a given route specification, the prices they may obtain, and/or any combination of other specifications or objectives.

Figure 43:
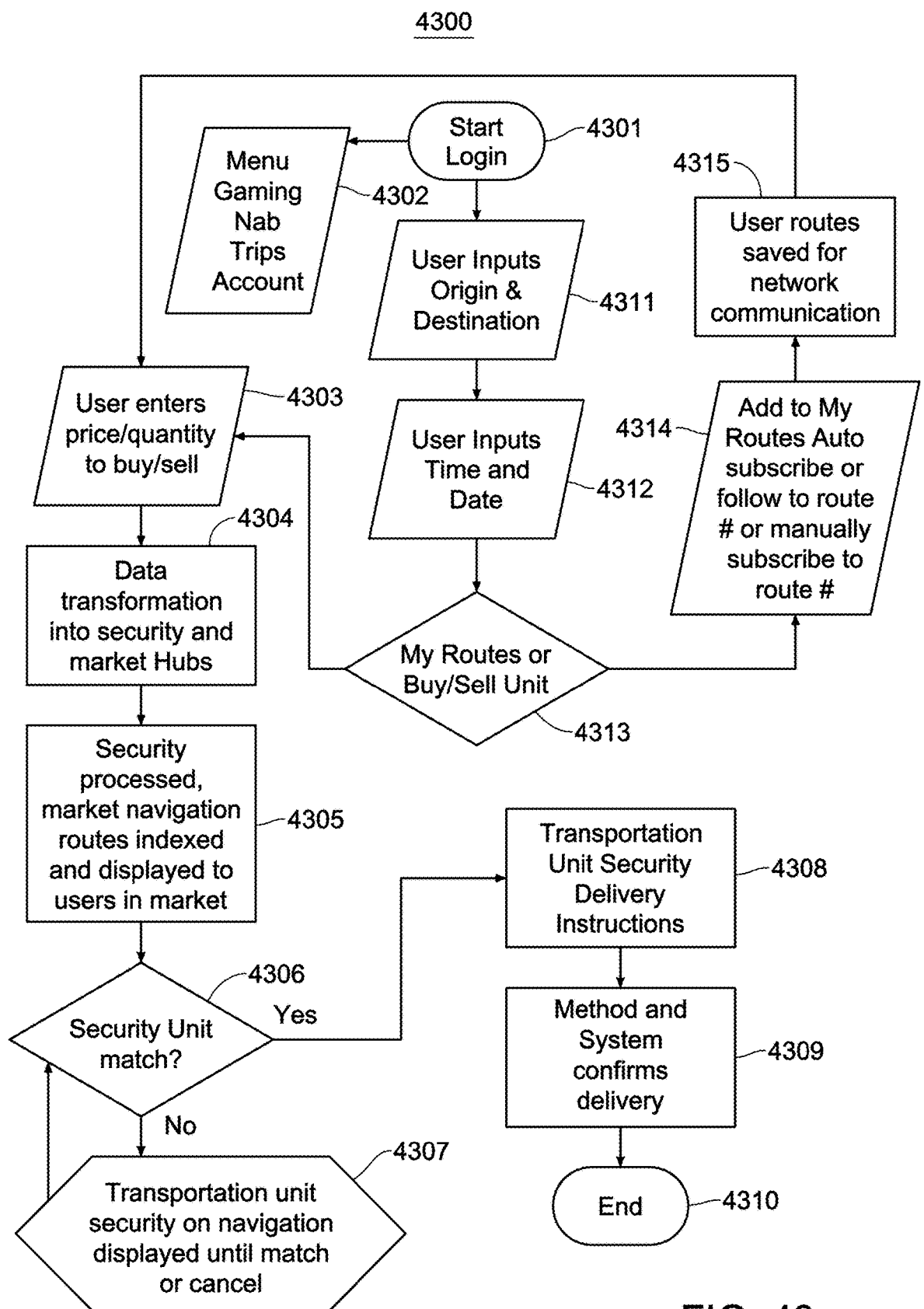
FIG. 43 illustrates a flow diagram of a method in accordance with implementations of various techniques described herein.

FIG. 43 illustrates a flow diagram of a method 4300 in accordance with implementations of various techniques described herein, where the method 4300 may be used for participating in, transacting, and/or trading transformed transportation capacity units or securities between virtual hub combinations. In one implementation, method 4300 may be at least partially performed by a computing system, such as the computing system implementations discussed herein. In particular, the computing system may include one or more of the following: a computing device, a mobile or portable multifunction device, a fixed computing device, a computing device with a touchscreen, a computing device without a touchscreen, an augmented, audio interface computing device, a computing device with a mixed reality non-screen display, and/or any other computing system or device known to those skilled in the art. It should be understood that while method 4300 indicates a particular order of execution of operations, in some implementations, certain portions of the operations might be executed in a different order. Further, in some implementations, additional operations or steps may be added to the method 4300. Likewise, some operations or steps may be omitted.

In one implementation, the method 4300 may correspond to a user experience during a transformed transportation unit or security life cycle. At 4301, the user may login to the computing system, where the user may be similar to the user 110 described above. At 4302, the user may be required to go to a plurality of menu options. At 4311, the user may provide inputs relating to an origin and destination of virtual hubs, and, at 4312, the user may provide inputs relating to time and date for a given specification for the transformed transportation unit or security.

In a further implementation, the specification for the transformed transportation unit or security for a particular route may include one or more of the following specifications, attributes, and/or the like, as specified by the user: vehicle mode make, vehicle mode model type, vehicle model year, cheapest route, single mode, multi modal, fastest route, most scenic, highest rating, most available, highest volume, most frequent, service level, security and safety, group restricted, modes, automobile, air, autonomous vehicle, bike, boat, bus, drone, limo, motorcycle, moped, shuttle, spaceship, subway, taxi, train, fastest optimized, cheapest route, packages, cargo, virtual, order types, term specification, timing specification, virtual hub end point and start point, and/or a plurality of other specifications, attributes, and/or the like. At 4313, the user may save a route to the "My Routes" section of the computing system. At 4314, the user may save a route to the "Add My Routes" section of the computing system. In some implementations, the user's route may be saved at 4313 and/or 4314 in the computing system for one touch retrieval in the future.

At 4303, the user may enter a price or quantity to buy or sell the transformed transportation unit or security for a given specification or specification combination. At 4304, one or more steps may be used for the transformation of the transportation unit or security. At 4305, the computing system may perform one or more additional data transformations to process the transportation unit or security, may determine one or more market navigation route options and indexing, may determine one or more virtual hub or virtual hub combination data transformations, may determine one or more transportation unit transformations, and may determine one or more transformed transportation unit combinations and combination specifications.

At 4306, the computing system may determine if a transformed transportation unit or security matches in price and specification (e.g., offers to buy and sell are equally priced). At 4308, if there is a match, then the computing system may begin the delivery process for the transformed transportation unit or security. At 4309, the computing system may continue the delivery process, which may include steps such as electric signal handoff, security checks, 911 system checks, GPS server and user position checks, transportation unit rating checks, and/or other possible checks for the data elements of the transformed transportation unit or security. The check mentioned herein may be used for verification of delivery of the unit or security. At 4307, if the prices of the buyer and seller queue do not match, then the steps described with respect to 4304, 4305, and 4306 may repeat until a match is made or an order is cancelled before it expires for the transformed transportation unit or security.

Figure 44:
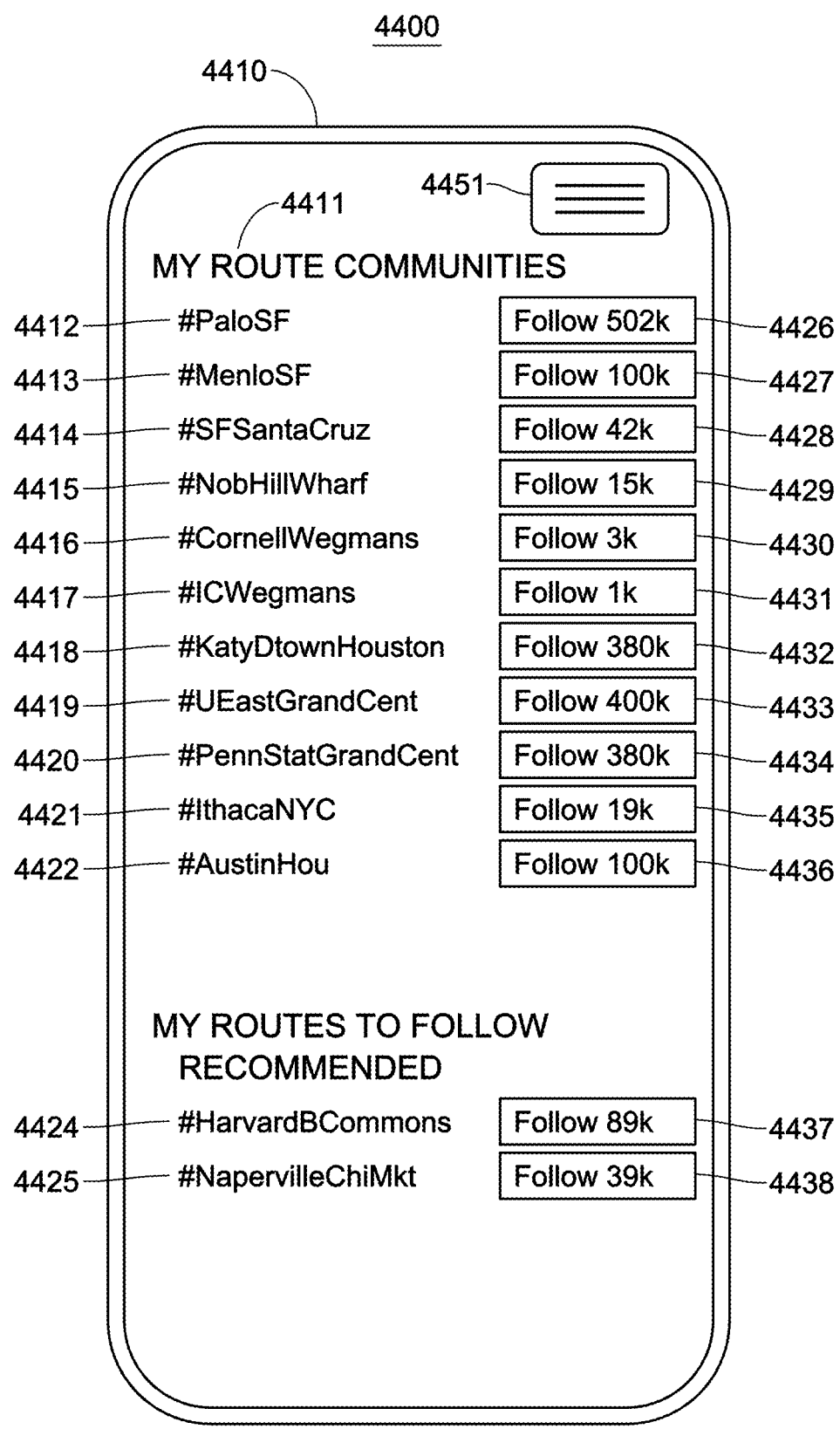
FIGS. 44-46 illustrate a configuration module in accordance with implementations of various techniques described herein.

FIG. 44 illustrates a configuration module 4400 in accordance with implementations of various techniques described herein, where the configuration module 4400 may be used to for accessing one or more functions associated with the My Routes implementations mentioned above. In particular, as mentioned above, a computing system may be used to select, store and/or edit a user's preferred routes, which may be referred to as My Routes, for more efficient access to transportation capacity unit markets over various modes and specifications of transportation capacity.

The configuration module 4400 may be implemented using a computing device (e.g., the mobile computing device mentioned above), where the device may include a user interface 4410. The user interface 4410 may be a GUI or any other user interface known to those skilled in the art. Further, the computing device may be voice-enabled device, a screen-enabled device, a non-screen enabled device, or any computing device known to those skilled in the art. In particular, the interface 4410 may be used to display implementations which utilize a multi-layered network node topology for forward market of transportation and freight units for price-based navigation.

As shown in FIG. 44, the user interface 4410 may display a My Routes Community heading 4411. The user interface 4410 may also display a menu option button 4451 configured to allow the user to access other areas of the method and system implemented on the computing device. In one implementation, a virtual transportation hub sequence representing one or more routes from Palo Alto, California to San Francisco, California may be represented as an object via the interface 4410 with a metadata tag #PaloSF 4412. In a further implementation, the virtual transportation hub sequence having the #PaloSF 4412 tag may have an associated option button 4426 configured to allow the user to follow, join, subscribe to, or add an online community (which may be represented by a community object transformed data structure within the computing system) associated with the virtual transportation hub sequence having the #PaloSF 4412 tag. In some implementations, the associated option button 4426 may indicate a number of followers or network members who have joined the associated community, which is shown to be 502,000 in FIG. 44.

In another implementation, a virtual transportation hub sequence representing one or more routes from Menlo Park, California to San Francisco, California may be represented as an object via the interface 4410 with a metadata tag #MenloSF 4413. In a further implementation, the virtual transportation hub sequence having the #MenloSF 4413 tag may have an associated option button 4427 configured to allow the user to follow, join, subscribe to, or add an online community (which may be represented by a community object transformed data structure within the computing system) associated with the virtual transportation hub sequence having the #MenloSF 4413 tag. In some implementations, the associated option button 4427 may indicate a number of followers or network members who have joined the associated community, which is shown to be 100,000 in FIG. 44

In another implementation, a virtual transportation hub sequence representing one or more routes from San Francisco, California to Santa Cruz, California may be represented as an object via the interface 4410 with a metadata tag #SFSantaCruz 4414. In a further implementation, the virtual transportation hub sequence having the #SFSantaCruz 4414 tag may have an associated option button 4428 configured to allow the user to follow, join, subscribe to, or add an online community (which may be represented by a community object transformed data structure within the computing system) associated with the virtual transportation hub sequence having the #SFSantaCruz 4414 tag. In some implementations, the associated option button 4428 may indicate a number of followers or network members who have joined the associated community, which is shown to be 42,000 in FIG. 44

In another implementation, a virtual transportation hub sequence representing one or more routes from Nob Hill in San Francisco, California to Fisherman's Wharf in San Francisco, California may be represented as an object via the interface 4410 with a metadata tag #NobHillWharf 4415. In a further implementation, the virtual transportation hub sequence having the #NobHillWharf 4415 tag may have an associated option button 4429 configured to allow the user to follow, join, subscribe to, or add an online community (which may be represented by a community object transformed data structure within the computing system) associated with the virtual transportation hub sequence having the #NobHillWharf 4415 tag. In some implementations, the associated option button 4429 may indicate a number of followers or network members who have joined the associated community, which is shown to be 15,000 in FIG. 44.

In yet another implementation, a virtual transportation hub sequence representing one or more routes from Cornell University in Ithaca, NY to Wegmans in Ithaca, NY may be represented as an object via the interface 4410 with a metadata tag #CornellWegmans 4416. In a further implementation, the virtual transportation hub sequence having the #CornellWegmans 4416 tag may have an associated option button 4430 configured to allow the user to follow, join, subscribe to, or add an online community (which may be represented by a community object transformed data structure within the computing system) associated with the virtual transportation hub sequence having the #CornellWegmans 4416 tag. In some implementations, the associated option button 4430 may indicate a number of followers or network members who have joined the associated community, which is shown to be 3,000 in FIG. 44.

In yet another implementation, a virtual transportation hub sequence representing one or more routes from Ithaca College in Ithaca, NY to Wegmans in Ithaca, NY may be represented as an object via the interface 4410 with a metadata tag #ICWegmans 4417. In a further implementation, the virtual transportation hub sequence having the #ICWegmans 4417 tag may have an associated option button 4431 configured to allow the user to follow, join, subscribe to, or add an online community (which may be represented by a community object transformed data structure within the computing system) associated with the virtual transportation hub sequence having the #ICWegmans 4417 tag. In some implementations, the associated option button 4431 may indicate a number of followers or network members who have joined the associated community, which is shown to be 1,000 in FIG. 44.

In another implementation, a virtual transportation hub sequence representing one or more routes from Katy, Texas to Houston, Texas may be represented as an object via the interface 4410 with a metadata tag #KatyDtownHouston 4418. In a further implementation, the virtual transportation hub sequence having the #KatyDtownHouston 4418 tag may have an associated option button 4432 configured to allow the user to follow, join, subscribe to, or add an online community (which may be represented by a community object transformed data structure within the computing system) associated with the virtual transportation hub sequence having the #KatyDtownHouston 4418 tag. In some implementations, the associated option button 4432 may indicate a number of followers or network members who have joined the associated community, which is shown to be 380,000 in FIG. 44.

In yet another implementation, a virtual transportation hub sequence representing one or more routes from Upper East Side in NYC to Grand Central Station in NYC may be represented as an object via the interface 4410 with a metadata tag #UEastGrandCent 4419. In a further implementation, the virtual transportation hub sequence having the #UEastGrandCent 4419 tag may have an associated option button 4433 configured to allow the user to follow, join, subscribe to, or add an online community (which may be represented by a community object transformed data structure within the computing system) associated with the virtual transportation hub sequence having the #UEastGrandCent 4419 tag. In some implementations, the associated option button 4433 may indicate a number of followers or network members who have joined the associated community, which is shown to be 400,000 in FIG. 44.

In another implementation, a virtual transportation hub sequence representing one or more routes from Penn Station in NYC to Grand Central Station in NYC may be represented as an object via the interface 4410 with a metadata tag #PennStatGrandCent 4420. In a further implementation, the virtual transportation hub sequence having the #PennStatGrandCent 4420 tag may have an associated option button 4434 configured to allow the user to follow, join, subscribe to, or add an online community (which may be represented by a community object transformed data structure within the computing system) associated with the virtual transportation hub sequence having the #PennStatGrandCent 4420 tag. In some implementations, the associated option button 4434 may indicate a number of followers or network members who have joined the associated community, which is shown to be 380,000 in FIG. 44.

In yet another implementation, a virtual transportation hub sequence representing one or more routes from Ithaca, NY to Grand Central Station in NYC may be represented as an object via the interface 4410 with a metadata tag #IthacaNYC 4421. In a further implementation, the virtual transportation hub sequence having the #IthacaNYC 4421 tag may have an associated option button 4435 configured to allow the user to follow, join, subscribe to, or add an online community (which may be represented by a community object transformed data structure within the computing system) associated with the virtual transportation hub sequence having the #IthacaNYC 4421 tag. In some implementations, the associated option button 4435 may indicate a number of followers or network members who have joined the associated community, which is shown to be 19,000 in FIG. 44.

In another implementation, a virtual transportation hub sequence representing one or more routes from Austin, TX to Houston, TX may be represented as an object via the interface 4410 with a metadata tag #AustinHou 4422. In a further implementation, the virtual transportation hub sequence having the #AustinHou 4422 tag may have an associated option button 4436 configured to allow the user to follow, join, subscribe to, or add an online community (which may be represented by a community object transformed data structure within the computing system) associated with the virtual transportation hub sequence having the ##AustinHou 4422 tag. In some implementations, the associated option button 4436 may indicate a number of followers or network members who have joined the associated community, which is shown to be 100,000 in FIG. 44.

In some implementations, the computing system may recommend one or more virtual transportation hub sequences to the user, which may be displayed via the interface 4410 under a My Routes To Follow Recommended heading 4423. In one such implementation, a virtual transportation hub sequence representing one or more routes from Harvard University in Cambridge, MA to Boston Commons in Boston, MA may be represented as an object via the interface 4410 with a metadata tag #HarvardBCommons 4424. In a further implementation, the virtual transportation hub sequence having the #HarvardBCommons 4424 tag may have an associated option button 4437 configured to allow the user to follow, join, subscribe to, or add an online community (which may be represented by a community object transformed data structure within the computing system) associated with the virtual transportation hub sequence having the #HarvardBCommons 4424 tag. In some implementations, the associated option button 4437 may indicate a number of followers or network members who have joined the associated community, which is shown to be 89,000 in FIG. 44.

In another such implementation, a virtual transportation hub sequence representing one or more routes from Naperville in Chicago, IL to Marketplace in Chicago, IL may be represented as an object via the interface 4410 with a metadata tag #NapervilleChiMkt 4425. In a further implementation, the virtual transportation hub sequence having the #NapervilleChiMkt 4425 tag may have an associated option button 4438 configured to allow the user to follow, join, subscribe to, or add an online community (which may be represented by a community object transformed data structure within the computing system) associated with the virtual transportation hub sequence having the #NapervilleChiMkt 4425 tag. In some implementations, the associated option button 4438 may indicate a number of followers or network members who have joined the associated community, which is shown to be 39,000 in FIG. 44.

Figure 45:
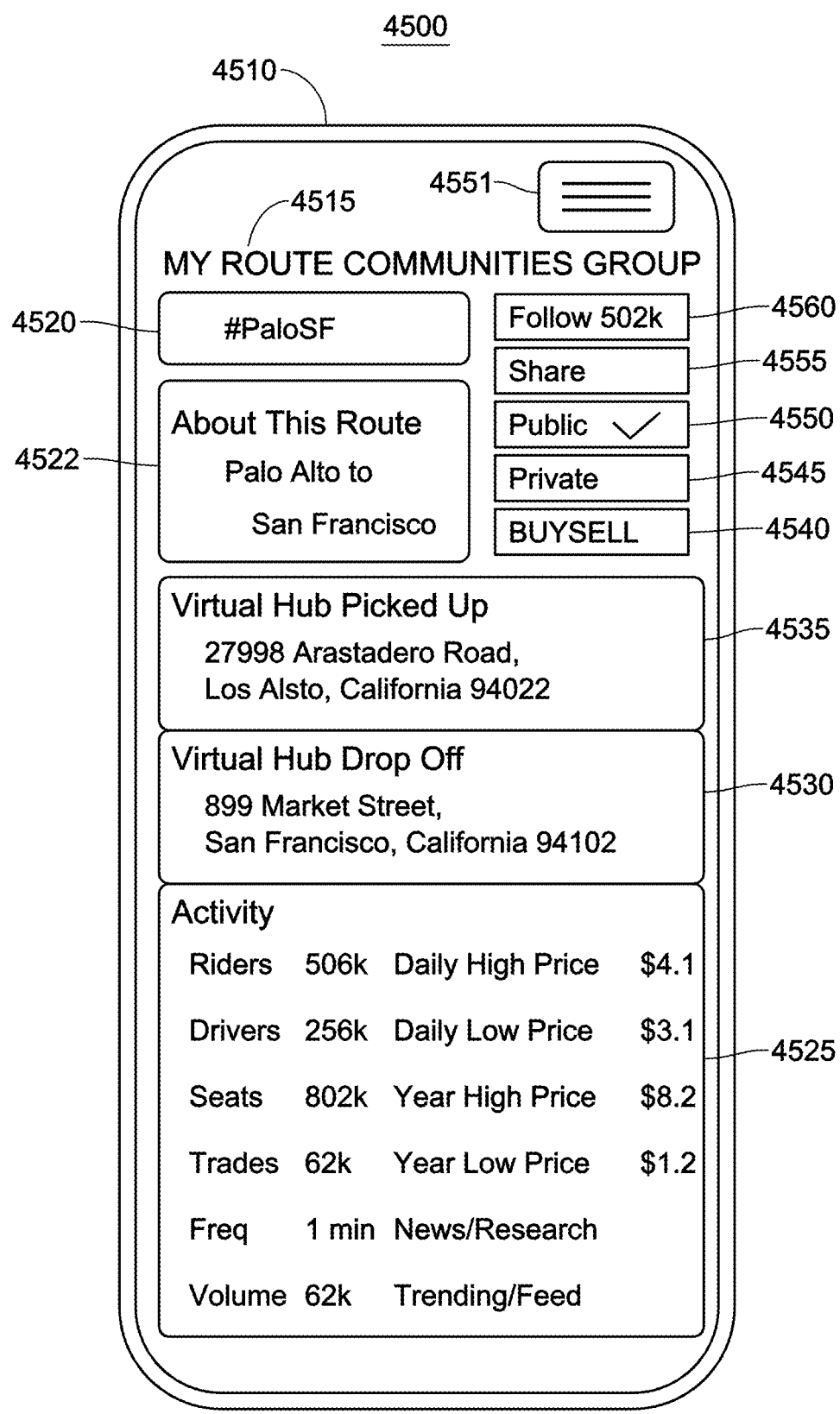

FIG. 45 illustrates a configuration module 4500 in accordance with implementations of various techniques described herein, where the configuration module 4500 may be used to display and/or choose options for a virtual transportation hub sequence with an associated online community (which may be represented by a community object transformed data structure within the computing system).

The configuration module 4500 may be implemented using a computing device (e.g., the mobile computing device mentioned above), where the device may include a user interface 4510. The user interface 4510 may be a GUI or any other user interface known to those skilled in the art. Further, the computing device may be voice-enabled device, a screen-enabled device, a non-screen enabled device, or any computing device known to those skilled in the art. In particular, the interface 4510 may be used to display implementations which utilize a multi-layered network node topology for forward market of transportation and freight units for price-based navigation.

As shown in FIG. 45, the user interface 4510 may display a My Route Communities heading 4515. The user interface 4510 may display one or more options for a particular virtual hub sequence, such as the transformed data structure of a transformed community virtual transportation hub sequence representing one or more routes from Palo Alto, CA to San Francisco, CA with a metadata tag #PaloSF 4520.

As shown, the interface 4510 may display long form route details relating to the particular virtual hub sequence (e.g., the virtual transportation hub sequence having the #PaloSF tag) in the About This Route section 4522. Further, the interface 4510 may display an option to follow button 4560 the online community associated with the virtual transportation hub sequence, where the button 4560 may also indicate a number of followers or network members who have joined the associated community. In addition, the interface 4510 may display a share button 4555, where the button 4555 may allow the user to share the associated community group to others via another social network, text, email, and/or other network protocol. The interface 4510 may also display a public button 4550 and a private button 4545, which may be used to change the privacy settings for the associated online community. Additionally, the interface 4510 may display a buy/sell button 4540, which may be used to provide a gateway to buy or sell transportation units corresponding to the virtual transportation hub sequence.

The interface 4510 may also display address information 45435 relating to a virtual hub pick up location and address information 4530 relating to a virtual hub drop off location for the virtual transportation hub sequence. The interface 4510 may further display activity information 4525 relating to statistics and data for the virtual transportation hub sequence and/or its associated online community, such as statistics and data relating to the number of riders, number of drivers, number of seats, number of trades, frequency of transportation units, volume of transportation units, daily high price for transportation units, daily low price for transportation units for the virtual transportation hub sequence community object, yearly high price, yearly low price, news, research, trending, feeds for the virtual hub sequence, and/or the like.

Figure 46:
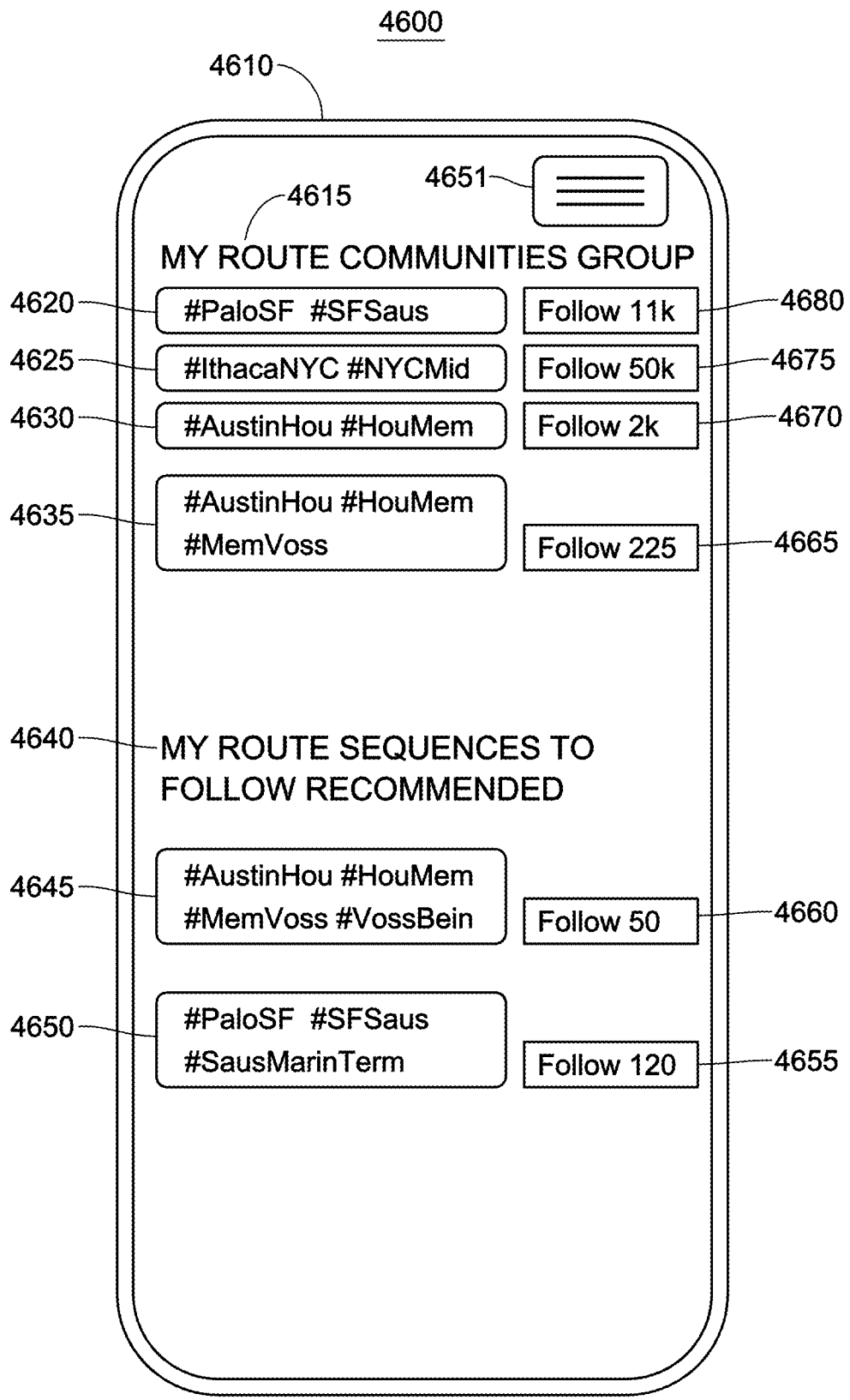

FIG. 46 a configuration module 4600 in accordance with implementations of various techniques described herein, where the configuration module 4600 may be used to transform virtual transportation hub sequences with two virtual hubs into virtual transportation hub sequences with more than two virtual hubs. In particular, the virtual transportation hub sequences with more than two virtual hubs may be composed of two or more series of virtual transportation hub sequences.

The configuration module 4600 may be implemented using a computing device (e.g., the mobile computing device mentioned above), where the device may include a user interface 4610. The user interface 4610 may be a GUI or any other user interface known to those skilled in the art. Further, the computing device may be voice-enabled device, a screen-enabled device, a non-screen enabled device, or any computing device known to those skilled in the art. In particular, the interface 4610 may be used to display implementations which utilize a multi-layered network node topology for forward market of transportation and freight units for price-based navigation.

As shown in FIG. 46, the user interface 4610 may display a My Route Sequences heading 4615. In one implementation, the interface 4610 may display a multi-leg virtual transportation hub sequence 4620 representing an origin virtual hub sequence of Palo Alto, CA to San Francisco, CA (with a metadata tag #PaloSF) followed by a secondary sequence of San Francisco, CA to Sausalito, California CA (with a metadata tag #SFSaus). Multi-leg virtual hub sequences may allow for the linking of villages, cities or states using a network transportation topology structure for multiple providers of transportation units, which may provide higher levels of frequency and market opportunity to link public and private systems. In a further implementation, the multi-leg virtual transportation hub sequence 4620 having the #PaloSF #SFSaus tags may have an associated option button 4680 configured to allow users to join, follow, subscribe to, or become a member of an online community (which may be represented by a community object transformed data structure within the computing system) associated with the multi-leg virtual transportation hub sequence 4620, which may help to alleviate potential last mile issues within transportation systems.

In another implementation, the interface 4610 may display a multi-leg virtual transportation hub sequence 4625 representing an origin virtual hub sequence of Ithaca, NY to New York City, NY (with a metadata tag #IthacaNY) followed by a secondary sequence of New York City, NY to Midtown in New York City, NY (with a metadata tag #NYCMid). In such an implementation, the multi-leg virtual transportation hub sequence 4625 may allow for a transportation unit seller or buyer to connect two disparate transportation networks to provide last mile transportation to a destination at the lowest market cost, because each leg or series of virtual hub sequences may have an independent market associated with the leg or virtual hub sequence. In a further implementation, the multi-leg virtual transportation hub sequence 4625 having the #IthacaNY #NYCMid tags may have an associated option button 4675 configured to allow users to join, follow, subscribe to, or become a member of an online community (which may be represented by a community object transformed data structure within the computing system) associated with the multi-leg virtual transportation hub sequence 4625, which may help to alleviate potential last mile issues within transportation systems.

In a further implementation, the configuration module 4600 may be used to transform virtual transportation hub sequences composed of three or more series of virtual transportation hub sequences. In one such implementation, the interface 4610 may display a multi-leg virtual transportation hub sequence 4635 representing an origin virtual hub sequence of Austin, TX to Houston, TX (with a metadata tag #AustinHou), followed by a sequence of Houston, TX to Memorial in Houston, TX (with a metadata tag #HouMem), and followed by a sequence of Memorial in Houston, TX to Voss in Houston, TX (with a metadata tag #MemVoss). In particular, a user may use a transportation unit for the initial sequence with tag #AustinHou, uses another transportation unit for the sequence with tag #HouMem, and then uses yet another transportation unit for the sequence with tag #MemVoss. The multi-leg virtual transportation hub sequence 4635 may help to alleviate last mile issues for travelers where public transport may be an issue or private rides simply are going in a different direction. In particular, multi-leg virtual transportation hub sequence 4635 and the associated sequence community object transformation may help travelers understand options and piece multiple transportation systems onto a single community based object to aggregate communication and transaction benefits of the system.

In some implementations, computing system may use prior history navigation searches and locations to build recommended additional multi-leg virtual transportation hub sequences to the user, which may be displayed via the interface 4610 under a My Routes Sequences To Follow Recommended heading 4640. In one such implementation, the computing system may recommend a multi-leg virtual hub route sequence composed of four or more virtual hub sequences, combinations of already linked virtual hub sequences, and/or the like. For example, as shown in FIG. 46, the interface 4610 may display a multi-leg virtual transportation hub sequence 4645, which may be similar to the sequence 4635 with the additional sequence of Voss in Houston, TX to a specific address on Bein St. in Houston, TX (with a metadata tag #VossBein). The multi-leg virtual transportation hub sequence 4645 may help to provide a last mile sequence to a traveler or driver from Austin, TX to a specific address in Houston, TX In a further implementation, the multi-leg virtual transportation hub sequence 4645 may have an associated option button 4660 configured to allow users to join, follow, subscribe to, or become a member of an online community (which may be represented by a community object transformed data structure within the computing system) associated with the multi-leg virtual transportation hub sequence 4645.

In another example, as shown in FIG. 46, the interface 4610 may display a multi-leg virtual transportation hub sequence 4650, which may be similar to the sequence 4620 with the additional sequence of Sausalito, CA to a specific address in Marin Terminal in Sausalito, CA (with a metadata tag #SausMarinTerm). The multi-leg virtual transportation hub sequence 4650 may help to provide a last mile sequence to a traveler or driver from Palo Alto, CA to a specific address in Marin Terminal in Sausalito, CA In a further implementation, the multi-leg virtual transportation hub sequence 4650 may have an associated option button 4655 configured to allow users to join, follow, subscribe to, or become a member of an online community (which may be represented by a community object transformed data structure within the computing system) associated with the multi-leg virtual transportation hub sequence 4650.

Traversing a series of linked trips via a multi-leg virtual transportation hub sequence may allow for the cost of non-linked trips to be dramatically lower due to using a series of connected local seats rather than a private for-hire vehicle, as the private for-hire vehicle which may be more expensive and add a reverse dead head trip that further pollutes the environment and leaves the driver without additional income on the dead head return leg. The transformed virtual hub sequence methodology may allow for transportation systems to be integrated in ways that were not formerly possible because the systems were disparate or simply did not allow for linked trips or linked community objects that could optimize topological network structures over existing inefficient structures.

Figure 47:
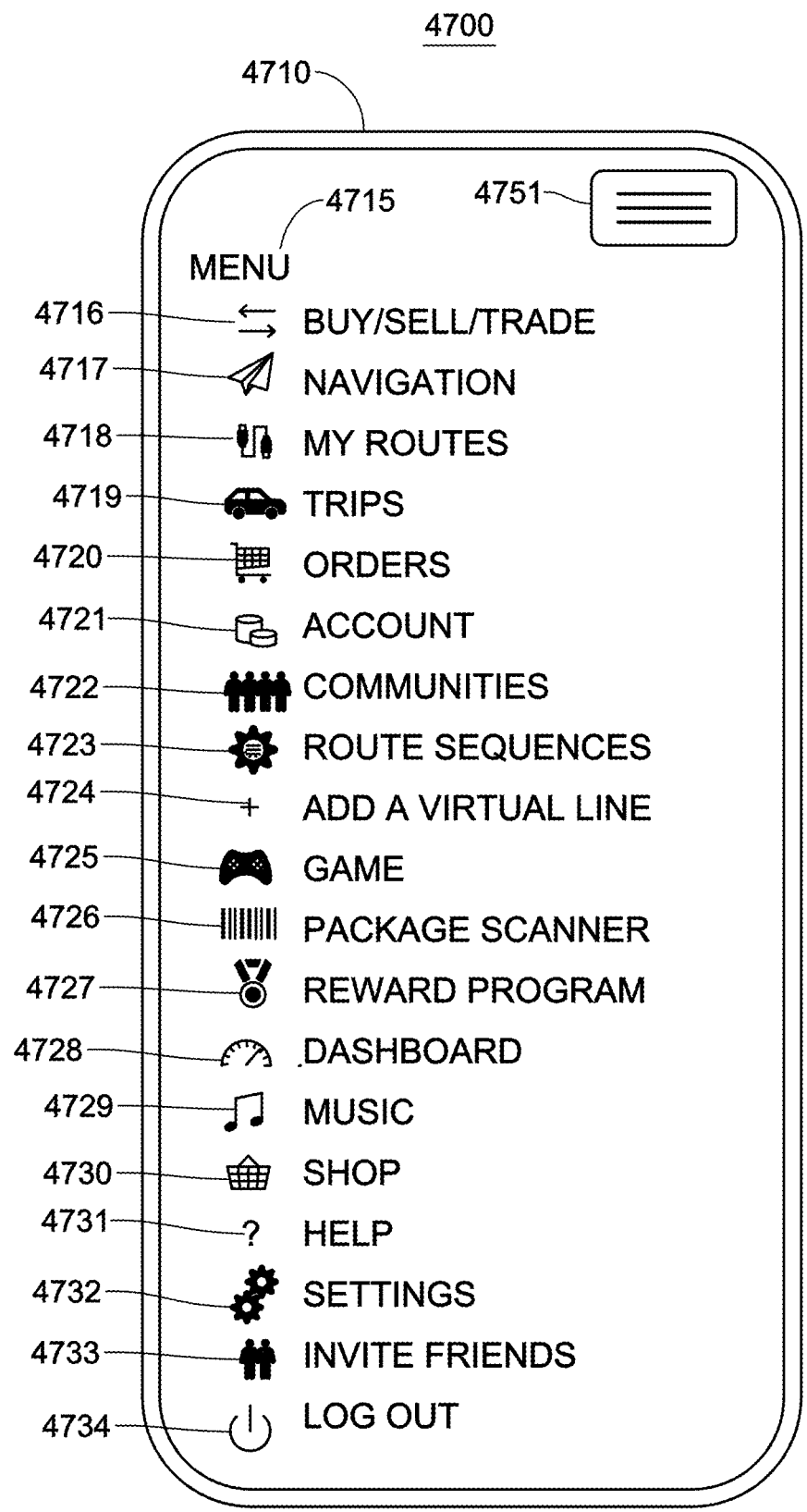
FIG. 47 illustrates a menu options configuration in accordance with implementations of various techniques described herein.

FIG. 47 illustrates a menu options configuration 4700 in accordance with implementations of various techniques described herein, where the menu options configuration 4700 may be used to display one or more menu options for use with the implementations and configurations described herein.

The menu options configuration 4700 may be implemented using a computing device (e.g., the mobile computing device mentioned above), where the device may include a user interface 4710. The user interface 4710 may be a GUI or any other user interface known to those skilled in the art. Further, the computing device may be voice-enabled device, a screen-enabled device, a non-screen enabled device, or any computing device known to those skilled in the art. In particular, the interface 4710 may be used to display implementations which utilize a multi-layered network node topology for forward market of transportation and freight units for price-based navigation.

The menu options configuration 4700 may include a buy/sell/trade option 4716, which may be configured to allow the user to access the transportation unit gateway trading platform for virtual hub combinations and virtual hub sequences. The menu options configuration 4700 may include a navigation option 4717, which may be configured to allow the user to access a navigation module for price based navigation or route selection based on cost or earnings from a route, as described in: a) U.S. patent application Ser. No. 16/242,967, "Price Based Navigation," filed Jan. 8, 2019, the entirety of which is incorporated by reference herein; and, b) U.S. Patent Application Publication, Ser. No. 15/877,393, "Electronic Forward Market Exchange for Transportation Seats and Capacity in Transportation Spaces and Vehicles," filed Jan. 23, 2018, the entirety of which is incorporated by reference herein.

The menu options configuration 4700 may also include a my routes option 4718, which may be configured to allow the user to access routes that are associated to their user profile or behavior and may be stored in the network member database. The menu options configuration 4700 may also include a trips option 4719, which may be configured to allow the user to access a trip delivery view. The menu options configuration 4700 may also include an orders option 4720, which may be configured to allow the user to cancel or adjust orders in the system that are unfilled. The menu options configuration 4700 may also include an accounts option 4721 to allow the user to toggle to an account page, a communities option 4722 to allow the user to toggle to a communities object page, or a route sequences option 4723 to allow the user to toggle to a route sequences page.

Further, the menu options configuration 4700 may include an additional hubs option 4724 to allow the user to add additional hubs 4724, or include a gaming option 4725 to allow the user to a gaming interface. In addition, the menu options configuration 4700 may also include a package scanner option 4726 to allow the user to scan freight transportation units. Additionally, the menu options configuration 4700 may also include a reward program option 4727 to allow users to access a reward, and may include a dashboard option 4728 to allow users to access a dashboard module. The menu options configuration 4700 may also include a music option 4729 and a shop option 4730. Further, the menu options configuration 4700 may include a help option 4731 and/or a settings option 4732 to allow the user to update account information or privacy settings. In addition, the menu options configuration 4700 may include an invite friends option 4733 to allow the user to earn rewards, bonuses, cash, or credits. The menu options configuration 4700 may also include a logout option 4734 to allow the user to log out of the system.

FIG. 48 illustrates a system 4800 in accordance with implementations of various techniques described herein. In one implementation, an asymmetric transportation and freight capacity unit routing problem may be defined as shown in boxes 4801 and 4802. In particular, as shown in box 4802, $y_i$, $i \in M$ may be a binary variable with a value of 1 if supplier i is selected. The binary variable may have a value of 0 otherwise. Further, $x_{ij}$,(i,j)$\in A$ may be a binary variable with a value of 1 if arc(i,j) is traversed. The binary variable may have a value of 0 otherwise. In addition, $Z_{ik}$,k$\in K$, i$\in M_k$, may be a variable representing the number of units of product k purchased by supplier i. Moreover, for any subset V' of nodes, the following equations may be defined:

$$\delta+(V'):=\{(i,j)\in A: i\in V', j\notin V'\} \quad (1)$$

$$\delta+(V'):=\{(i,j)\in A: i\notin V', j\in V'\} \quad (2).$$

Further, as shown in box 4803, for the price-time priority queue routing:

$$\min \sum_{(i,j)\in A}^{n} c_{ij}x_{ij} \sum_{k\in K}\sum_{i\in M_k} P_{ik}Z_{ik} :. \quad (3)$$

which may be subject to the following equations, as shown in boxes 4803-4810:

$$\sum_{i\in M_k} Z_{ik} = d_k, \ k\in K \quad (4)$$

$$Z_{ik} \leq q_{ik}y_i, \ k\in K, \ i\in M_k \quad (5)$$

$$\sum_{(i,j)\in \delta+(\{h\})} x_{ij} = \sum_{(i,j)\in \delta+(\{h\})} x_{ij} = y_h, h\in M \quad (6)$$

$$\sum_{(i,j)\in \delta-(M')} x_{ij} \geq y_h = M'c\ M,\ h\in M' \quad (7)$$

$$x_{ij} \in \{0,1\}, \ (i,j)\in A \quad (8)$$

$$y_i \in \{0,1\}, \ i\in M \quad (9)$$

$$z_{iik} \geq 0, \ k\in K, \ i\in M_k \quad (10).$$

In some implementations, the objective function of Equation 3 and shown in box 4803 may be used for the joint minimization of the traveling and purchasing costs. Further, Equation 4 (shown in box 4804) may ensure that each product demand is satisfied. The constraint equations in Equation 5 (shown in box 4805) may impose that each supplier has to visit to purchase a transportation and freight capacity unit product from it and the purchased quantity should not exceed the corresponding availability. The constraints in Equations 6 and 7 (shown in boxes 4806 and 4807) may be used to decide the visiting tour feasibility. In particular, Equation 6 may impose that, for each visited supplier, exactly one arc is to enter and leave the relative node. In particular, the price-time priority queue may be used to provide value for each path of an individual node pair. As such, an overall route sequence for a transportation and freight capacity unit, where the sequence may include a transit of people, packages, data, electricity, space and time, virtual transit, and/or the like. The sequence may also be organized by price-time priority queue for value and then aggregated into a complete arc set.

Further, the inequalities of Equation 7 may be connectively constraints that prevent the creation of sub-tours, not including the depot, by imposing that at least one arc must enter each subset M' of suppliers in which at least one supplier h has visited. In addition, the constraints of Equations 8, 9, and 10 (shown in boxes 4808, 4809, and 4810) may impose binary and non-negative conditions on variables. In some implementations, no integrality conditions may be required for z variables, even if they actually represent the number of transportation and freight units purchased for each product in each supplier. In some implementations, if all input data are integers, then an optimal solution where all z-variables have integer values may exist.

FIG. 49 illustrates a system 4900 in accordance with implementations of various techniques described herein. In one implementation, an asymmetric transportation and freight capacity unit routing problem with trivial preprocessing may be defined as shown in box 4901. In particular, as shown in box 4902, a first trivial preprocessing can be applied to the system 4800:

$$M^* \stackrel{def}{=} \{0\} \cup \{i \in M: \exists k \in K \text{ such that } \Sigma_{j \in M_k/\{i\}} q_{ik} < d_k\} \quad (11).$$

In particular, the node set shown in Equation 11 and box 4902 may be part of any feasible solution.

As shown in box 4903:

$$K^* := \{k \in K: \Sigma_{i \in M_k} q_{ik} = d_k\} \quad (12)$$

as the product set for which suppliers' selection and purchasing plan decisions may be predetermined. Thus, the constraints of Equation 9 (shown in box 4809) may be replaced by $$y_i = 1 \text{ when } i \in M^* \quad (13)$$

and the constraints of Equation 4 (shown in box 4804) may be replaced by $$z_{ik} = q_{ik} \text{ when } k \in K^*, i \in M_k \quad (14).$$

In some implementations, the formulations of system 4800 may not be implemented through a commercial solver (e.g., solvers available in commercial spreadsheet programs) even for small size instances, since the number of constraints (e.g., Equation 7) may be exponentially larger than the size of M. In particular, the commercial solver may be limited due to one or more of the following reasons: a lack of price-time priority queue input ingest to organize inputs; failure to limit or organize the solution to minimize distance and maximize profit; failure to transform the underlying transportation and freight capacity unit into a form that would work legally or technically with such a queue, in that it has not been unitized or securitized as a homogenous unit; and/or the like. However, there may exist other subtour elimination constraints that yield, expanding the variables subspace, transportation and freight capacity unit route sequence formulations with one or more polynomial constraints cardinality for compact formulations.

FIG. 50 illustrates a system 5000 in accordance with implementations of various techniques described herein. In one implementation, an asymmetric transportation and freight capacity unit routing problem with introductions of a non-negative variable may be defined as shown in box 5001. In particular, as shown in box 5002, a non-negative variable $u_i$ may be introduced for each supplier $i \in M$ representing the total number of suppliers already visited when leaving supplier i. Further, as explained in boxes 5002-5004, the inequality of Equation 7 (and shown in box 4807) may be substituted with:

$$u_i - u_j + |M| x_{ij} \leq |M| - 1 \; i,j \in M, \; i \neq j \quad (15).$$

Using Equation 15 may prevent the creation of subtours by controlling the order of visit of the suppliers.

In another implementation, as shown in box 5005, a non-negative flow variable $f_{ij}$ may be defined for each arc $(i,j) \in A$ representing the quantity of a commodity on the vehicle when it leaves supplier i and arrives in j. The single commodity flow formulation may be obtained by substituting the inequalities of Equations 6 and 7 (shown in boxes 4806 and 4807) with the following, which are also shown in boxes 5006-5008:

$$\Sigma_{j \in M} f_{0j} = \Sigma_{k \in K} d_k \quad (16)$$

$$\Sigma_{j:(i,j) \in \delta+(\{h\})} f_{ij} - \Sigma_{(i,j) \in \delta-(\{h\})} f_{ij} = -\Sigma_{k \in K} z_{hk} \; h \in M \quad (17)$$

$$f_{ij} \leq x_{ij} \Sigma_{k \in K} d_k \; (i,j) \in A \quad (18).$$

Figure 51:
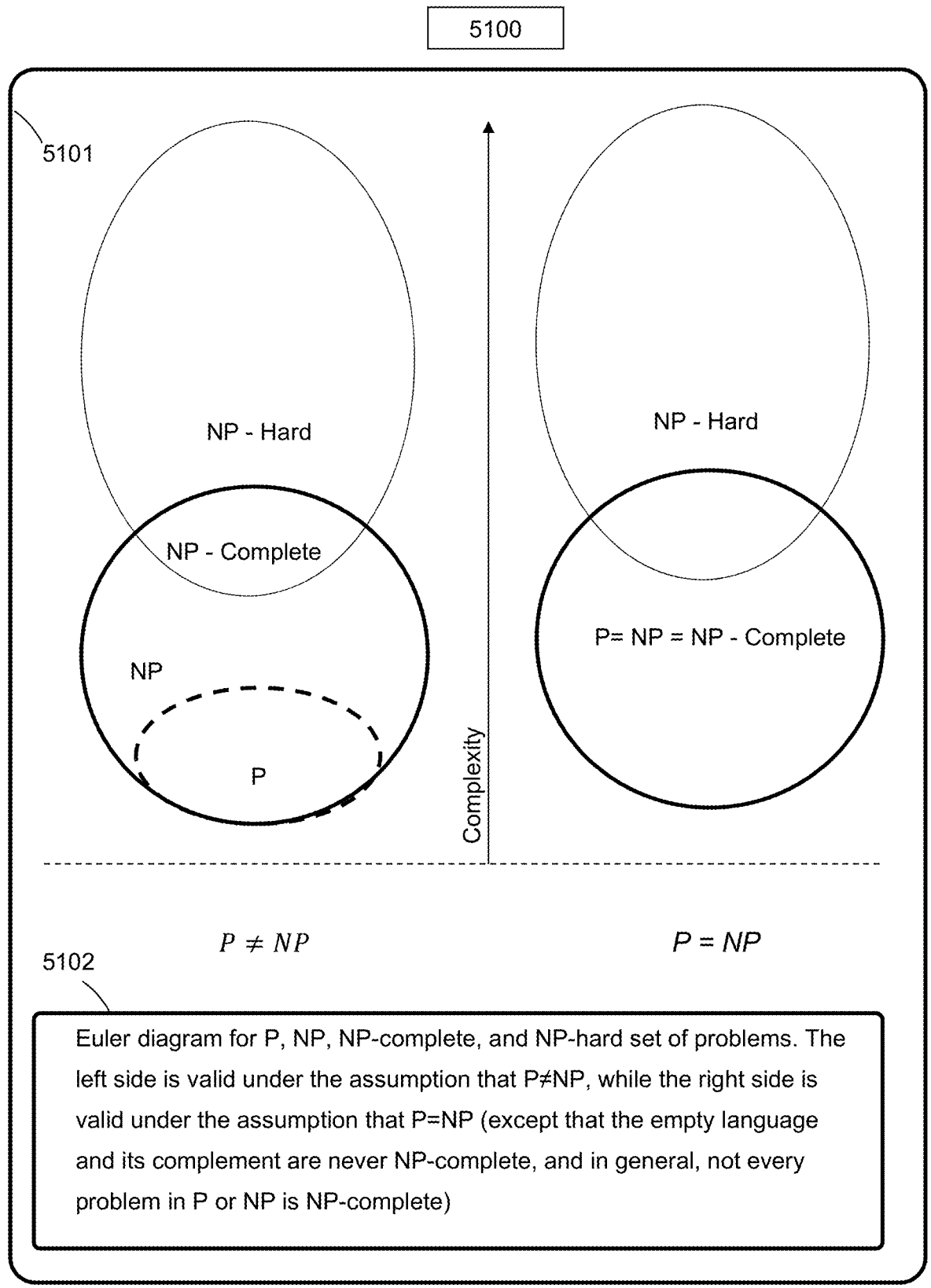

FIG. 51 illustrates a system 5100 in accordance with implementations of various techniques described herein. In one implementation, an Euler diagram of a transportation and freight capacity unit routing problem with introduction solution sets and subsets may be defined as shown in box 5101. In one implementation, and as explained in box 5102, an Euler diagram for P, NP, NP-complete, and NP-hard set of problems is shown in box 5101. The left side may be valid under the assumption that P≠NP, while the right side may be valid under the assumption that P=NP (except that the empty language and its complement are never NP-complete, and in general, not every problem in P or NP is NP-complete).

FIG. 52 illustrates a system 5200 in accordance with implementations of various techniques described herein. In one implementation, box 5201 shows a layered diagram of the components of a transportation and freight capacity unit covering sets, supersets and subsets that may expand the layered diagram. A layered supplier selection grid may be created as an input 5202 with finite or infinite nodes in multidimensional space. The minimization equations for travel cost, travel time, travel purchases or other market driven travel variables may be separated into a routing layer 5203, a purchasing layer 5204, or other layers. The routing layer may select one or more route sequences that minimize travel cost, travel time, travel purchases or other market driven travel variables and nodes, such as nodes 5205, 5206, 5207, 5208, and 5209. The purchasing layer may select one or more route sequences that minimize travel cost, travel time, travel purchases or other market driven travel variables and nodes, such as nodes 5210, 5211, 5212, 5213, and 5214.

Box 5215 shows route optimized route sequences, which may be displayed as a map of optimal routes given an objective function, with market transportation or freight capacity units as inputs into the objective function and or constraint functions. In some implementations, route sequences may be altered in real time as price-time priority queues and market structured transformations over market-based queue structures for transportation and freight capacity units are bought or sold or re-traded to form new objective functions and constraints which may be interactively and iteratively optimized for optimal route structures. In particular, because the input values may be dynamically generated by the price-time priority queues for each sub route, the overall route may have a new, optimal solution each time the price-time priority queue object changes value on a single node to node path. Further, the portfolio route solution may dependent on the input route solution, but the input route values may be dynamically changing a series of exchanges in the form of price-time priority queues for each node to node pair value.

In some implementations, the aforementioned steps and transformations may be processed to transform the transportation or freight capacity unit routing sequence general case, such as that which was discussed with respect to FIG. 48. These steps and transformations may be used to improve the traveling purchasing problem route sequence formulations and improve the fields of computational combinatorial optimization problems, NP-hard problems, freight, transportation, and the movement of wireless and optical and wave packets through routing structures in telecommunications, wireless, power, broadband and other fields.

Implementations of one or more methods and systems described herein may be used to transform a multi-modal transportation and freight capacity units network with a waypoint, two waypoints, a destination waypoint, or a series sequence of waypoints into transformed hub and spoke topologies and transformed routing sequences associated with transportation and freight capacity unit route markets to optimize route sequences. One or more implementations described herein may relate to combining the concepts of multi-dimensional routing sequences, route sequence optimization, object oriented programming, navigation systems, network topologies, social networking, and/or transportation and freight as a fungible asset class or trading market, such as in more developed commodity markets (e.g., oil, wheat, corn, and the like).

Transportation capacity units and freight capacity units have not been defined terms in prior art. Further, data transformations have not been used to redefine the transportation and freight markets. In particular, transportation and freight have not previously been tradable, like oil, gas, wheat, or stocks, because the data transformations to transportation and freight units have not been attempted by any prior art. Further, while there may be hundreds, thousands, or millions of people along various transportation virtual hub sequences, there currently exists no method or system of organizing a route or virtual hub sequence into a transformed data community object. In some implementations, while hub and spoke transportation systems may be used for airplane transportation or bus and train networks, they do not exist for private vehicle networks in an organized manner other than roadways.

These aforementioned deficiencies may also limit and prevent the theoretical and practical development of more useful implementations of P, NP, NP-complete and NP-hard set computational complexity theoretical implementations of routing, where the implementations may be based on traveling salesman problems or other traveling purchaser problems. Traveling salesman problems and traveling purchaser problems may have previously been limited to non-substitutable transportation capacity unit and non-dynamic pricing limitations, which may have limited route sequence planning, route sequence optimization, and route sequences to limited and discrete time periods. The lack of market price time priority queues may have limited the capability and effectiveness of routing software based on limited dimension and limited layer constructions of networks. Typical transportation systems and routing methods may use a 24 hour cycle, which may create large overhead of wasted transportation and freight space, as transportation and freight capacity units had not been formed. The trading of transportation units may have not been allowed to allocate capacity dynamically and allow for higher frequency routing formulations to occur on changing network node valuations with iterative optimization from changing market dynamics.

The aforementioned deficiencies and other problems associated with the routing formulations, general navigation systems, transportation and freight markets, securitization of transportation units and other systems and interfaces may be reduced or eliminated by the implementations disclosed herein. In particular, the implementations may include integrating and interfacing a plurality of systems into one system, which may allow for data transformations of a transportation and freight unit security combined with the efficiency of a forward market structure transformation, and which may be used to price and ration unused space. This may help to eliminate wasted transportation units or freight capacity. The input may be the price time priority queues of transportation and freight prices between one or more waypoints into dynamic real time routing algorithms, and the resulting outputs of algorithms may be to minimize travel cost, travel distance and route pricing. The associated legal and calculation transformations or transportation and freight capacity units may lead to new quantum mechanics fields of study in transportation and freight routing and computational complexity theory.

In some implementations, the methods and systems disclosed herein may be used on portable devices. The implementations disclosed herein may create a transformed route based on minimizing travel time, route distance, route pricing and route cost or a subset or superset of the above. The implementations disclosed herein may be a layer on mapping and map routing software on one or more computing devices. The implementations disclosed herein may use subordinate legal contracts to transform the data. The implementations disclosed herein may be used on stationary devices. The implementations disclosed herein may be used on mixed reality, augmented reality, virtual reality, and/or other audio or visualization systems and methods, which may allow a user to transact and trade freight and transportation capacity units as a forward commodity security and resulting routing sequence outputs.

In some implementations the graphical user interface ("GUI") on any mobile or stationary computer device may interface with one or more processors, memory and one or more modules, and/or programs or sets of instructions stored in memory for performing multiple functions. The user may interact with the GUI primarily through finger contacts, voice commands, or other sensory methods to interface with the GUI. The functions may include the user directing the GUI to place a user profile in a virtual hub so that they may participate, transact, or trade a combination of virtual hub transportation routes as a forward commodity for transportation or freight capacity and resulting routing sequences. The functions may also include the user instructing the GUI to participate, transact, route, re-route or trade various modes of transportation capacity, such as automobile, air, autonomous vehicle, bike, boat, bus, drone, limo, motorcycle, moped, shuttle, spaceship, subway, scooters, eVehicles, eScooters, taxi, train, other transportation methods, cargo freight, package freight, virtual transport, and/or various combinations, subsets and supersets of the aforementioned modes and other transportation and freight modes. The functions may further include the user instructing the GUI to form a new or existing virtual hub or virtual hub combination, which then has a specification function which forms a basis for the GUI to present the plurality of buyers and sellers of transportation and freight capacity securities between two or more virtual hubs. Further, the transformed transportation and freight capacity units may create a new dimension in time and space, where the price time priority queues or other market based queue structures create yet another dimension in time and space formerly not considered by routing algorithms. The aforementioned market input for a transportation or freight capacity unit waypoint or waypoint sequence may then be used as an input for routing and rerouting optimization algorithms to provide and change optimal route output sequences.

In one implementation, a user may be at a mobile or fixed computing device with a touchscreen, a computing device without a touchscreen, an augmented reality non-screen display, an audio non-screen interface, and/or other computing interface detecting a user network login. The computing system may detect a secure login based on facial recognition, fingerprint recognition, photo scan, and/or biometric interface recognition of the user. The computing system may perform multiple local and external security and crime checks on the user. The computing system may also detect and receive from the user an origin location through the GUI user input or GPS coordinate input from the computing device. The computing device may detect from the user input a destination coordinate and the transmission of said coordinates, generating and applying specific data legal contract transformations to incorporate general specifications as well as the concepts of cost of cover, liquidated damages, and force majeure.

The computing system may also generate and apply one or more optimization techniques to form a virtual hub with other users that have similar transportation requests within a geographic boundary. The computing system may determine if two or more virtual hubs are required for the path of the auction or price time priority market queue structure or other market based queue structure between a starting point and ending point, and may generate instructions to index and rank pricing for a plurality of routes in context of virtual hubs or navigation routing. The computing system may also generate instructions to index navigation routes based on pricing for transportation units along the routes, and may generate instructions for a plurality of computing devices, networks, virtual hub database servers, network member database servers, and/or transportation platform market database servers to form a combination of virtual hubs and contract specifications for delivery of transportation services or freight capacity between the virtual hubs. The computing system present the combination of virtual hubs in a format presented by a GUI which allows the user to submit prices to sell (offer) or bid (buy) transportation or freight capacity between virtual hub combinations, generate instructions to interface a plurality networks, navigation routing based on price of transportation unit securities, navigation routing based on minimizing transportation costs, navigation routing based on minimizing purchasing cost, global positioning systems networks, servers, securitization, forward commodity markets, grouping software for virtual hubs, sequence routing algorithms, sequence cost routing algorithms, sequence purchasing routing algorithms, map routing systems and methods, transparent open access pricing systems which form a price auction of a given quality, price-time priority queues for market pricing of transportation and freight capacity units, blockchain audit and safety systems, virtual hub topology servers and systems, and/or no arbitrage constraint condition systems which form one system to implement a forward commodity transportation and freight capacity unit market system and method.

The programs and instructions may be stored in memory and configured to be executed by one or more processes by a plurality of users. The programs may include a plurality of configurations and specification instructions for various modes of transportation capacity. The programs also may include specification options to select a plurality of timings, quality levels of capacity and service, cost of cover, liquidated damages, force majeure, term of timings such as by the second, minute, hour, day, weekday, weekend, month, annual or day of the week, and/or various order types such as day, good till cancelled, immediate or cancel, good till date, day till cancelled, limit, market, market if touched, snap market, snap mid, snap to primary, peg to benchmark, and adaptive custom orders. The programs may also include a plurality of instruction modes such as automobile, air, autonomous vehicle, bike, boat, bus, drone, limo, motorcycle, moped, scooter, shuttle, ship, spaceship, subway, taxi, train, packages, multimodal, and cargo for transportation or freight capacity. The programs also may include instructions for virtual hub pick up and drop off points as well as instructions to set various constraints, such as cheapest route, single mode, multi-mode, fastest route, most scenic route, highest rating, routing alternatives based on the prices of the transportation unit securities between two hubs, lowest travel cost, lowest purchasing cost, most available or liquid, highest volume, most frequent, service level, security and safety, and/or group restricted modes. The programs may include a plurality of interfaces with map routing display interface software, such as Google Maps, Apple Maps, TomTom Maps, Open Street Maps, Bing Maps, Nokia Maps, or a plurality of other map routing technologies to place the forward transportation unit security pricing on the map navigation routes or routing sequences based on market inputs as an integration layer. The programs and instructions from the computing system may provide master instructions for the plurality of computing devices and servers which interface to allow the user to participate, transact and trade a plurality of transportation and freight capacity modes between a plurality of virtual hubs.

In addition, a computing system may include a plurality of networks, global positioning systems networks, servers, forward commodity market servers and instructions, securitization legal data transformations, grouping program instructions for virtual hubs and associated servers, transparent open access pricing servers and instructions, GPS map routing servers, indexing databases and programs to rank alternative navigation routes based on transportation and freight unit security pricing, blockchain audit and safety servers and instructions, user identification history, instructions against crime databases, identity databases to confirm security of the system and users, virtual hub servers and instructions, route sequence algorithm instructions, and/or no arbitrage constraint condition servers and instructions which form one system to implement a forward commodity transportation and freight capacity unit security market routing sequence system and method.

Figure 53:
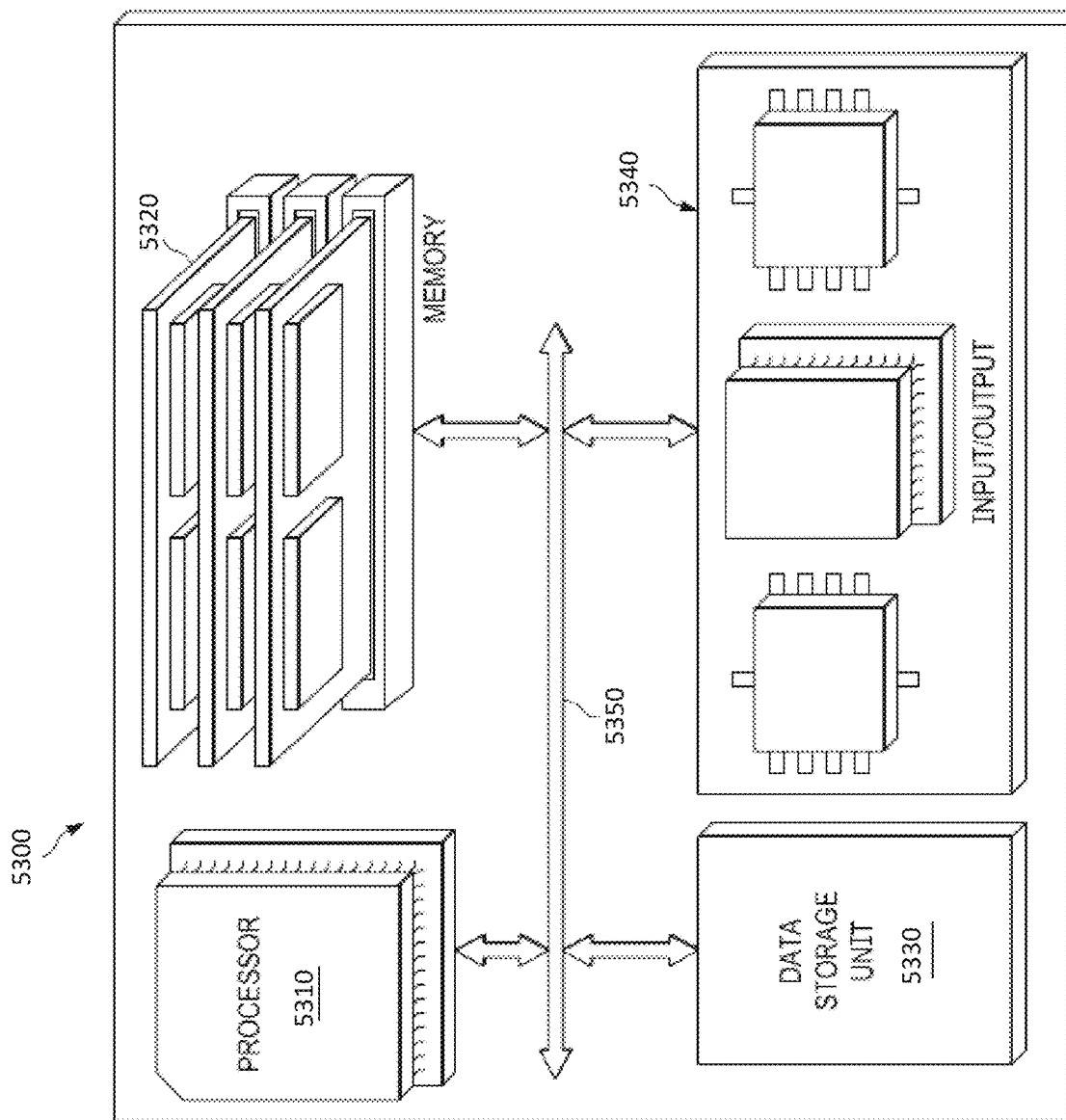
FIG. 53 illustrates a schematic diagram of a computing system in which the various technologies described herein may be incorporated and practiced.

FIG. 53 illustrates a block diagram of a hardware configuration 5300 in which one or more various technologies described herein may be incorporated and practiced. The hardware configuration 5300 can be used to implement the computing systems discussed above (e.g., the computing devices mentioned above). The hardware configuration 5300 can include a processor 5310, a memory 5320, a storage device 5330, and an input/output device 5340. Each of the components 5310, 5320, 5330, and 5340 can, for example, be interconnected using a system bus 5350. The processor 5310 can be capable of processing instructions for execution within the hardware configuration 5300. In one implementation, the processor 5310 can be a single-threaded processor. In another implementation, the processor 5310 can be a multi-threaded processor. The processor 5310 can be capable of processing instructions stored in the memory 5320 or on the storage device 5330.

The memory 5320 can store information within the hardware configuration 5300. In one implementation, the memory 5320 can be a computer-readable medium. In one implementation, the memory 5320 can be a volatile memory unit. In another implementation, the memory 5320 can be a non-volatile memory unit.

In some implementations, the storage device 5330 can be capable of providing mass storage for the hardware configuration 5300. In one implementation, the storage device 5330 can be a computer-readable medium. In various different implementations, the storage device 5330 can, for example, include a hard disk device/drive, an optical disk device, flash memory or some other large capacity storage device. In other implementations, the storage device 5330 can be a device external to the hardware configuration 5300. Various implementations for the memory 5320 and/or the storage device 5330 are further discussed below.

The input/output device 5340 can provide input/output operations for the hardware configuration 5300. In one implementation, the input/output device 5340 can include one or more display system interfaces, sensors and/or data transfer ports.

The subject matter of this disclosure, and/or components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine, e.g., a machine programmed to perform the processes described herein. The processes and logic flows can also be performed by, and apparatus can also be implemented as, special purpose logic circuitry, e.g., an FPGA (field programmable gate array) or an ASIC (application specific integrated circuit).

Computer readable media (e.g., memory 5320 and/or the storage device 5330) suitable for storing computer program instructions and data may include all forms of non-volatile memory, media, and memory devices, including, by way of example, any semiconductor memory devices (e.g., EPROM, EEPROM, solid state memory devices, and flash memory devices); any magnetic disks (e.g., internal hard disks or removable disks); any magneto optical disks; and any CD-ROM and DVD-ROM disks. The processor and the memory can be supplemented by, or incorporated in, special purpose logic circuitry.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   tracking origin location data and destination location data for a plurality of users from respective satellite navigation systems;
   receiving updates to the origin location data and the destination location data in real-time from one or more of the plurality of users over a wireless or wired communication network, wherein the origin location data corresponds to a geographic origin and the destination location data corresponds to a geographic destination;
   generating a plurality of routes based on the updates to the origin location data and the updates to the destination location data;
   receiving constraint data from the one or more of the plurality of users, wherein the constraint data indicates a selection by the one or more of the plurality of users of one or more conditions for traveling along the plurality of routes, wherein:
      the one or more conditions comprise cheapest route, single mode of transportation, multiple modes of transportation, fastest route, most scenic route, highest rated route, most available route, highest volume of participants for route, most frequent route, service level for route, emissions reduction, highest safety and security level for route, gender of driver, security of driver, and rating of driver;
   determining a plurality of virtual hubs along the plurality of routes, wherein the plurality of virtual hubs comprises a first virtual hub based on the updates to the origin location data and a second virtual hub based on the updates to the destination location data;
   storing virtual hub location data corresponding to the first and second virtual hubs on a first database server;
   generating one or more geolocation units for at least a first subset of the plurality of users based on travel cost data for the plurality of routes, wherein:
      the one or more geolocation units correspond to a predetermined space traveling from the first virtual hub to the second virtual hub,
      the travel cost data for the plurality of routes comprises data relating to travel time, travel expenses, or combinations thereof, and
      the travel cost data for the plurality of routes is based on the constraint data;
   generating a geolocation market platform for trading the one or more geolocation units, comprising:
      receiving, over the wireless or wired communication network, market depth data for the geolocation market platform for the one or more geolocation units based on the plurality of routes, wherein:
         the market depth data comprises one or more bid prices and one or more offer prices for the one or more geolocation units, and
         the market depth data is based on the plurality of routes and the constraint data;
      storing the market depth data for the geolocation market platform on a second database server;

selecting an optimized route of the plurality of routes for the one or more geolocation units based on an objective function, wherein the objective function uses the travel cost data, the market depth data, or combinations thereof;

detecting, at respective user interfaces of the plurality of users, respective user network logins of the user interfaces using facial recognition or fingerprint recognition for authentication;

generating one or more graphical layers, on at least one of the detected user interfaces, based on the travel cost data and at least a subset of the market depth data, wherein the one or more graphical layers are configured to be integrated on a respective navigational map interface;

generating, on the generated one or more graphical layers on the at least one of the detected user interfaces, the selected optimized route as a visualization on the respective navigational map interface; and generating a forward commodity contract based on the selected optimized route, wherein the forward commodity contract is used for physical delivery of the one or more geolocation units, and wherein the forward commodity contract comprises one or more conditional attributes to provide substitutability between first and second geolocation units of the one or more geolocation units.

2. The method of claim 1, wherein:
the detected user interfaces comprise touchscreen displays or augmented non-screen displays of the plurality of users; and
the objective function comprises a function configured to minimize travel time, travel expenses, cost of bid prices, or combinations thereof, and wherein the geolocation market platform comprises a market exchange for the one or more geolocation units, and wherein the one or more geolocation units comprises one or more commodity contract specifications.

3. The method of claim 1, wherein:
the one or more graphical layers comprise one or more integrated or overlayed layers;
the one or more integrated or overlayed layers comprise at least one or more of: buttons, icons, settings tables, or menus configured for selection or manipulation by a respective user of the plurality of users; and
the optimized route comprises a route for travel for the one or more geolocation units using one or more transportation vehicles, wherein the one or more transportation vehicles comprise an automobile, an aircraft, an autonomous vehicle, a motorcycle, a bicycle, a boat, a bus, a subway car, a taxicab, a train, a taxicab, a drone, an unmanned aircraft, a virtual transportation vehicle, or a delivery vehicle.

4. The method of claim 1, wherein:
at least one of the market depth data and the travel cost data are transmitted to the detected user interfaces as one or more overlayed or integrated layers, wherein the one or more overlayed or integrated layers comprise one or more of the graphical layers or graphical list views; and
the predetermined space comprises a seat or cargo capacity in one or more vehicles traveling from the first virtual hub to the second virtual hub.

5. A computing system, comprising:
one or more processors; and
one or more memory comprising program instructions executable by the one or more processors to:

track origin location data and destination location data for a plurality of users in real time from respective satellite navigation systems;

receive updates to the origin location data and the destination location data in real-time from one or more of the plurality of users over a wireless or wired communication network, wherein the origin location data corresponds to a geographic origin and the destination location data corresponds to a geographic destination;

generate a plurality of routes based on the updates to the origin location data and the updates to the destination location data;

receive constraint data from the one or more of the plurality of users, wherein the constraint data indicates a selection by the one or more of the plurality of users of one or more conditions for traveling along the plurality of routes, wherein:
the one or more conditions comprise cheapest route, single mode of transportation, multiple modes of transportation, fastest route, most scenic route, highest rated route, most available route, highest volume of participants for route, most frequent route, service level for route, emissions reduction, highest safety and security level for route, gender of driver, security of driver, and rating of driver;

determine a plurality of virtual hubs along the plurality of routes, wherein the plurality of virtual hubs comprises a first virtual hub based on the updates to the origin location data and a second virtual hub based on the updates to the destination location data;

store virtual hub location data corresponding to the first and second virtual hubs on a first database server;

generate one or more geolocation units for at least a first subset of the plurality of users based on travel cost data for the plurality of routes, wherein:
the one or more geolocation units correspond to a predetermined space traveling from the first virtual hub to the second virtual hub,
the travel cost data for the plurality of routes comprises data relating to travel time, travel expenses, or combinations thereof, and
the travel cost data for the plurality of routes is based on the constraint data;

generating a geolocation market platform for trading the one or more geolocation units, comprising:
receive, over the wireless or wired communication network, market depth data for the geolocation market platform for the one or more geolocation units based on the plurality of routes, wherein:
the market depth data comprises one or more bid prices and one or more offer prices for the one or more geolocation units, and
the market depth data is based on the plurality of routes and the constraint data;
store the market depth data for the geolocation market platform on a second database server;
select an optimized route of the plurality of routes for the one or more geolocation units based on an objective function, wherein the objective function uses the travel cost data, the market depth data, or combinations thereof;

detect, at respective user interfaces of the plurality of users, respective user network logins of the user interfaces using facial recognition or fingerprint recognition for authentication;

generate one or more graphical layers, on at least one of the detected user interfaces, based on the travel cost data and at least a subset of the market depth data, wherein the one or more graphical layers are configured to be integrated on a respective navigational map interface;

generate, on the generated one or more graphical layers on the at least one of the detected user interfaces, the selected optimized route as a visualization on the respective navigational map interface; and generate a forward commodity contract based on the selected optimized route, wherein the forward commodity contract is used for physical delivery of the one or more geolocation units, and wherein the forward commodity contract comprises one or more conditional attributes to provide substitutability between first and second geolocation units of the one or more geolocation units.

6. The computing system of claim 5, wherein the objective function comprises a function configured to minimize travel time, travel expenses, cost of bid prices, or combinations thereof, and wherein the geolocation market platform comprises an exchange for the one or more geolocation units, and wherein the one or more geolocation units comprises one or more commodity contract specifications.

7. The computing system of claim 5, wherein the optimized route comprises a route for travel for the one or more geolocation units using one or more transportation vehicles, wherein the one or more transportation vehicles comprise an automobile, an aircraft, an autonomous vehicle, a motorcycle, a bicycle, a boat, a bus, a subway car, a taxicab, a train, a drone, an unmanned aircraft, a virtual transportation vehicle, or a delivery vehicle.

8. The computing system of claim 5, wherein the predetermined space comprises a seat or cargo capacity in one or more vehicles traveling from the first virtual hub to the second virtual hub.

9. A non-transitory computer-readable medium having stored thereon a plurality of computer-executable instructions which, when executed by a computer, cause the computer to:

track origin location data and destination location data for a plurality of users in real time from respective satellite navigation systems;

receive updates to the origin location data and the destination location data in real-time from one or more of the plurality of users over a wireless or wired communication network, wherein the origin location data corresponds to a geographic origin and the destination location data corresponds to a geographic destination;

generate a plurality of routes based on the updates to the origin location data and the updates to the destination location data;

receive constraint data from the one or more of the plurality of users, wherein the constraint data indicates a selection by the one or more of the plurality of users of one or more conditions for traveling along the plurality of routes, wherein:

the one or more conditions comprise cheapest route, single mode of transportation, multiple modes of transportation, fastest route, most scenic route, highest rated route, most available route, highest volume of participants for route, most frequent route, service level for route, emissions reduction, highest safety and security level for route, gender of driver, security of driver, and rating of driver;

determine a plurality of virtual hubs along the plurality of routes, wherein the plurality of virtual hubs comprises a first virtual hub based on the updates to the origin location data and a second virtual hub based on the updates to the destination location data;

store virtual hub location data corresponding to the first and second virtual hubs on a first database server;

generate one or more geolocation units for at least a first subset of the plurality of users based on travel cost data for the plurality of routes, wherein:

the one or more geolocation units correspond to a predetermined space traveling from the first virtual hub to the second virtual hub, and the travel cost data for the plurality of routes comprises data relating to travel time, travel expenses, or combinations thereof, and the travel cost data for the plurality of routes is based on the constraint data;

generating a geolocation market platform for trading the one or more geolocation units, comprising:

receive, over the wireless or wired communication network, market depth data for the geolocation market platform for the one or more geolocation units based on the plurality of routes, wherein;

the market depth data comprises one or more bid prices and one or more offer prices for the one or more geolocation units, and the market depth data is based on the plurality of routes and the constraint data;

store the market depth data for the geolocation market platform on a second database server;

select an optimized route of the plurality of routes for the one or more geolocation units based on an objective function, wherein the objective function uses the travel cost data, the market depth data, or combinations thereof;

detect, at respective user interfaces of the plurality of users, respective user network logins of the user interfaces using facial recognition or fingerprint recognition for authentication;

generate one or more graphical layers, on at least one of the detected user interfaces, based on the travel cost data and at least a subset of the market depth data, wherein the one or more graphical layers are configured to be integrated on a respective navigational map interface;

generate, on the generated one or more graphical layers on the at least one of the detected user interfaces, the selected optimized route as a visualization on the respective navigational map interface; and generate a forward commodity contract based on the selected optimized route, wherein the forward commodity contract is used for physical delivery of the one or more geolocation units, and wherein the forward commodity contract comprises one or more conditional attributes to provide substitutability between first and second geolocation units of the one or more geolocation units.

10. The non-transitory computer-readable medium of claim 9, wherein the objective function comprises a function configured to minimize travel time, travel expenses, cost of bid prices, or combinations thereof.

11. The non-transitory computer-readable medium of claim 9, wherein the optimized route comprises a route for travel for the one or more geolocation units using one or more transportation vehicles, wherein the one or more transportation vehicles comprise an automobile, an aircraft, an autonomous vehicle, a motorcycle, a bicycle, a boat, a bus, a subway car, a taxicab, a train, a drone, an unmanned aircraft, a virtual transportation vehicle, or a delivery vehicle.

12. The non-transitory computer-readable medium of claim 9, the predetermined space comprises a seat or cargo capacity in one or more vehicles traveling from the first virtual hub to the second virtual hub.

* * * * *